US009589266B2

(12) United States Patent
Pourfallah et al.

(10) Patent No.: US 9,589,266 B2
(45) Date of Patent: *Mar. 7, 2017

(54) RESTRICTED-USE ACCOUNT PAYMENT ADMINISTRATION APPARATUSES, METHODS AND SYSTEMS

(75) Inventors: Stacy Sweeney Pourfallah, San Ramon, CA (US); Shaw Li, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,883

(22) Filed: Mar. 31, 2012

(65) Prior Publication Data

US 2012/0253852 A1    Oct. 4, 2012

Related U.S. Application Data

(60) Provisional application No. 61/471,092, filed on Apr. 1, 2011.

(51) Int. Cl.
  *G06Q 40/00*    (2012.01)
  *G06Q 20/36*    (2012.01)
  (Continued)

(52) U.S. Cl.
  CPC ......... *G06Q 20/36* (2013.01); *G06Q 20/3276* (2013.01); *G06Q 40/02* (2013.01)

(58) Field of Classification Search
  USPC .......................................... 705/35, 40, 4, 39
  See application file for complete search history.

(56) References Cited

U.S. PATENT DOCUMENTS

| 4,491,725 | A | 1/1985 | Pritchard |
| 5,018,067 | A | 5/1991 | Mohlenbrock et al. |
| | | (Continued) | |

FOREIGN PATENT DOCUMENTS

| AU | 2006203957 | 3/2012 |
| AU | 2006203968 | 3/2012 |
| | (Continued) | |

OTHER PUBLICATIONS

PCT International Search Report and Written Opinion, mailed Jul. 16, 2012 for PCT/US12/31762, filed Mar. 31, 2012.

(Continued)

*Primary Examiner* — Lalita M Hamilton
(74) *Attorney, Agent, or Firm* — Loeb & Loeb LLP

(57) ABSTRACT

The RESTRICTED-USE ACCOUNT PAYMENT ADMINISTRATION APPARATUSES, METHODS AND SYSTEMS (hereinafter "RUAP") transform purchase item information inputs or purchase receipt inputs via RUAP components into restricted-use account payment settlement outputs. A method is disclosed, including: receiving a restricted-use account reimbursement request including receipt information related to a purchase transaction from a user; obtaining purchase item information from the receipt information included in the restricted-use account reimbursement request; identifying a restricted-use account of the user; determining a purchase item is eligible for the restricted-account usage; determining a reimbursement amount associated with the purchase item form the purchase item information; generating a reimbursement authorization request message including the purchase item information and the reimbursement amount; transmitting the reimbursement authorization request message to a restricted-account issuer for approval; and transacting the reimbursement (Continued)

amount from the restricted-use account to a user financial account upon the restricted-account issuer approval.

21 Claims, 81 Drawing Sheets

(51) Int. Cl.
  *G06Q 20/32* (2012.01)
  *G06Q 40/02* (2012.01)

(56) References Cited

U.S. PATENT DOCUMENTS

| | | | |
|---|---|---|---|
| 5,070,452 A | 12/1991 | Doyle, Jr. et al. | |
| 5,175,416 A | 12/1992 | Mansvelt et al. | |
| 5,235,507 A | 8/1993 | Sackler et al. | |
| 5,301,105 A | 4/1994 | Cummings, Jr. | |
| 5,324,077 A | 6/1994 | Kessler et al. | |
| 5,335,278 A | 8/1994 | Matchett et al. | |
| 5,550,734 A | 8/1996 | Tarter et al. | |
| 5,628,530 A | 5/1997 | Thornton | |
| 5,644,778 A | 7/1997 | Burks et al. | |
| 5,710,578 A | 1/1998 | Beauregard et al. | |
| 5,832,447 A | 11/1998 | Rieker et al. | |
| 5,915,241 A | 6/1999 | Giannini | |
| 5,965,860 A | 10/1999 | Oneda | |
| 5,995,939 A | 11/1999 | Berman et al. | |
| 6,012,035 A | 1/2000 | Freeman, Jr. et al. | |
| 6,044,352 A | 3/2000 | Deavers | |
| 6,082,776 A | 7/2000 | Feinberg | |
| 6,112,183 A | 8/2000 | Swanson et al. | |
| 6,151,588 A | 11/2000 | Tozzoli et al. | |
| 6,208,973 B1 | 3/2001 | Boyer et al. | |
| 6,332,133 B1 | 12/2001 | Takayama | |
| 6,343,271 B1 | 1/2002 | Peterson et al. | |
| 6,401,079 B1 | 6/2002 | Kahn et al. | |
| 6,529,884 B1 | 3/2003 | Jakobsson | |
| 6,629,081 B1 | 9/2003 | Cornelius et al. | |
| 6,850,901 B1 | 2/2005 | Hunter et al. | |
| 6,877,655 B1 | 4/2005 | Robertson et al. | |
| 6,915,265 B1 | 7/2005 | Johnson | |
| 6,988,075 B1 | 1/2006 | Hacker | |
| 7,072,842 B2 | 7/2006 | Provost et al. | |
| 7,174,302 B2 | 2/2007 | Patricelli et al. | |
| 7,295,988 B1 | 11/2007 | Reeves | |
| 7,428,494 B2 | 9/2008 | Hasan et al. | |
| 7,464,859 B1 | 12/2008 | Hawkins | |
| 7,650,308 B2 | 1/2010 | Nguyen et al. | |
| 7,752,096 B2 | 7/2010 | Santalo et al. | |
| 7,769,599 B2 | 8/2010 | Yanak et al. | |
| 7,792,688 B2 | 9/2010 | Yanak et al. | |
| 7,866,548 B2 | 1/2011 | Reed et al. | |
| 7,925,518 B2 | 4/2011 | Lee et al. | |
| 7,996,260 B1 | 8/2011 | Cunningham et al. | |
| 8,219,420 B1* | 7/2012 | Heffley | G06F 19/328 705/4 |
| 2001/0037295 A1 | 11/2001 | Olsen | |
| 2001/0053986 A1 | 12/2001 | Dick | |
| 2002/0002534 A1 | 1/2002 | Davis et al. | |
| 2002/0002536 A1 | 1/2002 | Braco | |
| 2002/0019808 A1 | 2/2002 | Sharma | |
| 2002/0032583 A1 | 3/2002 | Joao | |
| 2002/0128863 A1 | 9/2002 | Richmond | |
| 2002/0138309 A1 | 9/2002 | Thomas, Jr. | |
| 2002/0147678 A1 | 10/2002 | Drunsic | |
| 2002/0152180 A1 | 10/2002 | Turgeon | |
| 2002/0198831 A1 | 12/2002 | Patricelli et al. | |
| 2003/0009355 A1 | 1/2003 | Gupta | |
| 2003/0040939 A1 | 2/2003 | Tritch et al. | |
| 2003/0055686 A1 | 3/2003 | Satoh et al. | |
| 2003/0193185 A1 | 10/2003 | Valley et al. | |
| 2003/0200118 A1 | 10/2003 | Lee et al. | |
| 2003/0212642 A1 | 11/2003 | Weller et al. | |
| 2003/0225693 A1 | 12/2003 | Ballard et al. | |
| 2003/0236747 A1* | 12/2003 | Sager | G06Q 20/02 705/40 |
| 2004/0006490 A1 | 1/2004 | Gingrich et al. | |
| 2004/0039693 A1 | 2/2004 | Nauman et al. | |
| 2004/0054935 A1 | 3/2004 | Holvey et al. | |
| 2004/0103000 A1 | 5/2004 | Owurowa et al. | |
| 2004/0111345 A1 | 6/2004 | Chuang et al. | |
| 2004/0128201 A1 | 7/2004 | Ofir et al. | |
| 2004/0138999 A1 | 7/2004 | Friedman et al. | |
| 2004/0148203 A1 | 7/2004 | Whitaker et al. | |
| 2004/0172312 A1 | 9/2004 | Selwanes et al. | |
| 2004/0186746 A1 | 9/2004 | Angst et al. | |
| 2004/0210520 A1 | 10/2004 | Fitzgerald et al. | |
| 2004/0225567 A1 | 11/2004 | Mitchell et al. | |
| 2004/0254816 A1 | 12/2004 | Myers | |
| 2005/0010448 A1 | 1/2005 | Mattera | |
| 2005/0015280 A1 | 1/2005 | Gabel et al. | |
| 2005/0033609 A1 | 2/2005 | Yang | |
| 2005/0038675 A1 | 2/2005 | Siekman et al. | |
| 2005/0065819 A1 | 3/2005 | Schultz | |
| 2005/0065824 A1 | 3/2005 | Kohan | |
| 2005/0071194 A1 | 3/2005 | Bormann et al. | |
| 2005/0080692 A1* | 4/2005 | Padam | G06Q 20/04 705/30 |
| 2005/0119918 A1 | 6/2005 | Berliner | |
| 2005/0182721 A1 | 8/2005 | Weintraub | |
| 2005/0187790 A1 | 8/2005 | Lapsker | |
| 2005/0187794 A1 | 8/2005 | Kimak | |
| 2005/0209893 A1 | 9/2005 | Nahra et al. | |
| 2005/0211764 A1 | 9/2005 | Barcelou | |
| 2005/0246292 A1 | 11/2005 | Sarcanin | |
| 2005/0273387 A1 | 12/2005 | Previdi | |
| 2005/0288964 A1 | 12/2005 | Lutzen et al. | |
| 2006/0010007 A1 | 1/2006 | Denman et al. | |
| 2006/0106645 A1 | 5/2006 | Bergelson et al. | |
| 2006/0106646 A1 | 5/2006 | Squilla et al. | |
| 2006/0111943 A1 | 5/2006 | Wu | |
| 2006/0122855 A1 | 6/2006 | Prorock | |
| 2006/0129427 A1 | 6/2006 | Wennberg | |
| 2006/0129435 A1 | 6/2006 | Smitherman et al. | |
| 2006/0136270 A1 | 6/2006 | Morgan et al. | |
| 2006/0149529 A1 | 7/2006 | Nguyen et al. | |
| 2006/0149603 A1 | 7/2006 | Patterson et al. | |
| 2006/0149670 A1* | 7/2006 | Nguyen | G06Q 20/10 705/39 |
| 2006/0161456 A1 | 7/2006 | Baker et al. | |
| 2006/0173712 A1 | 8/2006 | Joubert | |
| 2006/0184455 A1 | 8/2006 | Meyer et al. | |
| 2006/0206361 A1 | 9/2006 | Logan, Jr. | |
| 2006/0224417 A1 | 10/2006 | Werner | |
| 2006/0229911 A1 | 10/2006 | Gropper et al. | |
| 2006/0235761 A1 | 10/2006 | Johnson | |
| 2007/0005403 A1 | 1/2007 | Kennedy et al. | |
| 2007/0027715 A1 | 2/2007 | Gropper et al. | |
| 2007/0061169 A1 | 3/2007 | Lorsch | |
| 2007/0106607 A1 | 5/2007 | Seib et al. | |
| 2007/0125844 A1 | 6/2007 | Libin et al. | |
| 2007/0143215 A1 | 6/2007 | Willems | |
| 2007/0233525 A1 | 10/2007 | Boyle | |
| 2007/0271120 A1 | 11/2007 | Suresh et al. | |
| 2007/0282637 A1 | 12/2007 | Smith | |
| 2008/0010096 A1 | 1/2008 | Patterson et al. | |
| 2008/0046347 A1 | 2/2008 | Smith et al. | |
| 2008/0071646 A1 | 3/2008 | Hodson et al. | |
| 2008/0140447 A1 | 6/2008 | Pourfallah et al. | |
| 2008/0147518 A1 | 6/2008 | Haider et al. | |
| 2008/0177574 A1 | 7/2008 | Lara Gonzalez et al. | |
| 2008/0281733 A1 | 11/2008 | Kubo et al. | |
| 2008/0313066 A1* | 12/2008 | Sholtis | G06Q 30/06 705/35 |
| 2008/0319794 A1 | 12/2008 | Carlson et al. | |
| 2008/0319904 A1 | 12/2008 | Carlson et al. | |
| 2009/0006203 A1 | 1/2009 | Fordyce, III et al. | |
| 2009/0018923 A1 | 1/2009 | Chen et al. | |
| 2009/0326977 A1 | 12/2009 | Cullen et al. | |
| 2010/0010901 A1 | 1/2010 | Marshall et al. | |
| 2010/0010909 A1 | 1/2010 | Marshall et al. | |
| 2010/0057611 A1 | 3/2010 | Antoo et al. | |
| 2010/0057621 A1 | 3/2010 | Faith et al. | |

(56) References Cited

U.S. PATENT DOCUMENTS

| | | | |
|---|---|---|---|
| 2010/0100484 | A1 | 4/2010 | Nguyen et al. |
| 2010/0116882 | A9* | 5/2010 | Harrison et al. ............. 235/381 |
| 2010/0145810 | A1* | 6/2010 | Pourfallah ............ G06Q 20/12 705/17 |
| 2010/0162171 | A1 | 6/2010 | Felt et al. |
| 2010/0332251 | A1 | 12/2010 | Yanak et al. |
| 2011/0079643 | A1 | 4/2011 | Pourfallah |
| 2011/0082708 | A1 | 4/2011 | Pourfallah |
| 2011/0082739 | A1 | 4/2011 | Pourfallah |
| 2011/0082745 | A1 | 4/2011 | Pourfallah |
| 2011/0145008 | A1 | 6/2011 | Cervenka et al. |
| 2011/0166872 | A1 | 7/2011 | Cervenka et al. |
| 2011/0178816 | A1 | 7/2011 | Lee et al. |
| 2012/0054046 | A1* | 3/2012 | Albisu ........................... 705/16 |
| 2012/0080530 | A1* | 4/2012 | Martin ......................... 235/494 |
| 2012/0253833 | A1 | 10/2012 | John et al. |
| 2014/0304010 | A1* | 10/2014 | Kennedy ............... G06F 19/328 705/4 |

FOREIGN PATENT DOCUMENTS

| | | |
|---|---|---|
| CN | 102576452 | 7/2012 |
| EP | 1834275 | 9/2007 |
| EP | 1834314 | 9/2007 |
| EP | 1856663 | 11/2007 |
| EP | 2030163 | 3/2009 |
| EP | 2035990 | 3/2009 |
| EP | 2165297 | 3/2010 |
| EP | 2294540 | 3/2011 |
| EP | 2359324 | 8/2011 |
| EP | 2465091 | 6/2012 |
| HK | 1107164 | 3/2008 |
| HK | 1107172 | 3/2008 |
| HK | 1108752 | 5/2008 |
| JP | 2005124991 | 5/2005 |
| JP | 2008545210 | 12/2008 |
| JP | 2009541864 | 11/2009 |
| KR | 1020040028017 | 4/2004 |
| KR | 1020050099707 | 10/2005 |
| KR | 1020050094938 | 7/2006 |
| KR | 1020070041183 | 4/2007 |
| WO | WO99/22330 | 5/1999 |
| WO | WO01/06468 | 1/2001 |
| WO | WO03/073353 | 9/2003 |
| WO | WO2006/074285 | 7/2006 |
| WO | WO2012/097310 | 7/2012 |
| ZA | 201000032 | 4/2011 |

OTHER PUBLICATIONS

Companion Guide 835 Health Care Claim Payment/Advice, Convansys, Jun. 24, 2004 XP002564865 http://www.njelkids.com/UL/pdf/NJ_835v1_20040820-2.pdf.

Hammond, W Edward and Cimino, James "Standards in Medical Informatics: Computer Applications in Health Care and Biomedicine," 2000 Springer, NY XP002564866, pp. 226-276.

Administrative Services of Kansas, ANSI X12N 270/271, Companion Guide: Health Care Eligibility Benefit Inquiry and Response, pp. 1-18, Aug. 5, 2010.

Classen, David et al.; "The Patient safety Insitute demonstration Project: A Model for Implementing a Local Health information Infrastructure"; 2004, Journal of Healthcare Information Management, vol. 19, No. 4, pp. 75-86.

"Patient Safety Institute: Economic Value of a Community Clinical Information Sharing Network, Part 1: Value to Payers (Private, Medicare, Medicaid and self-Insured Employers) and the Uninsured"; White Paper prepared by Emerging Practives First consulting Group, 2004. pp. 1-18.

"Visa Introduces Next Generation B2B Payment Service" downloaded on www.corporate.visa.com/md/nr/press136.jsp, Feb. 2, 2007, pp. 1-3.

"Visa USA Small Business & Merchants, Visa ePay-How it Works" downloaded on www.usa.visa.com/business/accepting_visa/payment_technologies/epay_how_it_works.html, Feb. 2, 2007, p. 1.

"Visa USA Small Business & Merchants, Visa epay-Participating Financial Institutes" downloaded on www.usa.visa.com/business/accepting_visa/payment_technologies/epay_fi.html, at Feb. 2, 2007, p. 1.

"Visa ePay" downloaded on www.usa.visa.com/business/accepting_visa/payment_technologies/epay.html, Feb. 2, 2007, p. 1.

"Welcome to American Express Healthpay Plus Works, What is Pay Plus" downloaded on www.152.americanexpress.com/entcampweb/payment_technologies/epay_how_it_works.jsp, Feb. 2, 2007, pp. 1-2.

"Visa USA Small Business & marchants, Visa ePay-Credit counseling Automation" downloaded on www.usa.visa.com/business/accepting_visa/payment_technologies/epay_credit_counseling.html, Feb. 2, 2007, pp. 1-3.

"Visa Introduces Next Generation B2Bpayment Service" downloaded on www.sellitontheweb.com/ezine/newso569.shtml, Feb. 2, 2007, pp. 1-4.

"Welcome to American Express Healthpay Plus(SM)", What is HealthPay Plus downloaded on www.152.americanexpress.com/entcampweb/whatishealthpayplus.jsp at Feb. 2, 2007, pp. 1-5.

Supplementary European Search Report for EP 06717481.
International Search Report for PCT/US2006/00288.
Supplementary European Search Report for EP 06717470.
International Search Report for PCT/US2006/00274.
International Search Report for PCT/US2007/84179.
International Search Report for PCT/US2009/066847.
International Search Report for PCT/US2009/049203.
Search Report EIC 3600 to Examiner John Holly, Aug. 20, 2009 for U.S. Appl. No. 11/230,761.
Supplementary European Search Report for EP 06717482.
International Search Report for PCT/US2010/051355.
International Search Report for PCT/US2010/045500.
International Search Report for PCT/US2010/045445.
International Search Report for PCT/US2007/70780.
Supplementary European Search Report for European Patent Application EP 07798894.
International Search Report for PCT/US2007/71797.
Supplementary European Search Report for EP 08771445.7.
International Search Report for PCT/US2008/67460.
International Search Report for PCT/US2007/74862.
Recal Introduces WebSentry Reducing the Risk of Fraud for Internet Transactions; WebSentry Offers System Integrators Cost Effective SET Compliance for E-Commerce—Canadian Corporation News May 26, 1999.

* cited by examiner

Example: Quick Response Code Processing ("QRCP") component 600

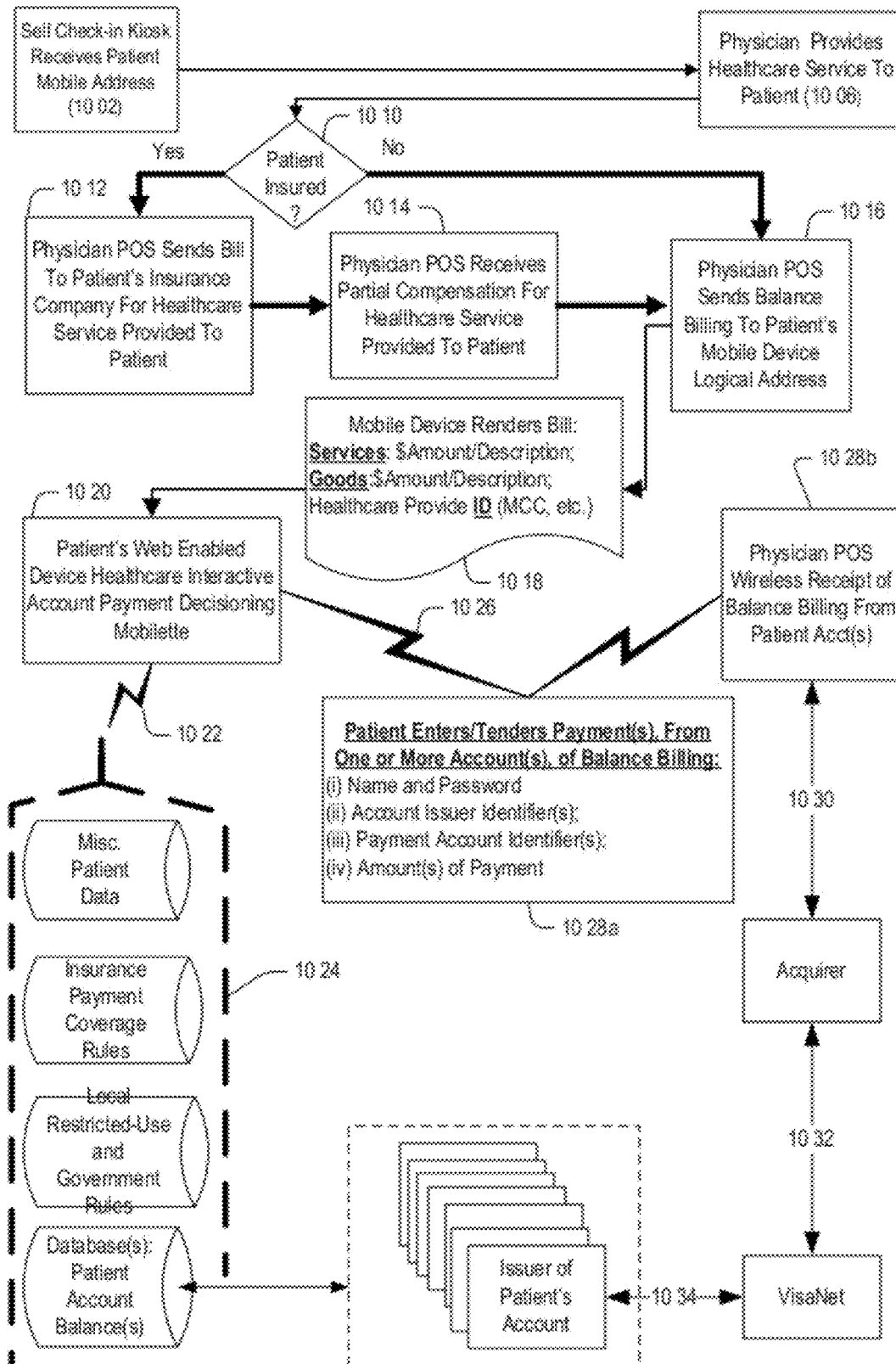
Figure 10A     RUAP Example Logic Flow: Healthcare Payment Overview

Figure 14G    RUAP Example Mobile Wallet UI: Augmented Reality In-Store Example: RUAP Application Embodiment - History Mode

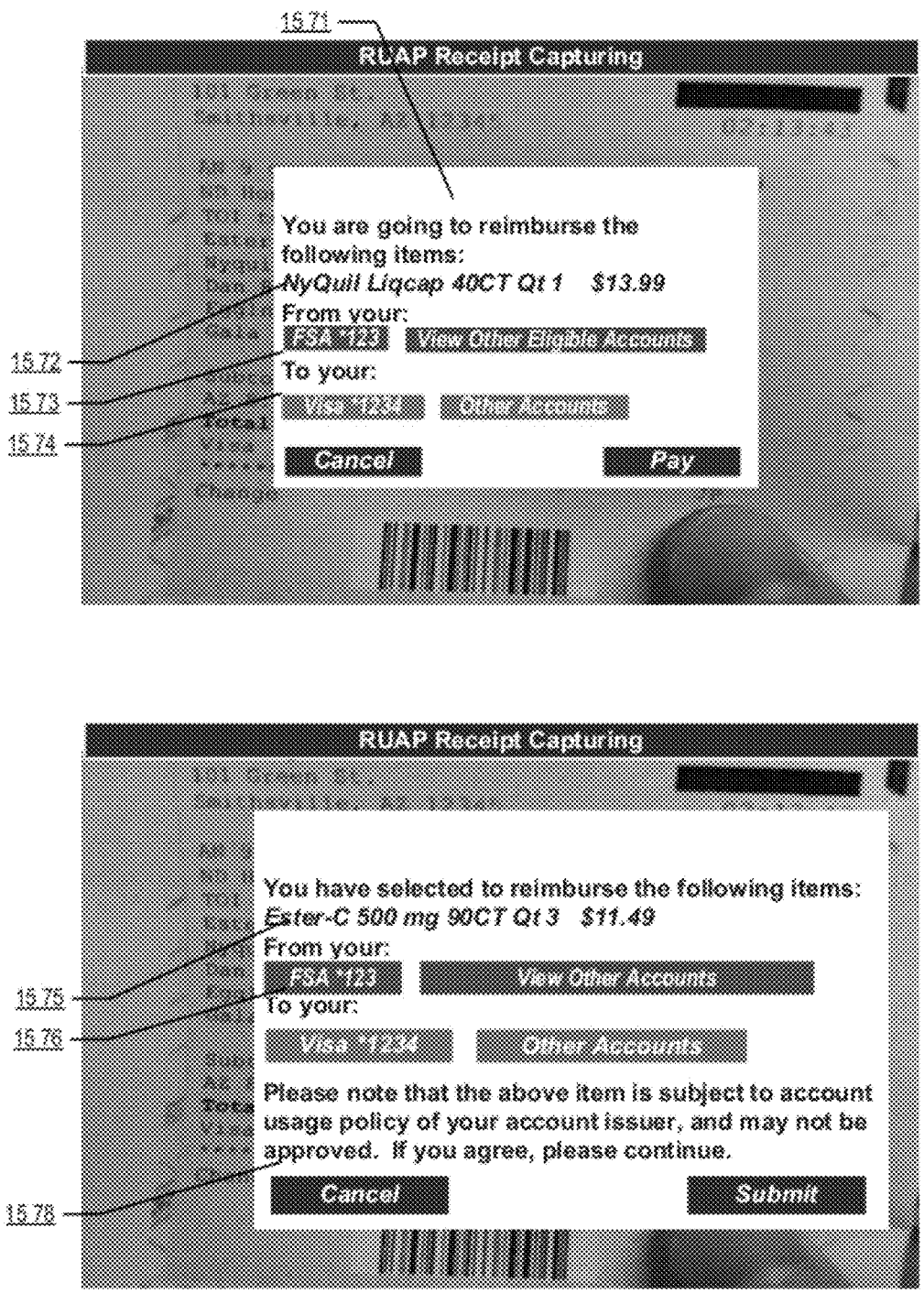
Figure 15I    RUAP Example Mobile Wallet UI: Augmented Reality Receipt Capturing

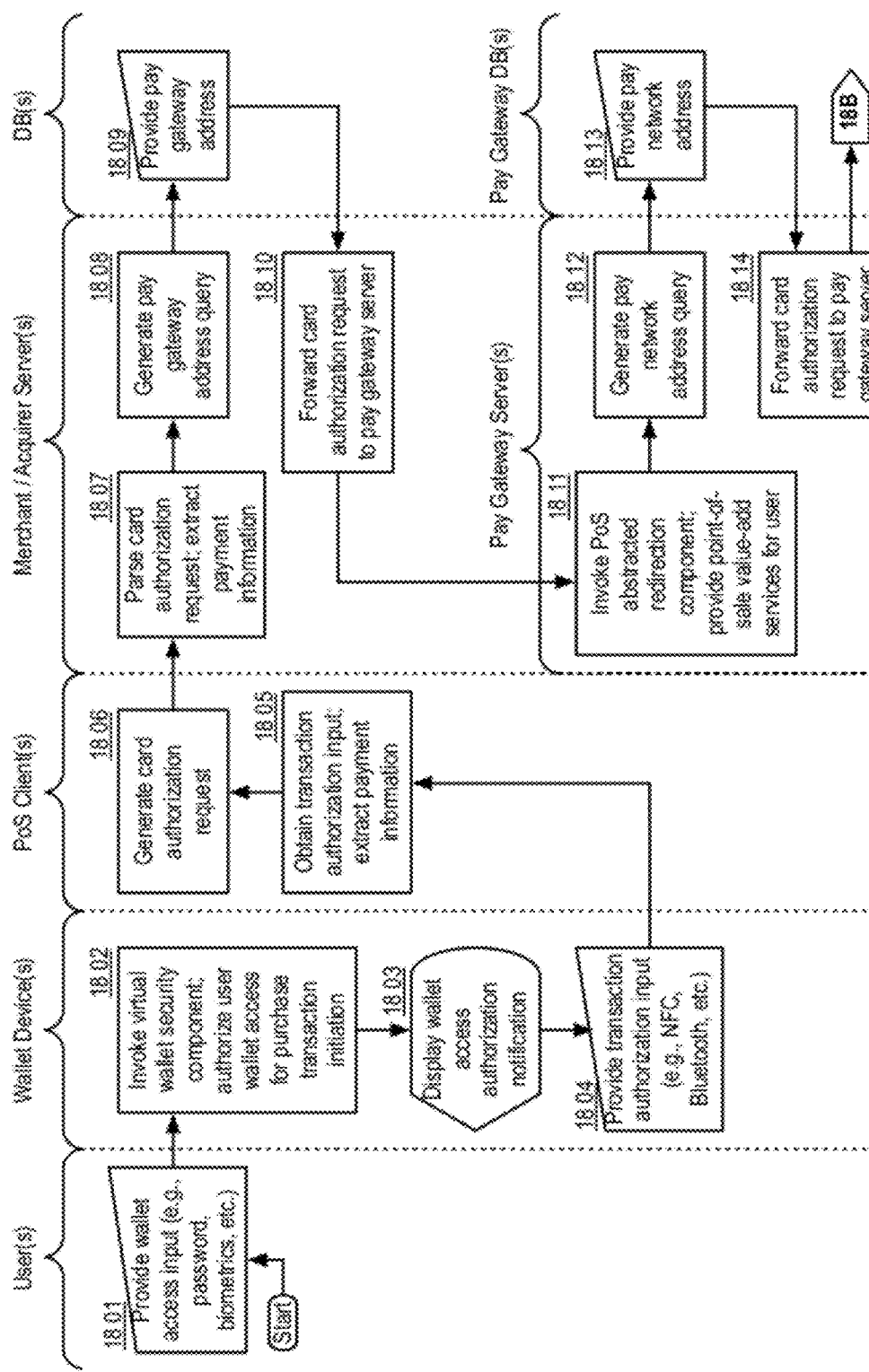

Figure 22 — RUAP Example Infrastructure

RESTRICTED-USE ACCOUNT PAYMENT ADMINISTRATION APPARATUSES, METHODS AND SYSTEMS

PRIORITY CLAIM

Applicant hereby claims priority under 35 U.S.C. §119 to U.S. Application Ser. No. 61/471,092, entitled "Mobile Claims Administration Apparatuses, Methods and Systems," filed on Apr. 1, 2011.

The instant application is further related to Patent Cooperation Treaty application ser. no. PCT/US2012/031762, entitled "Restricted-Use Account Payment Administration Apparatuses, Methods And Systems," filed on Mar. 31, 2012.

The aforementioned applications are hereby expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present innovations are directed generally to healthcare payment, and more particularly, to RESTRICTED-USE ACCOUNT PAYMENT ADMINISTRATION APPARATUSES, METHODS AND SYSTEMS.

BACKGROUND

A flexible spending account (FSA) is a financial account which is set up by a user setting aside a portion of their income. For example, the FSA may be used for medical expenses, dependent care, and/or the like. A user needs to collect receipts of payments eligible for FSA reimbursement, and send the receipts to a FSA administer program. Upon verifying eligibility of the expenses, the FSA administer program may return the user payment amount to the user, by an authorized transfer of funds from the user's FSA account to the user.

BRIEF DESCRIPTION OF THE DRAWINGS

The accompanying appendices and/or drawings illustrate various non-limiting, example, innovative aspects in accordance with the present descriptions:

FIGS. 10A-10C provide diagrams illustrating example RUAP aspects in healthcare payment within embodiments of the RUAP;

FIGS. 14A-14G provide exemplary mobile wallet UIs illustrating making a payment within embodiments of the RUAP;

FIGS. 15A-15I show user interface diagrams illustrating example features of virtual wallet applications in a snap mode, in some embodiments of the RUAP;

FIGS. 18A-B show logic flow diagrams illustrating example aspects of purchase transaction authorization in some embodiments of the RUAP, e.g., a Purchase Transaction Authorization ("PTA") component;

Figure 1A:
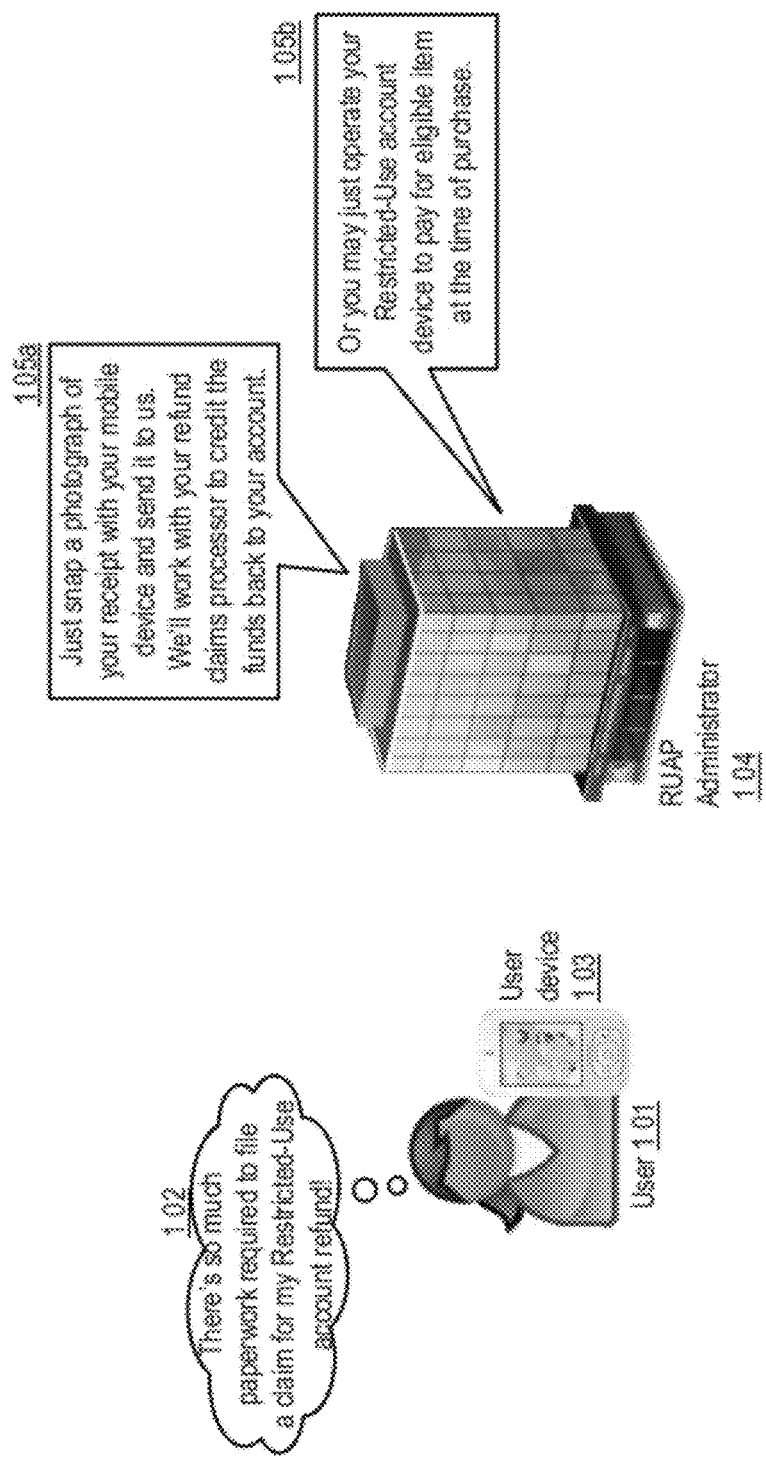
FIGS. 1A-1D provide block diagrams illustrating various scenarios of restricted-use account checkout and/or reimbursement within embodiments of the RUAP.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The RESTRICTED-USE ACCOUNT PAYMENT ADMINISTRATION APPARATUSES, METHODS AND SYSTEMS (hereinafter "RUAP") provides a healthcare payment platform which facilitates payment and/or reimbursement from a restricted-use account.

In one implementation, RUAP may facilitate a user to engage a restricted-use account for the cost of eligible items. A restricted-use account may be a financial account having funds that can only be used for payment of approved products (e.g., prescription drugs, vaccine, food, etc.) and/or services (e.g., healthcare treatment, physical examination, etc.). Examples of a restricted use account may comprise Flexible Savings Accounts (FSA), one or more Health Savings Accounts (HSA), Line of Credit (LOC), one or more health reimbursement accounts (HRA), one or more government insurance programs (i.e., Medicare or Medicaid), various private insurance rules, various other restricted use favored payment accounts such as employment benefit plans or employee pharmacy benefit plans, and income deduction rules, and/or the like. In other examples, the restricted-use account may comprise a food voucher, a food stamp, and/or the like. Within implementations, the approval process of payment with a restricted use account may be administered by a third party, such as, but not limited to FSA/HSA administrator, government unemployment program administrator, and/or the like.

For example, the RUAP processing platform may facilitate payment with healthcare restricted-use accounts (e.g., FSA, HSA, etc.) when a user/patient visits a healthcare provider. In one embodiment, a user may operate a payment device (e.g., a mobile wallet component instantiated on a smart phone, a healthcare prepaid card, a web-based application, etc.) for checkout at a merchant, wherein the mobile computing device is web enabled, and may receive a communication from a point of service terminal (POS). The communication may include a balance due bill of a healthcare provider for healthcare to a user. The web enabled mobile computing device may execute an application that derives an optimized payment of the balance due bill that substantially maximizes incentives and minimize penalties in paying the healthcare provider for the healthcare provided to the user. The optimized payment is transmitted from the web enabled mobile computing device to the POS for further authorization processing of one or more currency amounts to be paid from respective accounts to satisfy the balance due bill.

Integration of an electronic wallet, a desktop application, a plug-in to existing applications, a stand alone mobile application, a web based application, a smart prepaid card, and/or the like in payment with restricted-use account reduces the number of network transactions and messages that fulfill restricted-use account payment approval and procurement of eligible purchase items (e.g., a user and/or a merchant does not need to file additional application requests for restricted-use account payment/reimbursement, which may require voluminous paper work or manual information fill-in). In this way, with the reduction of network communications, the number of transactions that may be processed per day is increased, i.e., processing efficiency is improved.

RUAP

FIG. 1A shows a block diagram illustrating example aspects of mobile claims administration in some embodiments of the RUAP. In some implementations, a user, e.g., 101, may wish to file a claim for a refund of funds paid by the user, file an insurance claim, and/or the like claim for compensation, see, e.g., 102. In one implementation, the use may determine his/her recent purchase comprises a restricted-use account eligible item, and may want to engage the restricted-use account to pay for the eligible items. For example, the user may desire to use his FSA/HSA accounts to pay for purchases of prescription drugs, physician office visits, medical treatments, and/or the like. In another example, the user may desire to use his Medicare, Medicaid account to pay for received medical products/services received at a qualified provider, e.g., a public hospital. In another example, the user may desire to use a food voucher to pay for grocery goods, and/or the like.

In some implementations, a user may use a non-restricted-use account, e.g., the user's credit card, debit card, personal check, and/or the like to pay for a purchase, and may want to reimburse the cost of eligible items from his restricted-use accounts. In one implementation, the process of filing a claim for such compensation may involve a large amount of paperwork. In such implementations, the user may be discouraged from filing the claim due to the large amount of paperwork. In some implementations, the RUAP may reduce and/or eliminate the need for the user to undertake paperwork to file the claim for compensation.

In some implementations, the user may have a user device, e.g., 103. The user may utilize the user device to obtain a snapshot of a receipt for funds previously paid by the user (e.g., a "post-flight" reimbursement claim, etc.), a license plate of a car, and/or like evidence of validity of a claim 105a for compensation. In some implementations, the user may provide the snapshot of the payment receipt for the RUAP, and the RUAP may, see, e.g, 104, generate a claim for compensation on behalf of the user, and coordinate with the claims processor to obtain a claims compensation for the user. The RUAP may also automatically credit funds obtained via claim compensation to an account of the user. In some implementations, the RUAP may require no user intervention beyond providing the snapshot to provide mobile claims administration features.

In another implementation, the user may operate the user device 103 at a merchant, e.g., a Point of Sale (PoS) terminal at a pharmacy, a healthcare provider, etc., to directly pay for eligible items (e.g., an "in-flight" payment during checkout). For example, the user may operate an electronic wallet and select his FSA/HSA account to pay for prescription drugs at a pharmacy, and/or the like.

Figure 1B:
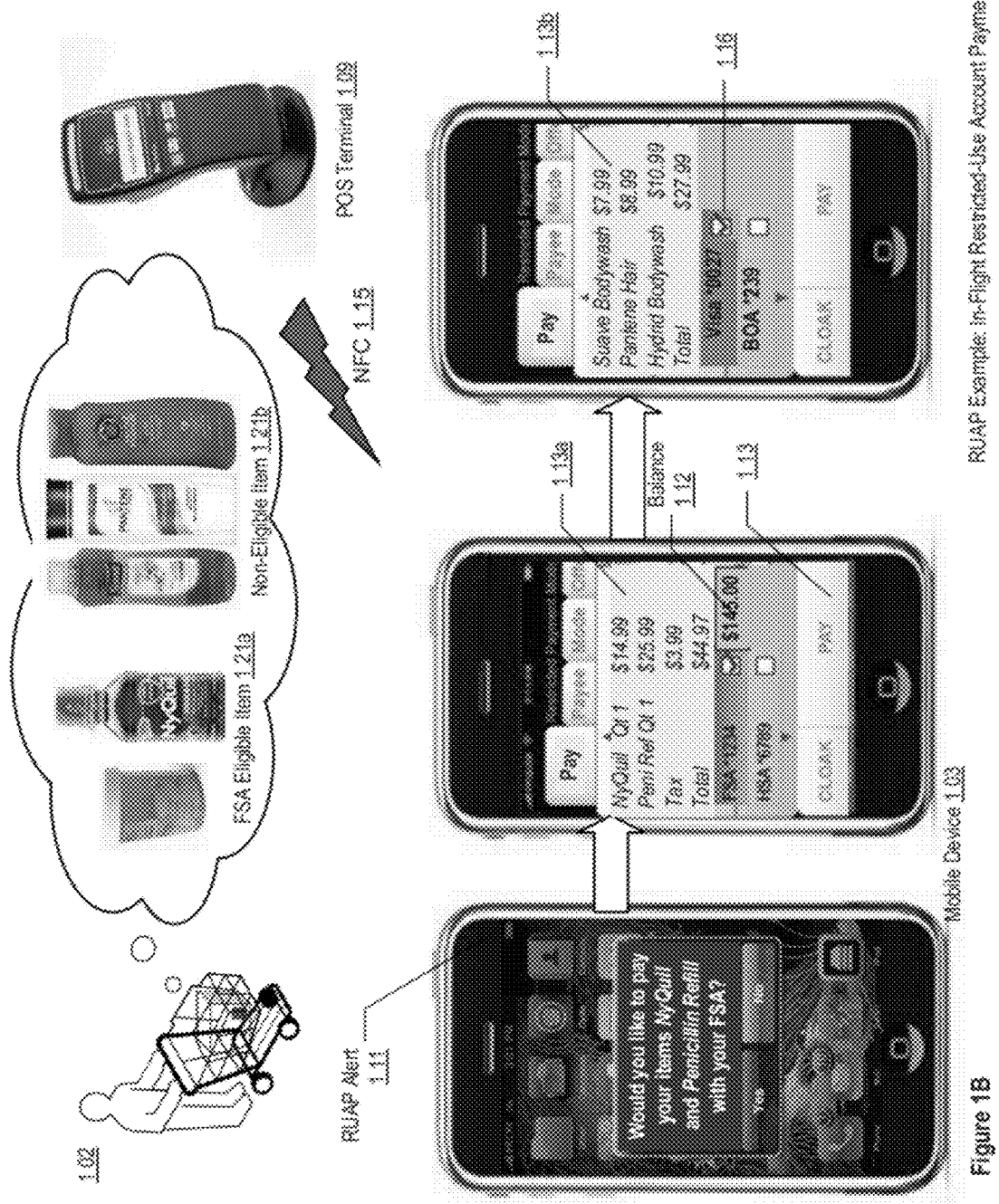

FIG. 1B provides an exemplary block diagram illustrating RUAP payment at a participating merchant within embodiments of the RUAP. In one implementation, a user 102 may have in his/her shopping cart a list of mixed items including restricted-use account eligible items 121a and non-eligible items 121b. For example, a user 102 may shop at a supermarket, a pharmacy store, etc., to purchase pharmaceutical drugs (e.g., NyQuil cold medicine, Antibiotics, etc.) which are eligible for FSA/HSA usage, and various items (e.g., body wash, shampoo, etc.) that are not eligible for any restricted-use account.

In one implementation, a user 102 may engage a mobile wallet 103 to pay for the purchase at a PoS terminal 109 of the merchant. In one implementation, the mobile wallet 103 may provide a prompt alert 111 to the user via a mobile user interface, showing that part or all of the user's purchases are eligible for one or more restricted-use accounts that have been enrolled in the user's mobile wallet. For example, as shown in FIG. 1B, when the user has purchased pharmaceutical products such as "NyQuil" and "Penicillin," the mobile wallet may notify the users that such drugs are eligible for FSA usage. In one implementation, if the user selects "Yes" to proceed with payment with FSA, the user may need to split the purchase to pay for the eligible items 121*a* in the shopping cart with his FSA account and submit an amount of the drugs. For example, the user may view a list of the FSA eligible items 113*a*, and a list of healthcare restricted-use accounts such as FSA, HSA, etc. If the user selects to pay with FSA, the user may view the remaining balance of the FSA account 112. Upon selecting to pay 113, the user may submit the transaction to pay with FSA account for the healthcare products 113*a*.

In one implementation, the user may be directed to another list of remaining items which are non-eligible for any restricted-use items 121*b*, e.g., see 113*b*. The user may then need to select another account (e.g., a regular bank account, etc.), such as a Visa credit card 116 for non-eligible items 121*b* in a separate transaction.

In one implementation, the RUAP alert may be originated at a PoS terminal 109, wherein the merchant may maintain a blacklist/whitelist of eligible product codes for various types of restricted-use accounts, and may send notifications to the wallet via Near Field Communication (NFC) protocol 115.

In another implementation, a user's electronic wallet may identify eligible items for a restricted-use account itself, e.g., the PoS terminal 109 may generate a bill and transmit bill information to the user's wallet via NFC 115. In further implementations, the PoS terminal 109 may generate a bill comprise a QR code, and the user may snap a photo of the generated QR code on the bill, which may facilitate the intelligent wallet to capture information of user purchased items.

In an alternative implementation, the user may operate a restricted-use prepaid card, and the PoS terminal may inform the user eligibility of the user's purchase to apply his/her restricted-use account.

In further implementations, the user's mobile wallet may intelligently recommend an account in the wallet for the instant payment. For example, the mobile wallet may detect the user's location at a healthcare provider 108 via its GPS component, and thus may recommend healthcare benefit accounts for user payment by highlighting the accounts "FSA" in and "HSA". When the user selects the FSA account in, the wallet may display an available balance 112 of the FSA account. The user may then tap on a "pay" button 113 of the mobile wallet to initiate a user payment transaction.

Figure 1C:
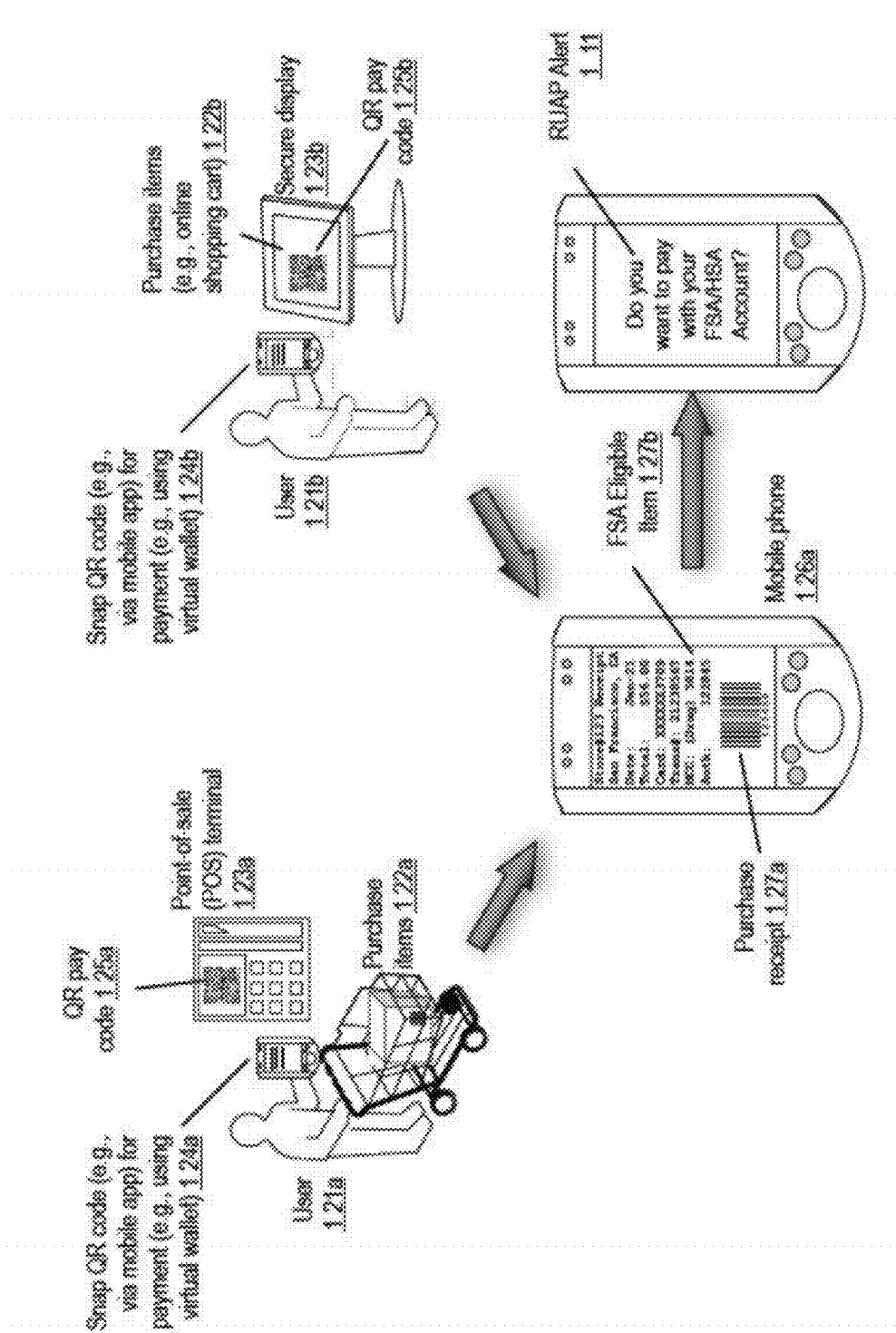

FIG. 1C provides an example showing user checkout with QR code capturing at a merchant PoS terminal within embodiments of the RUAP. In some implementations, a user, e.g., 121*a-b*, may wish to purchase products at a merchant store, e.g., 123*a*, or at a merchant website, e.g., 123*b*. For example, at a merchant store, the user may scan barcodes for a number of products, e.g., 122*a*, at a PoS terminal in the store, e.g., 123*a*, and then indicate that the user wishes to checkout the scanned items. In some implementations, the POS terminal may generate a Quick Response ("QR") code, e.g., 125*a*, including information on the scanned product items, as well as merchant information for processing the purchase transaction via a payment network. The user may capture an image of the QR code generated by the POS terminal using a user device, such as a smartphone. For example, the user device may have executing on it an app for snapping the merchant-product QR code. The user device may utilize the information extracted from the QR code, along with information on a virtual wallet tied to the user device to initiate a purchase transaction. For example, the user device may utilize the product and merchant information extracted from the QR code, and financial payment information from the virtual wallet, to create a purchase transaction request, and submit the request to a payment network (e.g., credit card processing network).

In some implementations, the user device may utilize methods alternative to capture of a QR code to obtain information from the POS terminal. For example, the POS terminal may communicate the information required for submitting a purchase transaction request to a payment network to user device via Bluetooth™, Wi-Fi, SMS, text message, electronic mail, and/or other communication methods.

In some implementations, a user 121*b* may wish to checkout items stored in a virtual shopping cart on an online shopping website, e.g., 122*b*. For example, the user may be viewing the website using a secure display (e.g., that is part of a trusted computing device of the user). Upon indicating that the user wishes to checkout the items in the virtual shopping cart, the website may provide a QR code including information on the products in the virtual shopping cart and merchant information. For example, in the scenario where the user utilizes a secure display, the QR code may be displayed at a random position within the secure display for security purposes. The user may capture a snapshot of the displayed QR code, and utilize payment information from the virtual wallet associated with the user device to create a purchase transaction request for processing by the payment network. Upon completion of the purchase transaction, the payment network may provide a purchase receipt, e.g., 127*a* directly to the user device 126*a*, the POS terminal in the store and/or the secure display (for the secure online shopping scenario) as confirmation of completion of transaction processing. Thus, in some implementations, the merchant may be shielded from obtaining personal and/or private information of the user while processing the purchase transaction, while ensuring integrity of the user's virtual wallet using a secure display for presenting the merchant-product QR code.

In various implementations, such payment processing may be utilized for a wide variety of transactions. For example, a user dining at a restaurant may obtain a bill including a QR pay code including detail on the dining charges included in the bill, and a merchant ID for the restaurant. The user may take a snapshot of the restaurant bill using the user's smartphone, and utilize the user's virtual wallet to pay for the restaurant bill, without revealing any financial or personal information about the user to the restaurant.

In an alternative implementation, when the receipt 127*a* comprise a FSA eligible item 127*b* (e.g., prescription drugs, etc.), the user device 126*a* may receive a RUAP alert 111 to notify user eligibility of the purchase item for FSA usage. For example, in one implementation, the RUAP alert 111 may be received prior to user engage in the final payment so that the user may elect to pay with FSA account. In another example, the RUAP alert may be received after the user has obtained a post-payment purchase receipt and may submit the receipt for reimbursement into the eligible FSA account, as shown in FIG. 1D.

Figure 1D:
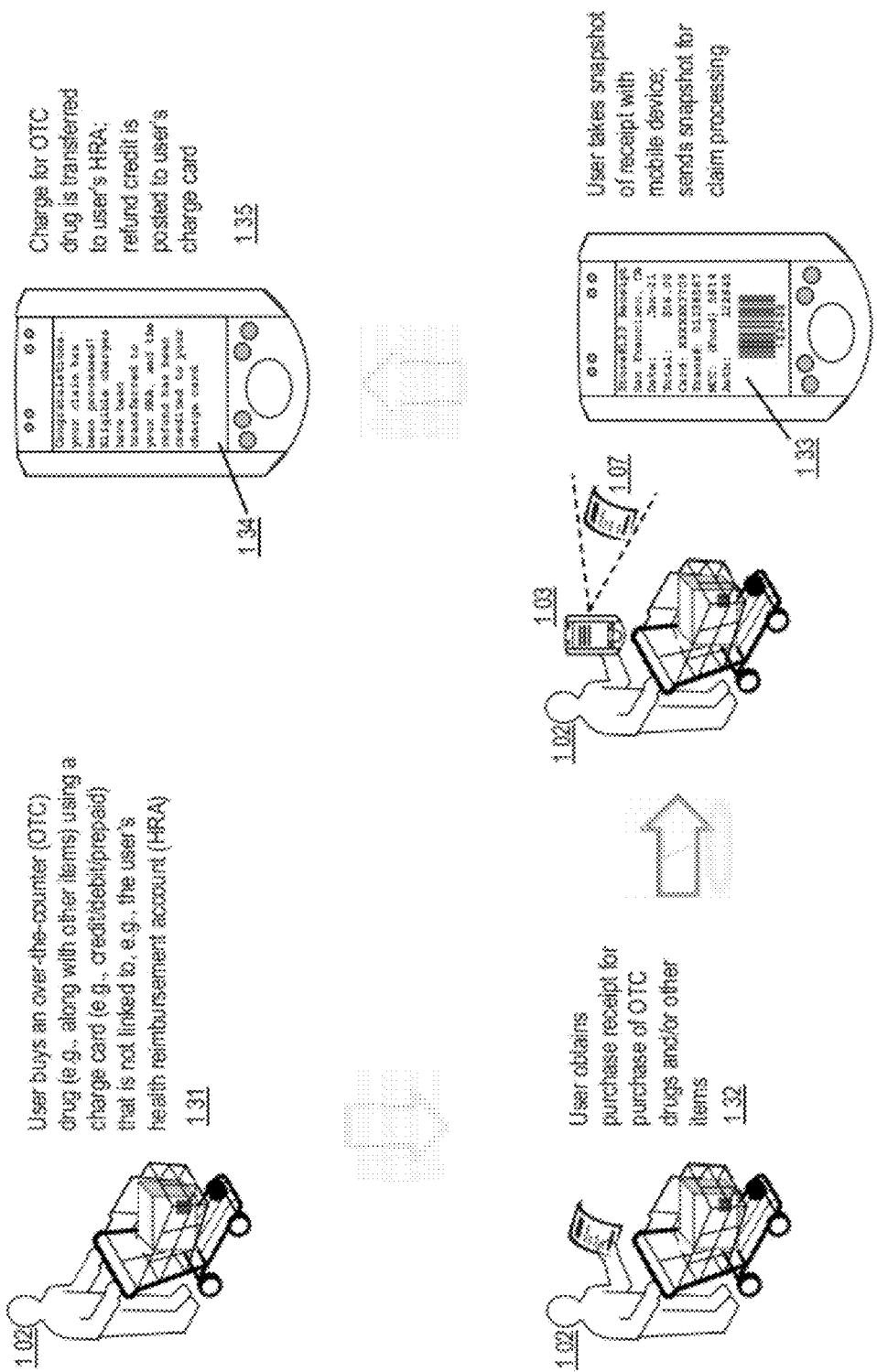

FIG. 1D shows a block diagram illustrating an example scenario where a user may request reimbursement with his/her restricted-use accounts in some embodiments of the RUAP. In some implementations, a user, e.g., 102, may be required to file a claim to obtain a refund of credit made towards a card-based purchase transaction (e.g., credit card, debit card, prepaid card transaction, hereinafter "charge card"). In one implementation, the user may have a signature debit card for purchase transactions, and as well as a FSA, HSA, HRA, LOC, and/or like accounts. In some scenarios, the user may desire to purchase a number of goods at a store including over-the-counter medication, and may be other items as well, e.g., 131. The user may find it inconvenient to utilize the cards required to charge the medication purchase to the user's FSA as well as the charge card for expenses ineligible to be paid for using the user's FSA. For example, continuing on with the example in FIG. 1B, the user may elect not to pay with FSA at checkout as the user may prefer to checkout all FSA-eligible and non-eligible items in one transaction for convenience, instead of splitting the purchase into different stages.

Thus, in some implementations, the user may utilize the charge card to pay for all the expenses, including expenses that may be eligible for payment using the user's FSA. In such implementations, the user may be paying more that may be needed if the user utilizes the user's FSA, or the user may be reducing the user's net income by not utilizing the savings, income, rewards, tax and/or like advantages offered by the FSA. In some implementations, the user may require to substantiate a payment made using a FSA, to prove that the user only utilized the FSA for purposes for which the FSA was issued to the user.

In some implementations, the RUAP may provide the user with features to prove that the user only used the user's FSA for legitimate purposes. In some implementations, the RUAP may provide the user with features to transfer charges from a charge card to the user's FSA when the charges are eligible to be paid for using the user's FSA. For example, the user may obtain a purchase receipt for the purchase of the medication items, e.g., 132. The user may obtain a snapshot of the purchase receipt, e.g., 133, e.g., via a mobile device of the user, e.g., 103. The user may provide a snapshot of the purchase receipt 107 to the RUAP for claim processing. The RUAP may obtain the snapshot, extract a list of the items purchased by analyzing the snapshot of the RUAP. The RUAP may determine which of the charges on the purchase receipt are eligible to be paid by the user's FSA. In implementations where the user seeks to substantiate charges made to the FSA, the RUAP may determine whether each charge is eligible to be paid for using the user's FSA, and may provide such substantiation for the user and/or other entities and/or components of the RUAP. In implementations, where the user seeks to transfer charges that are eligible to be paid for using the user's FSA from a charge card to the user's FSA, the RUAP may identify the charges that may be transferred, and credit/debit the account(s) necessary to achieve the transfer. For example, the RUAP may debit the user's FSA account with an amount based on the transaction cost for the items eligible to be paid for using the user's FSA, and credit the user's charge card account appropriately, e.g., at 135. In some implementations, because the user's FSA can provide savings to the user when the user utilizes the FSA to make eligible purchases, the RUAP may provide savings to the user by ensuring that any eligible purchases are always transferred to the appropriate account(s). In some implementations, the RUAP may provide notification(s), e.g., 134, to the user via the user's mobile device indicating the crediting of the user's account.

Figure 2A:
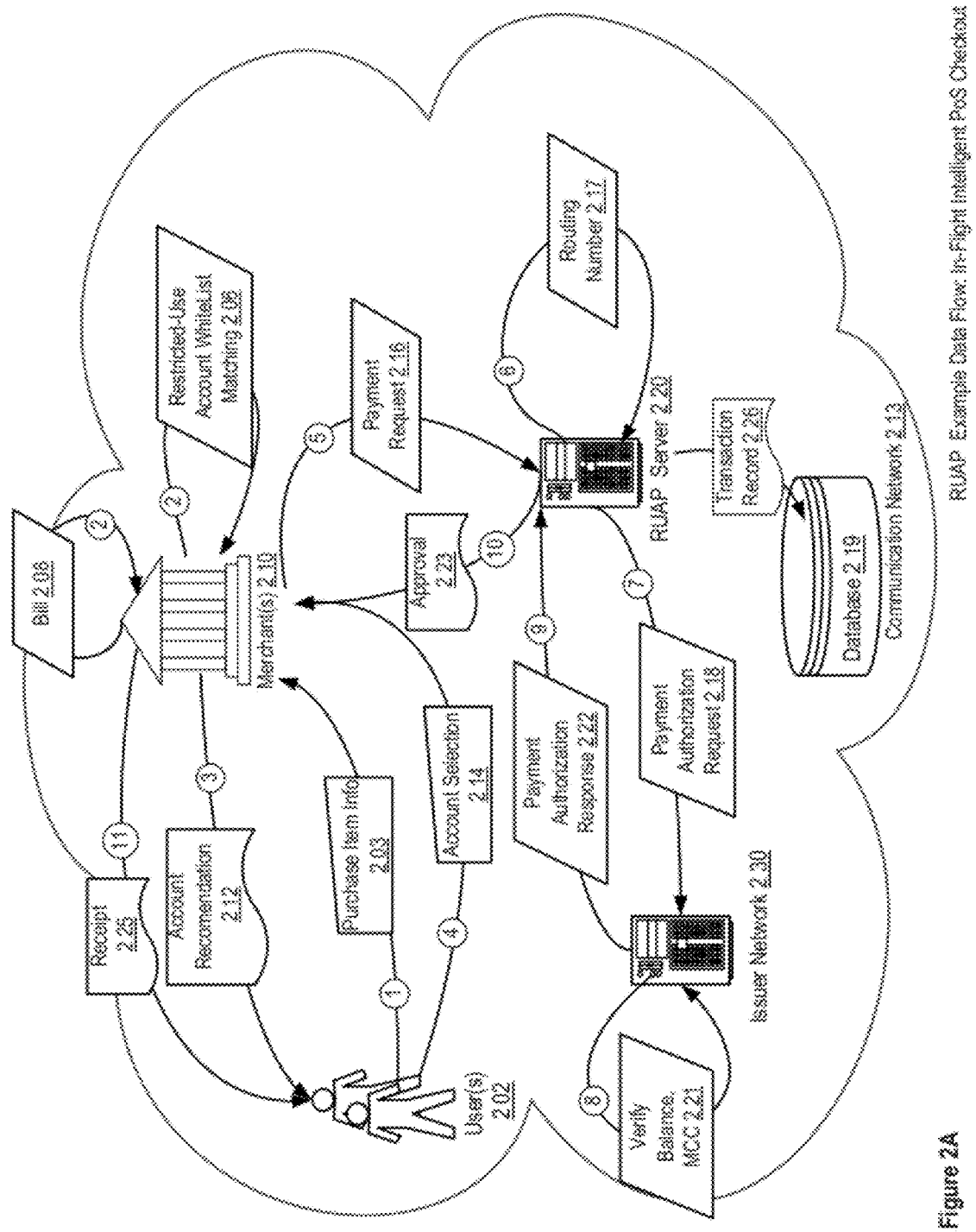
FIGS. 2A-2C provide data flow diagrams illustrating data flows between RUAP and affiliated entities for user PoS checkout with restricted-use account within various embodiments of the RUAP.
Figure 2B:
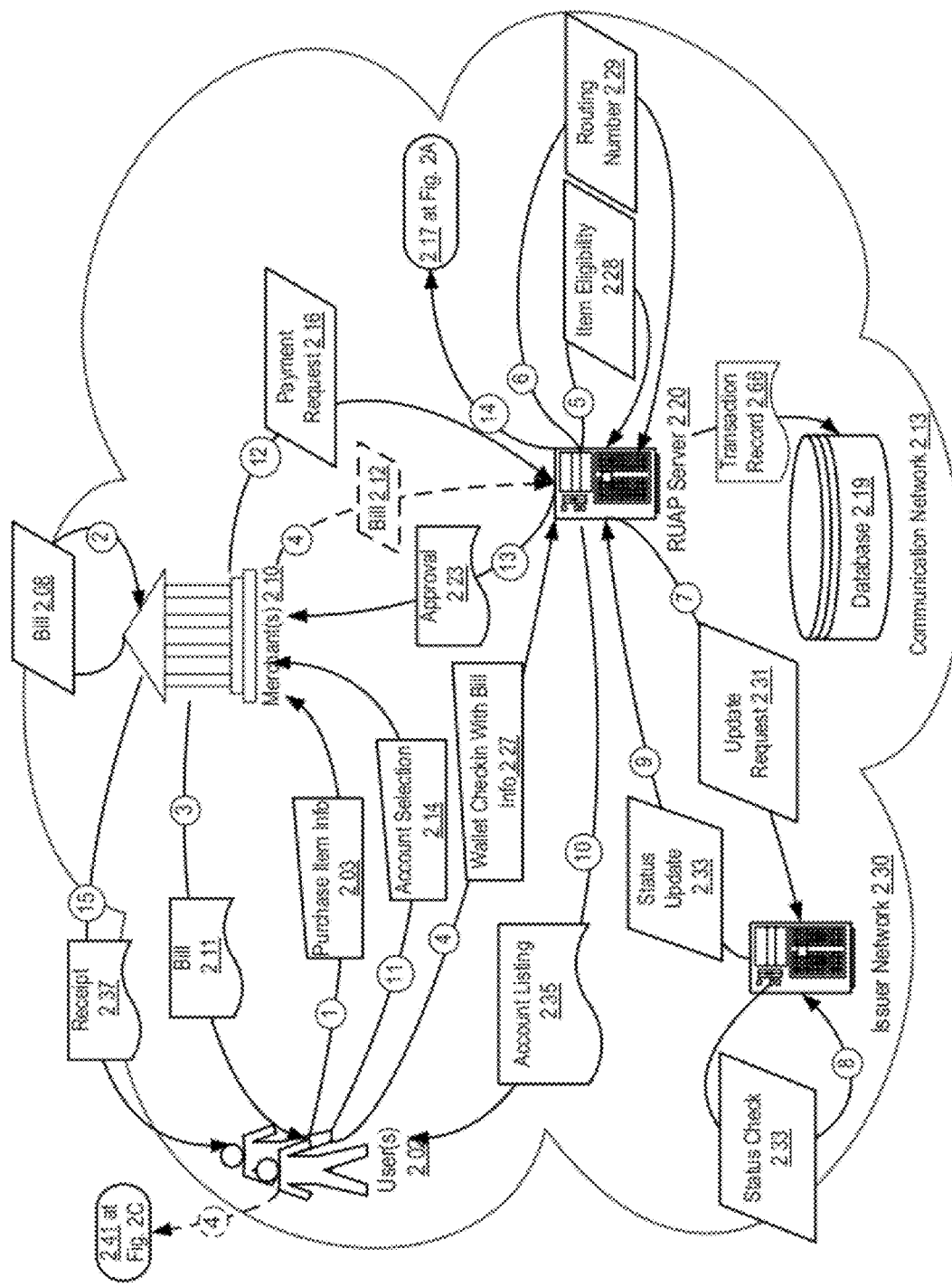

FIGS. 2A-2B provides a data block diagram illustrating data flow between RUAP server, user, merchant and affiliated entities to substantiate an in-flight PoS checkout payment at a merchant within embodiments of the RUAP. Within various embodiments, as shown in FIGS. 2A-2B, one or more user(s) 202, RUAP server 220, RUAP database(s) 219, merchant(s) (PoS terminal(s)) 210, account issuer network 230, and/or the like are shown to interact via various communication networks 213 to facilitate the substantiation of a user purchase payment transaction.

Within various embodiments, the user (e.g., an individual consumer, etc.) 202 may include a wide variety of different communications devices and technologies within embodiments of RUAP operation. For example, in one embodiment, the patient 102 may operate devices such as, but not limited to, terminal computers, work stations, servers, cellular telephony handsets, smart phones (e.g., an Apple iPhone, a Google Android, a BlackBerry, etc.), PDAs, and/or the like.

In one embodiment, the RUAP server 220 may be equipped at a terminal computer, a mobile device, and/or or the like of the user 202. In another embodiment, the RUAP server 220 may be a remote server which is accessed by the user 202 via a communication network 113, such as, but not limited to local area network (LAN), in-house intranet, the Internet, and/or the like. In a further implementation, the RUAP merchant 210 may communicate with the user 202 via a POS terminal, and/or be integrated with a user 202 at a computer terminal. For example, the user 202 may operate a mobile device as a self-checkout device, e.g., see barcode scanning checkout examples in FIG. 13A-13C.

Within embodiments, a user 202 may shop with a merchant 210, which may be a physical store, an online shopping site, and/or the like. For example, the user 202 may walk in a physical merchant store and bring a shopping cart of purchase item to a PoS terminal, which may scan in the purchase item information 203. In another example, the user 202 may engage in online shopping by adding purchase items into a virtual shopping cart and transmit the purchase item information 203 to the shopping site server.

For example, in one implementation, a user device may generate a Hypertext Transfer Protocol Secure (HTTPS) POST message to send purchase item information 203 in the form of data formatted according to the XML. Below is an example HTTP(S) POST message including an XML-formatted message of the purchase item information 203 for the merchant 210:

```
POST /PurchaseItem\\.php HTTP/1.1
Host: 216.15.51.74
Content-Type: Application/XML
Content-Length: 718
<?XML version = "1.0" encoding = "UTF-8"?>
<PurchaseItem>
    <Time> 17:40:40 </Time>
    <Date> 09-09-2015 </Date>
    <Item1>
        <ItemCode> FOOD-9875 </ItemCode>
        <Category> FOOD </Category>
        <Sub-Category> Breakfast </Sub-Category>
        </ItemName> Cereal </ItemName>
        <Description> whole grain original 10 oz </Description>
        <Quantity> 1 </Quantity>
        <UnitPrice> 4.99 </UnitPrice>
```

```
            <TotalAmt> 4.99 </TotalAmt>
            ...
        </Item1>
        <Item2>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL </Description>
            <Quantity> 1 </Quantity>
            <UnitPrice> 12.99 </UnitPrice>
            <TotalAmt> 12.99 </TotalAmt>
            ...
        </Item2>
        <item_3>
            <ItemCode> SU-Shampoo-001 </ItemCode>
            <Category> WASH </Category>
            <Sub-Category> hair product </Sub-Category>
            </ItemName> SUAVE shampoo </ItemName>
            <Description> SUAVE shampoo heat treatment 120 mL
            </Description>
            <Quantity> 1 </Quantity>
            <UnitPrice> 8.99 </UnitPrice>
            <TotalAmt> 8.99 </TotalAmt>
            ...
        </item_3>
    ...
</PurchaseItem>
```

Within embodiments, the merchant 210 may generate a bill 208 upon the obtained purchase item information. For example, the bill may take a similar data structure as the obtained purchase item information 203. In one implementation, the merchant may include an intelligent PoS terminal, which may identify whether a purchase item qualifies for a restricted-use account. For example, when the merchant is equipped with a smart PoS terminal, the terminal may query for a list of eligible merchant category code (MCC) associated with a restricted-use account, to determine whether the restricted-use account may be applied to purchase the item. In one implementation, the PoS terminal may generate a restricted-use account white list matching status 206, which may comprise information as to a recommended restricted-use account that may be applied to the item. An exemplary XML-formatted message of the restricted-use account status 206 for the merchant 210 may take a form similar to the following:

```
POST /RestrictStatus.php HTTP/1.1
Host: 216.15.51.74
Content-Type: Application/XML
Content-Length: 718
<?XML version = "1.0" encoding = "UTF-8"?>
<ItemStatus>
    <Time> 17:40:40 </Time>
    <Date> 09-09-2015 </Date>
    ...
    <user>
        <user_id> JS-001 </user_id>
        <user_name> John Smith </user_name>
        <wallet_id> js_wallet </wallet_id>
        <password> ***** </password>
        ...
    </user>
    <Item1>
        <ItemCode> FOOD-9875 </ItemCode>
        <Category> FOOD </Category>
        <Sub-Category> Breakfast </Sub-Category>
        <RecommendedAct>
            <Act1> Food Stamp </Act1>
            ...
        </RecommendAct>
    </Item1>
    <Item2>
        <ItemCode> DRUG-23401 </ItemCode>
        <Category> DRUG </Category>
        <Sub-Category> Non-Prescription </Sub-Category>
        <RecommendedAct>
            <Act1> FSA </Act1>
            <Act2> HSA </Act2>
            ...
        </RecommendAct>
        ...
    </Item2>
    <Item3>
        <ItemCode> MS-Shampoo-01 </ItemCode>
        <Category> Body Wash</Category>
        <Sub-Category> shampoo </Sub-Category>
        <RecommendedAct>
            <Act1> Regular </Act1>
            ...
        </RecommendAct>
        ...
    </Item3>
    ...
</ItemStatus>
```

Within implementations, the merchant 210 may provide an account recommendation message 212 to the user 202, e.g., a message sent to the user's mobile device via NFC handshake, a message displayed on the PoS terminal, and/or the like. For example, in one implementation, as shown in the above example of restricted-use account matching status message 206, when the PoS terminal has determined one or more of the user's purchase items includes healthcare products that are eligible for FSA/HSA expenses, the PoS terminal may generate a RUAP alert asking the user whether the user would like to purchase eligible items using FSA/HSA account, e.g., see 111 in FIG. 1B. An exemplary XML-formatted message of account recommendation message 212 for the user may take a form similar to the following:

```
POST /AccountAlert.php HTTP/1.1
Host: 216.15.51.74
Content-Type: Application/XML
Content-Length: 718
<?XML version = "1.0" encoding = "UTF-8"?>
<AccountAlert>
    <Time> 17:40:40 </Time>
    <Date> 09-09-2015 </Date>
    ...
    <Item>
        <Item1>
            <ItemCode> DRUG-23401 </ItemCode>
            <Category> DRUG </Category>
            <Sub-Category> Non-Prescription </Sub-Category>
            <ItemAlias> NyQuil </ItemAlias>
            <RecommendedAct>
                <Act1> FSA </Act1>
                <Act2> HSA </Act2>
                ...
            </RecommendAct>
            ...
        </Item1>
    </Item>
    <Message> "Would you like to pay your NyQuil with your FSA/HSA?" </Message>
    <HardwareID> JS001 </HardwareID>
    <Address> 01:23:45:67:89:ab </Address>
    ...
</AccountAlert>
```

In another example, the restricted-use account status 206 may identify eligible items for each restricted-use account if there is any. For example, an exemplary XML-formatted message 206 for the user may take a form similar to the following:

```
POST /AccountAlert.php HTTP/1.1
Host: 216.15.51.74
Content-Type: Application/XML
Content-Length: 718
<?XML version = "1.0" encoding = "UTF-8"?>
<AccountStatus>
    <Time> 17:40:40 </Time>
    <Date> 09-09-2015 </Date>
    ...
        <user>
            <user_id> JS-001 </user_id>
            <user_name> John Smith </user_name>
            <wallet_id> js_wallet </wallet_id>
            <password> ***** </password>
            ...
        </user>
    <ru_account1>
        <account_name> FSA </account_name>
        <account_category> healthcare </account_category>
        <account_type> prepaid </account_type>
        <item>
        <Item1>
            <ItemCode> DRUG-23401 </ItemCode>
            <Category> DRUG </Category>
            <Sub-Category> Non-Prescription </Sub-Category>
            <ItemAlias> NyQuil </ItemAlias>
            ...
        </Item1>
        <item_2>
            <item_code> DRUG-23402 </item_code>
            <category> drug </category>
            <sub_category> antibiotics </sub_category>
                <item_alias> penicillin </item_alias>
            ...
        </item_2>
        ...
        </Item>
    ...
    </ru_account1>
    <ru_account2>
        <account_name> food stamp </account_name>
        <account_category> government </account_category>
        <account_type> food </account_type>
        <item>
        <Item1>
            <ItemCode> food-2307 </ItemCode>
            <Category> grocery </Category>
            <Sub-Category> produce </Sub-Category>
            <ItemAlias> flour </ItemAlias>
            ...
        </Item1>
        <item_2>
            <item_code> food-3394 </item_code>
            <category> grocery </category>
            <sub_category> bakery </sub_category>
                <item_alias> cupcake </item_alias>
            ...
        </item_2>
        ...
        </Item>
    </ru_account2>
    ...
</Accountstatus>
```

In one implementation, the user may select an account 214 to proceed with checkout, e.g., by selecting whether to accept payment with a restricted-use account as recommended by the PoS terminal, or to skip the recommendation and proceed with a bank account checkout. In one implementation, the user may submit account information together with the account selection message 214 to the PoS terminal, e.g., by tapping on an electronic wallet, by swiping a magnetic payment card, and/or the like. In one implementation, an exemplary XML formatted user account selection message 214 may take a form similar to the following:

```
POST /AccountSelection.php HTTP/1.1
Host: 216.15.51.74
Content-Type: Application/XML
Content-Length: 718
<?XML version = "1.0" encoding = "UTF-8"?>
<AccountSelection>
    <TimeStamp> 11:11:23 </TimeStamp>
    <Date> 09-09-2015 </Date>
    <User>
        <UserName> John Smith </UserName>
        <UserID> JS0000 </UserID>
        ...
    </User>
    <Account>
        <AccountNo> 0000 0000 0000 </AccountNO>
        <AccountType> FSA </AccountType>
        <Employer> SuperFast Software Co. </Employer>
        <AccountHolder> John Smith </AccountHolder>
        <RoutingNumber> 000000000 </RoutingNumber>
        ...
    </Account>
    ...
</AccountSelection>
```

Within implementation, upon receiving the user's account selection, the merchant 210 may generate a payment request message 216 to the RUAP server 220, e.g., a HTTP POST message to the RUAP server 220, wherein the XML-formatted payment request 216 message may take a form similar to:

```
POST /PaymentRequst.php HTTP/1.1
Host: www.ruap.com
Content-Type: Application/XML
Content-Length: 718
<?XML version = "1.0" encoding = "UTF-8"?>
<PaymentRequest>
    <RequestID> SHP-0001 </RequestID>
    <RequestDate> 09-09-2015 </BillDate>
    <RequestTimeStamp> 14:23:56 </RequestTimeStamp>
    <User>
        <UserName> John Smith </UserName>
        <UserID> JS0000 </UserID>
        <DeviceID> JS-001 </DeviceID>
        ...
    </User>
    <Account>
        <AccountNo> 0000 0000 0000 </AccountNO>
        <AccountType> FSA </AccountType>
        <Employer> SuperFast Software Co. </Employer>
        <AccountHolder> John Smith </AccountHolder>
        <RoutingNumber> 000000000 </RoutingNumber>
        ...
    </Account>
    <PurchaseItem>
        <Item1>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
            ...
        </Item1>
        ...
    </PurchaseItem>
    <TotalAmount> 12.99 </TotalAmount>
    ...
</PaymentRequest>
```

In one implementation, the RUAP server 220 may obtain a routing number 217 from the received payment request 216, based on which the RUAP may determine where to forward the payment authorization request 218, which may take a similar form to the payment request 216. For example, if the user has elected a credit card account for payment, the RUAP server 220 may route the payment authorization request 218 to the credit card issuing bank. In another example, when the user elected a FSA/HSA account for payment, the RUAP server 220 may route the payment authorization request 218 the FSA/HSA account manager.

In one implementation, the account issuing network 230 may review and verify the payment request. For example, the account issuer may verify whether the account has sufficient remaining balance to furnish the payment, whether the MCC of the purchase item is eligible for usage of the account, and/or the like, e.g., 221. In one implementation, the account issuer network 230 may generate a payment authorization response message 222, e.g., a HTTPS POST message in the form of data formatted according to the XML. Below is an example HTTP(S) POST message including an XML-formatted message of the authorization response 222 for the RUAP server 220:

```
POST /AuthorizationResponse.php HTTP/1.1
Host: www.issuer.com
Content-Type: Application/XML
Content-Length: 718
<?XML version = "1.0" encoding = "UTF-8"?>
<AuthorizationResponse>
    <Time> 17:45:40 </Time>
    <Date> 09-09-2015 </Date>
    <User>
        <UserName> John Smith </UserName>
        <UserID> JS0000 </UserID>
        <DeviceID> JS-001 </DeviceID>
    ...
    </User>
    <Issuer>
        <IssuerID> FSA-CA-001 </IssuerID>
        <RoutingNo> 00000000 </RoutingNo>
    ...
    </Issuer>
    <Account>
        <AccountNo> 0000 0000 0000 </AccountNO>
        <AccountType> FSA </AccountType>
        <Employer> SuperFast Software Co. </Employer>
    ...
    </Account>
    <PurchaseItem>
        <Item1>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
        ...
        </Item1>
    ...
    </PurchaseItem>
    <TotalAmount> 12.99 </TotalAmount>
    <MCCEligibility> Good </MCCEligibility>
    <Balance> Good </Balance>
    <Remaining> 1000.00 </Remaining>
...
</AuthorizationResponse >
```

In the above example, the account issuer, e.g., a FSA account manager, may verify the item category "drug" is eligible for FSA usage, and the remaining balance "$1000.00" is sufficient to cover the requested payment amount of "$14.99."

Upon receiving the payment authorization 222, the RUAP server 220 may process the payment by transacting a requested amount from the user account to the merchant 210, and send an approval notice 223 to the merchant 210. For example, the RUAP server 220 may send the fund transfer request, which may take a form similar to the format in compliance with electronic fund transfers (EFT), and in some embodiments, it may be directly made to the merchant 210 via a third party bank, e.g., absent the direction of the RUAP server 220. In another implementation, the RUAP server 220 may be integrated with a payment network, e.g., VisaNet, etc., which may facilitate the payment processing. In one implementation, the RUAP server 220 may debit the approved payment amount from the user's account and credit to the merchant 210. In another example, the fund transfer message may take a form similar to the Visa Single Message System (SMS) format, Visa Original Credit Transaction (OCT) format, and/or the like. Further implementations of the purchase transaction authorization are discussed in FIGS. 17A-21.

In one implementation, upon obtaining the approval notice 223 of the payment transaction, the merchant 210 may generate a receipt 225 to the user. For example, the user may obtain a printed receipt 213 from a PoS terminal. For another example, the user may obtain an electronic receipt (e.g., via online shopping site, via NFC handshake with the PoS terminal from a mobile device, etc.). In one implementation, receipt 225 may list the user's purchased item information, payment account information, merchant information, and/or the like. In another implementation, the RUAP server 220 may incorporate information in the receipt into a transaction record 226 for storage. For example, an example of the transaction record 266 for the RUAP server may take a form similar to the following:

```
POST /TransactionRecord.php HTTP/1.1
Host: www.ruap.com
Content-Type: Application/XML
Content-Length: 718
<?XML version = "1.0" encoding = "UTF-8"?>
<Transaction>
    <TransactionID> 000000 </TransactionID>
    <TransactionDate> 09-09-2015 </TransactionDate>
    <RequestTime> 19:30:27 </RequestTime>
    <ReceiptTime> 19:31:56 </ReceiptTime>
    <User>
        <UserName> John Smith </UserName>
        <UserID> JS0000 </UserID>
    ...
    </User>
    ...
    <Account>
        <AccountNo> 0000 0000 0000 </AccountNO>
        <AccountType> FSA </AccountType>
        <Employer> SuperFast Software Co. </Employer>
        <RoutingNo> 00000000 </RoutingNo>
    ...
    </Account>
    <PurchaseItem>
        <Item1>
            <ItemCode> DRUG-23401 </ItemCode>
            <Category> DRUG </Category>
            <Sub-Category> Non-Prescription </Sub-Category>
            <ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
        ...
        </Item1>
...
```

-continued

```
        </PurchaseItem>
        <TotalAmount> 12.99 </TotalAmount>
        <Verification> Good </Verification>
        <Merchant>
            <MerchantID> MC001 </Merhcant>
            <MerchantName> Walgreens </MerchantName>
            <MerchantAddress> ... </MerchantAddress>
            <PoSID> MCC-001-001 </PoSID>
            ...
        </Merchant>
        <TransferLog>
            <Transfer1>
                <Amount> 14.99 </Amount>
                <Payor> 0000 0000 0000 </Payor>
                <Payee> 0000 0000 0002 </Payee>
                <Status> Verified </Status>
                ...
            </Transfer1>
            ...
        </TransferLog>
    ...
    </Transaction>
```

In another implementation, the database 219 may be a relational database responsive to Structured Query Language ("SQL") commands. The RUAP server may execute a hypertext preprocessor ("PHP") script including SQL commands to query the database for user, transaction data, and/or the like. An example PHP/SQL command listing, illustrating substantive aspects of storing a transaction record 266 in the database:

```
<?PHP
header('Content-Type: text/plain');
mysql_connect("202.155.66.130",$DBserver,$password); // access database server
mysql_select("TRANSACTIONS.SQL"); // select database to append
mysql_query("INSERT INTO Transactions (transaction_id, transaction_date,
requested_time, receipt_time, user_id, user_name, account_no, account_type, employer,
routing_no, item_code, category, sub_category, item_name, item_description,
item_quantity, unit_price, total_amount, veritifcation_status, merchant_id,
merchant_name, PoS_id, transfer_log, payee_id, payor_id, transfer_amount ...)
VALUES ($transaction_id$, $transaction_date$, $requested_time$, $receipt_time$,
$user_id$, $user_name$, $account_no$, $account_type$, $employer$, $routing_no$,
$item_code$, $category$, $sub_category$, $item_name$, $item_description$,
$item_quantity$, $unit_price$, $total_amount$, $veritifcation_status$, $merchant_id$,
$merchant_name$, $PoS_id$, $transfer_log$, $payee_id$, $payor_id$, $transfer_amount$...);
//
add data to table in database
mysql_close("TRANSACTIONS.SQL"); // close connection to database
?>
```

In one implementation, the RUAP may access and retrieve information from one or more online databases 219. Some databases contain a rule for a payment made towards the balance due bill for the healthcare provided by the healthcare worker to the user. By way of example, and not by way of limitation, a database can contain a negative wealth impacting (e.g., deduction, liability, insurance, debt, tax, negative interests, and/or other wealth reducing factor) rule pertaining to payment to the healthcare provider for the healthcare to the user. Another database can contains an insurance rule pertaining to payment for the healthcare to the user. Other online databases accessible by the RUAP to retrieve information can contain data specific to the user and an insured entity financially responsible for the user, as well as currency balances in each of one or more accounts respectively issued by an issuer.

FIG. 2B provides a data flow illustrating alternative implementations of RUAP entity interactions within embodiments of the RUAP. Within implementations, instead of obtaining account recommendation (e.g., 212 in FIG. 2A) at a smart PoS terminal equipped with the merchant 210, such account recommendation may be provided by the RUAP server 220 upon user submitting purchase item information to the RUAP server 220. In one implementation, in one implementation, upon user submitting purchase item information 203 to the merchant 210, which in term generates a payment bill 208, the user may obtain a bill 211 from the merchant. For example, in one implementation, the merchant may print a paper bill 211 to the user. In another example, the merchant may transmit an electronic bill of the purchase items 211 to the user's electronic wallet, e.g., see 1416 in FIG. 14B. The user's electronic wallet may then determine whether the purchase item information comprises any restricted-use account eligible items. In further implementations, the merchant may generate a QR code for display, as further discussed in FIG. 2C.

Within alternative implementations, the user may check in with the RUAP server 220 with bill information 227. For example, in one implementation, the user's electronic wallet instantiated on a mobile device may automatically send a notification to the RUAP server 220 upon identifying the user's GPS coordinates reflect user's location at a merchant store 210. In another implementation, the user's browser may send a cookie to the RUAP server 220 indicating the user has entered into a merchant shopping site. The user-merchant check-in may take places prior to, after, or in accordance with the user obtaining a purchase bill from the merchant.

Within implementations, the user may also send purchase bill information 227 to the RUAP server 220. For example, in one implementation, the user may forward an electronic bill to the RUAP server 220 via wallet. In another example, the user may operate a camera-enabled mobile device to capture an image of a paper bill, a checkout list displayed at a PoS terminal screen, a QR code generated at a PoS terminal and/or a checkout page at the user's online shopping site, and/or the like, and incorporate the captured image in the message 227 to the RUAP server 220. In another implementation, the user may proceed with 241 in FIG. 2C to obtain bill information embedded in a QR code.

For example, in one implementation, the user's mobile device may generate a HTTPS POST message in the form of data formatted according to XML, wherein the XML-formatted message of the user check-in with bill information message 227 for the RUAP server 220 may take a form similar to the following:

```
POST /UserCheckin.php HTTP/1.1
Host: 216.15.51.74
Content-Type: Application/XML
Content-Length: 718
<?XML version = "1.0" encoding = "UTF-8"?>
<UserCheckin>
    <Time> 17:45:40 </Time>
    <Date> 09-09-2015 </Date>
    <User>
        <UserName> John Smith </UserName>
        <UserID> JS0000 </UserID>
        <DeviceID> JS-001 </DeviceID>
        ...
    </User>
    <GPS> 29.199505,-90.041242 </GPS>
    <Bill>
        <Item1>
            <ItemCode> FOOD-9875 </ItemCode>
            <Category> FOOD </Category>
            <Sub-Category> Breakfast </Sub-Category>
            </ItemName> Cereal </ItemName>
            <Description> whole grain original 10 oz </Description>
            <Quantity> 1 </Quantity>
            <UnitPrice> 4.99 </UnitPrice>
            <TotalAmt> 4.99 </TotalAmt>
            ...
        </Item1>
        <Item2>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
            ...
        </Item2>
        ...
    </Bill>
    <TotalAmount> 16.99 </TotalAmount>
    <Merchant>
        <MerchantID> MC001 </Merhcant>
        <MerchantName> Walgreens </MerchantName>
        <MerchantAddress> ... </MerchantAddress>
        <PoSID> MCC-001-001 </PoSID>
        ...
    </Merchant>
    ...
</UserCheckin>
```

In another implementation, the merchant may submit bill information 212 to the RUAP server 220. As such, the RUAP server may forward bill information to the user via email, SMS, instant messaging, wallet messaging, and/or the like.

In one implementation, upon receiving the user check-in information 227, the RUAP server 220 may query a user database to retrieve user's profile, and determine a list of user payment accounts registered with the electronic wallet. In one implementation, the RUAP server 220 may retrieve routing number 229 with user registered accounts, and submit an update request 231 to the account issuer network 230 for account balance information. The issuer network 230 may in turn retrieve the account information for status check 233a, and generate a status update 233b to the RUAP server. For example, in one implementation, the issuer network 230 may generate a HTTPS POST message in the form of data formatted according to XML, wherein the XML-formatted message of the account update message 233a-b for the RUAP server 220 may take a form similar to the following:

```
POST /AccountUpdate.php HTTP/1.1
Host: www.issuer.com
Content-Type: Application/XML
Content-Length: 718
<?XML version = "1.0" encoding = "UTF-8"?>
<AccountUpdate>
    <Time> 17:45:40 </Time>
    <Date> 09-09-2015 </Date>
    <User>
        <UserName> John Smith </UserName>
        <UserID> JS0000 </UserID>
        <DeviceID> JS-001 </DeviceID>
        ...
    </User>
    <Account>
        <AccountNo> 0000 0000 0000 </AccountNO>
        <AccountType> FSA </AccountType>
        <Employer> SuperFast Software Co. </Employer>
        <RoutingNo> 000000000 </RoutingNo>
        <Balance> 649.00 </Balance>
        <Term>
            <start_date> 01/01/2015 </start_date>
            <end_date> 12-31-2015 </end_date>
        </Term>
        ...
    </Account>
    <Status> Good </Status>
    ...
</AccountUpdate>
```

Figure 5A:
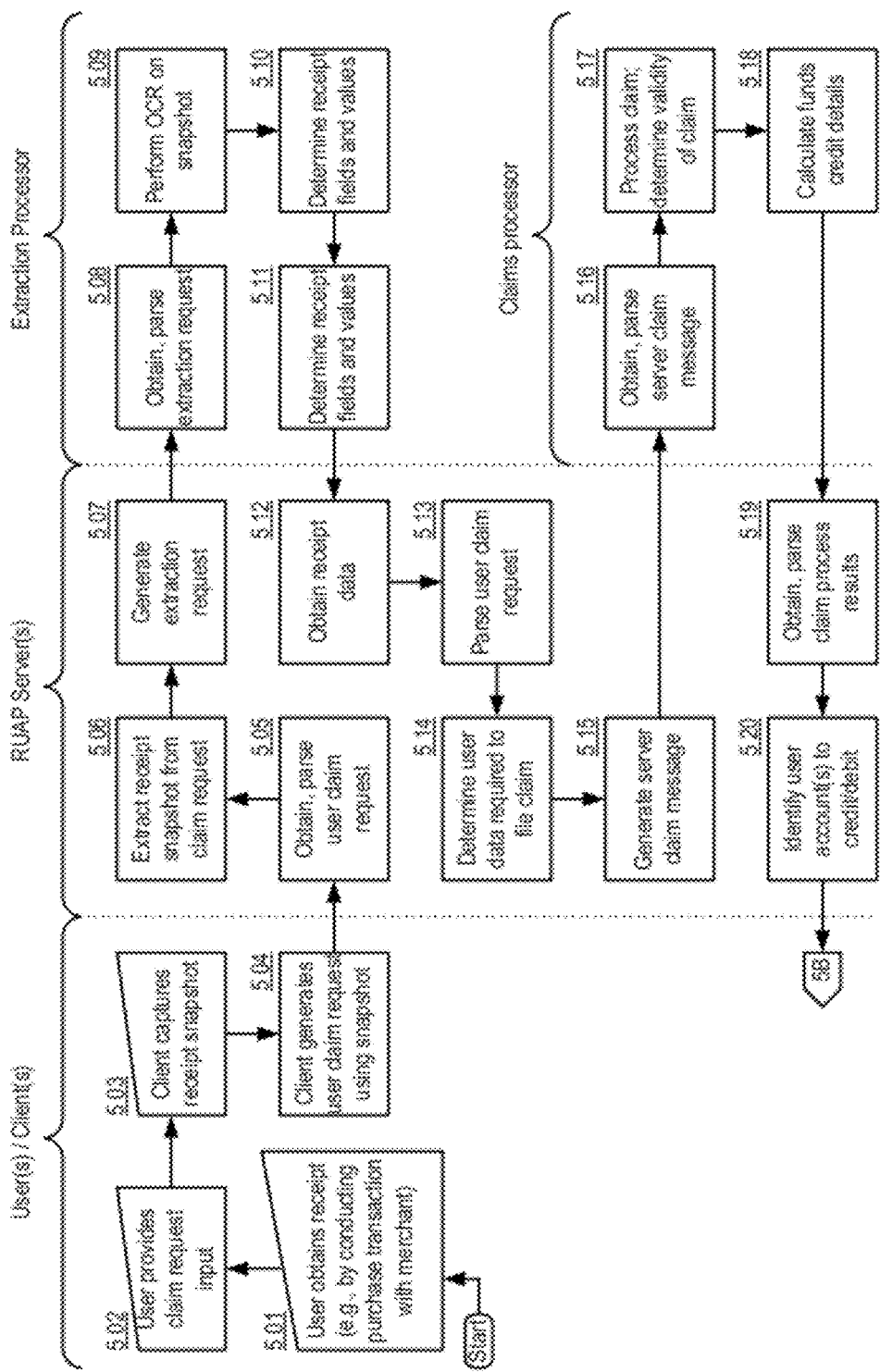
FIGS. 5A-5C provide logic flow diagrams illustrating data flows between RUAP and affiliated entities for post-purchase restricted-use account reimbursement processing within various embodiments of the RUAP.
Figure 5B:
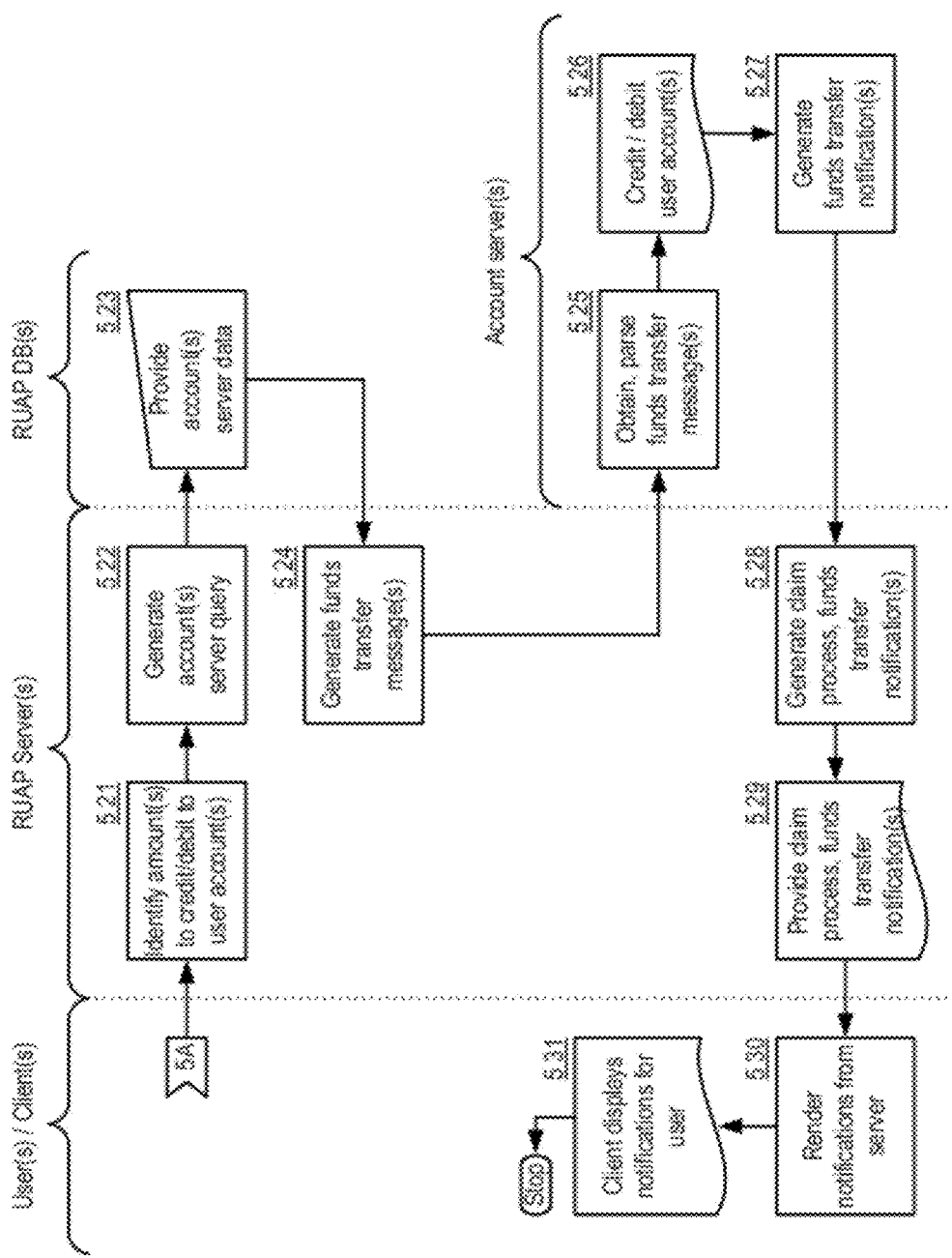
Figure 5C:
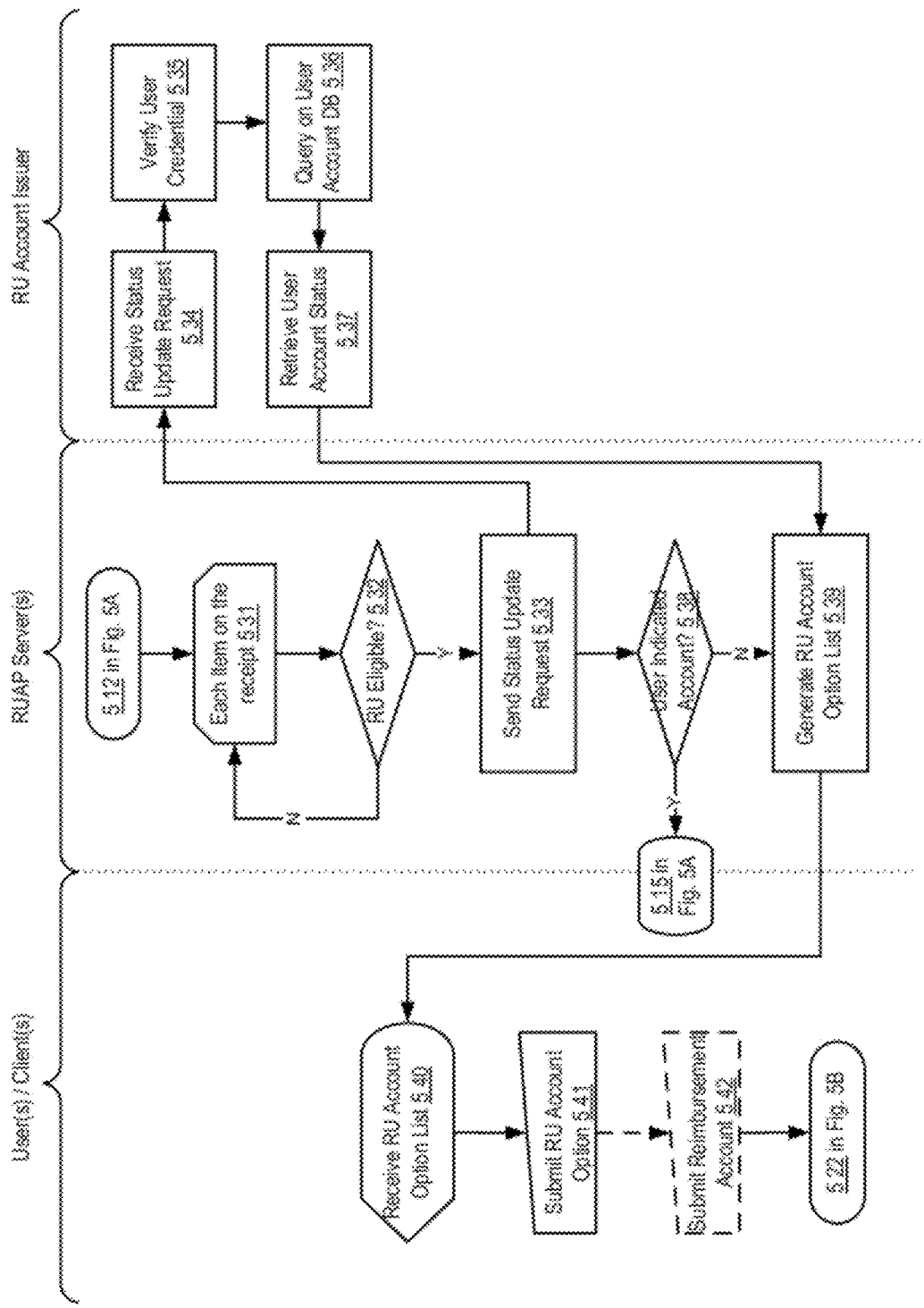
Figure 5D:
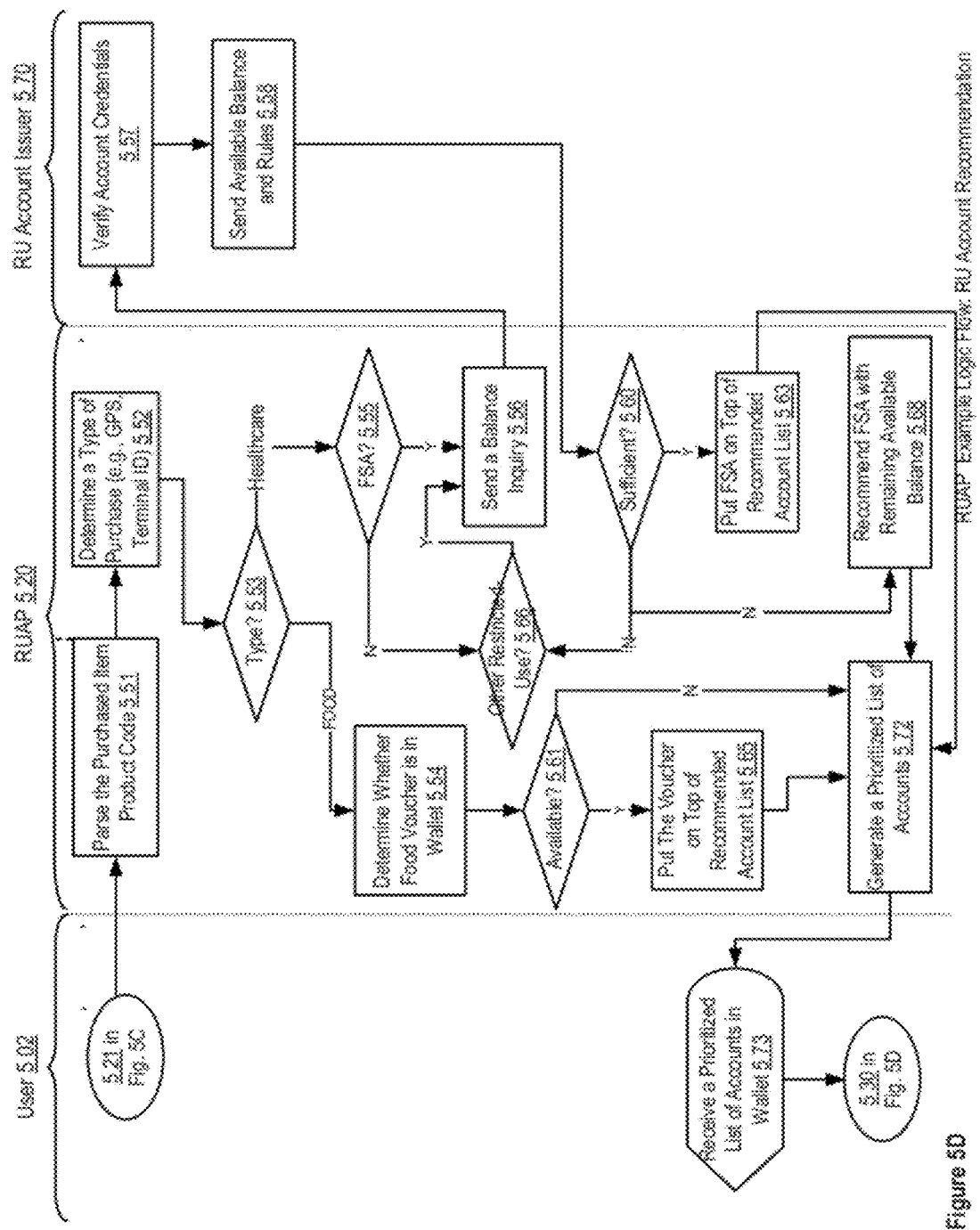
FIG. 5D provides a logic flow diagram illustrating restricted-account recommendation within various embodiments of the RUAP.

In another implementation, the RUAP server 220 may obtain purchase item information from the user provided bill information and perform item eligibility check 228 to see if any item from the bill is eligible for a user enrolled restricted-account usage. For example, in one implementation, the RUAP server 220 may extract purchase item information from the bill submitted with message 227, e.g., a snap bill image, etc., by performing an optical character recognition (OCR) procedure. The RUAP server 220 may then query a user database for user enrolled account, and the information retrieved by the RUAP from the online databases is processed by an optimization algorithm that operates on the rules in the retrieved information. The RUAP may derive a recommendation that includes a currency payment amount to pay against the balance due bill respectively from each said currency balance of the one or more accounts issued by respective issuers. In further implementations, the recommendation may be performed and rendered on the web enabled mobile computing device for approval by the user. If the recommendation is approved, the enabled mobile computing device transmits the recommendation to the POS. In one implementation, the POS may transmit the recommendation for authorization processing of each currency payment amount to pay against the balance due bill respectively from each currency balance of each account as provided by the recommendation. In a further implementation, the RUAP may substantially maximize currency payments pay against the balance due bill, as well as substantially minimize out-of-pocket payments pay against the balance due bill. Further implementations of account recommendations are illustrated in FIGS. 5D-5F.

Figure 5E:
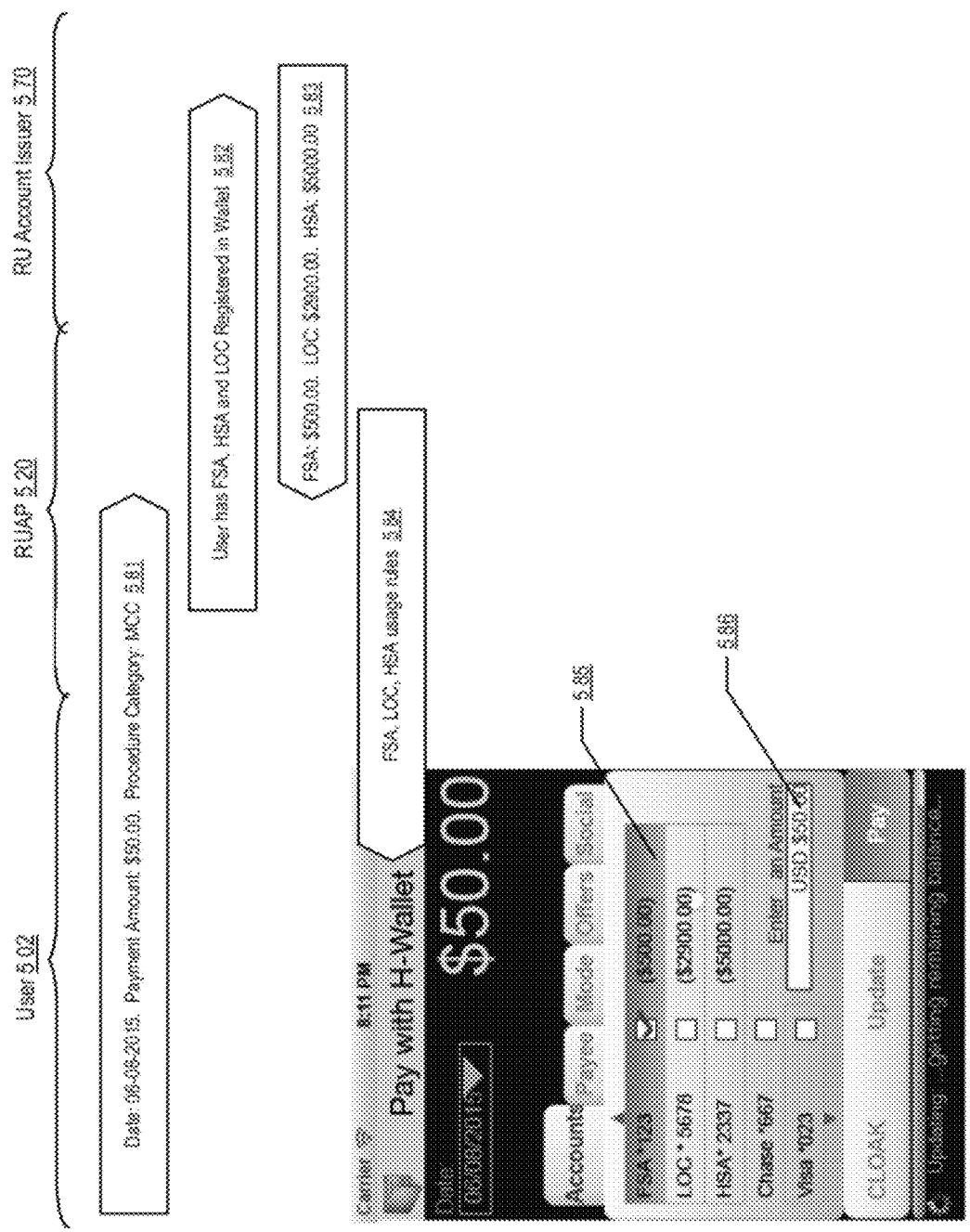
FIGS. 5E-5F provide combined logic flow and user interface(s) flows illustrating healthcare restricted-account (e.g., FSA, HSA, etc.) recommendation within various embodiments of the RUAP.
Figure 5F:
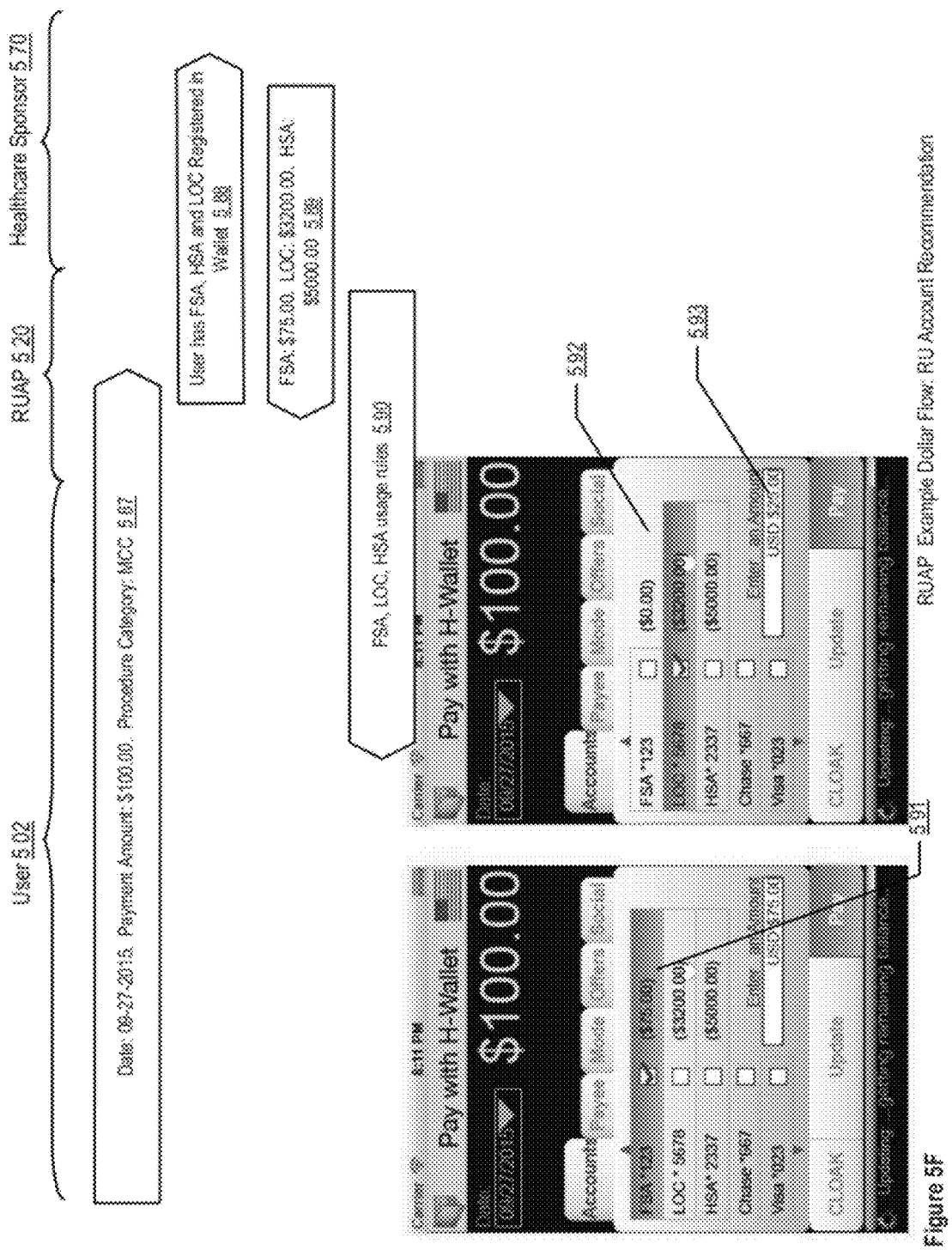

In one implementation, the RUAP server 220 may provide an account listing 235 (add a data structure) to the user, e.g., see 585 in FIG. 5E, and the user may submit an account selection 214 by tapping on an account. Upon obtaining the user selected account, the merchant PoS terminal may process the payment request 216 in a similar manner as discussed in FIG. 2A. For example, in one implementation, an exemplary XML-formatted recommended account listing may take a form similar to:

```
POST /AccountList.php HTTP/1.1
Host: www.issuer.com
Content-Type: Application/XML
Content-Length: 718
<?XML version = "1.0" encoding = "UTF-8"?>
<AccountList>
    <Time> 17:45:56 </Time>
    <Date> 09-09-2015 </Date>
    <User>
        <UserName> John Smith </UserName>
        <UserID> JS0000 </UserID>
        <DeviceID> JS-001 </DeviceID>
    ...
    </User>
    <AccountList>
        <Account1>
            <AccountType> FSA </AccountType>
            <AccountBalance> 100.00 </AccountBalance>
            ...
        <Account1>
            <Account2>
                <AccountType> HSA </AccountType>
                <AccountBalance> 1000.00 </AccountBalance>
            ...
        <Account2>
            <Account3>
                <AccountType> HRA </AccountType>
                <AccountBalance> 200.00 </AccountBalance>
            ...
        <Account3>
    </AccountList>
    <Status> Good </Status>
    ...
</AccountList>
```

Figure 2C:
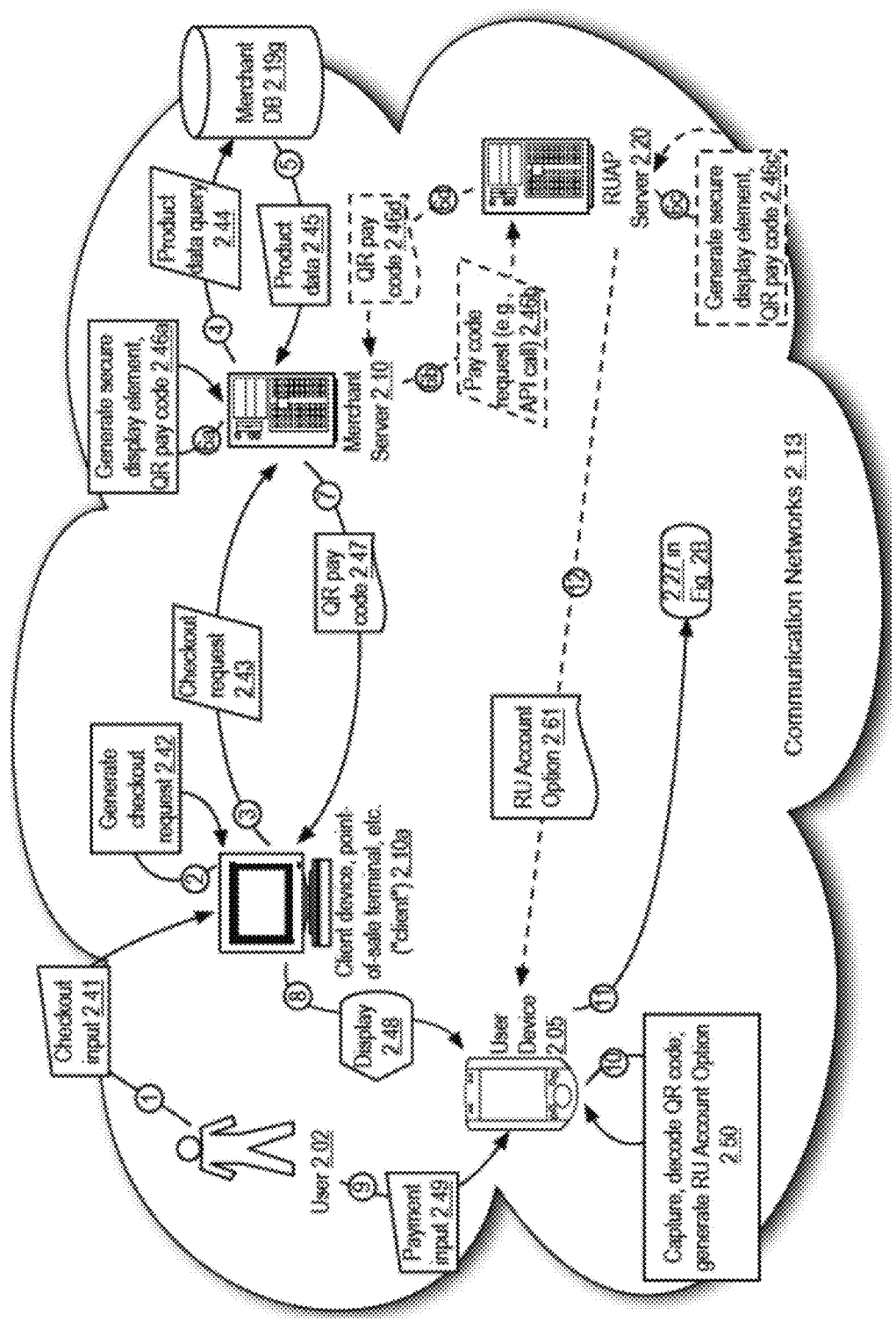

FIG. 2C provides a data flow diagram illustrating user-PoS interaction for capturing bill information from a QR code within embodiments of the RUAP. In some implementations, a user, e.g., 202, may desire to purchase a product, service, offering, and/or the like ("product"), from a merchant, e.g., 210, via a merchant online site or in the merchant's store. The user may communicate with a merchant server, e.g., 210, via a client such as, but not limited to: a personal computer, mobile device, television, point-of-sale terminal, kiosk, ATM, and/or the like (e.g., 402). For example, the user may provide user input, e.g., checkout input 241, into the client indicating the user's desire to purchase the product. For example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. The client may generate a checkout request, e.g., 242, and provide the checkout request, e.g., 243, to the merchant server. For example, the client may provide a HTTP(S) GET message including the product details for the merchant server in the form of data formatted according to the XML. Below is an example HTTP(S) GET message including an XML-formatted checkout request for the merchant server: (change it to the drug example)

```
GET /checkout.php HTTP/1.1
Host: www.merchant.com
Content-Type: Application/XML
Content-Length: 718
<?XML version = "1.0" encoding = "UTF-8"?>
<checkout_request>
    <session_ID>4NFU4RG94</session_ID>
```

-continued

```
    <timestamp>2011-02-22 15:22:43</timestamp>
    <user_ID>john.q.smith@email.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <purchase_details>
    <Item1>
        <ItemCode> FOOD-9875 </ItemCode>
        <Category> FOOD </Category>
        <Sub-Category> Breakfast </Sub-Category>
        </ItemName> Cereal </ItemName>
        <Description> whole grain original 10 oz </Description>
        <Quantity> 1 </Quantity>
        <UnitPrice> 4.99 </UnitPrice>
        <TotalAmt> 4.99 </TotalAmt>
        ...
    </Item1>
    <Item2>
        <ItemCode> DRUG-23401 </ItemCode>
        <Category> DRUG </Category>
        <Sub-Category> Non-Prescription </Sub-Category>
        </ItemName> NyQuil Cold Medicine </ItemName>
        <Description> NyQuil Cold&Flu Liquid 80 mL </Description>
        <Quantity> 1 </Quantity>
        <UnitPrice> 12.99 </UnitPrice>
        <TotalAmt> 12.99 </TotalAmt>
        ...
    </Item2>
    <item_3>
        <ItemCode> SU-Shampoo-001 </ItemCode>
        <Category> WASH </Category>
        <Sub-Category> hair product </Sub-Category>
        </ItemName> SUAVE shampoo </ItemName>
        <Description> SUAVE shampoo heat treatment 120 mL
        </Description>
        <Quantity> 1 </Quantity>
        <UnitPrice> 8.99 </UnitPrice>
        <TotalAmt> 8.99 </TotalAmt>
        ...
    </item_3>
    </purchase_details>
</checkout_request>
```

In some implementations, the merchant server may obtain the checkout request from the client, and extract the checkout detail (e.g., XML data) from the checkout request. For example, the merchant server may utilize a parser such as the example parsers described below in the discussion with reference to FIG. 24. The merchant server may extract the product data, as well as the client data from the checkout request. In some implementations, the merchant server may query, e.g., 244, a merchant database, e.g., 219g, to obtain product data, e.g., 245, such as product pricing, sales tax, offers, discounts, rewards, and/or other information to process the purchase transaction. For example, the database may be a relational database responsive to Structured Query Language ("SQL") commands. The merchant server may execute a hypertext preprocessor ("PHP") script including SQL commands to query the database for product data. An example PHP/SQL command listing, illustrating substantive aspects of querying the database, is provided below:

```
<?PHP
header('Content-Type: text/plain');
mysql_connect("254.93.179.112",$DBserver,$password); // access
database server
mysql_select_db("PRODUCTS.SQL"); // select database table to
search
//create query
```

-continued

```
$query = "SELECT product_info product_price tax_linfo_list
offers_list discounts_list
rewards_list FROM ProdTable WHERE product LIKE '%' $prod";
$result = mysql_query($query); // perform the search query
mysql_close("PRODUCTS.SQL"); // close database access
?>
```

In some implementations, in response to obtaining the product data, the merchant server may generate, e.g., 246a, a QR pay code, and/or secure display element according to the security settings of the user. The merchant server may provide the QR code to the client, so that the client may display the QR code, and the user may capture the QR code using the user's device to obtain merchant and/or product data for generating a purchase transaction processing request. In alternate implementations, the merchant server may direct the client to communicate the product and/or merchant data required to process the transaction to the user's device via an alternate communication protocol, such as, but not limited to: Wi-Fi™, Bluetooth™, cellular network, SMS, email and/or like communication protocols. For example, the merchant server may direct the client to initiate a plug-in on its system to provide the alternate communication service, and transmit the product and/or merchant data to the user's device via the communication service.

In implementations utilizing a QR code, the merchant server may generate a QR code embodying the product information, as well as merchant information required by a payment network to process the purchase transaction. In some implementations, the QR code may include at least information required by the user device capturing the QR code to generate a purchase transaction processing request, such as a merchant identifier (e.g., a merchant ID number, merchant name, store ID, etc.) and a session identifier for a user shopping session associated with the shopping website/brick-and-mortar store.

In some implementations, the merchant server may generate in real-time, a custom, user-specific merchant-product XML data structure having a time-limited validity period, such as the example 'QR_data' XML data structure provided below:

```
<QR_data>
    <order_ID>4NFU4RG94</order_ID>
    <timestamp>2011-02-22 15:22:43</timestamp>
    <expiry_lapse>00:00:30</expiry_lapse>
    <transaction_cost>$34.78</transaction_cost>
    <alerts_URL>www.merchant.com/shopcarts.php?sessionID=AEBB4356</alerts_URL>
    <user_ID>john.q.public@gmail.com</user_ID>
    <client_details>
        <client_IP>192.168.23.126</client_IP>
        <client_type>smartphone</client_type>
        <client_model>HTC Hero</client_model>
        <OS>Android 2.2</OS>
        <app_installed_flag>true</app_installed_flag>
    </client_details>
    <secure_element>www.merchant.com/securedyn/0394733/123.png</secure_element>
    <purchase_details>
    <Item1>
        <ItemCode> FOOD-9875 </ItemCode>
        <Category> FOOD </Category>
        <Sub-Category> Breakfast </Sub-Category>
        </ItemName> Cereal </ItemName>
        <Description> whole grain original 10 oz </Description>
        <Quantity> 1 </Quantity>
        <UnitPrice> 4.99 </UnitPrice>
        <TotalAmt> 4.99 </TotalAmt>
        ...
    </Item1>
    <Item2>
        <ItemCode> DRUG-23401 </ItemCode>
        <Category> DRUG </Category>
        <Sub-Category> Non-Prescription </Sub-Category>
        </ItemName> NyQuil Cold Medicine </ItemName>
        <Description> NyQuil Cold&Flu Liquid 80 mL </Description>
        <Quantity> 1 </Quantity>
        <UnitPrice> 12.99 </UnitPrice>
        <TotalAmt> 12.99 </TotalAmt>
        ...
    </Item2>
    <item_3>
        <ItemCode> SU-Shampoo-001 </ItemCode>
        <Category> WASH </Category>
        <Sub-Category> hair product </Sub-Category>
        </ItemName> SUAVE shampoo </ItemName>
        <Description> SUAVE shampoo heat treatment 120 mL </Description>
        <Quantity> 1 </Quantity>
        <UnitPrice> 8.99 </UnitPrice>
        <TotalAmt> 8.99 </TotalAmt>
        ...
    </item_3>
    </purchase_details>
    <merchant_params>
        <merchant_id>3FBCR4INC</merchant_id>
```

```
        <merchant_name>Acme Supermarket, Inc.</merchant_name>
        <merchant_auth_key>1NNF484MCP59CHB27365</merchant_auth_key>
    </merchant_params>
<QR_data>
```

In some implementations, the XML data may include a handle, alias, token, or pointer to information stored on a payment network server, rather than encoding all of the actual data required to initiate the transaction, so that the information encoded into the QR code may be advantageously minimized. In some implementations, the merchant may generate a QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

In alternate implementations, the merchant server may provide, e.g., 246b the XML data to a RUAP server 220, along with a request to generate a QR code. For example, the merchant server may utilize an API call to the RUAP server to request generation of the QR code. The RUAP server may generate the QR code for the merchant server, e.g., 246c, and provide, e.g., 246d, the QR code to the merchant server. For example, the RUAP server may encode the information provided by the merchant into the QR code, and may also advantageously encode security information, time validity information, digital certificate information, anonymous shipping information, QR code generation/processing fee information, etc. into the QR code.

In some implementations, the RUAP server may provide the merchant server with an encryption key (e.g., a Rivest-Shamir-Adleman ("RSA") private/public key, digital certificate). The merchant may encrypt the custom, user-specific merchant-product XML data structure using the encryption key to generate encrypted purchase data (e.g., using the RSA algorithm). The merchant server may then encode the encrypted data into the QR code. Such a scheme may be employed advantageously, in various embodiments, by the RUAP server to authenticate the merchant for any transaction processing requests related to the user-merchant shopping session.

In some implementations, pre-designed QR codes associated with authenticated with pre-authenticated merchants may be provided to the user device. For example, a user may be browsing an online website on the user's device. The user device may make a HTTP(S) GET request for a webpage from a web server. In some implementations, the web server may, in response to the user device's request for a webpage, generate a query for advertisements to display on the webpage. For example, the web server may search a database, or provide a request to an ad network server (e.g., Akamai) to provide advertisements for embedding into the webpage. In some implementations, the ad network server may utilize keywords, metadata, etc. obtained from the web server (e.g., keywords or metadata associated with the webpage, user profile information, user ID, user browsing history from a cookie stored on the user device, etc.). The ad network may utilize the keywords to generate a query of database(s) for advertisements associated with the keywords, and may obtain advertisements to provide. In some implementations, the ad network server may provide information (e.g., via an API call) on such advertisements (e.g., merchant name, merchant ID, product name, product pricing information, related offers, etc.) to a RUAP server. The RUAP server may generate a QR code based on the information provided by the ad network server, such that a user device may snap the QR code to initiate a purchase transaction for the goods and/or services associated with the QR code (e.g., as provided by the ad network server to the RUAP server). The ad network server may provide the QR as part of the advertisement to the web server, which may in turn embed the advertisement including the QR code into the webpage before providing it to the user device. In alternate implementations, the ad network server/web server may transmit a URL or other identifier of the QR code (ultimately) to the user device, and the user device may make a call (e.g., a HTTP(S) GET request) using the URL of the QR code (e.g., hosted on the RUAP server) to obtain the QR code and display it for the user.

In some implementations, the merchant server may provide the QR code to the client, e.g., 247. For example, the merchant server may provide a HyperText Markup Language ("HTML") page including a reference to the QR code image and/or secure element image, such as the example HTML page below:

```
<html>
    <img src="www.merchant.com/securedyn/0394733/qrcodeimg.png"
alt="Merchant-Product QR code"/>
    <img src=" www.merchant.com/securedyn/0394733/123.png"
alt="Secure Element"/>
</html>
```

In some implementations, the client may obtain the QR pay code, e.g., 247, and display the QR code, e.g., 248 on a display screen associated with the client device. In some implementations, the user may utilize a user device, e.g., 205, to capture the QR code presented by the client device for payment processing. For example, the user may provide payment input into the user device, e.g., 249. In various implementations, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. For example, the user device may obtain track 1 data from the user's card (e.g., credit card, debit card, prepaid card, charge card, etc.), such as the example track 1 data provided below:

%B123456789012345^PUBLIC/J.Q.^99011200000000000000901*****?*
(wherein '123456789012345' is the card number of 'J.Q. Public' and has a CVV number of
901. '990112' is a service code, and *** represents decimal digits which change
randomly each time the card is used.)

In some implementation, the user device may determine whether an image it has captured depicts a QR code. Depending on whether or not a QR code has been captured, and also (optionally) depending on contents of the QR code, the user device may redirect the user (e.g., via a web browser application executing on the user device) to: a product, a merchant website, a product at a merchant website, a website and including a command to add an item to a purchasing cart of the user associated with the website, and/or the like. For example, the user device may execute a component such as the example Quick Response Code Processing ("QRCP") component described below in the discussion with reference to FIGS. 6A-B.

In some implementations, upon obtaining the user payment input and capturing the QR code, the user device may generate a restricted-account option alert 250 (e.g., to notify the user an option to proceed with a restricted-account payment, etc.). In an alternative implementation, upon capturing purchase item information from the QR code, the user may proceed with 227 in FIG. 2B, e.g., to check-in and submit purchase item information to the RUAP server 220, which may in turn returns a restricted-account option alert 261 for display on the user device 205.

In another implementation, upon obtaining the QR code, the user device may provide a card authorization request, on behalf of the user, a HTTP(S) GET message including the product order details for the RUAP server 220, in the form of XML-formatted data. Below is an example HTTP(S) GET message including an XML-formatted card authorization request for the RUAP server:

```
GET /purchase.php HTTP/1.1
Host: www.merchant.com
Content-Type: Application/XML
Content-Length: 1306
<?XML version = "1.0" encoding = "UTF-8"?>
<purchase_order>
    <order_ID>4NFU4RG94</order_ID>
  <alerts_URL>www.merchant.com/shopcarts.php?sessionID=AEBB4356</alerts_URL>
        <timestamp>2011-02-22 15:22:43</timestamp>
        <user_ID>john.q.public@gmail.com</user_ID>
        <client_details>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </client_details>
        <purchase_details>
        <Item1>
            <ItemCode> FOOD-9875 </ItemCode>
            <Category> FOOD </Category>
            <Sub-Category> Breakfast </Sub-Category>
            </ItemName> Cereal </ItemName>
            <Description> whole grain original 10 oz </Description>
            <Quantity> 1 </Quantity>
            <UnitPrice> 4.99 </UnitPrice>
            <TotalAmt> 4.99 </TotalAmt>
            ...
        </Item1>
        <Item2>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL </Description>
            <Quantity> 1 </Quantity>
            <UnitPrice> 12.99 </UnitPrice>
            <TotalAmt> 12.99 </TotalAmt>
            ...
        </Item2>
        <item_3>
            <ItemCode> SU-Shampoo-001 </ItemCode>
            <Category> WASH </Category>
            <Sub-Category> hair product </Sub-Category>
            </ItemName> SUAVE shampoo </ItemName>
            <Description> SUAVE shampoo heat treatment 120 mL </Description>
            <Quantity> 1 </Quantity>
            <UnitPrice> 8.99 </UnitPrice>
            <TotalAmt> 8.99 </TotalAmt>
            ...
        </item_3>
        </purchase_details>
        <merchant_params>
```

```
        <merchant_id>3FBCR4INC</merchant_id>
        <merchant_name>Acme Supermarket, Inc.</merchant_name>
        <merchant_auth_key>1NNF484MCP59CHB27365</merchant_auth_key>
    </merchant_params>
    <account_params>
        <account_name>John Smith</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</purchase_order>
```

In some implementations, the card authorization request generated by the user device may include a minimum of information required to process the purchase transaction. For example, this may improve the efficiency of communicating the purchase transaction request, and may also advantageously improve the privacy protections provided to the user and/or merchant. For example, in some implementations, the card authorization request may include at least a merchant ID, a session ID for the user's shopping session with the merchant, and a device ID of a device (e.g., smartphone) of the user that is linked to the user's virtual wallet. In some implementations, the QR code and messages sent to/from the QR-code capturing device may include the source ID (e.g., identifier of the device generating the QR code), session ID, merchant ID, item ID (e.g., model number), the charge amount, and/or transacting device ID (e.g., the user's smartphone device).

In some implementations, the card authorization request may be provided by the merchant server or point of sale terminal, instead of the user device. In some implementations, the user, desiring security, may request, via the user device, the RUAP server for a dynamically-generated card verification value code (dCVV™) to be utilized along with the user's primary account number ("PAN," e.g., credit card number) in the purchase transaction. In response, the payment network server may generate a dCVV™ code (e.g., using random number generation, MD5 hash of an input key, which may be generated using the user ID, merchant ID, session ID, timestamp, combinations thereof, and/or the like), and provide a session-specific dCVV™ code for the user to utilize along with the user's PAN number. For example, the session-specific dCVV™ code may have an expiry time (e.g., expiry in a one minute from issue). The user device may communicate (e.g., via Bluetooth™, NFC, Wi-Fi, cellular, QR code, etc.) the PAN and dCVV to the point-of-sale terminal, which may create the card authorization request. For example, the user device may generate a QR payment code embedding the PAN and dCVV numbers, and the point of sale terminal may snap an image of the user device-generated QR payment code. The point of sale terminal may then generate and provide the card authorization request to the RUAP server. The RUAP server may then be able to validate the transaction by comparing the dCVV obtained from the merchant with the dCVV it provided to the user device before the purchase transaction was initiated. If the dCVV codes from the two sources (RUAP server and merchant) correspond properly to each other, the RUAP server may continue processing the purchase transaction.

In some implementations, the card authorization request from a user device may include encrypted data extracted from the QR code, which may have been encrypted by the merchant server as part of a merchant authentication scheme. In some implementations, the RUAP server may obtain the encrypted data from the card authorization request provided by the user device, and attempt to decrypt the encrypted data, e.g., using a RSA private/public that is complementary to the key the RUAP server initially provided to the merchant server for encrypting the purchase data before embedding it into the QR code. If the RUAP server is able to decrypt the purchase data, then the merchant is authenticated as being a valid merchant. In some implementations, the RUAP server may compare the purchase data decrypted from the card authorization with data provided by the user/user device, to determine whether the data from these different sources (user/user device, and merchant) correspond properly to each other. Thus, in some implementations, the RUAP server may be able to authenticate the merchant, and correlate the merchant to a specific user session or user device before processing the transaction.

In some implementations, the RUAP server may provide a notification to the user device that the transaction is authenticated and approved for transacting. In alternate implementations, the RUAP server may proceed with transaction processing. In some implementations, upon identifying that the user is in a session with the merchant, the RUAP server may communicate with the user device to provide additional features for the user. For example, in some implementations, the RUAP server may provide a communication to the user device (e.g., via a HTTP(S) POST message) to provide: a virtual storefront of the merchant; a depiction of an aisle of the merchant associated with the products included in the card authorization request, a listing of related items; and/or the like.

Figure 3A:
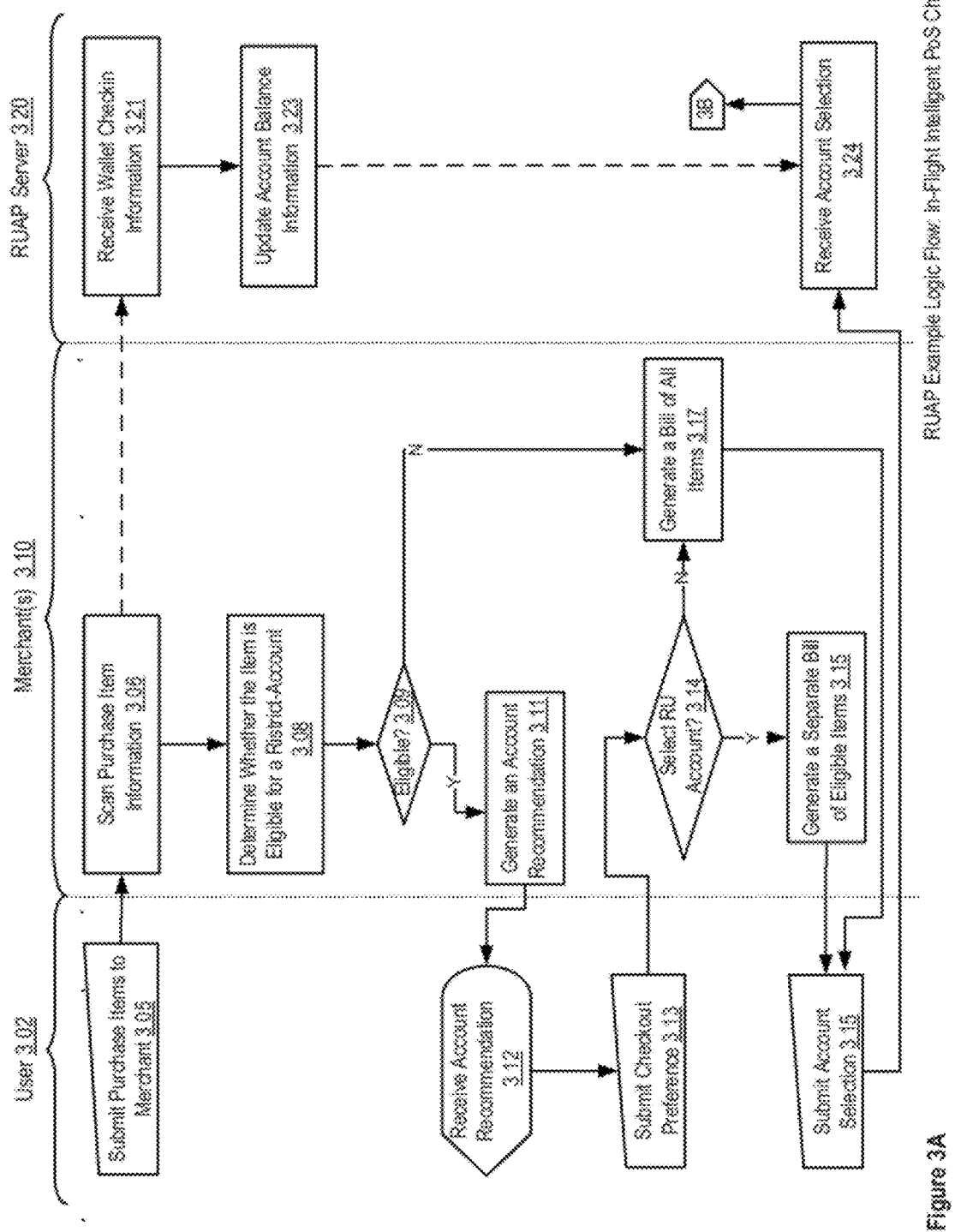
FIGS. 3A-3E provide logic flow diagrams illustrating user PoS checkout with restricted-use account within various embodiments of the RUAP.
Figure 3B:
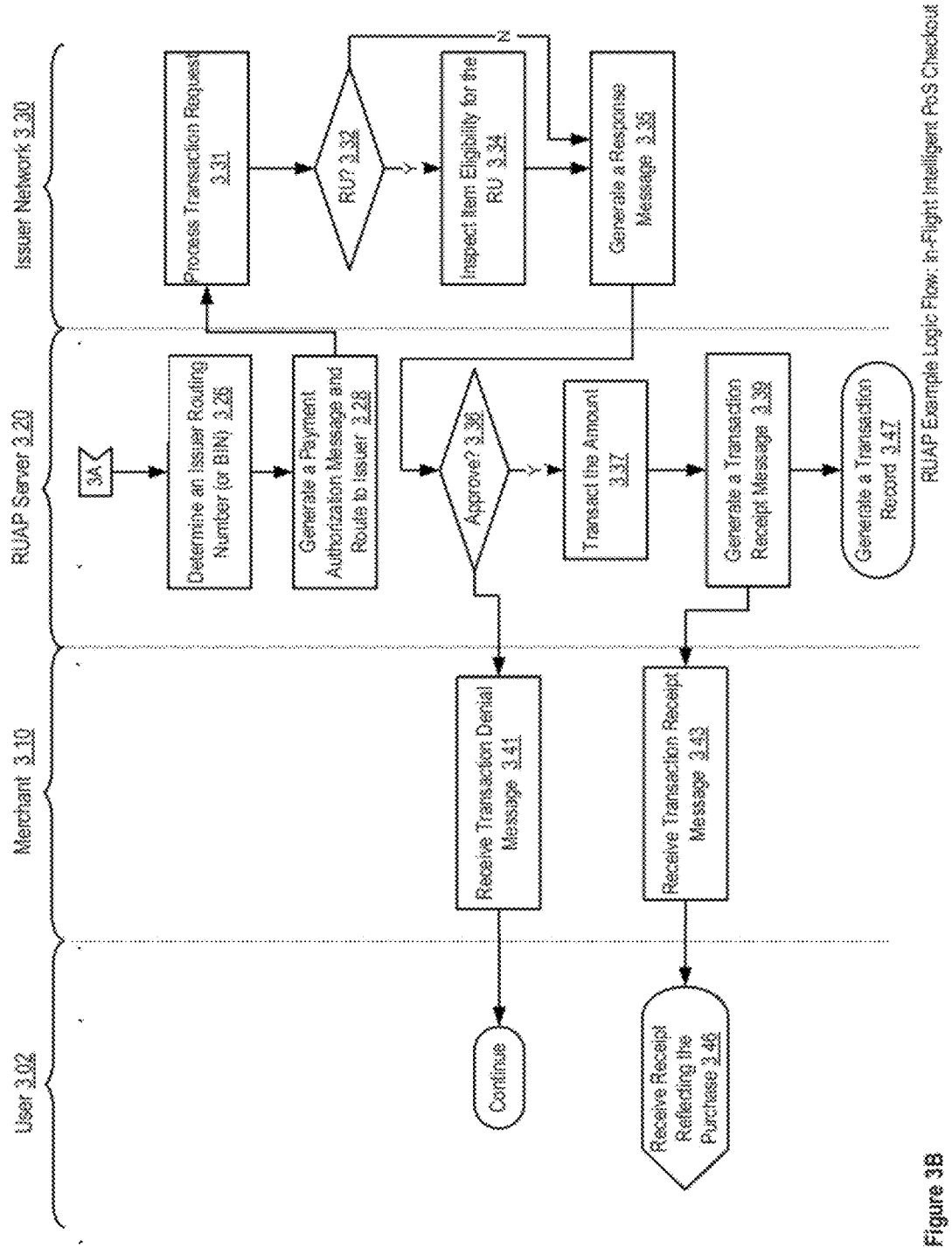

FIGS. 3A-3D provide logic flow diagrams illustrating various embodiments of restricted-use account payment and reimbursement process flows within embodiments of the RUAP. As shown in FIG. 3A, in one implementation, a user 302 may submit purchase items to a merchant 305 at a PoS checkout terminal, a checkout page at an online shopping site, etc. The merchant 310 may scan purchase item information 306 and determine whether an item is eligible for a restricted-use account usage 308. For example, the merchant PoS terminal may be installed with a software kit to query a list of eligible MCCs associated with a restricted-use account.

In another implementation, the user may submit wallet information to the merchant terminal 310, e.g., by check-in at the merchant at 321, so that the merchant may have wallet information of the user as to which restricted-use accounts the user has enrolled with. The user wallet check-in may further comprise RUAP server updating account balance information 323 to determine whether an account has sufficient funds to fulfill a payment.

In one implementation, if an item is eligible for a restricted-use account 309, the merchant may generate an account recommendation 311, e.g., by sending a RUAP alert to the user device via NFC, or display the message on a user PoS terminal user interface, 312. The user may elect to submit a checkout preference 313, e.g., by selecting to proceed checkout with the eligible restricted-use account or not. If the user has selected to check out with the recommended restricted-use account 314, the merchant may generate a separate bill for the eligible items 315 exclusively for payment using the corresponding restricted-use account.

In another implementation, if no item is eligible for any restricted-use account 309, or the user selects not to check out with the restricted-use account, the merchant may generate a bill of all purchase items 317.

In one implementation, the user may submit an account selection 315 in response to the generated bill at 315 or 317 to proceed with purchase payment transaction (e.g., see also 1416 in FIGS. 14A-14B). upon receiving the account selection 324, continuing on with 3B, the RUAP server may determine an issuer routing number 326 from the account selection, and generate a payment authorization message and route to the account issuer 328.

In one implementation, the issuer network 330 may receive and process the payment transaction request 331. If the account issuer issues a restricted-account 332, the issuer may further inspect the item eligibility 334, e.g., by verifying the MCC in the payment transaction request satisfies the restricted-use account requirement. The issuer may further generate a response message 335 upon verifying item eligibility, account balance, etc., to the RUAP server 320.

In one implementation, if the issuer response approves the transaction 336, the RUAP server 320 may transact the approved payment amount 337, e.g., by transferring the approved amount from the user account to a merchant account, and generate a transaction receipt message 339 to the merchant. In another implementation, if the transaction is denied by the issuer (e.g., insufficient balance in the selected account, MCC ineligible for a restricted-use account, etc.), the merchant may be notified of the rejection in a transaction denial message 341.

In one implementation, upon completing the transaction, the merchant may receive a transaction receipt message 343, based on which the merchant PoS terminal, or the shopping site, may generate a receipt reflecting the purchase 346 to the user. For example, the user may obtain a printed receipt from a PoS terminal. In another example, the user may obtain an electronic receipt via email, SMS, electronic wallet notifications, and/or the like.

Figure 3C:
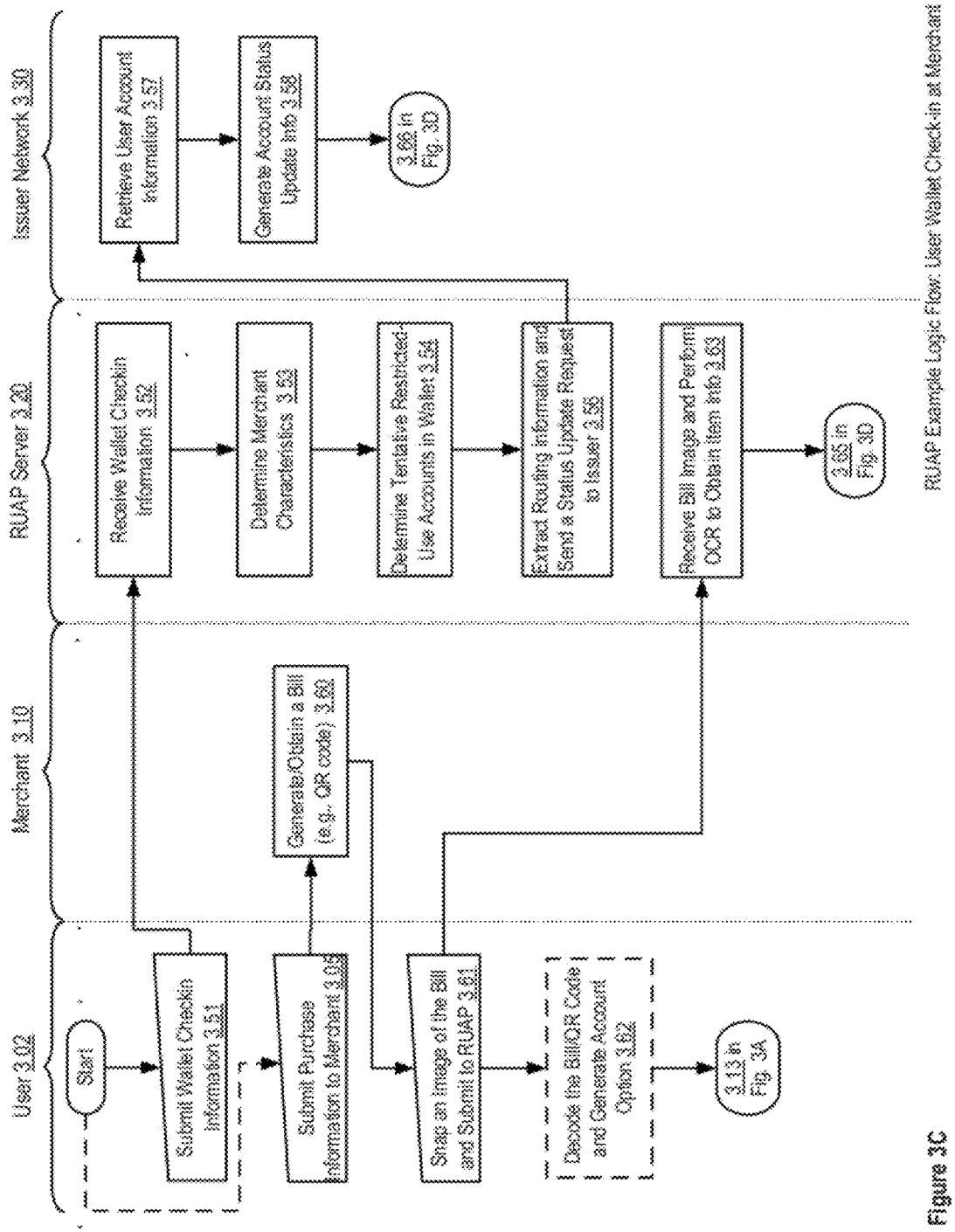

With reference to FIG. 3C, the user may check-in at a merchant store via the electronic wallet. In one implementation, the user 302 may submit wallet check-in information 351, e.g., GPS coordinates, user credentials, and/or the like. Upon receiving the wallet check-in information 352, the RUAP server 320 may determine merchant characteristics 353, e.g., based on GPS coordinates, etc., and tentatively retrieve a list of restricted-use use account in the wallet 354. For example, the RUAP server 320 may retrieve accounts the user has enrolled in the electronic wallet. In another example, the RUAP server may retrieve user enrolled restricted-use accounts based on merchant characteristics, e.g., FSA/HSA and other healthcare related restricted-use accounts if the merchant is a hospital, physician office, dental office, and/or the like; food stamp, etc., if the merchant is a grocery store, and/or the like.

In one implementation, the RUAP server 320 may extract routing information and send a status update request to account issuer 356. The account issuer may then retrieve user account information 357, e.g., balance information, valid term, etc., and generate account status update information 358 for the user.

Figure 3D:
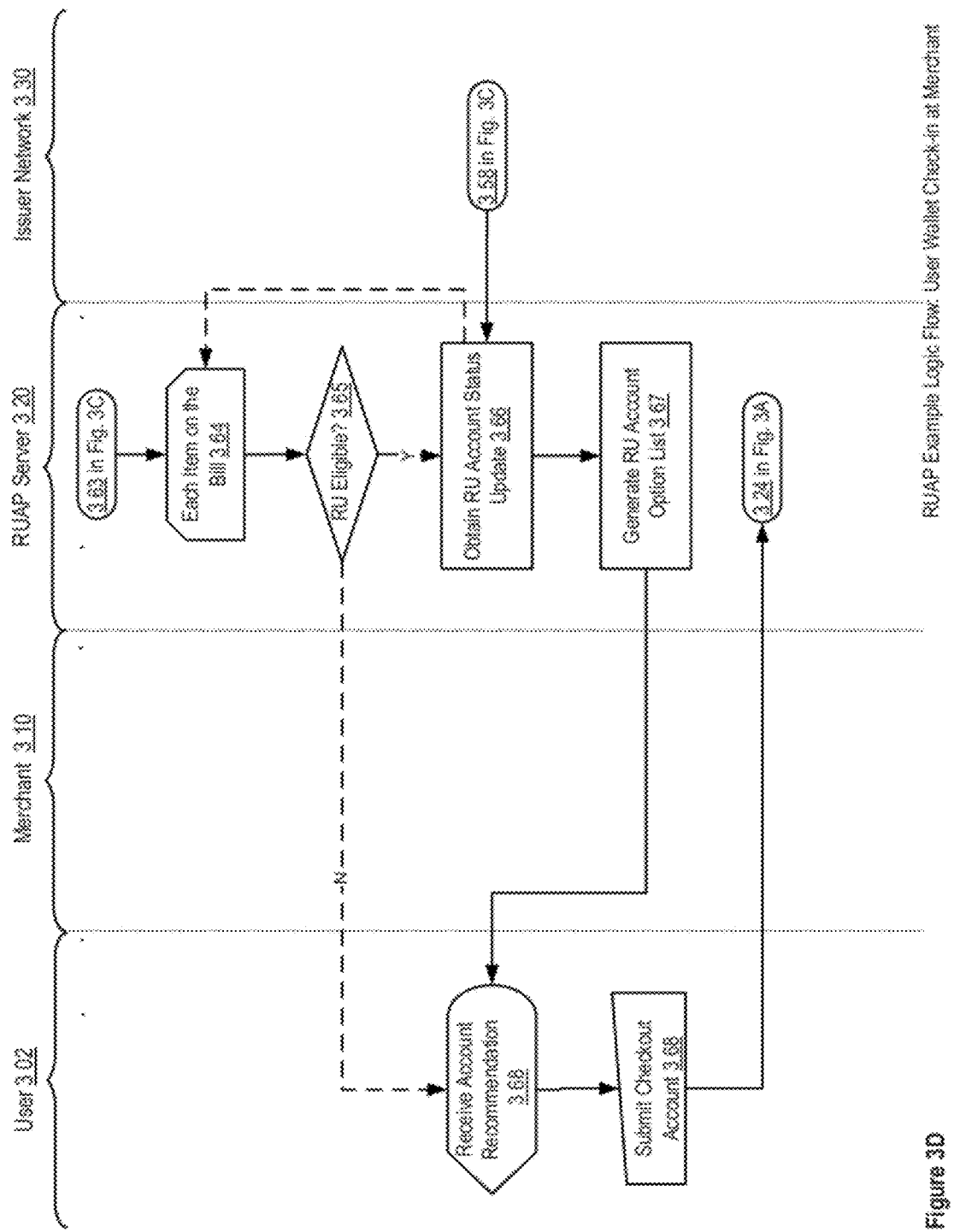
Figure 3E:
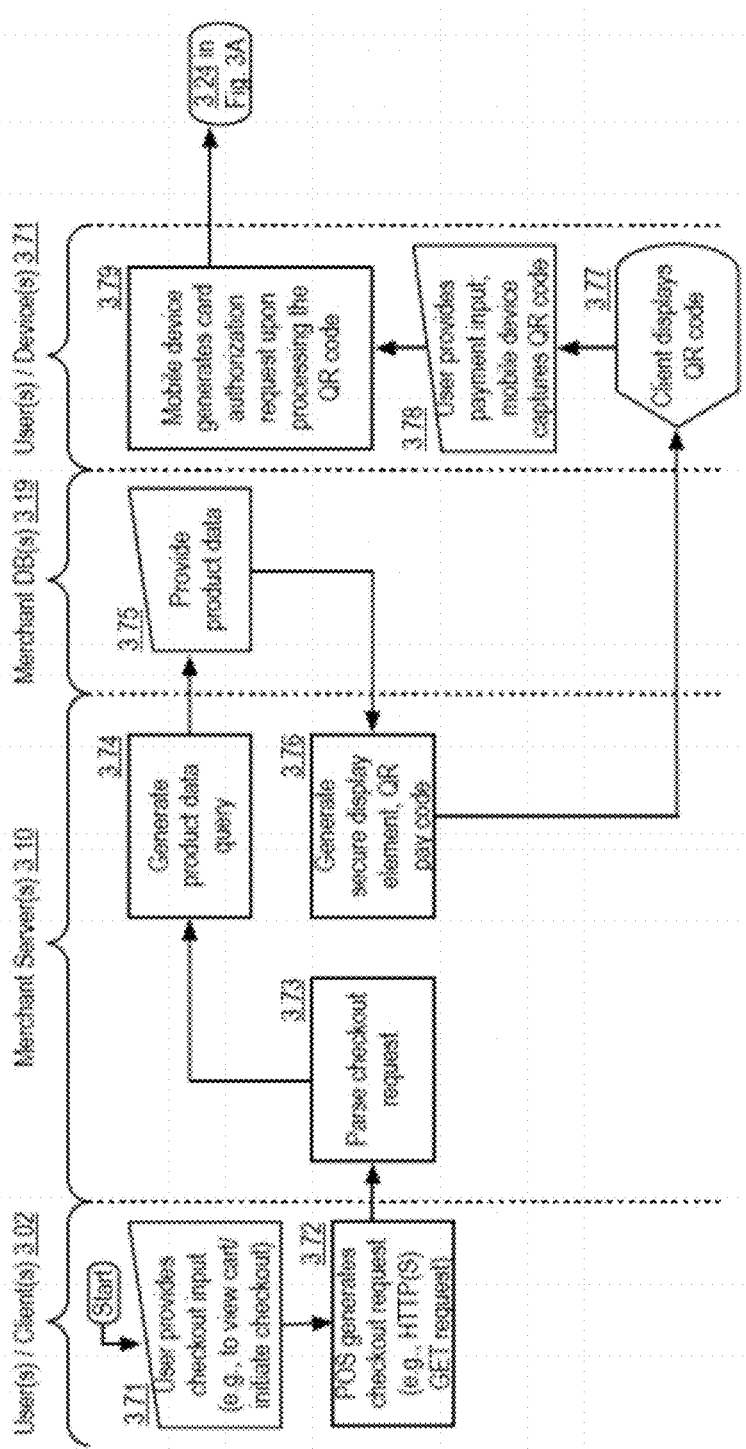

In one implementation, upon shopping with a merchant, the user 302 may submit purchase information to the merchant 305, which may generate a purchase bill and/or a QR code 360 (e.g., see FIG. 3E). The user may snap an image of the bill (and/or the QR code) and submit the bill image to the RUAP server 361, e.g., via the electronic wallet.

In one implementation, upon receiving bill image information, the RUAP server 320 may perform an OCR procedure to obtain item information 363. For example, the RUAP server 320 may adopt OCR software such as, but not limited to OmniPage, OCRFeeder, Scantron, Java OCR, and/or the like to extract information from a bill image. In an alternative implementation, the user device may perform bill analysis to obtain information as to the purchase item. For example, the user device may decode the QR code and generate an account option based on the purchase item category code 362.

With reference to FIG. 3D, upon OCR scanning of the received bill image, for each item on the bill 364, the RUAP server 320 may determine whether such item is eligible for a restricted-use account. In one implementation, the RUAP server may perform the match 365 based on enrolled restricted-accounts in the user's wallet; such account information may be retrieved at 354. For example, if the user has FSA, HSA accounts enrolled in the wallet, the RUAP server may query each item's MCC to determine whether it is an eligible healthcare product.

In one implementation, if an item is eligible for a restricted-use account 365, upon obtaining the status update of the restricted-use account 366, the RUAP server may generate a restricted-use account option list 367, e.g., including a recommendation of accounts (as further discussed in FIGS. 5D-5F). Upon receiving account recommendation 368, the user may submit a checkout account, e.g., whether to proceed with a restricted-account checkout or not, and proceed with 324 in FIG. 3A.

With reference to FIG. 3E, in some implementations, a user may desire to purchase a product, service, offering, and/or the like ("product"), from a merchant via a merchant online site or in the merchant's store. The user may communicate with a merchant server via a client. For example, the user may provide user input, e.g., 371, into the client indicating the user's desire to checkout shopping items in a (virtual) shopping cart. The client may generate a checkout request, e.g., 372, and provide the checkout request to the merchant server. The merchant server may obtain the checkout request from the client, and extract the checkout detail (e.g., XML data) from the checkout request, e.g., 373. For example, the merchant server may utilize a parser such as the example parsers described below in the discussion with reference to FIG. 24. The merchant server may extract the product data, as well as the client data from the checkout request. In some implementations, the merchant server may query, e.g., 374, a merchant database to obtain product data, e.g., 375, such as product pricing, sales tax, offers, discounts, rewards, and/or other information to process the purchase transaction.

In response to obtaining the product data, the merchant server may generate, e.g., 376, a QR pay code, and/or secure display element according to the security settings of the user (see, e.g., 358). For example, the merchant server may generate a QR code embodying the product information, as well as merchant information required by a payment network to process the purchase transaction. For example, the merchant server may first generate in real-time, a custom, user-specific merchant-product XML data structure having a time-limited validity period.

In some implementations, the merchant may generate QR code using the XML data. For example, the merchant server may utilize the PHP QR Code open-source (LGPL) library for generating QR Code, 2-dimensional barcode, available at http://phpqrcode.sourceforge.net/. For example, the merchant server may issue PHP commands similar to the example commands provided below:

```
<?PHP
header('Content-Type: text/plain');
// Create QR code image using data stored in $data variable
QRcode::png($data, 'qrcodeimg.png');
?>
```

The merchant server may provide the QR pay code to the client, e.g., 376. The client may obtain the QR pay code, and display the QR code, e.g., 377 on a display screen associated with the client device. In some implementations, the user may utilize a user device, e.g., 379, to capture the QR code presented by the client device for payment processing. The client device may decode the QR code to extract the information embedded in the QR code. For example, the client device may utilize an application such as the ZXing multi-format 1D/2D barcode image processing library, available at http://code.google.com/p/zxing/ to extract the information from the QR code. In some implementations, the user may provide payment input into the user device, e.g., 378. Upon obtaining the user purchase input, the user device may generate a card authorization request, e.g., 379, and provide the card authorization request to a RUAP server.

In another implementation, upon obtaining information from the QR code, the user device may submit an account selection to the RUAP server (e.g., see 324 in FIG. 3A) to proceed with a purchase transaction. In further implementation, the user device may submit the QR code to the RUAP server for processing.

Figure 4A:
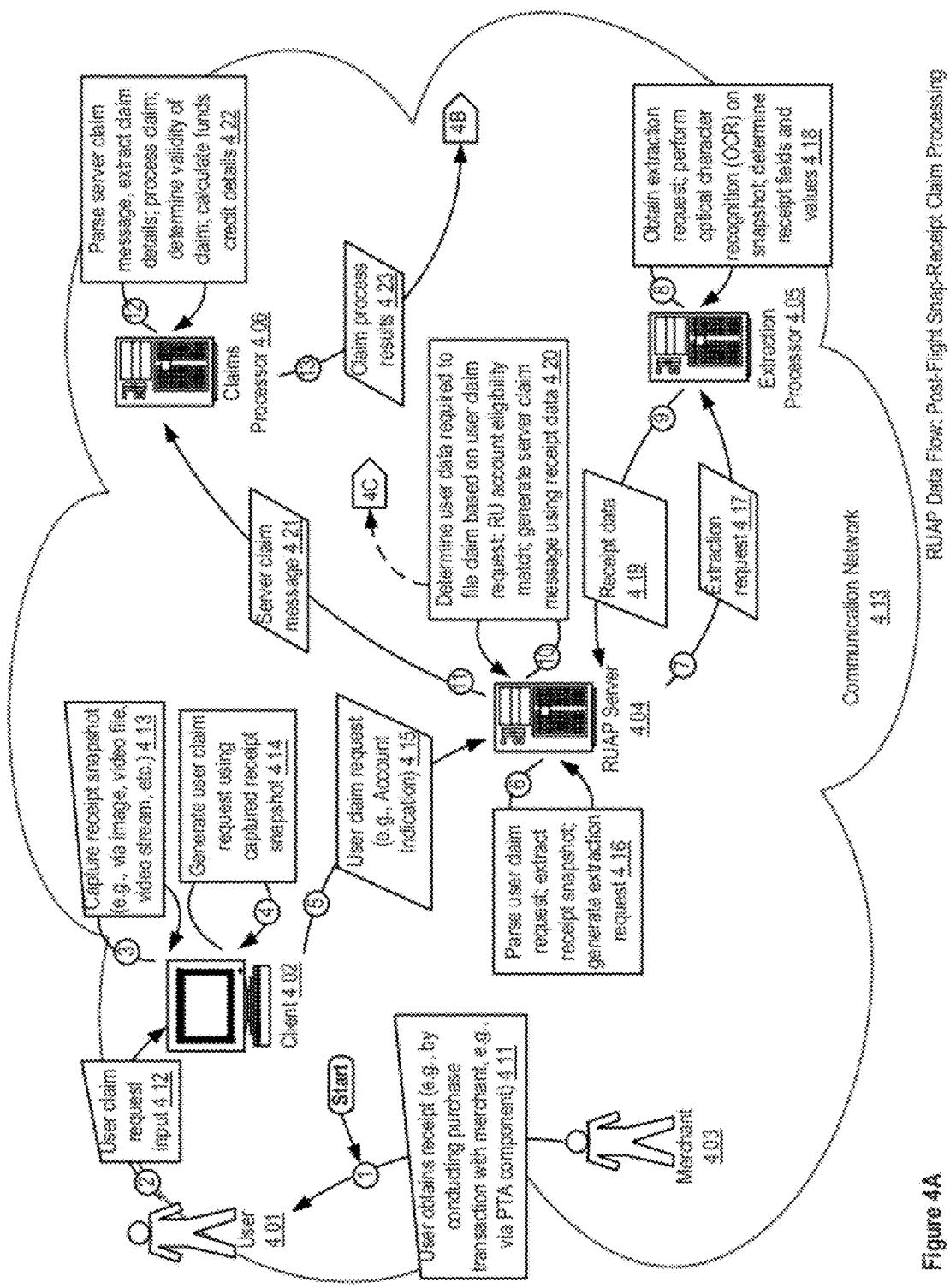
FIGS. 4A-4C provide data flow diagrams illustrating data flows between RUAP and affiliated entities for post-purchase restricted-use account reimbursement processing within various embodiments of the RUAP.
Figure 4B:
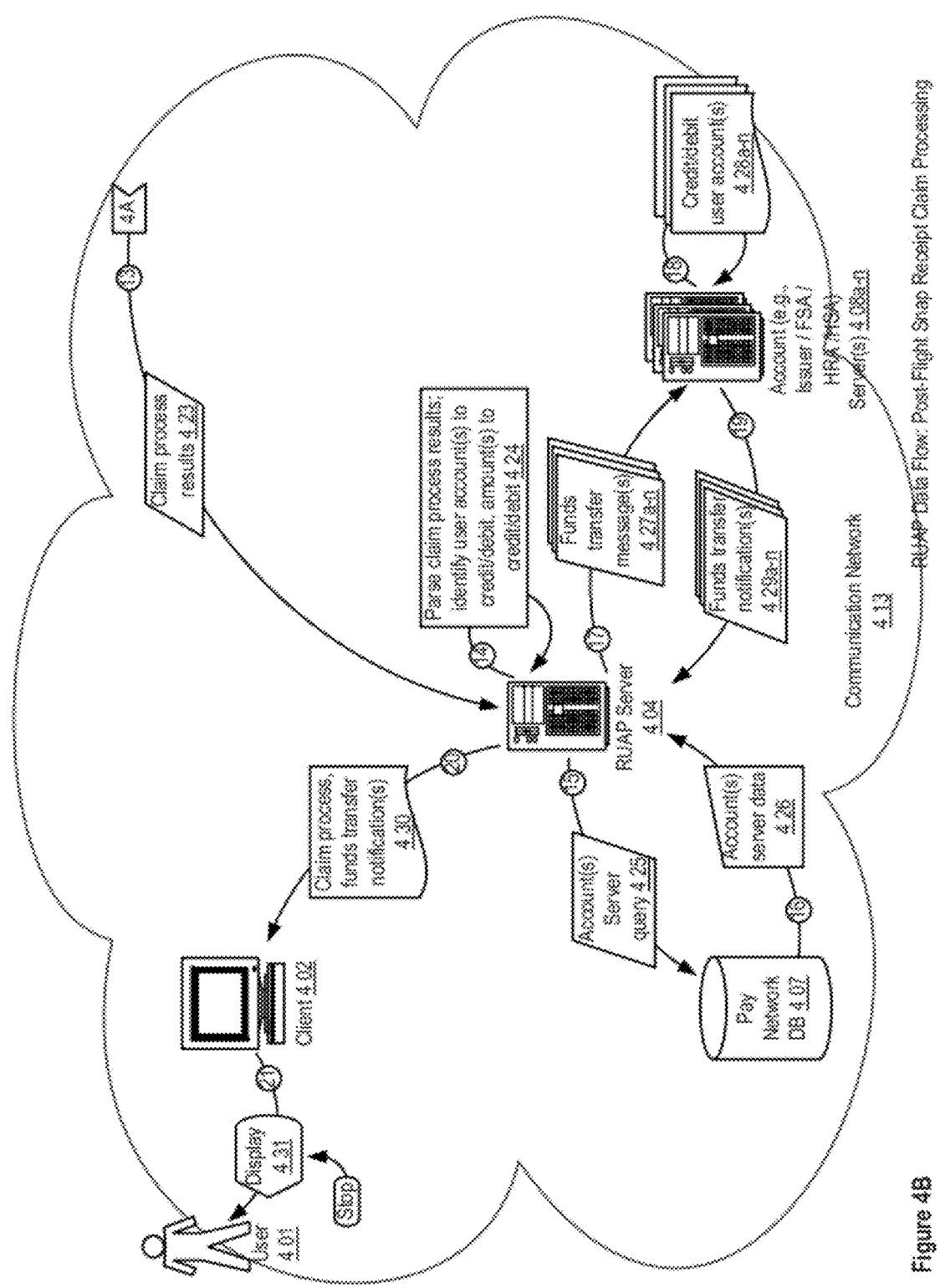
Figure 4C:
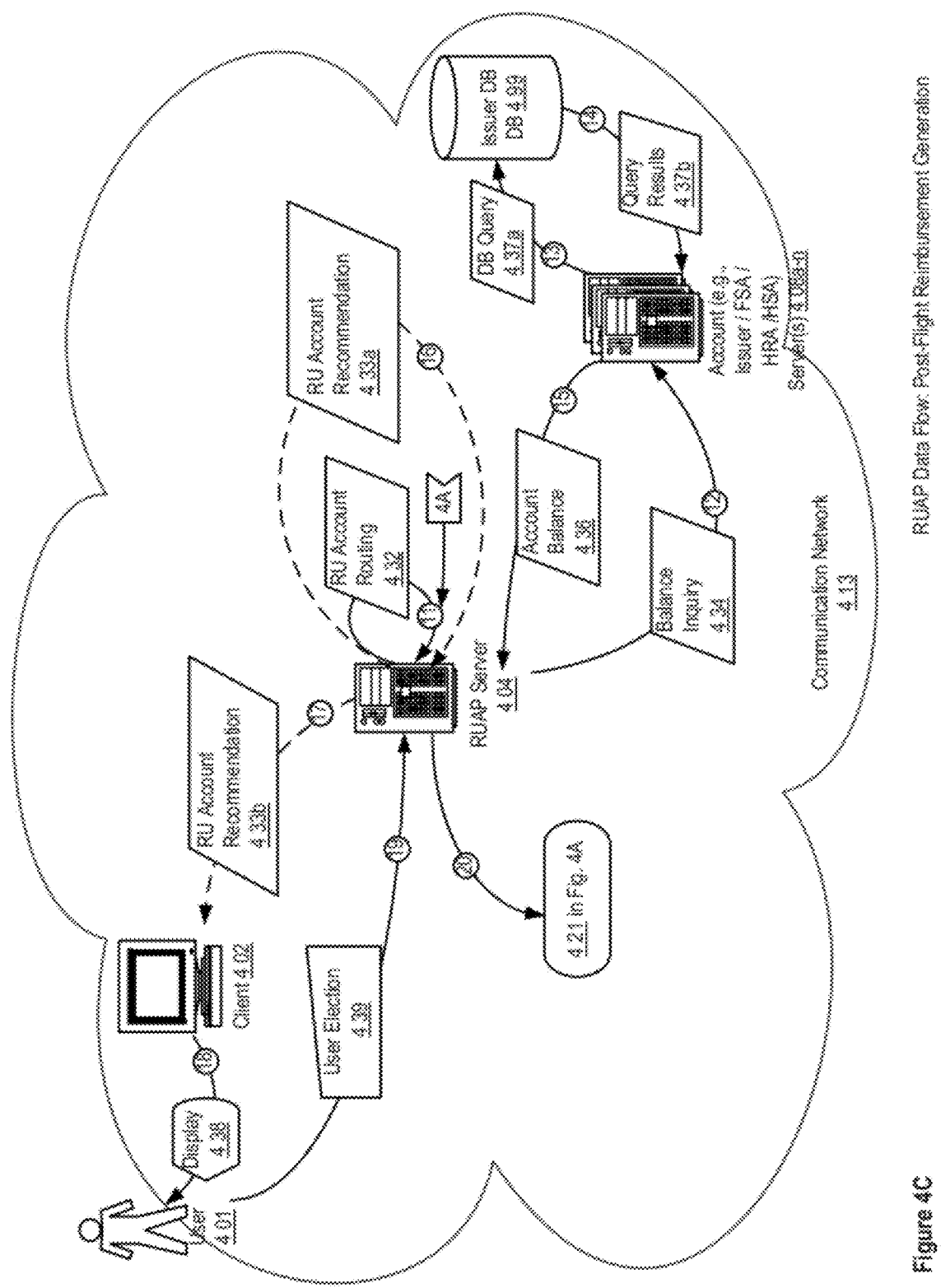

FIGS. 4A-4C provide data flow diagrams illustrating post-flight snap-receipt restricted-use account reimbursement processing within embodiments of the RUAP. Within alternative embodiments, instead of selecting a restricted-use account to pay for an eligible purchase item as illustrated in FIGS. 2A-3E, a user may select a general purpose bank account (e.g., a credit card, a debit card, a checking account, etc.) for payment, and may submit reimbursement requests for eligible items after the transaction via a communication network 413.

In some implementations, a user, e.g., 401, may desire to request a reimbursement for compensation, e.g., a refund and/or reallocation of funds for restricted-use eligible purchase items. The user may have a purchase receipt, e.g., 411, based on conducting a purchase transaction with a merchant, e.g., via the PTA/PTC component discussed further below with reference to FIGS. 17A-B. The RUAP may provide an app for a user device, e.g., 402, of the user for requesting a reimbursement for compensation. For example, the user may operate a device such as, but not limited to: a personal computer, mobile device, television, point-of-sale terminal, and/or the like, e.g., 402. For example, the app may be an executable application developed using a Software Development Kit (SDK) such as iOS SDK 4, Xcode 4, Android SDK, Visual Studio, Visual C++, Java EE 5 SDK, GTK+, GNUstep, wxWidgets, and/or the like. In some implementations, the app executing on the user device may provide a user interface using which the user may interact with the app executing on the user device. For example, the user may provide various types of input to indicate a user reimbursement request, e.g., 412, including but not limited to: keyboard entry, card swipe, activating a RFID/NFC enabled hardware device (e.g., electronic card having multiple accounts, smartphone, tablet, etc.), mouse clicks, depressing buttons on a joystick/game console, voice commands, single/multi-touch gestures on a touch-sensitive interface, touching user interface elements on a touch-sensitive display, and/or the like. In some implementations, the app may include a security feature to allow a user secure access to the interface. As an example, a user may enter a passcode to access the interface of the app. As another example, the user may present a card (e.g., a credit card, debit card, prepaid card, etc.) at the user device to gain access to the interface of the app. For example, the user may swipe the card through a card reader of the user device, present the card for a NFC card reader, Bluetooth reader, and/or the like. The user device may obtain, e.g., track 1 data from the user's card such as the example track 1 data provided below:

```
%B123456789012345^PUBLIC/J.Q.^990112000000000000000**901******?*
(wherein '1234567890123455' is the card number of 'J.Q. Public' and has a CVV number of
901. '990112' is a service code, and *** represents decimal digits which change
randomly each time the card is used.)
```

The user device may then authenticate the user based on, e.g., whether the user identification from the card data matches the identification of the user to whom the user device is registered, or whether the card number of the user matches the card of the user stored in a file on the user device, etc. Upon authentication, the app may provide the interface for the user. In some implementations, the user device executing the app may provide a number of outputs for the user including, but not limited to: sounds, music, audio, video, images, tactile feedback, vibration alerts (e.g., on vibration-capable client devices such as a smartphone etc.), and/or the like.

In some implementations, in response to the user's reimbursement request input, the user device ("client") may capture a receipt snapshot of the receipt, e.g., 413, and generate a user reimbursement request using the captured receipt snapshot, e.g., 414. For example, the client may obtain an image, a video, a live stream, etc. of the receipt. Within various implementations, the receipt image and/or video may comprise a variety of image/video format, such as, but not limited to JPEG, BMP, TIFF, MP4, AVI, MOV, and/or the like. In some implementations, the client may provide the obtained snapshot to a RUAP server, e.g., 404. For example, the client may send a (Secure) HyperText Transfer Protocol (HTTP(S)) POST/GET message, electronic mail message, Short Messaging Service (SMS) message, HTTP/Real Time Streaming Protocol (RTSP) video stream, etc., including the captured receipt snapshot as part of a user reimbursement request, e.g., 415. In another implementation, the user 401 may forward an electronic receipt to the RUAP server 404 in the reimbursement request 415. In various implementations, the snapshot of the receipt may be captured by a webcam, a digital camera, a scanner, any image processing device, and/or the like. In a further implementation, the imaging device may automatically send the receipt image to the RUAP server for reimbursement, e.g., via email, SMS, instant messaging, social messaging, wallet messaging, and/or the like.

In one implementation, the user may indicate a reimbursement account in the reimbursement request 415, e.g., an account for deposit of the reimbursed funds. In one implementation, the user may configure an account for reimbursement purpose via electronic wallet configuration at account enrollment. In another implementation, the RUAP server 404 may automatically deposit reimbursed funds into the account that has been used for the transaction as a default reimbursement account.

In one implementation, the user device/client 402 may generate a HTTPS POST message including the user reimbursement request 415. Below is an example HTTP(S) POST message including an XML-formatted user reimbursement request 415 for the RUAP server 404:

```
POST /ReimbursementRequest.php HTTP/1.1
Host: 216.15.51.74
Content-Type: Application/XML
Content-Length: 1306
<?XML version = "1.0" encoding = "UTF-8"?>
<reimbursement_request>
    <Time> 17:49:40 </Time>
    <Date> 09-09-2015 </Date>
    <User>
        <UserName> John Smith </UserName>
        <UserID> JS0000 </UserID>
        <DeviceID> JS-001 </DeviceID>
        ...
    </User>
    <ReceiptData>
        <Image1> IMG_0050.JPG </Image1>
        <Image2> IMG_0050.JPG </Image2>
        ...
    </ReceiptData>
    <RU_account> FSA </RU_account>
    <Reimburse_account> Chase *0689 </Reimburs_account>
    ...
</reimbursement_request
```

In the above example, the user submits a reimbursement request with captured images of a transaction receipt to the RUAP server, and has indicated a preferred restricted-use account is FSA, and has provided a "Chase *0689" bank account for depositing the reimbursed funds. In another implementation, the user may or may not need to indicate a restricted-account for reimbursement request, and the RUAP server may automatically determine a restricted-use account with regard to an eligible item.

In one implementation, when there are more than one enrolled restricted-use accounts can be applied for reimbursement for an eligible item, e.g., prescription drugs may be paid by FSA, HSA, LOC, etc., the RUAP server 404 may apply user configured rules to determine which restricted-use accounts to use for reimbursement. For example, the user configured rules may be further illustrated in FIGS. 5E-5F.

In some implementations, the RUAP server may parse the user reimbursement request, and extract the captured snapshot, e.g., 416. The RUAP server may generate an extraction request 417 to extract the data fields and values from the snapshot of the purchase receipt. The RUAP server may provide the extraction request to an extraction server, e.g., 405. The extraction server may obtain and parse the extraction request, and may extract the data fields and data values from the snapshot of the purchase receipt, e.g., 418. For example, the extraction server may utilize optical character recognition techniques to extract data fields and their associated values from images, video frames of the snapshot of the receipt. The extraction server may provide the receipt data, e.g., 419, to the RUAP server.

For example, the extraction processor 405 may generate a HTTPS POST message including the extracted receipt data 419. Below is an example HTTP(S) POST message including an XML-formatted receipt data 419 for the RUAP server 404:

```
POST /ReceiptData.php HTTP/1.1
Host: 216.15.51.00
Content-Type: Application/XML
Content-Length: 1306
<?XML version = "1.0" encoding = "UTF-8"?>
<receipt_data>
    <Time> 17:49:40 </Time>
    <Date> 09-09-2015 </Date>
    <receipt_image> IMG_0050.JPG </receipt_image>
    <source> JS-001 </source>
    <User>
        <UserName> John Smith </UserName>
        <UserID> JS0000 </UserID>
        <DeviceID> JS-001 </DeviceID>
        ...
    </User>
    <receipt_time> 17:43:40 </receipt_time>
    <receipt_date> 09-09-2015 </receipt_date>
    <merchant> Walgreens </merchant>
    <purchase_item>
        <item1>
            <ItemCode> FOOD-9875 </ItemCode>
            <Category> FOOD </Category>
            <Sub-Category> Breakfast </Sub-Category>
            </ItemName> Cereal </ItemName>
            <Description> whole grain original 10 oz </Description>
            <Quantity> 1 </Quantity>
            <UnitPrice> 4.99 </UnitPrice>
            <TotalAmt> 4.99 </TotalAmt>
            ...
        </Item1>
        <Item2>
            <ItemCode> DRUG-23401 </ItemCode>
            <Category> DRUG </Category>
            <Sub-Category> Non-Prescription </Sub-Category>
            </ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
```

```
    ...
        </Item2>
        <purchase_item>
        <amount> 16.99 </amount>
        <card_no> *****0689 </card_no>
    ...
</receipt_data>
```

In some implementations, the RUAP server may parse the user reimbursement request, and determine what information is required to be sent for reimbursements processing based on the user reimbursement request, and perform restricted-account eligibility per each parsed item from the receipt data e.g., 420. For example, the if the user wishes to transfer a charge for a medication purchase from the user's charge card to a restricted-use account, the RUAP server may determine that the reimbursement message sent for reimbursements processing may require the user's full name, residential address, social security number, restricted-use account details, and/or the like. The RUAP server may ensure that only the user data that is required for reimbursements processing may be sent for reimbursements processing. For example, the RUAP server may protect the user's bank account, charge card account information from being provided to the reimbursements processor, to protect the user's private and/or protected information. In some implementations, the RUAP server may generate a server reimbursement message, e.g., 421, filing a reimbursement on behalf of the user with a reimbursements processor, e.g., 406.

For example, the RUAP server may generate a HTTPS POST message including the server reimbursement claim message 421. Below is an example HTTP(S) POST message including an XML-formatted reimbursement message 421 for the RUAP server 404:

```
POST /reimbursement_claim.php HTTP/1.1
Host: www.ruap.com
Content-Type: Application/XML
Content-Length: 1306
<?XML version = "1.0" encoding = "UTF-8"?>
<reimbursement_claim>
    <Time> 17:49:40 </Time>
    <Date> 09-09-2015 </Date>
    <User>
        <UserName> John Smith </UserName>
        <UserID> JS0000 </UserID>
        <DeviceID> JS-001 </DeviceID>
    ...
    </User>
    <reimburse_item>
        <Item1>
            <ItemCode> DRUG-23401 </ItemCode>
            <Category> DRUG </Category>
            <Sub-Category> Non-Prescription </Sub-Category>
            <ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
        ...
        </Item1>
    ...
    <reimburse_item>
    <amount> 12.99 </amount>
    <reimburse_account> FSA </reimburse_acount>
    <account_no> 000000000 </account_no>
    <deposit_card_no> 0000 0000 0000 0000 </deposit_card_no>
    ...
<reimbursement_claim>
```

The reimbursements process server may parse the server reimbursement message, extract reimbursement details, and process the reimbursement, e.g., 422. For example, the reimbursements process server may determine the validity of the reimbursements and determine an amount of funds to be debited from the user's restricted-use account, and an amount of funds to be credited to the user's charge card. The reimbursements process server may provide the reimbursement process results, e.g., 423, to the RUAP server. For example, an exemplary XML-formatted reimbursement process results 423 message may take a form similar to the following:

```
. POST /reimbursement_results.php HTTP/1.1
Host: www.ruap.com
Content-Type: Application/XML
Content-Length: 1306
<?XML version = "1.0" encoding = "UTF-8"?>
<reimbursement_results>
    <Time> 17:49:54 </Time>
    <Date> 09-09-2015 </Date>
    <User>
        <UserName> John Smith </UserName>
        <UserID> JS0000 </UserID>
        <DeviceID> JS-001 </DeviceID>
    ...
    </User>
    <reimburse_item>
        <Item1>
            <ItemCode> DRUG-23401 </ItemCode>
            <Category> DRUG </Category>
            <Sub-Category> Non-Prescription </Sub-Category>
            <ItemName> NyQuil Cold Medicine </ItemName>
            <Description> NyQuil Cold&Flu Liquid 80 mL
            </Description>
            <Quantity> 1 </Quantity>
            <UnitPrice> 12.99 </UnitPrice>
            <TotalAmt> 12.99 </TotalAmt>
        ...
        </Item1>
    ...
    <reimburse_item>
    <amount> 12.99 </amount>
    <reimburse_account> FSA </reimburse_acount>
    <account_no> 000000000 </account_no>
    <deposit_card_no> 0000 0000 0000 0000 </deposit_card_no>
    <status>
        <item_code> eligible </item_code>
        <item_category> good </item_category>
        <receipt_barcode> good </receipt_barcode>
        ...
    </status>
...
<reimbursement_results>
```

Continuing on with FIG. 4B, in some implementations, the RUAP server may parse the reimbursement process results, and identify the user account(s) from which to debit/credit funds, as well as the amount(s) to debit/credit from the user account(s). In some implementations, the RUAP server may query a database, e.g., 425-26, for addresses (e.g., IP addresses, URLs) of the account(s) server maintaining the user account(s). The RUAP server may use the account server data, e.g., 426, to generate and provide funds transfer message(s), e.g., 427*a-n*, to the account server(s), e.g., 408*a-n*. The account server(s) may credit/debit funds from the user account(s) according to the indications in the funds transfer message(s), e.g., 428*a-n*, and provide funds transfer notifications, e.g., 429*a-n*, to the RUAP server. The RUAP server may provide notification(s), e.g., 430, of successful reimbursements processing and funds transfer notification(s) to the client, e.g., 402. In some implementations, the client may render and display the obtained notifications from the RUAP server for the user, e.g., 431.

Within implementations, the user may have indicated a restricted-use account for reimbursement. For example, the user may have indicated in the reimbursement request that the submitted receipt is for FSA reimbursement. In another implementation, the user may not identify any eligible restricted-use account, and the RUAP server may automatically identify potential restricted-use accounts for reimbursement by extracting item information from the receipt. For example, the RUAP server may retrieve restricted-use accounts the user has enrolled with RUAP, and perform an exhaustive search on the items on the receipt to determine whether any item can be eligible for any registered restricted-use account.

Similarly, the user may have indicated in the reimbursement request an account for deposit the reimbursement amount, e.g., a credit card account, a debit account, a checking account, and/or the like. In an alternative implementation, the RUAP server may retrieve a default account configured by the user upon enrollment with RUAP as the account to deposit reimbursement funds. In a further implementation, the RUAP server may identify a payment account from the receipt data and use the identified account as the deposit account. In such cases, as account number appeared on the receipt usually has an abbreviated form, e.g., only the last 4 digits, etc., the RUAP server may identify whether any enrolled user account matches with the abbreviated account number, and prompt the user to confirm whether the user desire to deposit reimbursement funds into the identified account.

Within alternative embodiments, upon obtaining receipt data at 419 and performing restricted-account eligibility match at 420, the RUAP may proceed with FIG. 4C to generate a reimbursement request for the restricted-use account issuers. In a further implementation, the RUAP may be part of the account issuer, and may perform claim validity check as to whether the claimed item is eligible for the restricted-use account.

As shown in FIG. 4C, when the RUAP server 404 has determined one or more items identified in the receipt data are eligible for reimbursement for a restricted-use account, the RUAP server may retrieve the restricted-account routing information 432, and generate a balance inquiry 434 to the account issuer 408*a-n*. The account issuer may then query 437*a* an issuer database 499 based on the user id and obtain query results 437*b* reflecting the user account balance and status update 436. The account issuer may then generate an account balance update message 436, which may take a similar form to the status update 233 in FIG. 2B, to the RUAP server 404.

In one implementation, the RUAP server 404 may generate restricted-account recommendation 433*a* for reimbursement, as further discussed in FIGS. 5E-5F, based upon the available balance of the restricted-account balance. In one implementation, the RUAP server 404 may optionally send the generated account recommendation 433*b* for user confirmation, e.g., see 585 in FIG. 5E. Upon user affirmation by selecting the reimbursement account 439, the RUAP server 220 may proceed with 424 in FIG. 4A to generate a reimbursement claim for processing.

FIGS. 5A-C show logic flow diagrams illustrating example aspects of processing a user claim via mobile claims administration in some embodiments of the RUAP, e.g., a User Claim Processing ("UCP") component 500. In some implementations, a user may desire to request a claim for compensation, e.g., a refund. The user may have a purchase receipt, e.g., 501, based on conducting a purchase transaction with a merchant, e.g., via PTA component discussed further below with reference to FIGS. 17A-17B. The user may provide input to request a user claim, e.g., 502. In some implementations, in response to the user's claim request input, the user device ("client") may capture a receipt snapshot of the receipt, e.g., 503, and generate a user claim request using the captured receipt snapshot, e.g., 504. The client may provide the obtained snapshot to a RUAP server, e.g., 505. In some implementations, the RUAP server may parse the user claim request, e.g., 505, and extract the captured snapshot, e.g., 506.

The RUAP server may generate an extraction request to extract the data fields and values from the snapshot of the purchase receipt, e.g., 507. The RUAP server may provide the extraction request to an extraction server, e.g., 508. The extraction server may obtain and parse the extraction request, e.g., 508, and may extract the data fields and data values from the snapshot of the purchase receipt, e.g., 509. For example, the extraction server may utilize optical character recognition techniques to extract data fields and their associated values from images, video frames of the snapshot of the receipt. The extraction server may determine the data fields present in the receipt, as well as the data values associated with the data fields in the receipt. The extraction server may provide the receipt data, e.g., 512, to the RUAP server. In some implementations, the RUAP server may parse the user claim request, e.g., 513, and determine what information is required to be sent for claims processing based on the user claim request, e.g., 514. In some implementations, the RUAP server may generate a server claim message, e.g., 515, filing a claim on behalf of the user with a claims process server, e.g., 516. The claims process server may parse the server claim message, e.g., 516, extract claim details, and process the claim, e.g., 517. For example, the claims process server may determine the validity of the claims and determine an amount of funds to be debited from the user's FSA account, and an amount of funds to be credited to the user's charge card, e.g., 518. The claims process server may provide the claim process results, e.g., 519, to the RUAP server. In some implementations, the RUAP server may parse the claim process results, e.g., 519, and identify the user account(s) from which to debit/credit funds, e.g., 520, as well as the amount(s) to debit/credit from the user account(s), e.g., 521. In some implementations, the RUAP server may query a database, e.g., 522, for addresses (e.g., IP addresses, URLs) of the account(s) server maintaining the user account(s). The RUAP server may use the account server data obtained from the database, e.g., 523, to generate and provide funds transfer message(s), e.g., 524, to the account server(s). The account server(s) may obtain and parse the funds transfer messages, e.g., 525, and credit/debit funds from the user account(s) according to the indications in the funds transfer message(s), e.g., 526. The account server may generate and provide, e.g., 527, funds transfer notifications to the RUAP server. The RUAP server may generate, e.g., 528, and provide notification(s), e.g., 529, of successful claims processing and funds transfer notification(s) to the client. In some implementations, the client may render, e.g., 530, and display the obtained notifications for the user, e.g., 531.

Continuing on with FIG. 5C, upon obtaining receipt data at 512 in FIG. 5A, the RUAP server may review each item on the receipt 531 to determine whether it is eligible for a restricted-use account 532. In one implementation, if it is eligible, the RUAP server may send an account status update request 533 to the restricted-use account issuer. The issuer may in turn receive the status update request 534, and verify the user credential 535 sent along with the status update request. In one implementation, the account issuer may query on the user account database 536 and retrieve user account status 537, e.g., the remaining balance, etc.

In one implementation, the RUAP server may further determine whether the user has configured or indicated a restricted-use account for reimbursement in the original reimbursement request 538. If not, the RUAP server may generate an option list for the user 539. For example, when an item on the receipt comprises healthcare products/services, the RUAP server may suggest FSA/HSA account to the user.

In one implementation, upon receiving a restricted-use account option list 540, the user may submit a selection 541. Or alternatively, the RUAP server may automatically select an account upon user configured restricted-account usage rules. In further implementations, the user may submit a deposit account for the reimbursed funds 542. The RUAP server may then proceed to generate reimbursement authorization messages for restricted-use account issuers, e.g., 522 in FIG. 5B. In further implementation, the RUAP may determine an account that has been used to pay for the transaction as showed on the receipt, e.g., an abbreviated credit card number "**1234." The RUAP may retrieve an account enrolled in the wallet that has an account number ends with "1234," and deposit the reimbursement amount into the account.

FIG. 5D-5F provide logic flows and exemplary mobile UIs illustrating restricted account recommendation for "in-flight" real-time PoS payment and/or post-transaction ("post-flight") reimbursement claims within embodiments of the RUAP. Within embodiments, continuing on with receiving receipt data at 521 in FIG. 5C (or receive user purchase bill information at 364 in FIG. 3D), the RUAP may parse the purchased item's merchant category code 551 to determine a type of the purchase 552. In further implementations, during a real-time checkout (e.g., a PoS checkout or online checkout, etc.), the RUAP 520 may determine the purchase type based on the GPS information, terminal ID, and/or the like. For example, the user's location at a physician's office may suggest a healthcare purchase, but a location at a grocery store may suggest food purchase, e.g., 553.

In one implementation, if the product code and/or terminal ID shows the purchased product comprises food, the RUAP may determine whether food voucher is enrolled in the wallet 554. If there is a food stamp account 561, the RUAP may put the food stamp/voucher account on top of a recommended account list 565.

In another implementation, if the product code and/or terminal ID shows a healthcare purchase, the RUAP may determine a recommended plan based on user specified rules. For example, if the user prefers to pay with FSA, the RUAP may determine whether there is FSA 555 enrolled in the wallet. If yes, the RUAP may send a balance inquiry 556 to the account issuer 570, which may verify the account credentials (e.g., a token, etc.) 557 and return the available balance 558. The RUAP may proceed to determine whether there is sufficient balance 560. If yes, the RUAP may put FSA on top of a recommended account list 563. If not, the RUAP, may recommend FSA with the remaining available balance 568. The RUAP may query for other enrolled restricted use accounts 566 in a similar manner.

In one implementation, the RUAP may generate a prioritized list of accounts 572 and presented to the user 573 in the wallet payment page, e.g., as illustrated in FIGS. 5E-5F.

FIGS. 5E-5F provides a dollar amount payment flow illustrating RUAP account recommendation within embodiments of the RUAP. In one implementation, a user may set up accounts and spending rules for the enrolled restricted use accounts, e.g., at 521 in FIG. 5B. For example, the RUAP rules may be illustrated in one example in the following table:

| | |
|---|---|
| Primary Account: | Flexible Spending Account (FSA) |
| Balance: | $500.00 |
| End Date: | Dec. 31, 2015 |
| Rules: | 1. Only use for medical MCC |
| | 2. Use for purchases less than $100.00 until Oct. 01, 2015 |
| | 3. After Oct. 01, 2015, use available balance for all medical MCC purchases. |
| Second Account: | Health Savings Account (HSA) |
| Balance: | $5000.00 |
| Rules: | 1. Use for medical MCC |
| | 2. Use for purchases greater than 2000.00 |
| | 3. Use as tertiary fund for medical MCC purchases |
| Third Account: | Revolving Line of Credit (LOC) |
| Credit Line: | $5000.00 |
| Rules: | 1. Use for any MCC |
| | 2. Use for purchases greater than $100 but less than $2000.00 |
| | 3. Use as secondary account for medical purchase |

For example, as shown in FIG. 5E, if a user 502 goes to a primary care physician on Jun. 8, 2015, i.e., more than half a year to the end date to his FSA, and a medical bill indicates a co-pay amount of $50.00 (e.g., at 581), the user may enter $50.00 into the RUAP mobile application and indicate it is medical purchase. Upon verifying the eligibility of medical purchase, the RUAP 520 may retrieve applicable healthcare restricted use accounts, and determine the user has his FSA, HSA and LOC accounts enrolled 582. The RUAP may then update the balance information of each account with the account sponsors 570, e.g., see also 527 in FIG. 5C.

In one implementation, the RUAP may assess the rules in the above example, and provide a screen of options showing the remaining balances in the three accounts 584, e.g., ranked as FSA ($500.00), LOC ($2900.00), HSA ($5000.00). In one implementation, the RUAP may list the available accounts in a prioritized order based on the spending rules, showing the balance of each account 585. It should be noted that although mobile user interface elements are depicted, web, desktop and other interfaces are contemplated for all the user interfaces throughout the disclosure. In this example, although LOC is the third account after the HSA, LOC is listed prior to HSA as the rule specifies LOC is applied as secondary account for medical purchase. In one implementation, the RUAP may put a default dollar amount as $50.00 (e.g., 586) for payment, or the user may change it by type a different amount.

For another example, as shown in FIG. 5F, if the user 502 goes to a physical therapist at Sep. 27, 2015, i.e., approximately three months to the end date of FSA, and the patient's responsibility is $100.00, the user may enter $100.00 into the RUAP mobile component and confirm it is medical purchase 587. In FIG. 5F, the user may press a "pay" button and enter an amount and type of purchase 593. The RUAP

520 may retrieve applicable healthcare restricted use accounts, and determine the user has his FSA, HSA and LOC accounts enrolled 588. The RUAP may then update the balance information of each account with the account sponsors 589, e.g., see also 527 in FIG. 5C, responded by listing the remaining balances, e.g., FSA ($750.00), LOC ($3200.00), and HSA ($5000.00), etc. Upon applying the usage rules 590, in this case, even if the FSA has insufficient funds, it is on top of the prioritized list because it will expire at the end of the year. As the remaining balance in FSA is insufficient to cover the amount due, the user may split the amount by selecting FSA to pay $750.00 591 and LOC to pay the remaining $100−$75=$25. For example, after paying $750.00 with FSA, the FSA account may have an updated balance of 0.00 592. The user may elect to pay the remaining $25.00 593 with the LOC account. The RUAP may send a report summary to the user including the updated remaining balance of the accounts after payment, and/or the like.

For another example, if the user received a surgery on Sep. 30, 2015, i.e., approximately three months to the end date of FSA, and received a medical bill of $2000.00, but the current accounts have available balances of LOC ($3000.00), FSA (o), HSA ($5000.00). In this case, the user may elect to select HSA for the payment.

Figure 6A:
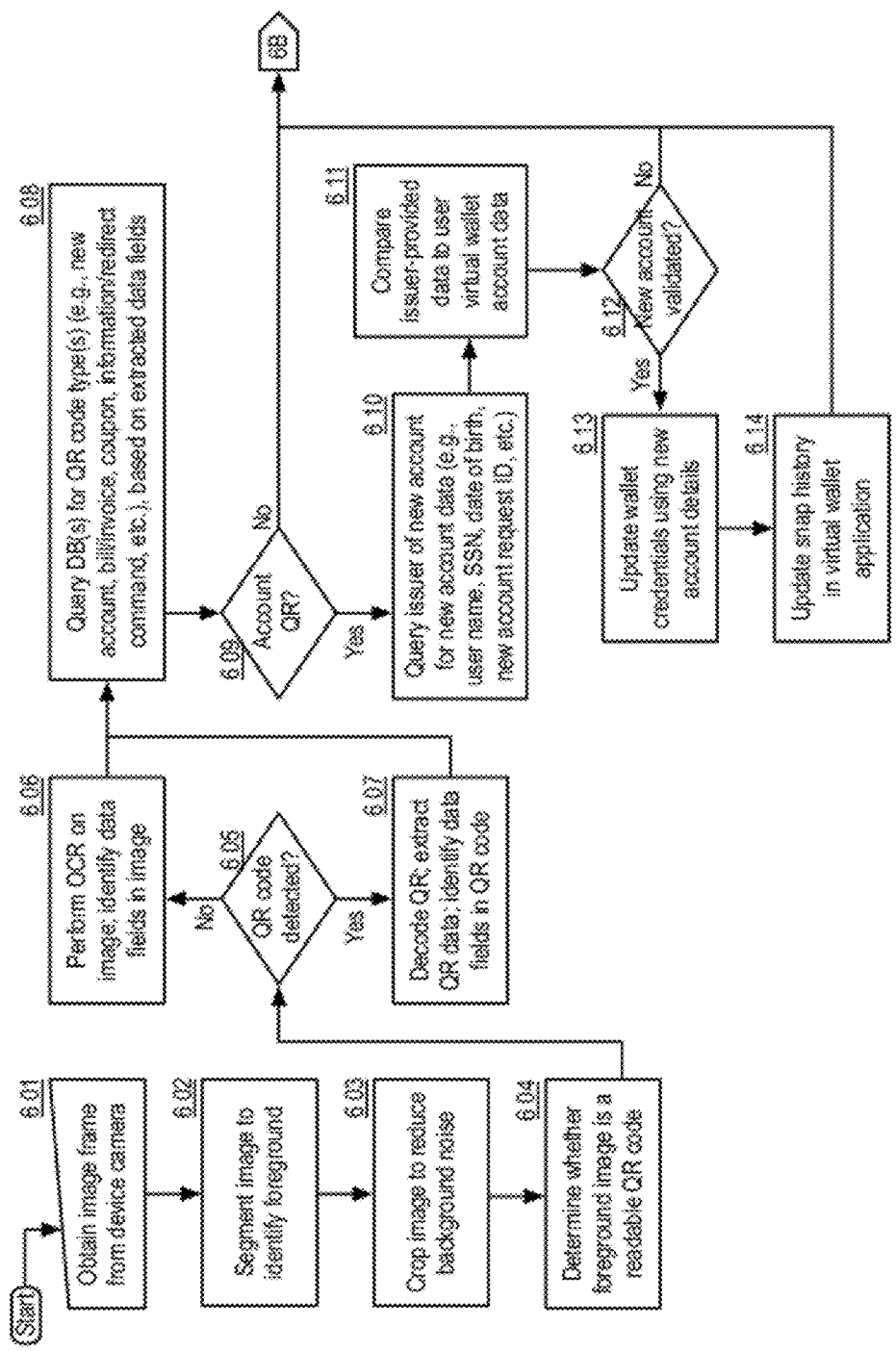
FIGS. 6A-B provide logic flow diagrams illustrating example aspects of processing a bill image comprising a Quick Response code in some embodiments of the RUAP.
Figure 6B:
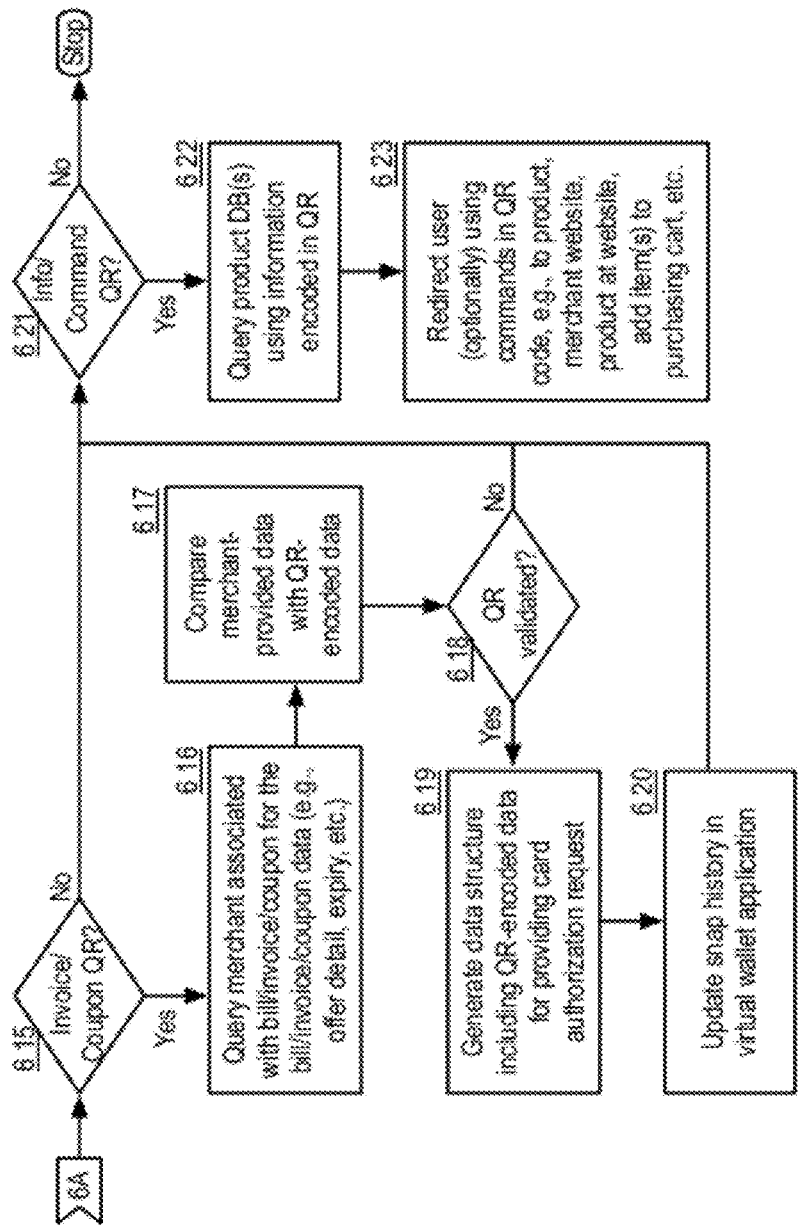

FIGS. 6A-B show logic flow diagrams illustrating example aspects of processing a bill image comprising a Quick Response code in some embodiments of the RUAP, e.g., a user may capture a bill image with a quick response code to facilitate payment as illustrated in FIG. 2C. With reference to FIG. 6A, in some implementations, a virtual wallet application executing on a user device may determine whether a QR code has been captured in an image frame obtained by a camera operatively connected to the user device, and may also determine the type, contents of the QR code. Using such information, the virtual wallet application may redirect the user experience of the user and/or initiating purchases, update aspects of the virtual wallet application, etc. For example, the virtual wallet application may trigger the capture of an image frame by a camera operatively connected to the user device, 601. The virtual wallet application may utilize an image segmentation algorithm to identify a foreground in the image, 602, and may crop the rest of the image to reduce background noise in the image, 603. The virtual wallet application may determine whether the foreground image includes a QR code from which data can be reliably read (e.g., this may not be so if the image does not include a QR code, or the QR code is partially cropped, blurred, etc.), 604. For example, the virtual wallet application may utilize a code library such as the ZXing multi-format 1D/2D barcode image processing library, available at http://code.google.com/p/zxing/ to try and extract the information from the QR code. If the virtual wallet application is able to detect a QR code (605, option "Yes"), the virtual wallet application may decode the QR code, and extract data from the QR code. If the virtual wallet application is unable to detect a QR code (605, option "No"), the virtual wallet application may attempt to perform Optical Character Recognition on the image. For example, the virtual wallet application may utilize the Tesseract C++ open source OCR engine, available at www.pixel-technology.com/freewarw/tessnet2, to perform the optical character recognition, 606. Thus, the virtual wallet application may obtain the data encoded into the image, and may continue if the data can be processed by the virtual wallet application. The virtual wallet application may query a database using fields identified in the extracted data, for a type of the QR code, 608. For example, the QR code could include an invoice/bill, a coupon, a money order (e.g., in a P2P transfer), a new account information packet, product information, purchase commands, URL navigation instructions, browser automation scripts, combinations thereof, and/or the like.

In some embodiments, the QR code may include data on a new account to be added to the virtual wallet application (see 609). The virtual wallet application may query an issuer of the new account (as obtained from the extracted data), for the data associated with the new account, 610. The virtual wallet application may compare the issuer-provided data to the data extracted from the QR code, 611. If the new account is validated (611, option "Yes"), the virtual wallet application may update the wallet credentials with the details of the new account, 613, and update the snap history of the virtual wallet application using the data from the QR code, 614.

With reference to FIG. 6B, in some embodiments, the QR code may include data on a bill, invoice, or coupon for a purchase using the virtual wallet application (see 615). The virtual wallet application may query merchant(s) associated with the purchase (as obtained from the extracted data), for the data associated with the bill, invoice, or coupon for a purchase (e.g., offer details, offer ID, expiry time, etc.), 616. The virtual wallet application may compare the merchant-provided data to the data extracted from the QR code, 617. If the bill, invoice, or coupon for a purchase is validated (618, option "Yes"), the virtual wallet application may generate a data structure (see e.g., XML QR_data structure in description above with reference to FIGS. 4-5) including the QR-encoded data for generating and providing a card authorization request, 619, and update the snap history of the virtual wallet application using the data from the QR code, 620.

In some embodiments, the QR code may include product information, commands, user navigation instructions, etc. for the virtual wallet application (see 621). virtual wallet application may query a product database using the information encoded in the QR. The virtual wallet application may provide various features including, without limitation, displaying product information, redirecting the user to: a product page, a merchant website, a product page on a merchant website, add item(s) to a user shopping cart at a merchant website, etc. In some implementations, the virtual wallet application may perform a procedure such as described above for any image frame pending to be processed, and/or selected for processing by the user (e.g., from the snap history).

In further implementations, the above mentioned software kits, tools, and/or the like may also be applied to capture textual item information on a bill/receipt image.

Figure 7A:
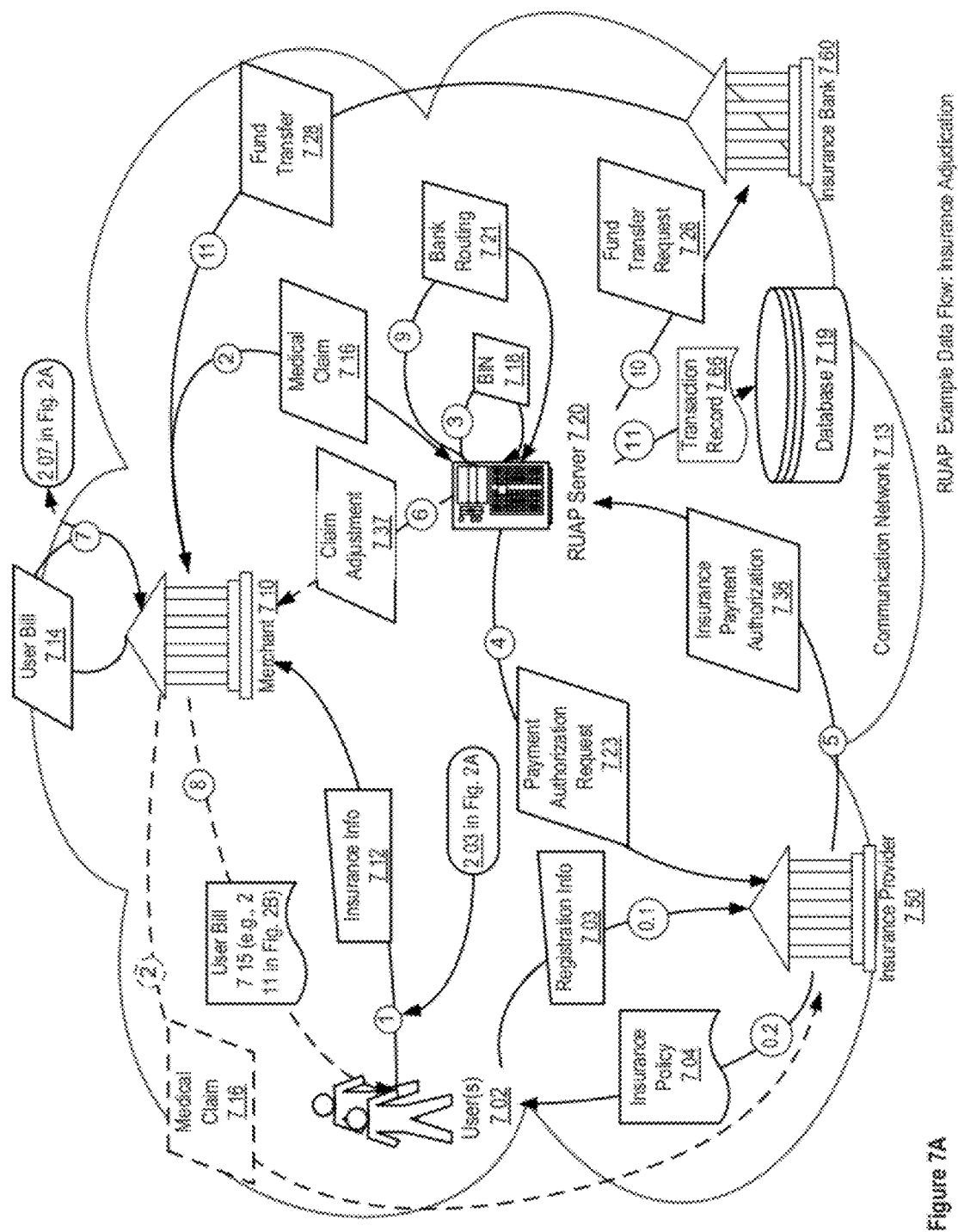
FIGS. 7A-7C provide data flow diagrams illustrating data flows between RUAP and affiliated entities for user healthcare restricted-use account payment and/or reimbursement within various embodiments of the RUAP.

In further implementations, when a purchase item is related healthcare product/service, the RUAP may automatically submit the purchase information for insurance adjudication. For example, when a user has submitted a receipt including purchase of prescription drugs for FSA reimbursement, the RUAP server may generate an insurance claim in addition to the FSA reimbursement, wherein the RUAP server may engage in an insurance adjudication process with the insurance provider to claim for an insured amount, and may then submit a request for FSA reimbursement of the remaining amount. FIG. 7A provides a data block diagram illustrating data flows between healthcare payment entities (RUAP server, user and affiliated entities) showing insurance adjudication within embodiments of the RUAP. Within various embodiments, as shown in FIG. 7A, one or more user(s) (patient(s)) 702, RUAP server 720, RUAP database(s) 719, merchant(s) 710 (e.g., a healthcare provider, etc.), insurance provider 750, insurance bank 760, and/or the like are shown to interact via various communication networks 713 to facilitate healthcare insurance adjudication.

Within embodiments, prior to receiving healthcare service or purchasing healthcare products, the user 702 may obtain an insurance program, e.g., by submitting registration information 703 to an insurance provider 750. For example, the user 702 may fill out an insurance application form via a web based application to the insurance provider 750. An XML formatted user registration message 703 may take a form similar to the following:

```
POST /InsuranceApp.php HTTP/1.1
Host: 64.134.25.22
Content-Type: Application/XML
Content-Length: 718
<?XML version = "1.0" encoding = "UTF-8"?>
<InsuranceApp>
    <TimeStamp> 11:11:23 </TimeStamp>
    <Date> 09-09-2015 </Date>
    <InsurnaceStartDate> 01-01-2016 </InsuranceStartDate>
    <InsuranceEndDate> 12-31-2016 </InsuranceEndDate>
    <InsuranceType> Employer Sponsored </InsuranceType>
    <ProgramCode> PPO </ProgramCode>
    <User>
        <UserName> John Smith </UserName>
        <UserID> JS0000 </UserID>
        <AccountNo> 0000 0000 0000 </AccountNO>
        <Password> 0000 </Password>
        <PasswordQ>
            <Question1> Where were you born </Question1>
            <Answer1> New York </Answer>
            ...
        </PasswordQ>
        <Employer> SuperFast Software Co. </Employer>
        <AnnualIncome> 100,000.00 </AnnualIncome>
        ...
    </User>
    <Employer>
        <ID> 092034 </ID>
        <GroupID> 43498ABC </GroupID>
        <Name> SuperFast Software Co. </Name>
        <Address>
            <Line1> ... </Line1>
            <Line2> ... </Line2>
            <Zipcode> 00000 </Zipcode>
            ...
        </Address>
        ...
    </Employer>
    ...
</InsuranceApp>
```

In one implementation, the insurance provider 750 may underwrite an insurance policy 704 for the user, and issue an insurance device to the user 702, e.g., an insurance card, etc. For example, the insurance provider 750 may maintain an insurance record of the user 702 at a database. An exemplary XML formatted user insurance record 704 may take a form similar to the following:

```
POST /UserInsurance.php HTTP/1.1
Host: 64.134.25.00
Content-Type: Application/XML
Content-Length: 718
<?XML version = "1.0" encoding = "UTF-8"?>
<UserInsurance>
    <User>
        <UserName> John Smith </UserName>
        <UserID> JS0000 </UserID>
        <AccountNo> 0000 0000 0000 </AccountNO>
        <Password> 0000 </Password>
        <PasswordQ>
            <Question1> Where were you born </Question1>
            <Answer1> New York </Answer>
            ...
        </PasswordQ>
        <Employer> SuperFast Software Co. </Employer>
        <AnnualIncome> 100,000.00 </AnnualIncome>
        ...
    </User>
    <BIN> 0009090fdsfdf </BIN>
    <Insurance>
        <InsuranceID> BB0008PPO </Insurance>
        <InsurnaceStartDate> 01-01-2016 </InsuranceStartDate>
        <InsuranceEndDate> 12-31-2016 </InsuranceEndDate>
        <InsuranceType> Employer Sponsored
        </InsuranceType>
        <ProgramCode> PPO </ProgramCode>
        <GroupID> 8943243 </GroupID>
        <InsuranceCoverage>
            <ProcedureCode1> 60% </ProcedureCode1>
            <ProcedureCode2> 60% </ProcedureCode2>
            ...
    </Insurance>
    ...
</UserInsurance>
```

Upon establishing an insurance policy with the insurance provider 750, the user 702 may submit their insurance information 712 (e.g., the insurance ID, user information, etc.) to a merchant 710 upon visiting the office, purchasing a healthcare product at a pharmacy (e.g., at 203 in FIG. 2A), and/or the like. The merchant 710 may perform an insurance provider pre-check, e.g., checking whether the provider is an in-network provider, the coverage of the insurance policy, and/or the like. Based on the retrieved insurance coverage information, the merchant 710 may generate a medical bill 713 including a calculated insured amount and a user responsibility amount.

For example, the user 702 may receive a payment bill 715, indicating the details of the treatment, and the payment amount due, including an amount of the insurance coverage, and the patient's co-pay amount. In one implementation, the user may receive a printed bill at the POS terminal at the hospital; may receive an electronic bill in the email, instant messaging, a healthcare web portal, a mobile wallet, and/or the like. The merchant 710 may pre-check the insurance information of the patient, and thus make an estimate of the insured amount and user co-payment amount, which may be reflected into the medical bill 715. For example, in one implementation, an exemplary XML implementation of the medical bill 714 may take a form similar to:

```
POST /MedBill.php HTTP/1.1
Host: 64.134.25.33
Content-Type: Application/XML
Content-Length: 718
<?XML version = "1.0" encoding = "UTF-8"?>
<MedBill>
    <BillID> MD 0000123 </BillID>
    <BillDate> 09-09-2015 </BillDate>
    <BillTimeStamp> 14:23:56 </BillTimeStamp>
    <BillCode> 0543 </BillCode>
    <Patient>
        <UserID> 123456789 </UserID>
        <UserName> John Smith </UserName>
        </UserAddress> 111 White road </UserAddress>
        <UserPhoneNumber> 000-000-2222 </UserPhoneNumber>
        ...
        </UserDeviceID> 11111111 </UserDeviceID>
        <UserLicenseInfo> .....</UserLicenseInfo>
        ...
    </Patient>
```

```
...
<Procedure>
<ProcedureCode> Sur-Knee-Left </ProcedureCode>
<ProcedureDate> 09-09-2011 </ProcedureDate>
<ProviderID> SPH001 </ProviderID>
<ProviderName> St John's Hospital </ProviderName>
...
</Procedure>
<Insurance>
<InsuranceID> BB0008PPO </Insurance>
<InsuranceType> Regular </InsuranceType>
<InsuranceCoverage>
    <ProcedureCode1> 60% </ProcedureCode1>
    <ProcedureCode2> 60% </ProcedureCode2>
    ...
</Insurance>
<BillSummary>
    <TotalAmount> 12,000.00 </TotalAmount>
    <Insured> 5,000.00 </Insured>
    <PatientResp> 7,000.00 </PatientResp>
    <AmountDue> 7,000.00 </AmountDue>
    ...
</BillSummary>
...
</MedBill>
```

In one implementation, the merchant may generate a HTTP POST message to the RUAP server 720, seeking for medical claim 716, wherein the XML-formatted message may take a form similar to:

```
POST /ClaimRequst.php HTTP/1.1
Host: www.Hospital.com
Content-Type: Application/XML
Content-Length: 718
<?XML version = "1.0" encoding = "UTF-8"?>
<ClaimRequest>
<RequestID> SHP-0001 </RequestID>
<RequestDate> 09-09-2015 </BillDate>
<RequestTimeStamp> 14:23:56 </RequestTimeStamp>
<User>
        <UserName> John Smith </UserName>
        <UserID> JS0000 </UserID>
        <AccountNo> 0000 0000 0000 </AccountNO>
        <Password> 0000 </Password>
        <PasswordQ>
            <Question1> Where were you born </Question1>
            <Answer1> New York </Answer>
            ...
        </PasswordQ>
        ...
</User>
    <Insurance>
        <InsuranceID> BB0008PPO </Insurance>
        <GroupID> 123456789 </GroupID>
        <InsuranceType> Regular </InsuranceType>
        <InsuranceCoverage>
            <ProcedureCode1> 60% </ProcedureCode1>
            <ProcedureCode2> 60% </ProcedureCode2>
        </InsuranceCoverage>
        <BIN> 0009203920390 </BIN>
        ...
    </Insurance>
    ...
<Time> 19:20:23 </Time>
<Date> 09-01-2011 </Date>
<Claim>
        <Procedure>
        <ProcedureCode> Sur-Knee-Left </ProcedureCode>
        <ProcedureDate> 09-09-2011 </ProcedureDate>
        <ProviderID> SPH001 </ProviderID>
        <ProviderName> St John's Hospital </ProviderName>
        ...
        </Procedure>
<TotalAmount> 12,000.00 </TotalAmount>
<EstimatedInsured> 5,000.00 </EstimatedInsured>
<PatientResp> 7,000.00 </PatientResp>
...
</Claim>
...
</ClaimRequest>
```

In one implementation, the RUAP server 720 may obtain a BIN number 718 (e.g., a 16 digit code, etc.) from the received medical claim 716, based on which the RUAP may determine insurance provider routing information 721. For example, the RUAP server 720 may query an insurance provider database (e.g., 2419l in FIG. 24) and obtain routing destination 221 (e.g., an IP address, port address, gateway, etc.) of the BIN.

In one implementation, the RUAP server 720 may generate a payment authorization request 719 and route the message to the insurance provider 750 based on the BIN-based routing destination. For example, the RUAP may generate a HTTPS POST message to make an authorization request 719 in the form of data formatted according to the XML. Below is an example HTTP(S) POST message including an XML-formatted message of the authorization request 723 for the RUAP server:

```
POST /AuthorizationRequst.php HTTP/1.1
Host: www.RUAP.com
Content-Type: Application/XML
Content-Length: 718
<?XML version = "1.0" encoding = "UTF-8"?>
<AuthorizationRequest>
<Time> 17:40:40 </Time>
<Date> 09-09-2015 </Date>
<User>
    <UserName> John Smith </UserName>
    <UserID> JS0000 </UserID>
    <Password> 0000 </Password>
    <PasswordQ>
        <Question1> Where were you born </Question1>
        <Answer1> New York </Answer>
        ...
    </PasswordQ>
    <Employer> ABC Software CO. </Employer>
    ...
</User>
<Insurance>
    <InsuranceID> BB0008PPO </Insurance>
    <GroupID> 123456789 </Group>
    <InsuranceType> Regular </InsuranceType>
    <InsuranceCoverage>
        <ProcedureCode1> 60% </ProcedureCode1>
        <ProcedureCode2> 60% </ProcedureCode2>
        ...
    </InsuranceCoverage>
</Insurance>
...
<Procedure>
    <ProcedureCode> Sur-Knee-Left </ProcedureCode>
    <ProcedureDate> 09-09-2014 </ProcedureDate>
    <ProviderID> SPH001 </ProviderID>
    <ProviderName> St John's Hospital </ProviderName>
    ...
</Procedure>
<Claim>
    <Amount> 5,000.00 </Amount>
    <TotalAmount> 12000.00 </TotalAmount>
    ...
</Claim>
...
</AuthorizationRequest>
```

The insurance provider 750 may review and verify the requested insurance payment. For example, the insurance provider may assess the medical claim of the requested insured amount based on local annual income, economic indicators, market price, living expenses, and/or the like. In one implementation, the insurance provider 750 may send an insurance payment authorization response 736 back to the RUAP to authorize the payment. In another implementation, the insurance provider 750 may approve a payment amount which may not equate the requested amount, and subject to further adjudication and reconciliation.

Upon reviewing and approving the requested insured amount, the insurance provider 750 may provide a response 736 to the payment authorization request 719, either to approve an entirety or a part of the requested insurance payment, or to reject the payment request when the received medical claim is not eligible. For example, the insurance provider 750 may verify whether the estimated insured amount in the payment request 719 matches the user's insurance coverage program, whether the user's year-to-date insurance payment has exceeded a maximum amount if there is any, whether the user's employment and/or insurance program is in good standing, and/or the like.

In one implementation, the insurance provider may generate a HTTPS POST message to make an authorization response 736 in the form of data formatted according to the XML. Below is an example HTTP(S) POST message including an XML-formatted message of the authorization response 736 for the RUAP:

```
POST /AuthorizationResponse.php HTTP/1.1
Host: www.RUAP.com
Content-Type: Application/XML
Content-Length: 718
<?XML version = "1.0" encoding = "UTF-8"?>
<AuthorizationResponse>
<Time> 17:42:40 </Time>
<Date> 09-09-2015 </Date>
<User>
    <UserName> John Smith </UserName>
    <UserID> JS0000 </UserID>
    <Password> 0000 </Password>
    <PasswordQ>
        <Question1> Where were you born </Question1>
        <Answer1> New York </Answer>
        ...
    </PasswordQ>
    ...
</User>
<Insurance>
    <InsuranceID> BB0008PPO </InsuranceID>
    <GroupID> 123456789 </GroupID>
    <InsuranceType> Regular </InsuranceType>
    <InsuranceCoverage>
        <ProcedureCode1> 60% </ProcedureCode1>
        <ProcedureCode2> 60% </ProcedureCode2>
        ...
    </Insurance>
<Procedure>
    <ProcedureCode> Sur-Knee-Left </ProcedureCode>
    <ProcedureDate> 09-09-2011 </ProcedureDate>
    <ProviderID> SPH001 </ProviderID>
    <ProviderName> St John's Hospital </ProviderName>
    ...
</Procedure>
<RequestedAmount> 5,000.00 </RequestedAmount>
<AnnualMaximum> 6,000.00 </AnnualMaximum>
<YearToDate> 3,000.00 </YearToDate>
<Available> 3,000.00 </Available>
<ApprovedAmount> 3,000.00 </ApprovedAmount>
<Status> Good </Status>
...
</AuthorizationResponse >
```

In the above example, as the user "John Smith" has an insurance policy that cap the yearly insurance payment to be "$6,000.00" and the user has already received "$3,000.00" payment year to date. Therefore, the insurance provider may approve an amount capped by the remaining permitted insurance payment as "$3,000.00."

Upon receiving the insurance payment authorization 136, the RUAP may process the insurance payment 134, and may subject the payment to further adjudication and reconciliation. In one implementation, the RUAP server 720 may obtain an insurance provider approved amount and generate a claim adjustment request 737 to the merchant 710. The merchant 710 may in turn generate an adjusted user bill reflecting user co-pay amount 715 for user payment (e.g., the user bill 211 in FIG. 2B).

In one implementation, the RUAP may retrieve bank routing information 721 (e.g., the insurance bank information, etc.) and generate a fund transfer request 726 to transfer the approved insurance amount. For example, the RUAP may send the fund transfer request 136 to a bank 760 (e.g., the insurance bank, etc.), which may take a form similar to the format in compliance with electronic fund transfers (EFT), and in some embodiments, it may be directly made to the merchant via a third party bank, e.g., absent the direction of the RUAP server. In another implementation, the RUAP server 720 may be integrated with a payment network, e.g., VisaNet, etc., which may facilitate the payment processing. In one implementation, the RUAP server 720 may debit the approved insurance amount from the insurance provider's account and credit to the merchant 710. For example, the RUAP server may generate a HTTPS post for money transfer, wherein the HTTPS POST message 726 may take a form similar to the following:

```
POST /FundTransfer.php HTTP/1.1
Host: www.RUAP.com
Content-Type: Application/XML
Content-Length: 718
<?XML version = "1.0" encoding = "UTF-8"?>
<FundTransfer>
    <Time> 15:39:30 </Time>
    <Date> 09-09-2015 </Date>
    <Payor>
        <ID> BL009 </ID>
        <Name> Blue Cross </Name>
        <IssuerID> BOA001 </IssuerID>
        <AccountNo> 0000 0000 0000 0000 </AccountNO>
        <Routing> 111111111 </Routing>
        ...
    </Payor>
    <Payee>
        <ID> SHP009 </ID>
        <Name> St John's Hospital </Name>
        <AccountNo> 00000224 </AccountNO>
        <Routing> 1234555 </Routing>
        ...
    </Payee>
    <Amount> 3000.00 </Amount>
    ...
</FundTransfer>
```

For another example, the fund transfer message may take a form similar to the Visa Single Message System (SMS) format, Visa Original Credit Transaction (OCT) format, and/or the like. The merchant 710 may then received a fund transfer 728 from the insurance bank 760.

In one implementation, the RUAP server 720 may generate a transaction record 766 for the insurance payment in the database 719. For example, the RUAP may generate a database record. Below is an example of the transaction record 766 for the RUAP server:

```
POST /TransactionRecord.php HTTP/1.1
Host: 00.001.00.00
Content-Type: Application/XML
Content-Length: 718
<?XML version = "1.0" encoding = "UTF-8"?>
<Transaction>
    <TransactionID> 000000 </TransactionID>
    <TransactionDate> 09-09-2015 </TransactionDate>
    <RequestTime> 19:30:27 </RequestTime>
    <ReceiptTime> 19:31:56 </ReceiptTime>
    <User>
    <UserName> John Smith </UserName>
    <UserID> JS0000 </UserID>
    <AccountNo> 0000 0000 0000 </AccountNo>
    <Password> 0000 </Password>
    <PasswordQ>
        <Question1> Where were you born </Question1>
        <Answer1> New York </Answer>
        ...
    </PasswordQ>
    ...
    </User>
    <TotalAmount> 12,000.00 </TotalAmount>
    <Insured> 5,000.00 </Insured>
    <PatientResp> 7,000.00 </PatientResp>
    <ApprovedInsured> 3,000.00 </ApprovedInsured>
    <TransferLog>
        <Transfer1>
            <Amount> 3,000.00 </Amount>
            <Payor> Blue Cross </Payor>
            <Payee> St John's Hospital </Payee>
            <Status> Verified </Status>
            ...
        </Transfer1>
        ...
    </TransferLog>
    ...
</Transaction>
```

In another implementation, the database 719 may be a relational database responsive to Structured Query Language ("SQL") commands. The RUAP server may execute a hypertext preprocessor ("PHP") script including SQL commands to query the database for user, transaction data, and/or the like. An example PHP/SQL command listing, illustrating substantive aspects of storing a transaction record 766 in the database:

```
<?PHP
header('Content-Type: text/plain');
mysql_connect("202.155.66.130",$DBserver,$password); // access database server
mysql_select("TRANSACTIONS.SQL"); // select database to append
mysql_query("INSERT INTO Transactions (transaction_id, transaction_date,
requested_time, receipt_time, user_id, user_name, user_password, account_no,
total_amount, insured_amount, patient_copay, approved_insured, transfer_log, payee_id,
payor_id, transfer_amount ...)
VALUES ($transaction_id$, $transaction_date$, $requested_time$, $receipt_time$,
$user_id$, $user_name$, $user_password$, $account_no$, $total_amount$,
$insured_amount$, $patient_copay$, $approved_insured$, $transfer_log$, $payee_id$,
$payor_id$, $transfer_amount$ ...); //
add data to table in database
mysql_close("TRANSACTIONS.SQL"); // close connection to database
?>
```

Figure 7B:
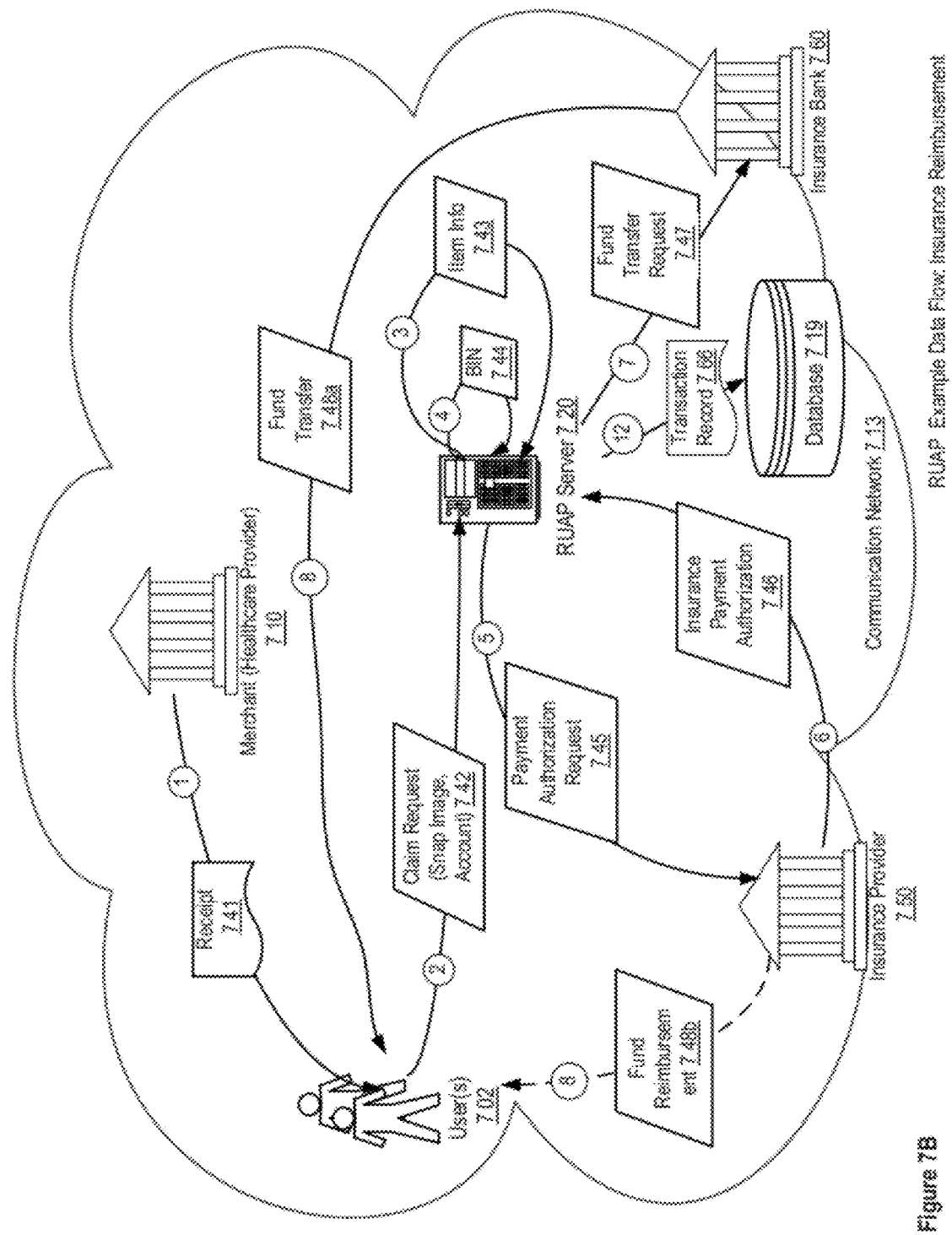

In an alternative implementation, when the user does not submit insurance information to the merchant at the time of purchase transaction, but seek for insurance reimbursement by submitting receipt information to the RUAP, insurance adjudication may take place after the transaction. FIG. 7B provides a data flow diagram illustrating post-transaction insurance reimbursement within embodiments of the RUAP. Within implementations, the user may obtain a receipt 741 from a merchant 710, which may take a similar form to the receipt 237 in FIG. 2B.

In one implementation, the user may submit a reimbursement request (e.g., including a snap image of the receipt, a reimbursement account indication, etc.) 742 to the RUAP server, e.g., see also 227 in FIG. 2B. Upon obtaining item information 743 by analyzing the receipt image and determining there is healthcare related service and products, the RUAP server 720 may retrieve a BIN number 744 of the user profile for insurance claim. For example, in one implementation, the user may have registered the insurance plan information with the electronic wallet.

Within implementations, the RUAP server 720 may generate an insurance payment authorization message 745, and route the message to the insurance provider 750 based on the BIN number. The insurance provider 750 may in turn review the payment request and generate a payment authorization response 746 including an approved insurance payment amount to the RUAP server 720. For example, in one implementation, the insurance payment authorization request message 746 and payment authorization response 746 may take a similar for to 723/736 in FIG. 7A, respectively.

Within implementations, the RUAP server 720 may generate a fund transfer request 747 to the insurance bank 760 to request the approved insurance amount reimbursed to the user 748a-b, which may take a form similar to the fund transfer processing messages 726-728 in FIG. 7A. Within implementations, upon insurance payment, the RUAP server 720 may proceed to determine whether the insurance partially reimbursed purchase item/service is eligible for healthcare restricted-use account reimbursement, e.g., FSA, HSA, etc. For example, the RUAP server may reimburse the remaining payment amount with a FSA account, e.g., to proceed with 421 in FIG. 4A.

Figure 7C:
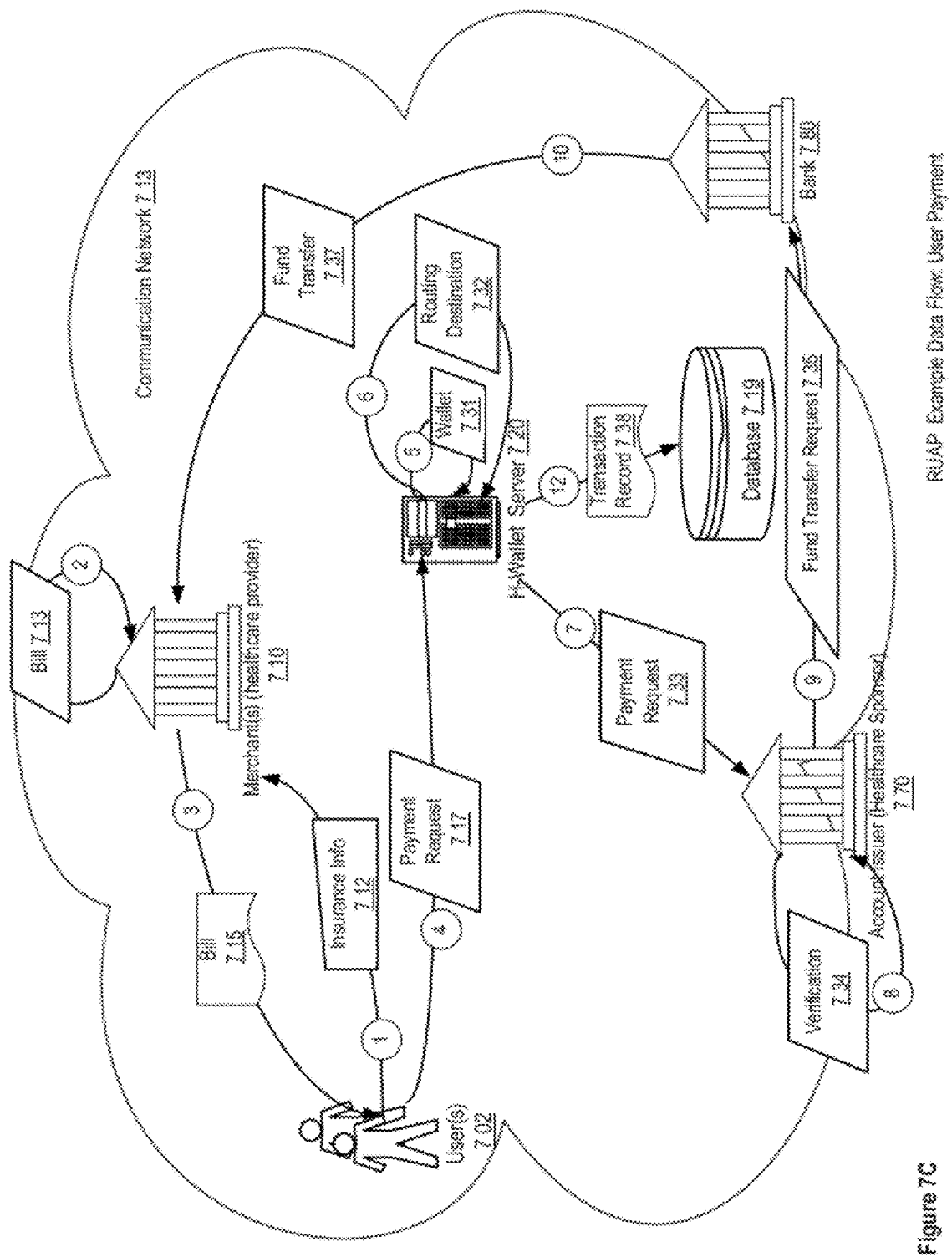

FIG. 7C provides a data block diagram illustrating data flow between healthcare payment entities (RUAP server, user and affiliated entities) for user payment within embodiments of the RUAP. Within various embodiments, as shown in FIG. 177B, one or more user(s) (patient(s)) 702, RUAP server 720, RUAP database(s) 719, merchant(s) 710, a account issuer 770, insurance bank 780, and/or the like are shown to interact via various communication networks 713 to facilitate healthcare user payment.

Continuing on with user 702 receiving a medical bill 715 form the merchant 710 (e.g., as discussed in FIG. 7A), in response to the received medical bill, e.g., at the POS terminal at the healthcare provider 110, the patient 702 may submit a medical payment request 717 to an acquirer, which may forward the payment request to the RUAP server 720 for processing. For example, the user may submit card information at the POS terminal. For another example, the user may initiate an electronic wallet payment via NFC handshake (e.g., as shown in FIG. 1A), and selects a payment account via his wallet. In one implementation, the wallet account may comprise any credit card account, debit account, investment account, alternative payment account, loyalty points account, and/or the like. In a further implementation, the user may have added restricted use accounts with the RUAP accounts, such as Flexible Savings Accounts (FSA), one or more Health Savings Accounts (HSA), one or more government insurance programs (i.e., Medicare or Medicaid), various private insurance rules, various other restricted use accounts such as employment benefit plans or employee pharmacy benefit plans, and income deduction rules, and/or the like. Further implementations of restricted use account wallet enrollment are discussed in FIG. 7C.

Within embodiments, the user may select one or more accounts for payment, and enter an amount to be charged with each account. For example, the user may select an account FSA and enter an amount of "1,000.00" and another credit card account with an entered amount of "6,000.00."

In one implementation, the payment request 717 may comprise information such as user profile information, user insurance information, user pre-loaded account information, medical bill information, and/or the like. For example, in one implementation, a POS terminal processing the user payment request may generate a HTTPS POST message including information of the payment request 717 in the form of data formatted according to the XML. Below is an example HTTP(S) POST message including an XML-formatted message for the RUAP server:

```
POST /PaymentRequst.php HTTP/1.1
Host: www.Hospital.com
Content-Type: Application/XML
Content-Length: 718
<?XML version = "1.0" encoding = "UTF-8"?>
<PaymentRequest>
    <Time> 15:30:30 </Time>
    <Date> 09-09-2014 </Date>
    <User>
    <UserName> John Smith </UserName>
    <UserWalletID> JS0000 </UserID>
    ...
    </User>
    <Wallet>
        <WalletID> HW-JS-0001 </WalletID>
        <WalletToken> 8943243 </WalletToken>
        <Payment1>
            <Account> FSA </Account>
            <AccountNo>
            <Amount> 1000.00 </Amount>
        </Payment>
        <Payment2>
            <Account> Bank Of America Visa Card </Account>
            <AccountNo> 0000 0000 0000 0000 </AccountNo>
            <Amount> 6000.00 </Amount>
        ...
    </Wallet>
    ...
</PaymentRequest>
```

Upon receiving the payment request message 717 from the user, the RUAP server 720 may retrieve wallet information 731 of the user (e.g., account no and user ID, as shown in the payment request 717). For each selected account indicated in the payment request 717, the RUAP server 720 may query for a routing destination 732 for the account. For example, when the user selects "FSA" account, the RUAP server 720 may select the routing destination 732 to be the FSA administer/sponsor 770 of the user.

In one implementation, the RUAP server 720 may generate and route a payment request 733 to the account issuer 770. For example, the account issuer 770 may comprise a restricted use account sponsor, e.g., a FSA/HSA administer, an employer who sponsored employer benefit programs for its employees, a government agency (e.g., Medicare, Medicaid, etc.). In one implementation, the RUAP server 720 may generate separate payment request messages to different routing destinations. In the above example payment request 717, when the user has selected a FSA payment account and a credit card payment, the RUAP server 720 may generate a payment request message 733 routed to a FSA administering entity (270), and a payment request message to a user's issuing bank of the credit card account.

Upon receiving a payment request 733, the account issuer 770 may retrieve rules to generate verification messages 734 of the payment request. For example, the verification message 734 may indicate whether the requested payment complies with account requirement, whether the requested payment amount has exceeded the maximum amount, and/or the like. For example, the account issuer entity 770 may generate a HTTPS POST message including a verification message 734 in the form of data formatted according to the XML. Below is an example HTTP(S) POST message including an XML-formatted verification message 734:

```
POST /FSAverification.php HTTP/1.1
Host: www.FSA.com
Content-Type: Application/XML
Content-Length: 718
<?XML version = "1.0" encoding = "UTF-8"?>
<FSAverification>
    <Time> 15:30:56 </Time>
    <Date> 09-09-2015 </Date>
    <User>
    <UserName> John Smith </UserName>
    <UserWalletID> JS0000 </UserID>
    ...
    </User>
    <AccountStatus>
        <AccountType> FSA </AccountType>
        <AccountNo> 123456 </AccountNo>
        <Amount> 1000.00 </Amount>
        <Balance> 7000.00 </Balance>
        ...
    </AccountStatus>
    <HealthcareService>
        <ProviderID> SHP009 </ProviderID>
        <ProcedureCode> KS-001 </ProcedureCode>
        <Coverage> OK </Coverage>
        ...
    </HealthcareService>
    <Status> Approve </Status>
    ...
</Verification>
```

In the above example, the FSA administer program 770 verifies that the user's healthcare service code is eligible for FSA reimbursement, and does not exceed the available balance in the account. As such, the FSA administer program 770 may approve the payment, and generate a fund transfer request 735 to the sponsor bank 780. For example, the fund transfer message may take a form similar to message 726 in FIG. 7B, which may trigger a fund transfer 737 from the FSA account to the healthcare provider 710.

In one implementation, the account issuer 770 may verify the payment in real time, or a nearly real time manner. In other implementations, the account issuer 770 may receive and process payment requests 733 in batch files. In further implementations, the RUAP server 720 may perform an eligibility pre-check if the user submitted account comprises a healthcare restricted-use account (e.g., FSA, HSA, etc) and various rules may be applied to the payment request based on the type of the account.

In one implementation, the RUAP server 720 may generate a transaction record 766b for the insurance payment in the database 719. For example, below is an example XML-formatted message of the transaction record 738 for the RUAP server:

```
POST /TransactionRecord.php HTTP/1.1
Host: 00.001.00.00
Content-Type: Application/XML
Content-Length: 718
<?XML version = "1.0" encoding = "UTF-8"?>
<Transaction>
    <TransactionID> 000002 </TransactionID>
    <TransactionDate> 09-09-2015 </TransactionDate>
    <RequestTime> 19:30:27 </RequestTime>
    <ReceiptTime> 19:48:56 </ReceiptTime>
    <User>
    <UserName> John Smith </UserName>
    <UserID> JS0000 </UserID>
    <Password> 0000 </Password>
    <PasswordQ>
        <Question1> Where were you born </Question1>
        <Answer1> New York </Answer>
        ...
    </PasswordQ>
    ...
    </User>
    <PaymentType> FSA </PaymentType>
    <Status> Approved </Status>
    <TransferLog>
        <Transfer1>
            <Amount> 1,000.00 </Amount>
            <Payor> FSA administration </Payor>
            <PayorAccount> 123456 </PayorAccount>
            <Payee> St John's Hospital </Payee>
            <Status> Verified </Status>
            ...
        </Transfer1>
        ...
    </TransferLog>
    ...
</Transaction>
```

In another implementation, the RUAP server may execute a hypertext preprocessor ("PHP") script including SQL commands to query the database for user, transaction data, and/or the like. An example PHP/SQL command listing, illustrating substantive aspects of storing a transaction record 766 in the database:

```
<?PHP
header('Content-Type: text/plain');
mysql_connect("202.155.66.130",$DBserver,$password); // access database server
mysql_select("TRANSACTIONS.SQL"); // select database to append
mysql_query("INSERT INTO Transactions (transaction_id, transaction_date,
requested_time, receipt_time, user_id, user_name, user_password, account_no,
total_amount, account_type, patient_copay, approved_insured, transfer_log, payee_id,
payer_id, transfer_amount ...)
VALUES ($transaction_id$, $transaction_date$, $requested_time$, $receipt_time$,
$user_id$, $user_name$, $user_password$, $account_no$, $total_amount$,
$insured_amount$, $account_type$, $approved_insured$, $transfer_log$, $payee_id$,
$payer_id$, $transfer_amount$ ...); //
add data to table in database
mysql_close("TRANSACTIONS.SQL"); // close connection to database
?>
```

Figure 8A:
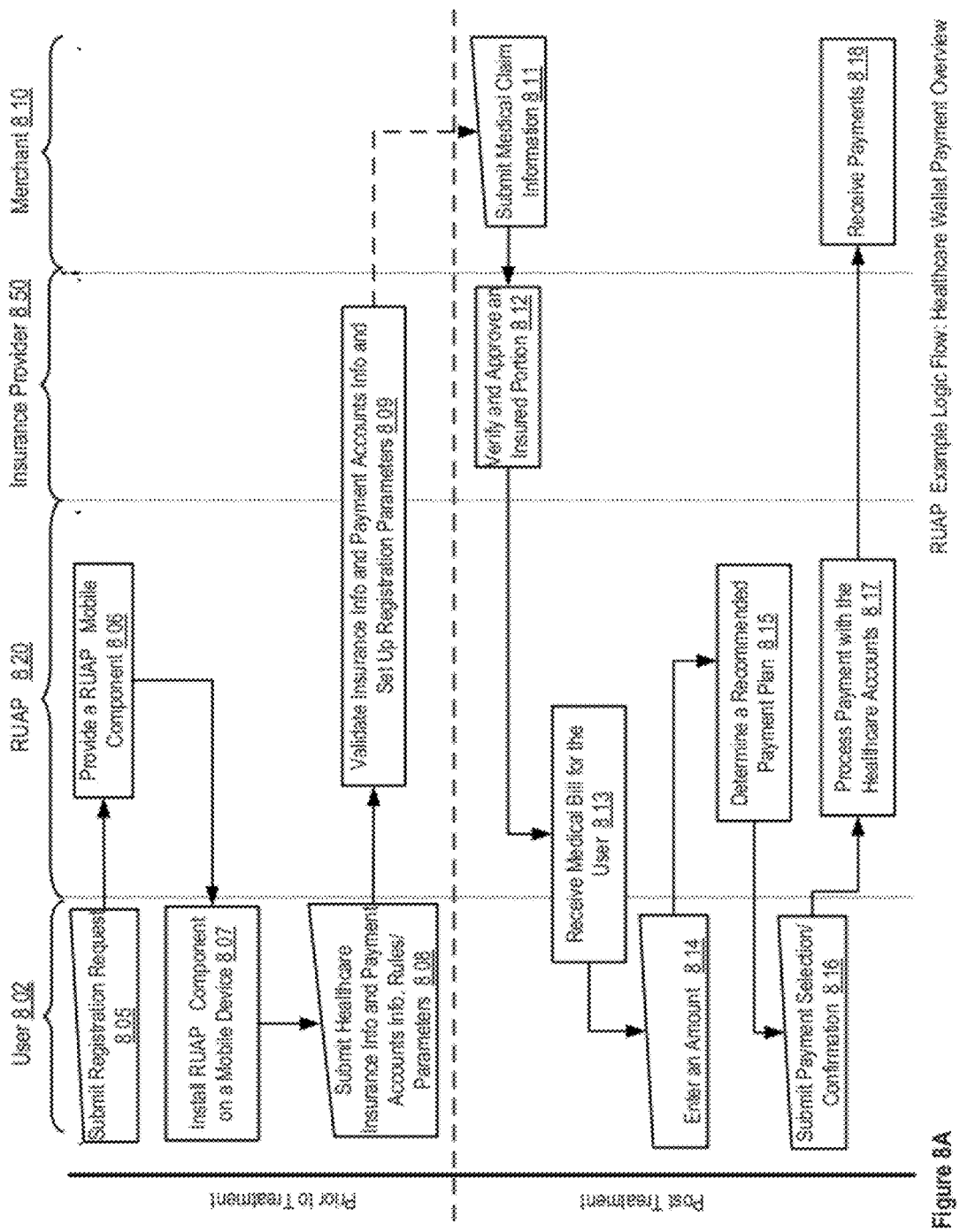
FIGS. 8A-8E provide logic flow diagrams illustrating user healthcare restricted-use account payment and/or reimbursement within various embodiments of the RUAP.

FIGS. 8A-8E provide logic flow diagrams illustrating healthcare insurance adjudication and healthcare restricted-use account (e.g., FSA, HSA, etc.) payment within embodiments of the RUAP. As shown in FIG. 8A, within implementations, the user 802 may register to the RUAP 820 prior to utilizing the RUAP payment service after healthcare treatment.

In one embodiment, the user 802 may submit a request 805 for registration with the RUAP, e.g., via an email, a text message, a telephonic phone call to customer service, and/or the like. The RUAP may then provide a RUAP mobile component 806 to the user. For example, the RUAP may provide an indication, a link, etc. for downloading a mobile payment application to the user's mobile device, via which the user may register one or more multi-purpose accounts with the RUAP and process healthcare claims and payments in real-time.

In one embodiment, the user 802 may download and install the RUAP component on a mobile device 807, e.g., an Apple iPhone, etc. In further implementation, the RUAP may comprise a web portal, feature sets in a cloud, downloaded indicia from a cloud, and/or the like.

The user 802 may then register with the RUAP via the installed RUAP component, by submitting healthcare insurance information and setting up payment accounts 808. For example, in one implementation, the user 802 may enroll restricted use accounts into their wallet for healthcare user payment. The restricted use rules may include those for one or more HSA/FSA, one or more government insurance programs (i.e., Medicare or Medicaid), various private insurance restricted use rules, various other restricted use accounts such as employment benefit plans or employee pharmacy benefit plans, and income deduction rules.

For example, the user may associate his FSA/HSA accounts with the RUAP. For another example, the user may be presented rule choices within agreement and IRS policies, and set up their rules and parameters for usage of their FSA/HSA payment accounts. For example, the user may set up a rule such that any medical purchase less than $100.00 until the end of the year will be paid by his FSA account.

In one embodiment, the RUAP may provide default settings and rules for the user via a user interface, e.g., the mobile component installed on the user's mobile device. In another embodiment, the user may configure a variety of parameters. In the above example, the user may edit the balancing amount of an account, the end date, the rules, and/or the like.

In one embodiment, upon receiving user provided registration data and related parameters and spending rules, the RUAP may validate the insurance information with the insurance provider 150, and set up spending rules associated with the user's RUAP account 809 to complete the registration. In another implementation, the RUAP 120 may register the user's mobile device for security, such as, via a hardware ID, MAC address, and/or the like.

In one embodiment, after the user is present at a healthcare provider for medical services, the healthcare provider 810 may submit medical claim information 811 to an insurance provider 850 at checkout, wherein the insurance provider may approve an insured portion 812 based on the user's insurance policy. In one implementation, the user may send a payment file (e.g., via text message, email, etc.) to the RUAP, including the amount of patient responsibility, NPI, plan membership, SSN, etc. The RUAP may then verify the submitted user data with verify against the healthcare registration record. If the record matches, the RUAP may generate a "please pay an amount $100.00" message and send to the user.

In one implementation, the healthcare provider 810 may send the remaining balance of the medical bill to the RUAP for user payment processing. In another implementation, the user 802 may receive a medical bill, e.g., at a mobile device, etc., in real-time at checkout, and enter the amount due 814 into his mobile device for RUAP.

In one implementation, the RUAP 820 may determine a recommended payment plan 815 to the user based on the remaining amount in the user's registered payment accounts with RUAP (e.g., based on the transaction nature, user's GPS location, etc.), and prompt the user to select a payment method 816. Upon receiving a confirmation of payment selection, the RUAP may process payment with the healthcare accounts 817, and the healthcare provider may send confirmation of payment 818.

Figure 8B:
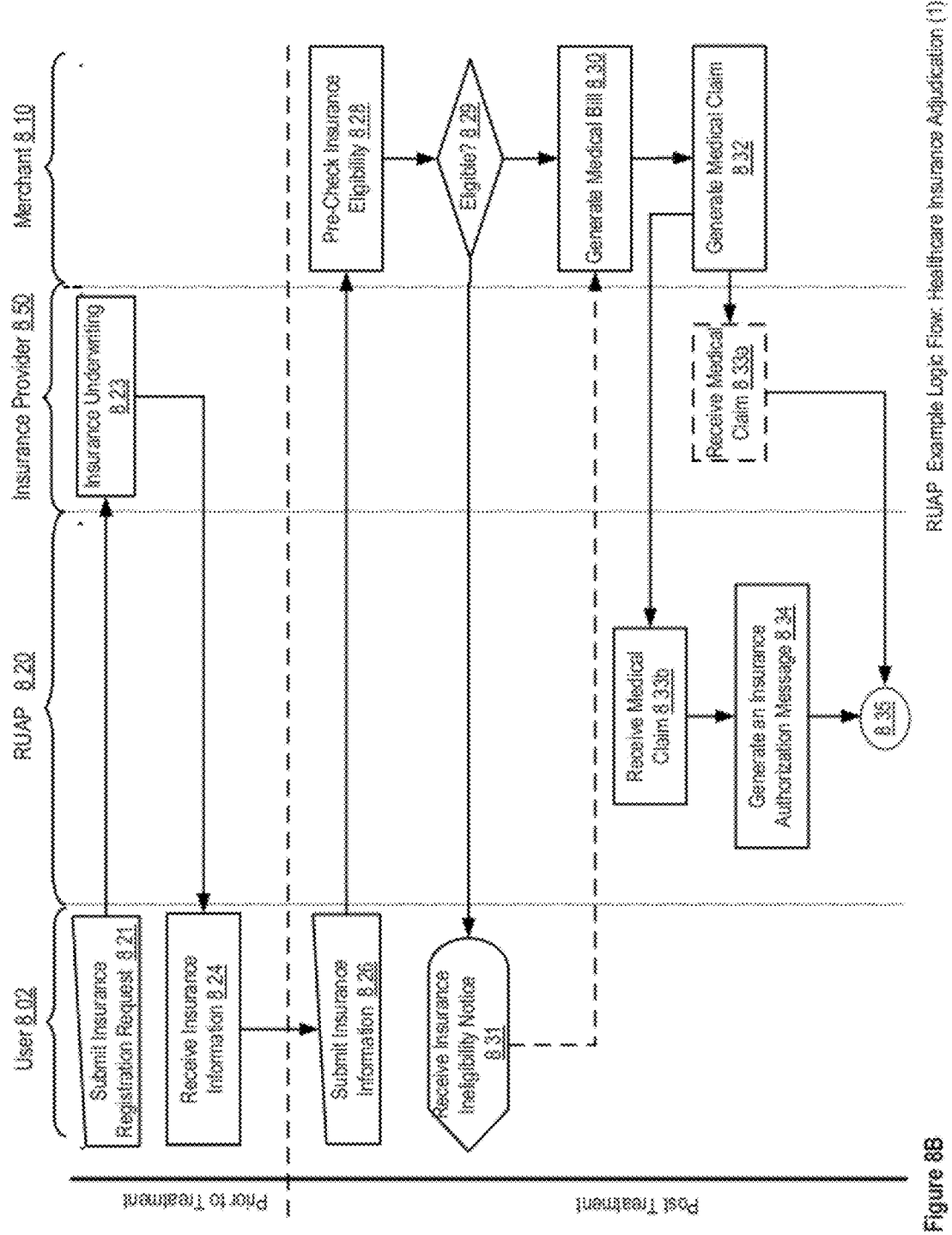
Figure 8C:
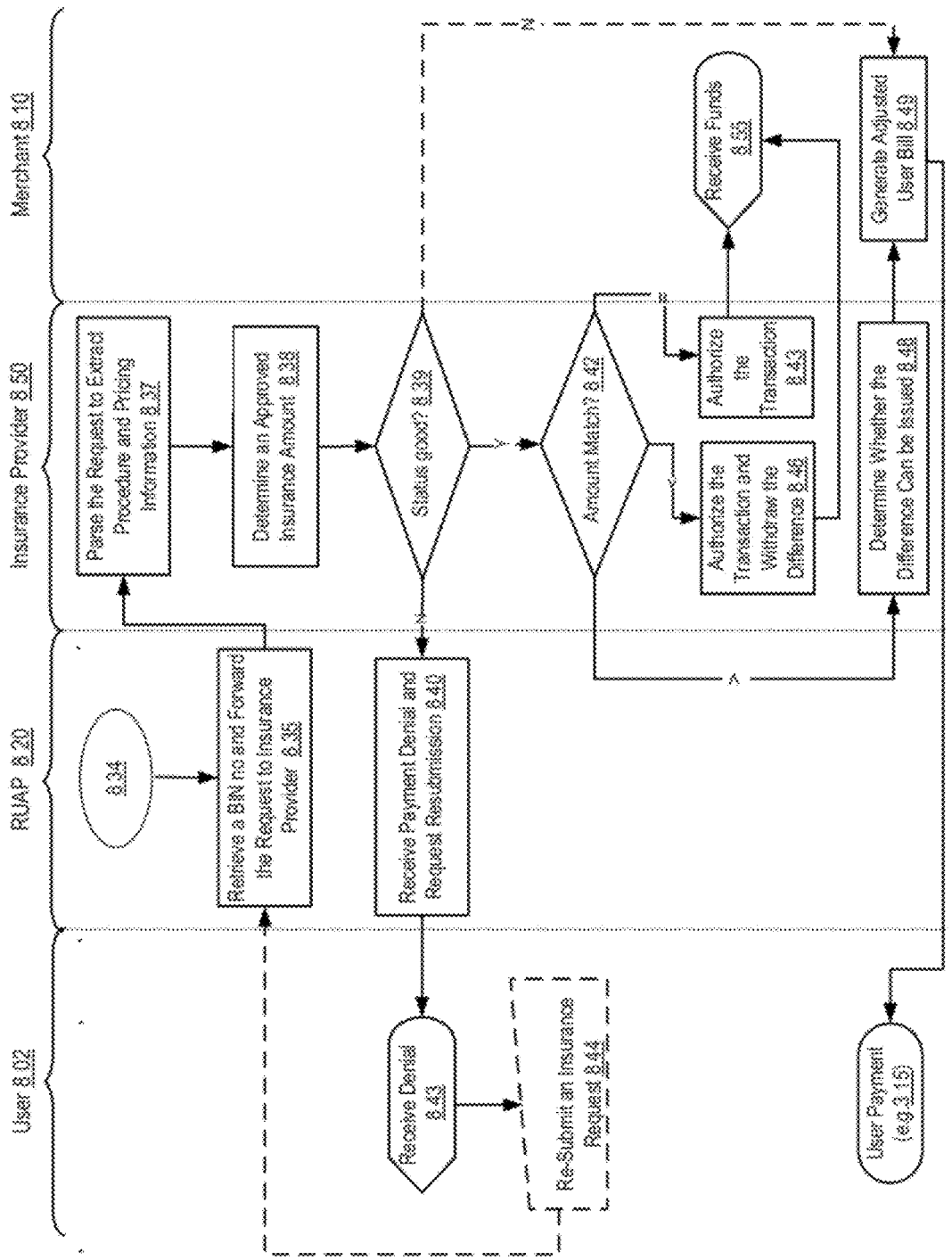

FIGS. 8B-8C provides a logic flow diagram illustrating healthcare insurance adjudication within embodiments of the RUAP. Within embodiment, prior to receiving healthcare treatment, a user 802 may submit insurance registration request 821, e.g., to purchase an insurance program, etc. The insurance provider 850 may underwrite the insurance policy for the user 823, and store the information (e.g., see 704 in FIG. 7A) in a database, and send the insurance information 824 to the user, e.g., an insurance card, an insurance electronic entry in the user's electronic wallet, and/or the like.

In one embodiment, upon receiving medical services, the user 802 may submit insurance information 826 to healthcare provider 810, e.g., by presenting his insurance card to a representative at a checkout desk. The healthcare provider 810 may pre-check the insurance eligibility 828, such as whether the healthcare provider is in network, whether the insurance term has expired, and/or the like. If it is not eligible (e.g., expired insurance term, healthcare provider out-of-network, etc.), the user may receive an insurance ineligibility notice 831. Otherwise, the healthcare provider 810 may generate a medical bill 830, including an estimated insured amount. For example, if the insurance provider has a standard coverage list for a procedure, e.g., 40% for a root canal therapy at an in-network dental provider, etc., the healthcare provider may calculate an estimated insured amount by multiplying the total amount with 40%.

Alternatively, the healthcare provider 810 may generate a medical claim 832 to the insurance provider for adjudication 833a, e.g., to provide an approved insurance payment amount. In one implementation, the medical claim may be sent to the RUAP server 833b, which may generate an insurance authorization message 834 (e.g., see 736 in FIG. 7A).

Continuing on with FIG. 8C, the RUAP may retrieve a BIN number from the medical claim and determine a routing destination based on the BIN number; and forward the authorization request to the insurance provider 835. Upon receiving the authorization/adjudication request, the insurance provider 850 may parse the request to extract procedure and pricing information 837, and determine an approved insurance amount 838. For example, the insurance provider may assess the procedure, and determine whether the healthcare provider provided pricing is reasonable based on a variety of factors, such as, but not limited to local living expenses, market price, economic indicator, pricing information of peer healthcare providers in the same area, average income, and/or the like.

In one implementation, the insurance provider may further verify whether the user's insurance account is in good standing 839. For example, if it is an employer benefit account, the insurance provider may verify the user's employment with the sponsor (e.g., the employer) is in good standing.

In one implementation, if the insurance account is no longer eligible for the user, the RUAP may receive a payment denial message and be prompted to re-submit insurance information 840. The RUAP may then provide the denial message to the user 843, who may elect to re-submit an insurance verification request 844. Alternatively, the healthcare provider may be notified of the ineligibility of the insurance, and may adjust the medical bill 841.

Upon verification at 839, the insurance provider 850 may compare the claimed amount (e.g., the insured amount field in the medical claim message 716 in FIG. 7A) with the insurance assessed amount (e.g., at 838) 842. If the approved amount meets with the claimed amount, the insurance provider 850 may authorize a transaction of the medical claim 843 (and withdraw the difference if the insurance approved amount is greater than the claimed 846), and the healthcare provider may received the claimed amount 855. Otherwise, if the insurance assessed amount is less than the requested claim, the insurance provider may re-assess the claim to determine whether to approve the difference 848, e.g., to start a re-adjudication process 841.

Figure 8D:
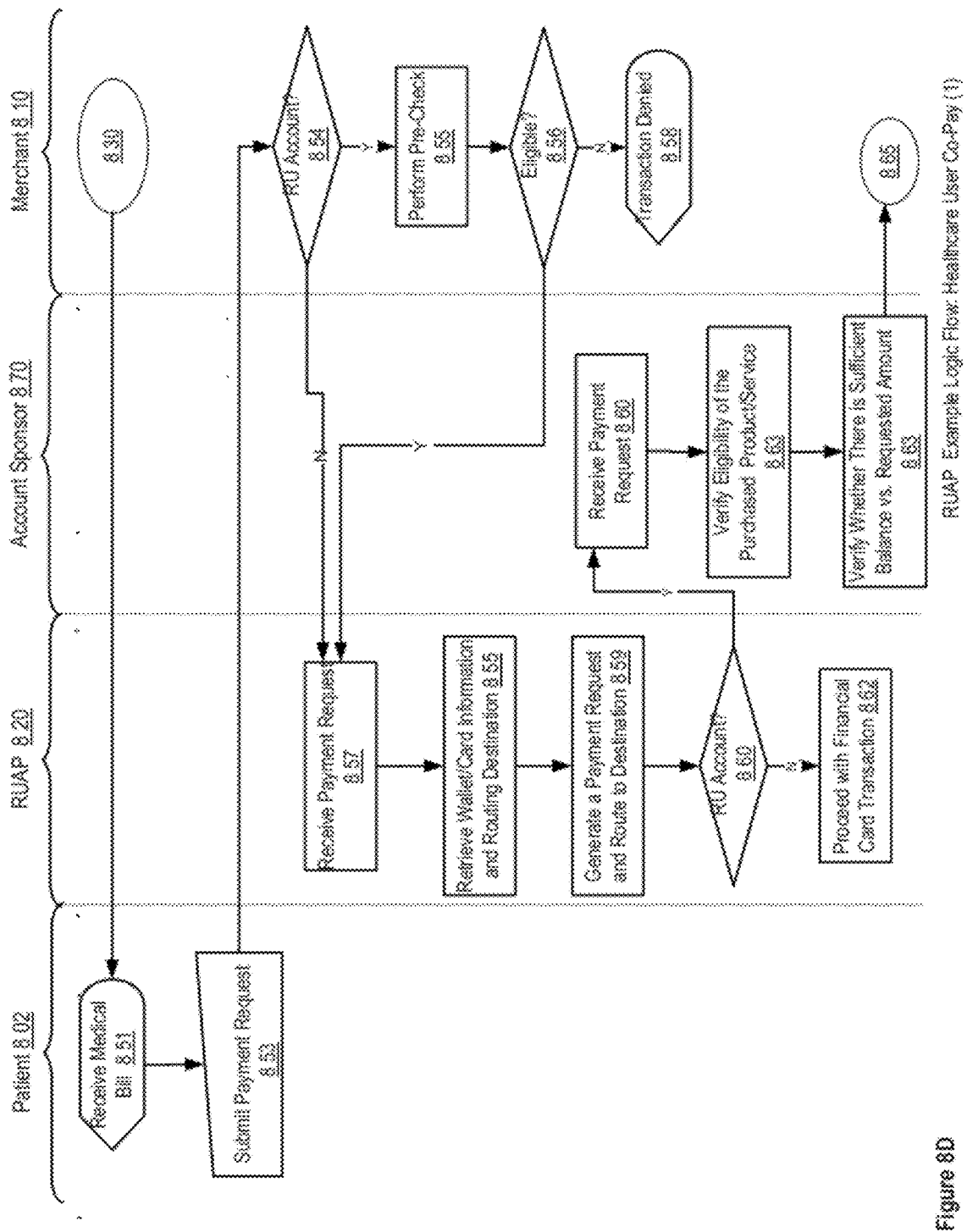
Figure 8E:
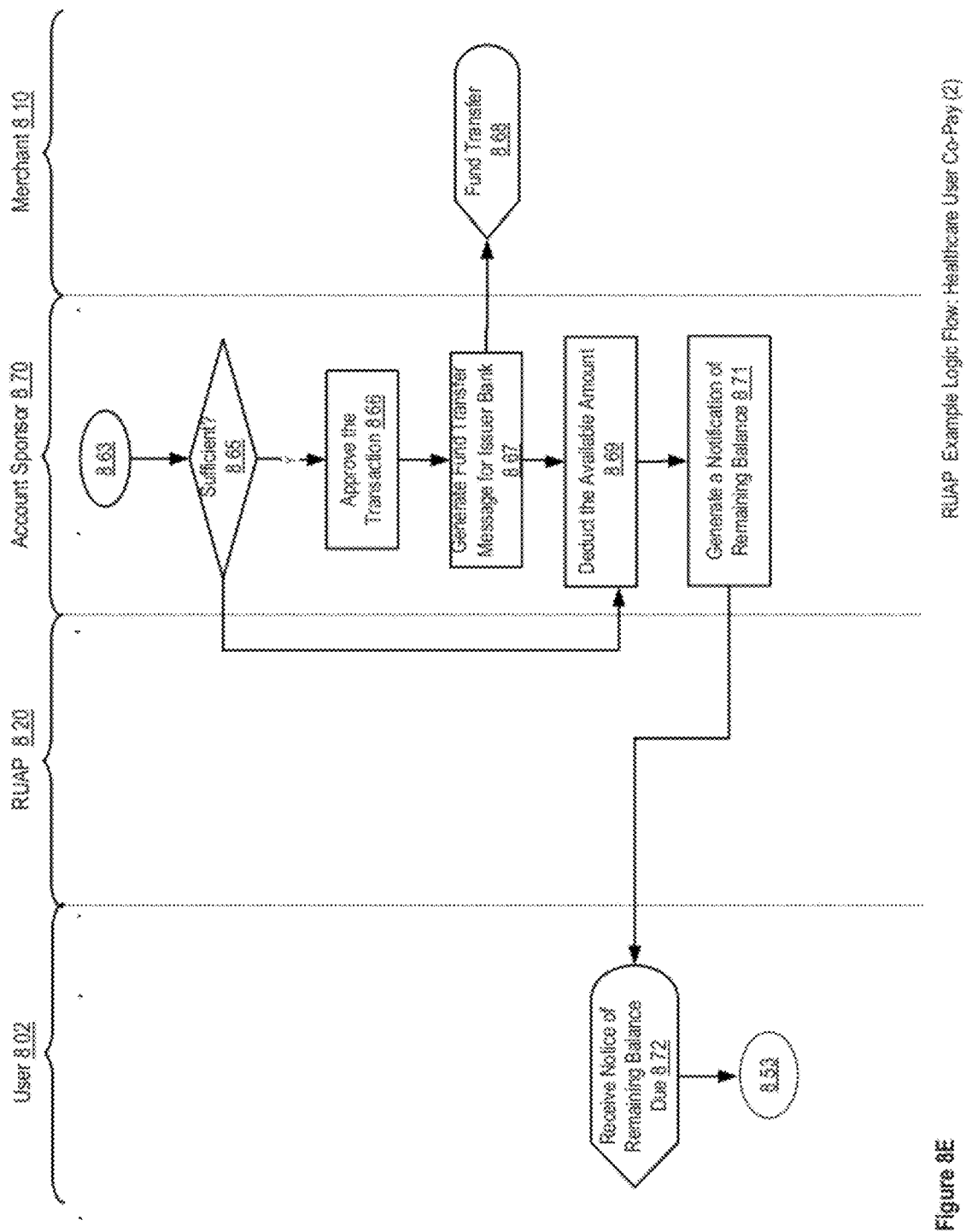

FIGS. 8D-8E provide logic flow diagrams illustrating healthcare user payment within embodiments of the RUAP. Within embodiments, users may obtain a medical bill which specifies the user responsible portion after the insurance adjudication. Upon receiving a medical bill 851 from a healthcare provider 810, the user 802 may submit a payment request 853, e.g., by swiping a prepaid card at the healthcare provider checkout registry, by operate a mobile wallet, and/or the like. In one implementation, the healthcare provider may determine whether the user submitted payment account is a restricted use account (e.g., a FSA, HSA, LOC, etc.), and/or a sponsor administered account (e.g., Medicare, Medicaid, employment benefit account, etc.) 854. If so, the healthcare provider may perform a pre-check 855 to determine whether it is applicable based on the purchased procedure/product code. For example, a user may not engage his FSA account to pay for cosmetic products, as the product code is not in a FSA eligible category. If not eligible, the transaction may be denied 858 at the healthcare provider.

If eligible, the RUAP may receive the payment request 857 including user's account information (e.g., via a healthcare card, an electronic wallet, etc.). The RUAP may retrieve the user's wallet/card information and a routing destination 855, and generate a payment request (e.g., 733 in FIG. 7B) for the routing destination 859. If the user submitted payment account is not a restricted use account 860, e.g., a bank account, etc., the RUAP may proceed with financial card transaction, e.g., as further discussed in FIGS. 17A-21.

If it is a restricted use account, the RUAP may send the payment request to the account sponsor 860, e.g., a FSA/HSA/LOC account manager, Medicare/Medicaid management, employer benefit account manager, and/or the like.

The account sponsor 870 may verify eligibility of the purchased product/service 863, and verify whether there is sufficient balance in the user's account for the requested payment amount 863.

Continuing on with FIG. 8E, if there is sufficient funds 865, the account sponsor 870 may approve the transaction 866, and generate a fund transfer message for an issuer bank 867, which may be processed in a similar manner as discussed in FIGS. 20A-23B. The approved amount may be deducted from the user account 869 and the healthcare provider may receive payment 868. Alternatively, if there are insufficient funds in the account, the account manager may elect to approve a payment of the available amount in the account 869.

Upon the transaction, the account sponsor 870 may generate a notification of the remaining balance 871 and send it to the user 872. In one implementation, the balance updates may be performed periodically (e.g., weekly, bi-weekly, etc.), and/or on an on-demand basis.

Figure 9A:
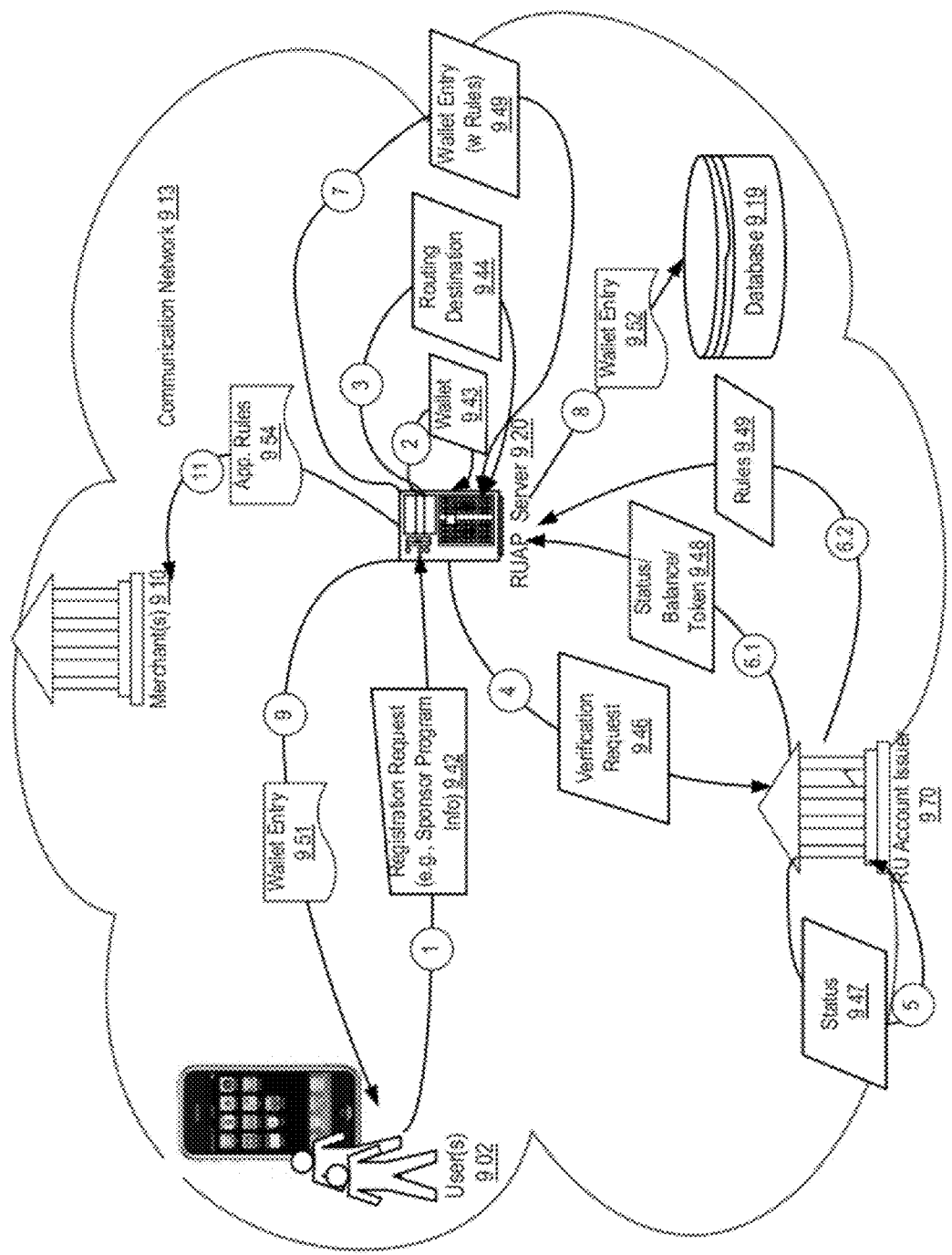
FIGS. 9A-9B provide diagrams illustrating restricted-use account enrollment within embodiments of the RUAP.
Figure 9B:
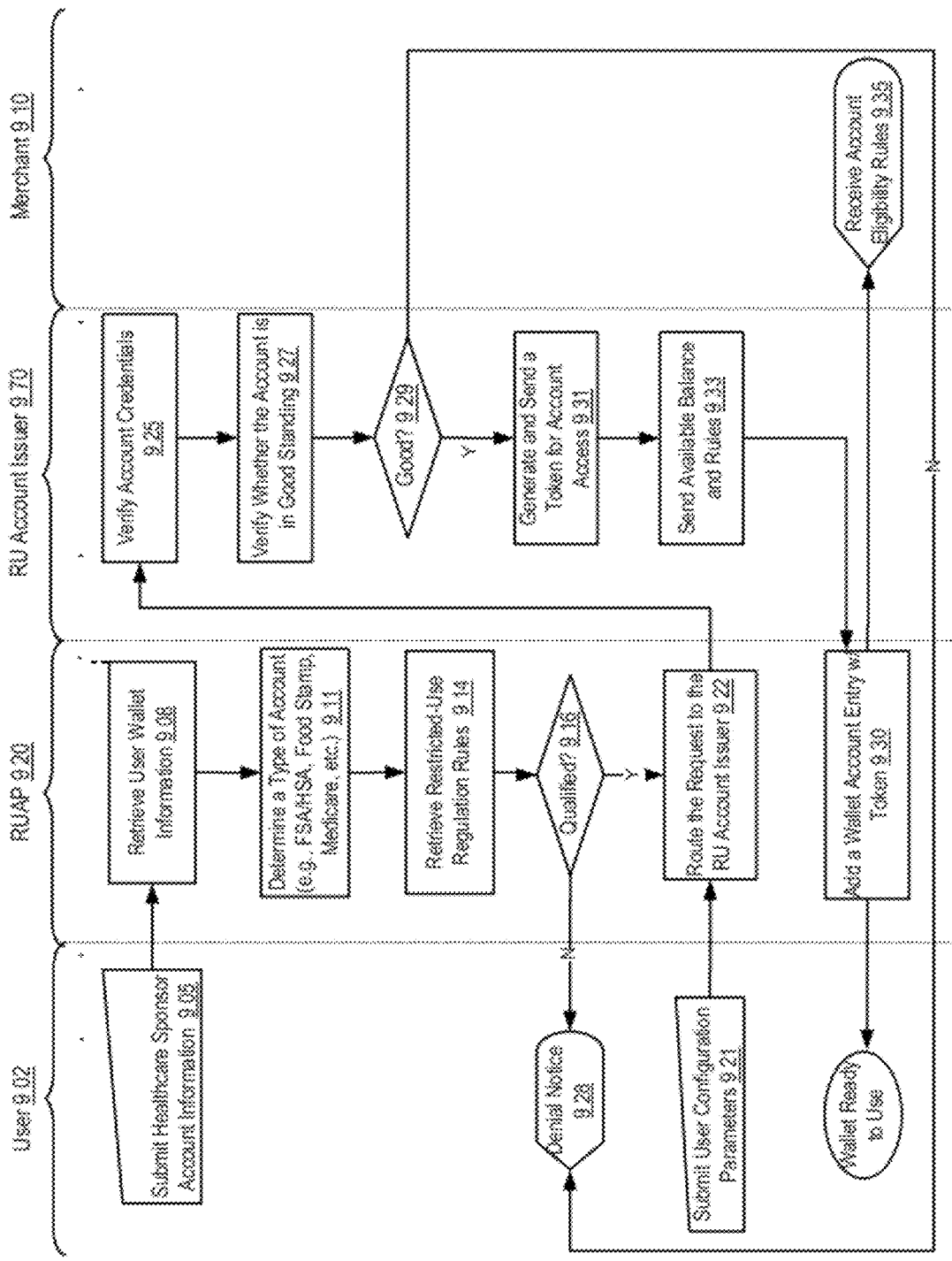

FIGS. 9A-9B provide example flows illustrating user restricted-use account enrollment in an electronic wallet within embodiments of the RUAP. In one implementation, a user may download and install a RUAP mobile wallet component on a smart phone or other portable web-enabled computing device. Integration of the electronic wallet reduces the number of network transactions and messages that fulfill healthcare payment approval and procurement of healthcare product and services. In this way, with the reduction of network communications, the number of transactions that may be processed per day is increased, i.e., processing efficiency is improved.

Within implementations, the mobile wallet application may be used by a user who is presented with a request to pay for healthcare service charges. When so used by the user, the mobile wallet component makes a recommendation of which the user's account to offers the greatest advantage to the user when used to pay for healthcare service charges. The mobile wallet component provides a real time decision tool for the user to choose one or more healthcare accounts from which to withdraw currency or other funds in order to pay for a healthcare service. To assist the user in making the right choice, the mobile wallet component is programmed to access local restricted use and regulatory business rules for healthcare services. The mobile wallet component is programmed to access: (i) user-specific data and (ii) balances held by the user in multiple payment accounts issued to the user who is financially responsible for the healthcare service charges. The mobile wallet component is further programmed to apply the restricted use and regulatory business rules to the online data (i.e., user-specific data and balances) in order to make a recommendation to the user as to which of the user's payment accounts be used in paying for the healthcare service charges. The user may adopt, or over ride, the mobile wallet component's recommendations. Thereafter, the user's smart phone may then be used at a healthcare service providers POS to make contactless payments from each of the user's account as were recommended by the mobile wallet component.

In one implementation, the mobile wallet component may have online access to various information for processing against the restricted use and regulatory business rules. For instance, local negative wealth impacting rules may provide various incentives and penalties as are applicable to: (a) a FSA; (b) a HSA; (c) Government Insurance (e.g.; Medicare); (d) Private Insurance; (e) Other Restricted use Accounts (e.g.; employee benefits plans); (f) Income deduction rules; (g) etc.

In one implementation, the mobile wallet component may have online access to various information for processing against insurance payment coverage rules. For instance, insurance payment coverage rules may provide various incentives and penalties as are applicable to: (a) a portion of the healthcare provided by the healthcare provider to the user that are and are not covered and thus will and will not be paid for via insurance coverage; (b) specific spending limit rules for the healthcare provider and health provided by same; (c) annual and life-time limits for spending: (i) by-the person; and (ii) by-the insurance policy; (d) limitations on the type and quantity of healthcare goods and/or services type, including but not limited to: (i) pharmacy; (ii) vision; (iii) dental, (iv) psychological; (v) substance abuse rehabilitation; (vi) etc.; (e) limitation on payments payment to a certain type of merchant, including but not limited to: (i) 'big-box' retailer; (ii) pharmacy retailer; (iii) physician sale of goods and services; (iv) etc.; (f) co-payments by insurance vehicle type; (g) etc.

In one implementation, the mobile wallet component may have online access to currency balances available for use, and respective calendar dates of availability, to pay the balance due bill for the healthcare provided by the healthcare provider. For instance, these accounts may include: (a) a Flexible Savings Account (FSA), where data retrieved may include a current currency balance, a date by which all funds in FSA must be spent; (b) a Health Savings Account (HSA), where data retrieved may include a liquid asset balance and a non-liquid asset balance (e.g.; stocks, mutual funds, Certificates of Deposit, etc.), and an amount charged for a commission to trade an illiquid asset for a liquid asset that may be used to pay the balance due bill from the healthcare provider.; (c) a remaining deductible contribution amount to a healthcare-relates account amount for a specific year; (d) a government insurance prepaid account; (e) a private insurance deductible information; (e) other restricted use accounts (e.g.; employee benefits plans); (f) non-restricted use payment accounts (e.g.; credit, debit, prepaid accounts) including information for these accounts such as loyalty points and awards having currency equivalents that may be made available for payment against the balance due bill and award thresholds for such loyalty points and awards. The mobile wallet component may also have online access to a prediction as to the likely income and local financial bracket of the user for year in which the healthcare provider's balance billing is due.

In still another implementation, a healthcare provider provides healthcare services (e.g., medical treatment, etc.) and/or products (e.g., prescription drugs, etc.) to a user. One or more insurance carriers are queried by the healthcare provider to obtain payment for the healthcare provided by the healthcare provider to the user. When the insurance carriers have not paid, or are unlikely to pay, for the healthcare, then the healthcare provider calculates a balance due bill for which the user is financially responsible. A PoS transmits the balance due bill to the user's smart phone. The smart phone executes a mobile wallet component to perform real time online access to various databases. This real time access obtains business rules and user data sufficient for the mobile wallet component to derive a recommendation as to which the user's accounts will provide the greatest advantage to the user when used to pay for healthcare service charges, both goods and services, of the balance due bill. The user's smart phone may then send a transmission to the healthcare provider's POS as a contactless payment from each of the user's recommended accounts. For each account in the recommendation: (i) the healthcare provider's POS sends the user's proposed payment amount to an acquirer for the healthcare provider; (ii) the acquirer sends an authorization request for the amount to a transaction handler (i.e., VisaNet) who sends the authorization request to the corresponding issuer of the user's account. Note that, in addition to the VisaNet network provided by Visa Inc., other networks (such as Discover and American Express) may be used to accept healthcare service payment transactions. Moreover, other payment options may also be made, such as ACH or online bill pay, each of which could be facilitated by either the foregoing implementations or by being routed to another payment portal; and (iii) the issuer sends an authorization response back to the transaction handler who sends the authorization response back to the healthcare provider's acquirer. Assuming that the healthcare provider's payment is authorized by the issuer, the smart phone receives an electronic acknowledgement of payment from each of the issuers 8 for each of the accounts. Clearing and settlement will then follow for each account selected by the user to pay the healthcare provider.

In the foregoing implementation, the derivation of the recommendation may rely on an application of mathematical (quantitative) techniques to make a healthcare payment decision recommendation. To do so, the user's financial and insurance penalties and incentives are defined and modeled as a set of mathematical equations. Data that is also made available for the derivation are currency balances, and dates as to availability of same, in one or more accounts to which the user has access for payment of the balance due bill. The equations are subjected to computer analysis to yield an optimized solution as to those user's accounts that will provide the greatest advantage to the user when used to pay for healthcare service charges, both goods and services, as defined in the balance due bill from the healthcare provider. Optimizing the solution may requires one or more iterations to test against various circumstances and situations until the optimized solution is found for making the recommendation. The set of mathematical equations may apply any of several different approaches, including but not limited to dynamic and linear programming, as well as forecasting and simulation techniques such as the Monte Carlo method.

FIG. 9A provides a data block diagram illustrating data flow between healthcare payment entities (RUAP server, user and affiliated entities) for RUAP account management within embodiments of the RUAP. Within various embodiments, as shown in FIG. 9A, one or more user(s) (patient(s)) 902, RUAP server 920, RUAP database(s) 919, merchant(s) 910, a account issuer 970, and/or the like are shown to interact via various communication networks 913 to facilitate RUAP account management.

Within embodiments, the RUAP server 920, or a account issuer 970 may act as a BIN sponsor. For example, the user 902 may submit healthcare benefit program information 942 to the RUAP server 920 in order to add a restricted-use account (e.g., FSA/HSA, LOC, Medicare, Medicaid, employee benefit program, food stamp, etc.) to the electronic wallet. For example, in one implementation, the user may fill in an online application form, may call up a wallet management agent, may send a request via instant messages, emails, and/or the like. In another implementation, the user may be provided the option to register with RUAP service when the user enrolls in a healthcare benefit program. For example, an XML-formatted user registration request including user information 942 may take a form similar to the following:

```
POST /RegistrationRequest.php HTTP/1.1
Host: 64.255.64.00
Content-Type: Application/XML
Content-Length: 718
<?XML version = "1.0" encoding = "UTF-8"?>
<RegistrationRequest[is this the same as Sponsor Program Info? That's
what the figure shows it as... I think one or the other is off?]>
     <Time> 17:42:40 </Time>
     <Date> 09-01-2014 </Date>
     <RequestType> Add Account </RequestType>
     <RequestID> JS09012011 </RequestID>
     <User>
            <UserName> John Smith </UserName>
            <WalletID> JS0000 </UserID>
            <Password> 0000 </Password>
            <PasswordQ>
                  <Question1> Where were you born </Question1>
                  <Answer1> New York </Answer1>
                  ...
            </PasswordQ>
            <Phone>
                  <Cell> 000-000-0000 </Cell>
                  <Day> 111-111-1111 </Day>
                  ...
            </Phone>
            <Address>
                  <Line1> 122 Apple Ave </Line1>
                  <City> Big City </City>
                  <State> CA </State>
                  <ZipCode> 99920 </Zipcode>
            </Address>
            ...
     </User>
     <Account>
            <AccountType> FSA </AccountType>
            <AccountNo> 123456 </AccountNo>
            <BIN> FSA-00133 </BIN>
            ...
     </Account>
     ...
</RegistrationRequest>
```

In one implementation, the RUAP may provide virtual prepaid card including a card number without sending physical magnetic cards, e.g., an electronic mobile wallet entry 951 for the user to download and instantiate on his mobile wallet (e.g., see electronic wallet UIs in FIGS. 16A-16E). For example, in further implementations, an additional wallet may be created for general spends.

In further implementations, funds on the additional healthcare wallet account may be separately loaded by the user. For example, fund loading to a FSA/HSA account may be performed by the user setting aside a portion of his income. In another implementation, the user may select a "back-up" account (e.g., a credit card account, a debit account, etc.) as a default account for user co-pay if payment request via the selected healthcare benefit account is denied by the account issuer 970, e.g., an ineligible healthcare service, etc.

In one implementation, the RUAP server 920 may retrieve the user's wallet information 943, and determine a routing destination 944 of the added account from the healthcare benefit program information 942, to generate a verification request 946 to the account issuer entity 970. For example, the verification request 946 may comprise information fields similar to that of the user submitted restricted-use account information 942. Below is an example HTTP(S) POST message including an XML-formatted message of the account access/verification request message 946:

```
POST /AccessRequest.php HTTP/1.1
Host: www. RUAP.com
Content-Type: Application/XML
Content-Length: 718
<?XML version = "1.0" encoding = "UTF-8"?>
<AccessRequest>
        <Time> 17:42:52 </Time>
        <Date> 09-09-2014 </Date>
        <RegistrationID> JS09012011 </RegistrationID>
        <Account>
        <AccountType> FSA </AccountType>
        <AccountNo> 123456 </AccountNo>
        <BIN> FSA-00133 </BIN>
        ...
        </Account>
    ...
        <User>
            <UserName> John Smith </UserName>
            <UserID> JS0000 </UserID>
            <AccountNo> 0000 0000 0000 </AccountNo>
            <Password> 0000 </Password>
            <Question1> Where were you born </Question1>
            <Answer1> New York </Answer1>
            </Password>
            ...
        </user>
    ...
</AccessRequest>
```

Within implementations, the account issuer entity 970 may verify the credentials and authorize the access request from RUAP. For example, the account issuer 970 may determine whether user credentials, confirmation, etc. are received to indicate authorization from account owner, whether the benefit sponsor allows the access, etc. In one implementation, the account issuer 970 may provisionally make a small amount deposit into the account that RUAP attempts to link to, e.g., $0.65, etc., and request the user to enter the numeric value of the deposit to prove authorization. For example, the user may receive confirmation request via email, instant messaging, phone calls, text messages, wallet notices, and/or the like, to provide the deposited numeric value. For another example, the account issuer 970 may contact a healthcare benefit program sponsor (e.g., a government agency representative, an employer, etc.) to verify the account access request 946.

In one implementation, the healthcare sponsor entity 970 may verify the status 947 of the restricted-use account, and may send a status including the currently available balance 948 to the RUAP server. For example, the account issuer entity 970 may generate a HTTPS POST message including an XML-formatted status message 948 may take a form similar to the following:

```
POST /FSAstatus.php HTTP/1.1
Host: 64.255.64.00
Content-Type: Application/XML
Content-Length: 718
<?XML version = "1.0" encoding = "UTF-8"?>
<FSAstatus>
    <Time> 17:45:40 </Time>
    <Date> 09-01-2014 </Date>
    <User>
        <UserName> John Smith </UserName>
        <WalletID> JS0000 </UserID>
        <Password> 0000 </Password>
        ...
    </User>
    <Account>
        <AccountType> FSA </AccountType>
        <AccountNo> 123456 </AccountNo>
        <BIN> FSA-00133 </BIN>
        <Token> %%^&SDSADFWF </Token>
        <Balance> 3000.00 </Balance>
        <LastUpdate> 17:45:00 </LastUpdate>
        ...
    </Account>
    <Rule>
        <Maximum> 3000.00 </Maximum>
        <ClearancePeriod> 24 hrs </ClearancePeriod>
        <Term>
            <StartDate> 01-01-2015 </StartDate>
            <EndDate> 12-31-2015 </EndDate>
            ...
        </Term>
        <ProcedureList>
            <Code1> 000 </Code1>
            <Code2> ... </Code2>
        </ProcedureList>
    ...
    </Rule>
    ...
</FSAstatus>
```

Within implementations, the RUAP server 920 may constantly, periodically, and/or intermittently send inquiries to the healthcare benefit sponsor entity 970 for available balance updates.

In one implementation, upon verifying with the account issuer entity 970, the RUAP server 920 may generate an additional entry 949 on the user's electronic wallet 943, wherein the entry may comprise the added account information, user verification information, restricted-use account rules, and/or the like that may prompt the user to provide additional payment method into the electronic wallet. In one implementation, the RUAP mobile wallet entry 949 including the payment account entry, may take a form similar to the following XML-formatted data message:

```
< RUAPentry>
    <UserName> John Smith </UserName>
    <UserID> JS0000 </UserID>
    <UserContactNo> 000 000 0000 </UserContactNo>
    <Password> 0000 </Password>
    <PasswordQ>
        <Question1> Where were you born </Question1>
        <Answer1> New York </Answer>
        ...
    </PasswordQ>
    <Account>
        <AccountType> FSA </AccountType>
        <AccountNo> 123456 </AccountNo>
        <BIN> FSA-00133 </BIN>
        <Token> %%^&SDSADFWF </Token>
        <Balance> 3000.00 </Balance>
        <LastUpdate> 17:45:00 </LastUpdate>
    ...
    </Account>
    <Rule>
        <Maximum> 3000.00 </Maximum>
        <ClearancePeriod> 24 hrs </ClearancePeriod>
        <Term>
            <StartDate> 01-01-2015 </StartDate>
            <EndDate> 12-31-2015 </EndDate>
            ...
        </Term>
        <ProcedureList>
            <Code1> 000 </Code1>
            <Code2> ... </Code2>
        </ProcedureList>
    ...
    </Rule>
    <Certificate>
        <UserToken> fdsjreiorrgr8t9340548 </UserToken>
        </DigitalCertificate> rfsfsuifuisduifu </DigitalCertificate>
        <Hash> 00000 </Hash>
```

-continued

```
    ...
    </Certificate>
...
</ RUAPentry>
```

In further implementation, the new wallet account entry 951 may be provided to the user wallet, e.g., the user may view a newly added "FSA" account into his wallet, and the account record 952 may be saved at the database 919. For example, the RUAP server may execute a hypertext preprocessor ("PHP") script including SQL commands to query the database for wallet account data, and/or the like. An example PHP/SQL command listing, illustrating substantive aspects of storing a wallet account entry 952 in the database:

```
<?PHP
header('Content-Type: text/plain');
mysql_connect("202.155.66.130",$DBserver,$password); // access database server
mysql_select("WALLET_ENTRY.SQL"); // select database to append
mysql_query("INSERT INTO Wallet_Entry (user_id, user_name, user_password, user_contact,
user_passwordQ, account_type, account_no, account_BIN, account_token, account_balance,
Account_lastupdate, rule_maximum, clear_period, start_date, end_date,..., certificate ...)
VALUES ($user_id$, $user_name$, $user_password$, $user_contact$, $user_passwordQ$,
$account_type$, $account_no$, $account_BIN$, $account_token$, $account_balance$,
$Account_lastupdate$, $rule_maximum$, $clear_period$, $start_date$, $end_date$,...,
$certificate$ ...) //
add data to table in database
mysql_close("Wallet_Entry.SQL"); // close connection to database
?>
```

In one implementation, the associated applicability rules 954 may be provided to a list of healthcare providers 910 for pre-check purposes. For example, the RUAP server 920 may provide the applicability rule to healthcare providers within a range of zip codes based on the user's location, and/or the like. For example, the RUAP server may generate a HTTPS POST message including an XML-formatted applicability rules message 954, which may take a form similar to the following:

```
POST /Rules.php HTTP/1.1
Host: 64.255.64.00
Content-Type: Application/XML
Content-Length: 718
<?XML version = "1.0" encoding = "UTF-8"?>
<Rules>
  <Time> 17:45:55 </Time>
  <Date> 09-05-2014 </Date>
  <AccountType> FSA </AccountType>
  <AccountSponsor> FSA-PPA </AccountSponsor>
  <ApplicableMerchant>
      <MerchantCode1> MC0001 </MerchantCode1>
      <MerchantCode2> ... </MerchantCode2>
      ...
  </APplicableMerchant>
  <ApplicableProducts>
      <ProductCode1> PA001 </ProductCode1>
      <ProductCode2> ... </ProductCode2>
      ...
  </APplicableProducts>
  <Procedures>
      <ProcedureCode1> KH0938 </ProcedureCode1>
      ...
  </ Procedures>
  ...
  </Rule>
```

In the above example, the RUAP may provide a list of applicable healthcare providers, products, procedures and/or the like, which are applicable for FSA account usage, to a healthcare provider. In further implementations, a user may configure user submitted rules for account usage, as further discussed in FIG. 9B, 9D and 9E.

FIG. 9B provides a logic flow diagram illustrating RUAP restricted use account enrollment within embodiments of the RUAP. Within embodiments, a user 902 may submit a healthcare sponsor account information 905 (e.g., a FSA/HSA/LOC account number, Medicare/Medicaid insurance ID, and/or the like), and wallet information. The RUAP 920 may retrieve user wallet information 908, and determine a type of the account (e.g., FSA/HSA, food stamp, Medicare/Medicaid, unemployment benefit, etc.) 911. The RUAP may retrieve restricted use regulation rules 914, and determine whether it is qualified for enrollment with the wallet 916, e.g., whether the regulatory policy permits the enrollment. If not, the user may receive a denial notice 928. If yes, the RUAP may route the enrollment request to the account issuer 922 for verification 922.

In one implementation, the account issuer 970 may verify the account credentials 925, user profile, account status 927, and/or the like. If the account is in good standing 929, the account issuer may generate and send a token for account access 931 to the RUAP, and the most recent balance information and account rules 933 to the RUAP. For example, in one implementation, the account rules may include a list of procedure/product code and/or merchant category code (MCC) applicable for the account usage.

In one implementation, the RUAP may store the security token and add a wallet entry 930 to the wallet "my account" list (e.g., 1670 in FIG. 16D), and the enrolled account is ready to use with wallet payment.

Figure 10B:
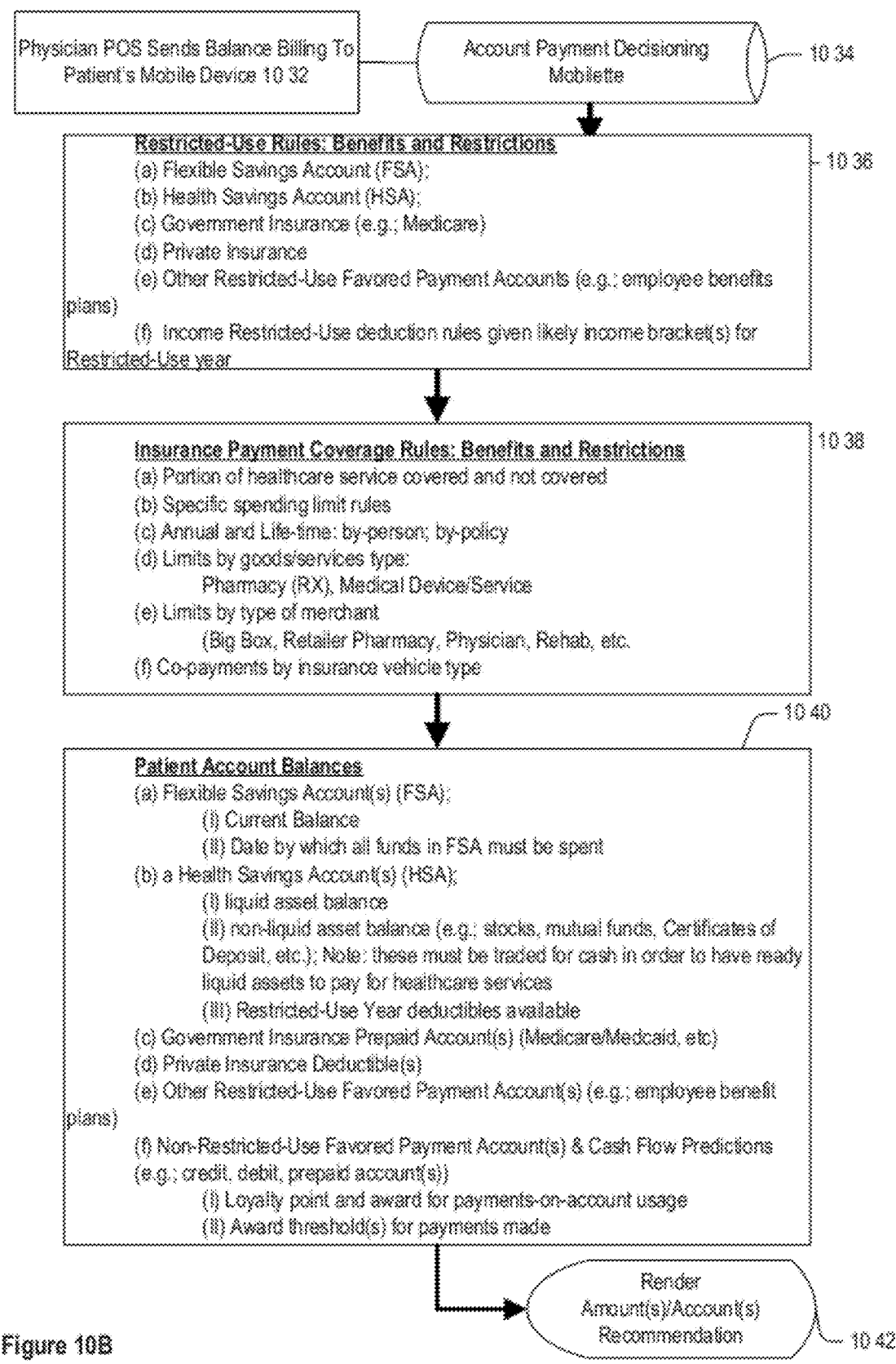
Figure 10C:
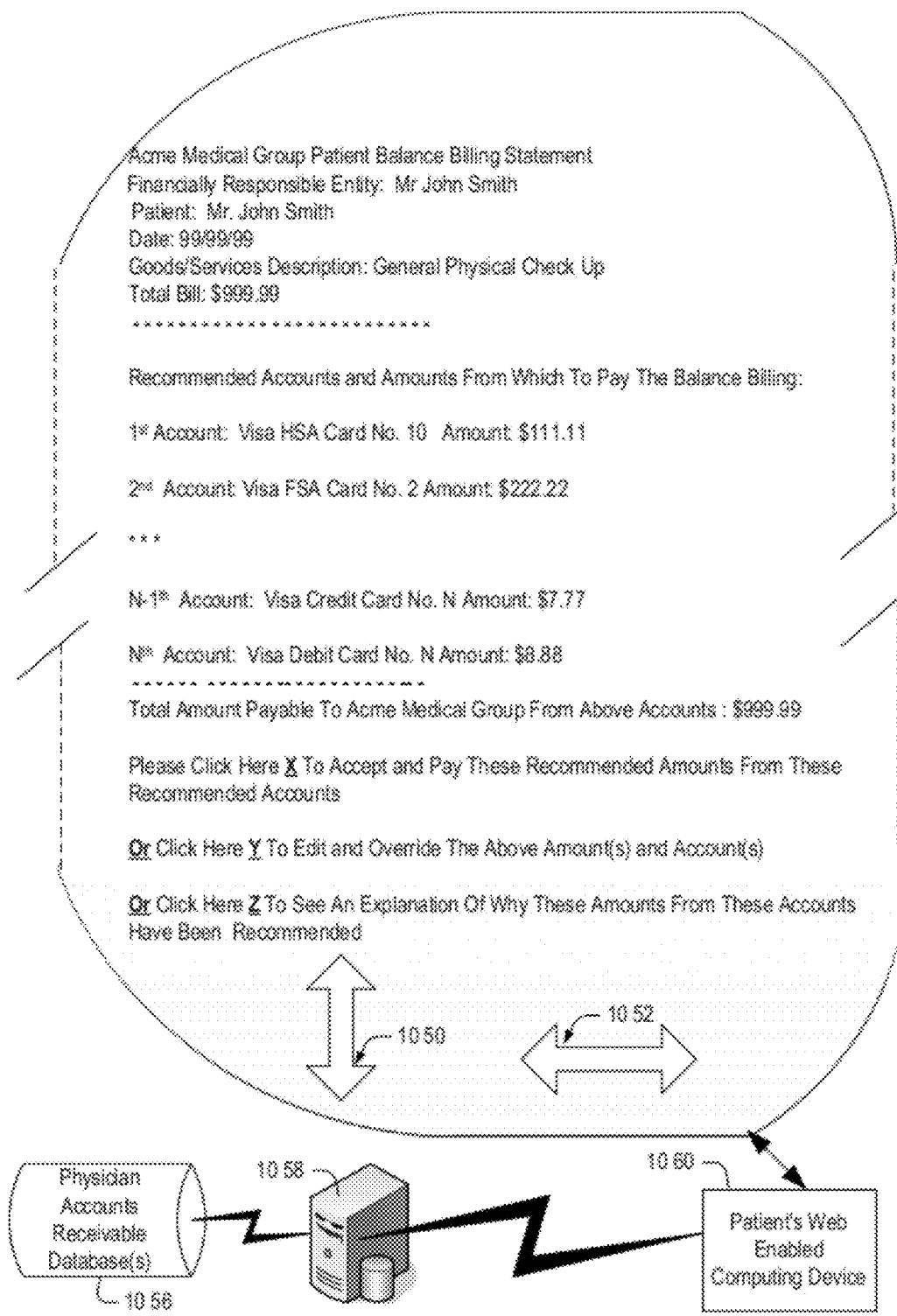

FIGS. 10A-10C provide exemplary diagrams illustrating RUAP applications in healthcare related purchases/products within embodiments of the RUAP. FIG. 10A provides a logic flow diagram illustrating processing healthcare payment within embodiments of the RUAP. In one embodiment, the payment being made by the user is optimized for the user's benefit with respect to considerations of insurance, governmental taxation, and user data so that an optimized payment scheme to be made to satisfy a bill from the healthcare provider for the healthcare.

In one embodiment, a user may check in at a kiosk at a healthcare provider's office 1002, e.g., a POS registry a hospital, a clinic, and/or the like. The physician or other healthcare provider may provide healthcare service to the user 1006. In one embodiment, the physician's office determines whether or not the user is insured 1010. If the user is insured, then process moves to step 1012. Otherwise, the process moves to step 1016.

In one implementation, the physician's Point Of Service terminal (POS) may send a bill to the user's insurance company for the healthcare that was provided to the user. For example, the healthcare provider may send the medical bill directly to an insurance provider via mail, email, instant message, and/or the like. For another example, the healthcare provider may submit information related to the medical bill In one embodiment, at step 1014, the physician's point of service terminal receives partial compensation from the user's insurance company for the healthcare that was provided to the user. At step 1016, the physician's point of service terminal sends a balance due billing to the user's mobile device, for instance, to an email address or as a text message by use of the user's cellular telephone number.

In one embodiment, at step 1018, the mobile device renders to the user a description of the bill as received for the balance due billing from the physician. The rendered bill, shown in step number 1018, shows the amount due, the description of the goods and/or services of the healthcare provided to the user by the healthcare provider, and a MCC of the physician or healthcare provider. At step 1020 the user's web-enabled device executes an application, which may also perform the rendering at step 1018, where a decisioning process takes place in order to satisfy the bill rendered at step 1018.

In one embodiment, the user may obtain and install a mobile application which determines payment accounts in order to pay the bill shown in step 1018. To make the determination, the mobile application draws upon one or more online databases to which it has access. Arrow 1022 shows online access to a plurality of databases 1024. These databases include a database having miscellaneous data for the user, a database for insurance payment coverage rules, a database for local and government rules, and one or more databases showing various account balances that have been issued by issuers to the user that have credit or currency available to satisfy the bill shown in step 1018. Various rules for incentives and penalties are contained within in the databases as seen at block 1024. For instance, available balances for Medicare Part D provisions can be shown as being available to satisfy the bill in step 1018.

The various databases can also include considerations for government insurance, pharmacy benefits, employer healthcare considerations, employer pharmacy benefit plans, employer or government subsidizing of healthcare goods and services, and incentives or penalties to use accounts according to code provisions as provided by various business rules. The available deductibles and required deductibles for each of the one or more benefit plans can be found in one or more databases seen at reference numeral 1024, as well as various co-pay requirements, healthcare spending limits, and various restricted use currency amounts. Various forfeiture rules, such as are applicable to FSA can also be found in databases 1024. The relative merits of using an HSA, with its restricted use deposit benefits, as well as the ability to grow its balance in terms of both compounding interest and the probability of a rise in the values of various equity holdings, are also taken into consideration. The various user account balances maintained by the databases of block 1024 can be assessed via one or more issuers of the respective user accounts as seen at 1034. Each issuer is an issuer to an account of the user, who is an account holder on that account that was issued by the issuer.

After the mobile application seen at process 1020 receives information, business rules, and data via communication seen at arrow 1022, the process 1020 calculates a recommendation of one or more accounts having respective one or more amounts to be paid from each account. This recommendation will provide the most favorable tax, cost, and benefits to the user by using the amounts and respective accounts, while also minimized penalties for such use. The mobile applications recommendations are rendered on the mobile device at step 1028a. The rendering on the web-enabled mobile device may also guard access such as by prompting for, and validating, a user name and the password to enable making withdrawals from respective accounts for respective amounts suggested by process 1020. Each account can be identified by a nickname or identifier, and the nickname will be listed along with the amount that is recommended to be paid from that account toward the balance due billing shown at block 1018.

For example, in one implementation, a Visa debit or credit account or a prepaid card may be suggested and identified by a nickname (i.e., a partial account number) along with an amount to be paid from that account. The user has the option to accept or reject the recommendation made as rendered on the web-enabled mobile device at step 1028a. If the user decides to reject the payment recommendation, an override can be submitted by the user to change the account and/or amounts and to make effective the changes or to amend the recommendations as to the amounts to be paid from various accounts by the user to the physician. This payment is seen in step 1028b where the physician's POS receives a wireless communication from the user's web-enabled mobile device. This wireless communication will contain data that reflects each account and each corresponding amount to be paid from each account to satisfy the balance due billing shown at step 1018.

In one embodiment, at arrows 1030 and 1032, the physician communicates with its acquirer and with a transaction handler (i.e., VisaNet) to send an authorization request for each payment for each account that is designated by the wireless communication from the web-enabled mobile device to the physician's POS. The authorization request is sent from VisaNet via communication 1034 to the issuer of each account from which a payment is to be made. Each issuer, respectively, sends an authorization response to the authorization request back to VisaNet, which is in turn sent from VisaNet to the physician's acquirer as shown by communication arrow 1032, and from there to the physician's acquirer via communication arrow 1030 back to the physician's POS. Once the physician's POS has received an authorization response for the payment from each account, then the physician may deem that the bill, as shown in block 1018, has been satisfied. Thereafter, the physician's office, with its acquirer, will initiate a clearing and settlement process for each authorized payment from each account that was used to satisfy the balance due billing seen at block 1018.

FIG. 10B provides a flow diagram illustrating alternative embodiments of RUAP. A physician has a point of service terminal that sends balance due billing to the patient's web-enabled mobile device 1032, and access to information and data interactively between various online databases and the mobile application executing on a patient's web-enabled mobile device 1034. Block 1036 shows access to retrieve various restricted use rules and benefits that can be input and considered to make a recommendation as to a payment which should be made from one or more accounts. In further implementations, income financial brackets for the patient's year may also be taken into consideration in arriving at a recommendation.

In one embodiment, considerations are also input through various online databases to show insurance payment coverage rules 1038. These business rules can include: (i) that portion of healthcare services that are covered or not covered for a healthcare service that is rendered by a physician to a patient; (ii) various specific spending rule limits and forfeiture rules, various annual and lifetime co-payment and maximum insurance payments by the person and/or by the policy, various limits for various goods and services which may or may not be reimbursable under insurance including pharmacy, vision, and dental payments to respective healthcare service providers; (iii) insurance coverage for various types of merchants that are available as benefits and restriction of benefits including big box retailers, retail pharmacy organizations, physician-owned organizations, rehabilitation organizations, various public and private hospitals, as well as various private preferred providers for respective insurance plans; and (iv) copayments that are available for each of several different insurance vehicles.

In one embodiment, the various patient account balances may be retrieved to determine availability of currency or funds to pay the balance due bill received from the healthcare provider 1040. These accounts can be assessed by online communication with the respective issuers to determine account balances. By way of example, these balances can include: (i) a balance for one or more Flexible Savings Accounts (FSA), including a current balance and the date by which all funds in each FSA account must be spent; (ii) one or more HSA including a liquid asset balance, a non-liquid asset balance that can including stocks, mutual funds, certificates of deposit, etc. In that some equities must be traded for cash in order to have access to liquid assets to satisfy the healthcare provider's balance due bill, the retrieved information can include various requirements for selling stock or other securities, including commission charges, which information can be taken into consideration by the decisioning application in making the recommendation; (iii) balances for government insurance prepaid accounts, such as Medicare and Medicaid; (iv) private insurance deductibles outstanding and yet to be paid; (v) other restricted use accounts that are available to satisfy the healthcare provider's balance due bill, such as employee benefit plans; (vi) non-restricted use accounts and likely cash flow predictions for in each one of those accounts, such as credit available in credit cards, cash available in debit card accounts, cash available on prepaid card accounts, as well as any currency that is available by converting loyalty points for each one of these accounts so that the loyalty points can be used as currency toward balance due billing payments. Also available are calculations made by the mobile application of award thresholds if a payment is made so as to thereby realize more loyalty points that can then be converted into currency to satisfy the healthcare provider's balance due billing.

The various inputs and data that are retrieved are subjected to various calculations as derived from steps 1036 through 1040 so that the mobile application can make a recommendation as to each account 1042, and each amount to be paid from each account, that will be in the patient's best interest to pay a balance due billing received by the web-enabled mobile device from the patient's physician or other healthcare provider via a point of service terminal.

FIG. 10C shows an exemplary screen shot of a display terminal within embodiments of the RUAP. In one implementation, a horizontal and vertical icon is rendered on the screen so that a user can navigate to view vertical and horizontal portions of the display screen, as indicated by icons 1050, 1052. Screen shot shows the total balance due from the physician as well as each of the accounts 1 through N, and respective amounts to be paid from accounts 1 through N, as recommended by the mobile application to satisfy the healthcare provider's balance due billing. As shown in display screen, the patient can accept the recommended payments from each recommended account by clicking in one location. Alternatively, the patient can edit the respective accounts and their respective payments from each account, by 'clicking' on an icon at another location. As a third option, the user can 'click on' an icon to receive a rendering of an explanation on display screen as to why the recommendations from each account for each amount was recommended. The explanation will give the patient an understanding upon which the patient can base an approval, modification, or rejection of the recommended payments from each account.

Once the recommendations are accepted, the process taken place as shown in steps 1056 through 1060, where the patient's web-enabled mobile device transmits to the physician's point of service terminal a communication that describes the payment to be made from each account. An e-commerce server, shown at block 1058, processes each payment from each account as is described in FIG. 10B through the issuer processer, the acquirer processer, and the transaction handler (VisaNet) for a clearing and settlement process by which the physician's accounts receivable satisfied as to the balance due payment made by the patient, as shown in block 1056.

In one implementation, the patient may operate a web-enabled mobile computing device that can be executing a World Wide Web browser, or other special purpose software, in order to access databases.

In one implementation, the RUAP may allow the patient to view specifics of the balance due billing that the physician is charging the patient, as well as funds for payment of the balance due billing. The patient can provide information to the web-enabled mobile device in order to gain access to financial information stored by each issuer that issued an account to the patient. To access financial information for the patient, a name and password can be required. Once supplied by the patient, financial information can be sent and retrieved. This information can include account issuer identifiers (e.g.; account numbers), the name of the issuer who issued the account numbers, and any amounts that the financially responsible person wishes to pay on balance due billing to the doctor. Specifics of a bill that the patient can view may include: (i) the healthcare organization name that provided healthcare services to the patient, (ii) the name of the physician who treated the patient, (iii) the name of the person who is financially responsible for the patient, (iv) the name of the patient, (v) the date the services were provided by the doctor to the patient, (vi) a description of the healthcare goods and/or services that were rendered to the patient by the doctor, (vii) any amounts paid by the insurance company for the foregoing healthcare goods and services, and (viii) any balance due by the person who is financially responsible for the patient to the healthcare organization.

Figure 11A:
FIGS. 11A-11D provide various exemplary PoS terminal interfaces for user checkout with snap bill/QR code (e.g., see FIG. 2C) within embodiments of the RUAP.

FIGS. 11A-11D provide various exemplary PoS terminal interfaces for user checkout with snap bill/QR code (e.g., see FIG. 2C) within embodiments of the RUAP. With reference to FIG. 11A, in some implementations, such merchant-product information embodying QR codes may be utilized by a point-of-sale ("POS") terminal, e.g., 1110a-b. For example, in a brick-and-mortar store, the POS terminal may display a QR code, e.g., 1111a-b, that includes the purchase payment amount, e.g., 1112a-b, upon the user indicating that the user wishes to checkout the items in the user's physical shopping cart.

In one implementation, when the PoS terminal comprises a smart component, e.g., as described in FIG. 2A, the PoS terminal may determine whether an item is eligible for any restricted-use account. For example, the PoS terminal may display a message 1112*c* showing a list of pharmaceutical items eligible for FSA, and prompt a cashier and/or the user to determine whether they would like to check out with the FSA account. If the user selects "yes" at the screen 1112C, the PoS terminal may generate a separate bill for the FSA eligible items 1112*d*, and the user may proceed to payment with the FSA account for the eligible items only. In this case, the user may not need a smart phone or electronic wallet to engage in RUAP service, as the PoS terminal may provide a user interface for the user.

Figure 11B:
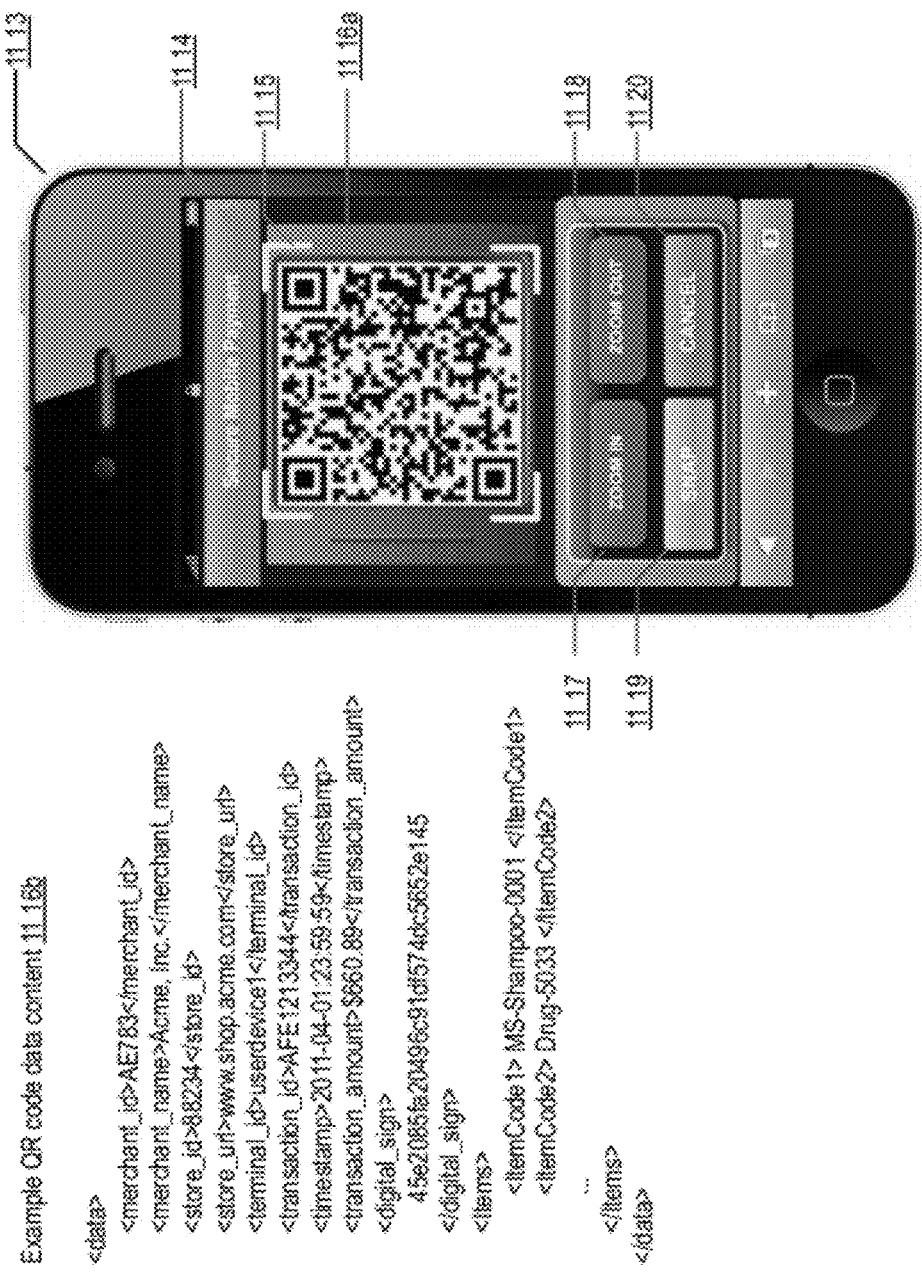

With reference to FIG. 11B, in some implementations, the user may obtain a snapshot of the QR code displayed on the screen of the secure display or the POS terminal using a smartphone, e.g., 1113. For example, the user's smartphone may have an app, e.g., 1114, executing on it to detect and capture QR codes, e.g., 1116*a*. For example, the user may utilize registration features, e.g., 1115, to align the QR code within the display of the smartphone. The app may, in some implementations, provide the user with the ability to zoom in, e.g., 1117, or zoom out, e.g., 1118, of the QR code to ensure that the image of the QR code fits within the dimensions of the screen of the smartphone. Upon aligning the QR code within the display of the smartphone, the user may be able to obtain a snapshot of the QR code using a user interface element, e.g., 1119. The user may cancel the snap mobile payment procedure using a user interface element 1120 on the display of the smartphone.

Figure 11C:
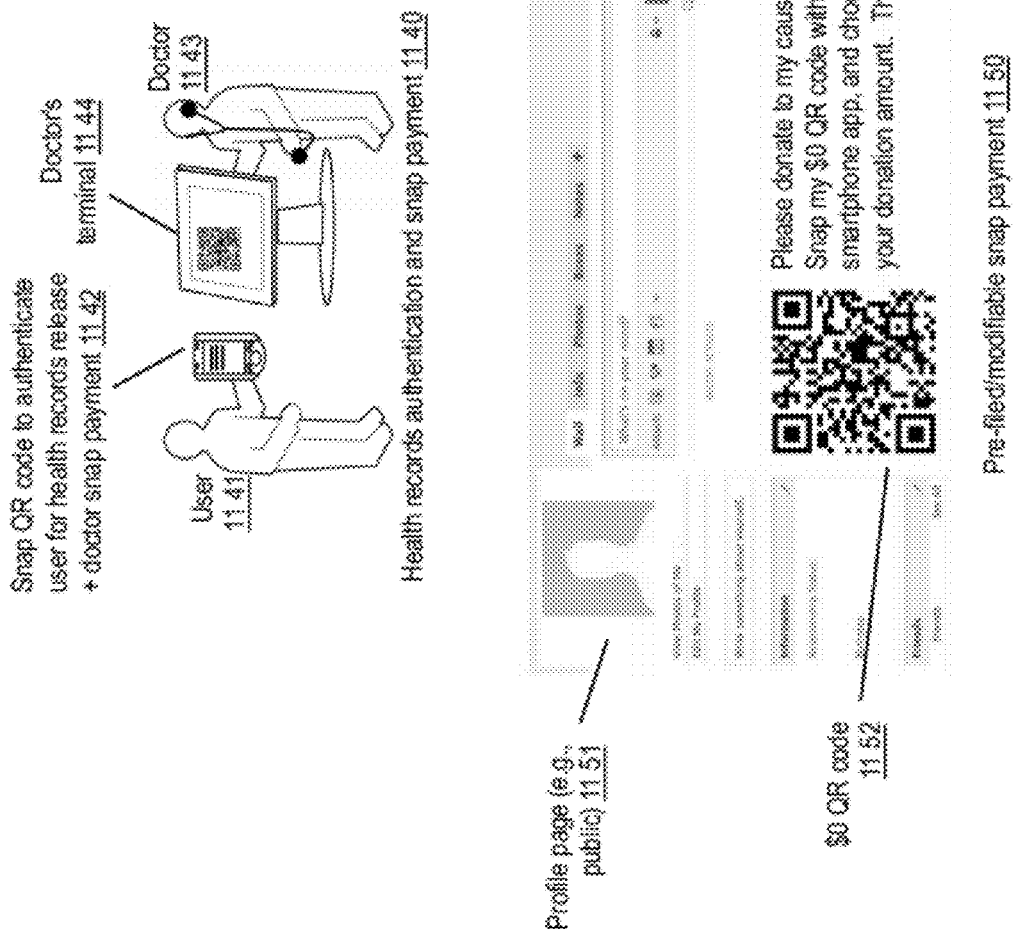
Figure 11D:
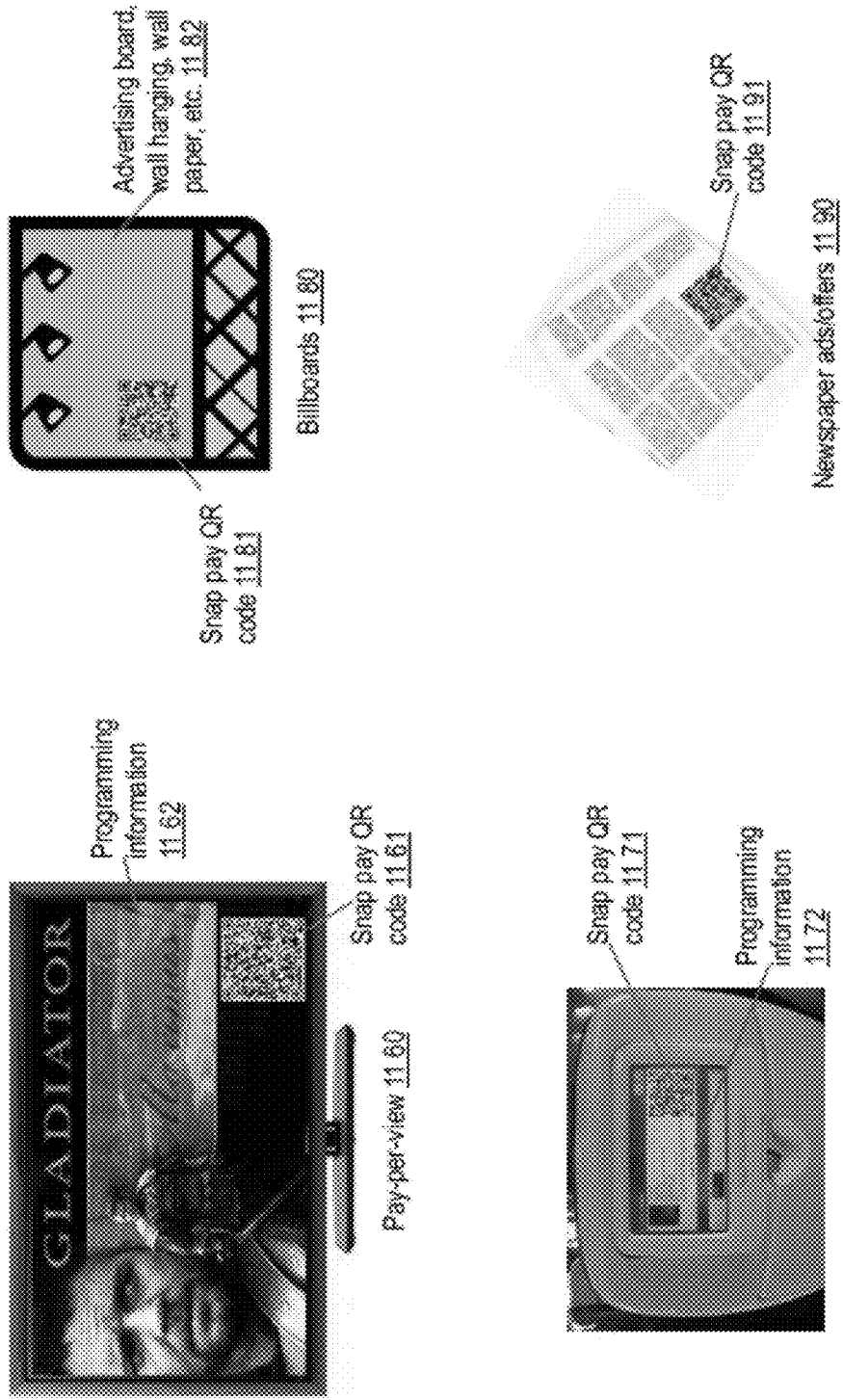

With reference to FIG. 11C, in some implementations, RUAP reimbursement may be utilized for authentication/verification purposes, and for providing digital consent for disclosure of personal and/or private information. For example, a user 1142 visiting his/her doctor 1143 may be required to provide informed consent to disclosing personal information (e.g., medical records) to the doctor. The doctor's terminal may generate a QR code embodying the doctor's digital certificate as well as information on the type/content of medical records of the user that are requested, e.g., 1144. The user may snap the QR code via the user's mobile device. The user's mobile device may generate a request for records release according to the QR code, and also serve as verification that the request is obtained from a personal trusted device (e.g., the user's mobile device). In alternate implementations, the user may be able to select the personal information that the user would like to reveal to the healthcare provider, and the user's mobile device may generate a QR code for the doctor's terminal to obtain a snapshot for retrieving the user's medical information. In some implementations, the QR code may also include payment information (e.g., the user's pay account information, or the doctor's acquirer information) along with the information on controlled release of personal information.

In some implementations, the RUAP may facilitate P2P transactions via pre-filled, modifiable QR payment codes, e.g., 1150. For example, a first user having a public profile page, e.g., 1151, may place an image of a QR code in the public profile, e.g., 1152. For example, the QR code may include a predetermined payment amount for a purchase transaction initiated by capturing a snapshot of the QR code. In some implementations, the predetermined amount may be $0 (e.g., a $0 QR pay code). A second user may capture a snapshot of the QR pay code using a mobile device, and may set an amount that the second user would like to pay the first user via the second user's mobile device. The second user's mobile device may provide the information encoded within the QR code along with the second-user-chosen payment amount to a payment network for transaction processing.

It is to be understood that the various aspects described herein of snap mobile payment may be utilized for any controlled exchange of information and/or payment. For example, with reference to FIG. 11D, in some implementations, a user may obtain pay-per-view programming via snap mobile payment, e.g., 1160. For example, a television display may provide an advertisement including programming information, e.g., 1162, as well as a QR pay code for obtain the programming content, e.g., 1161. The QR code may include information identifying the programming information, as well as information identifying the television subscriber account information, television machine address, and/or the like. The user may obtain a snapshot of the QR code, and provide the information embodied in the QR code along with information from the user's mobile device (e.g., subscriber account number linked to the user's virtual wallet, pay account information, and/or the like). Upon processing of the payment information by the payment network, the payment network may provide an indication to the television-programming provider of the payment completion, and the television-programming provider may stream the programming content to the user's television. As another example, a similar flow may be utilized for in-flight entertainment, e.g., 1170, wherein an in-flight screen may provide programming information 1172, as well as a QR pay code 1171 for the user to snap for in-flight entertainment initiation. As another example, a billboard, wall hanging, poster, in-store advertisement, hoarding, etc., e.g., 1180, may include an offer for a product/service, and a QR code including merchant information and product information identifying a purchase amount, and/or the like. The user may snap the QR code with the user's mobile device linked to the user's virtual wallet to purchase the product and/or service, and, if applicable, the product may be directly shipped to the user's address as specified by the purchase information exchanged with the payment network as part of the purchase request sent by the user's mobile device. As another example, newspapers, e.g., 1185, may include offers, advertisements, job postings, and/or the like including QR codes, e.g., 1186, embodying the information necessary for the user to initiate a purchase transaction with the payment network. It is to be understood that any aspects of implementing snap mobile payment discussed in any of the implementations herein, and/or their equivalents, may be utilized in any other implementations discussed herein, and/or their equivalents.

Figure 12A:
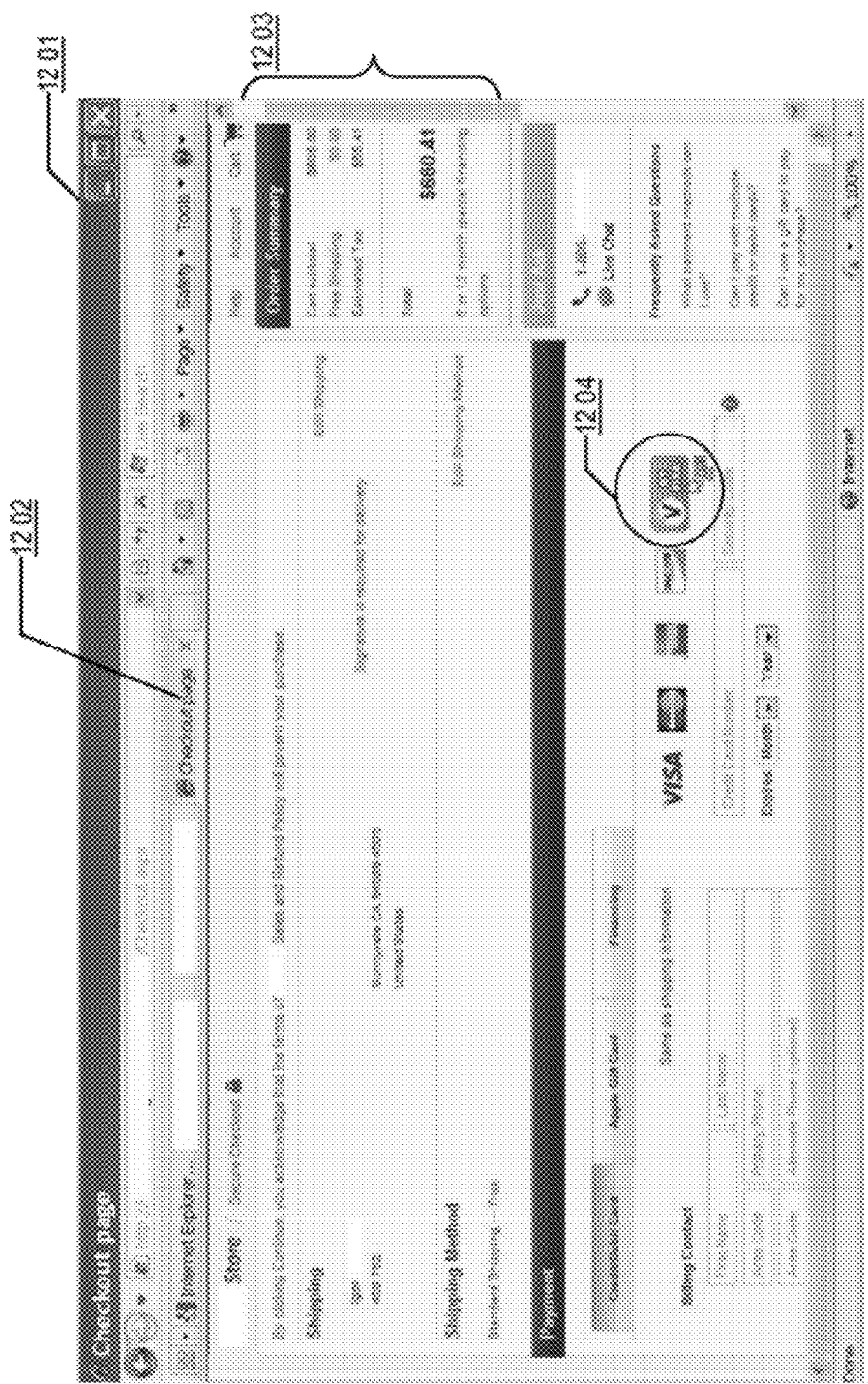
FIGS. 12A-12E provide exemplary UIs of a web-based shopping checkout with RUAP within embodiments of the RUAP.

FIGS. 12A-12E provide exemplary UIs of a web-based shopping checkout with RUAP within embodiments of the RUAP. With reference to FIG. 12A, in some implementations, a user may desire to checkout one or items stored in a virtual shopping cart of an online merchant website. For example, the user may be utilizing a browser application, e.g., 1201, to visualize a checkout page of the merchant website, e.g., 1202. The checkout webpage may depict details of the checkout order, e.g., 1203, and may provide one or more options for the user to provide payment for the purchase of the store items. In some implementations, the checkout webpage may include an option to pay for the purchase using a snap mobile payment procedure, e.g., 1204.

Figure 12B:
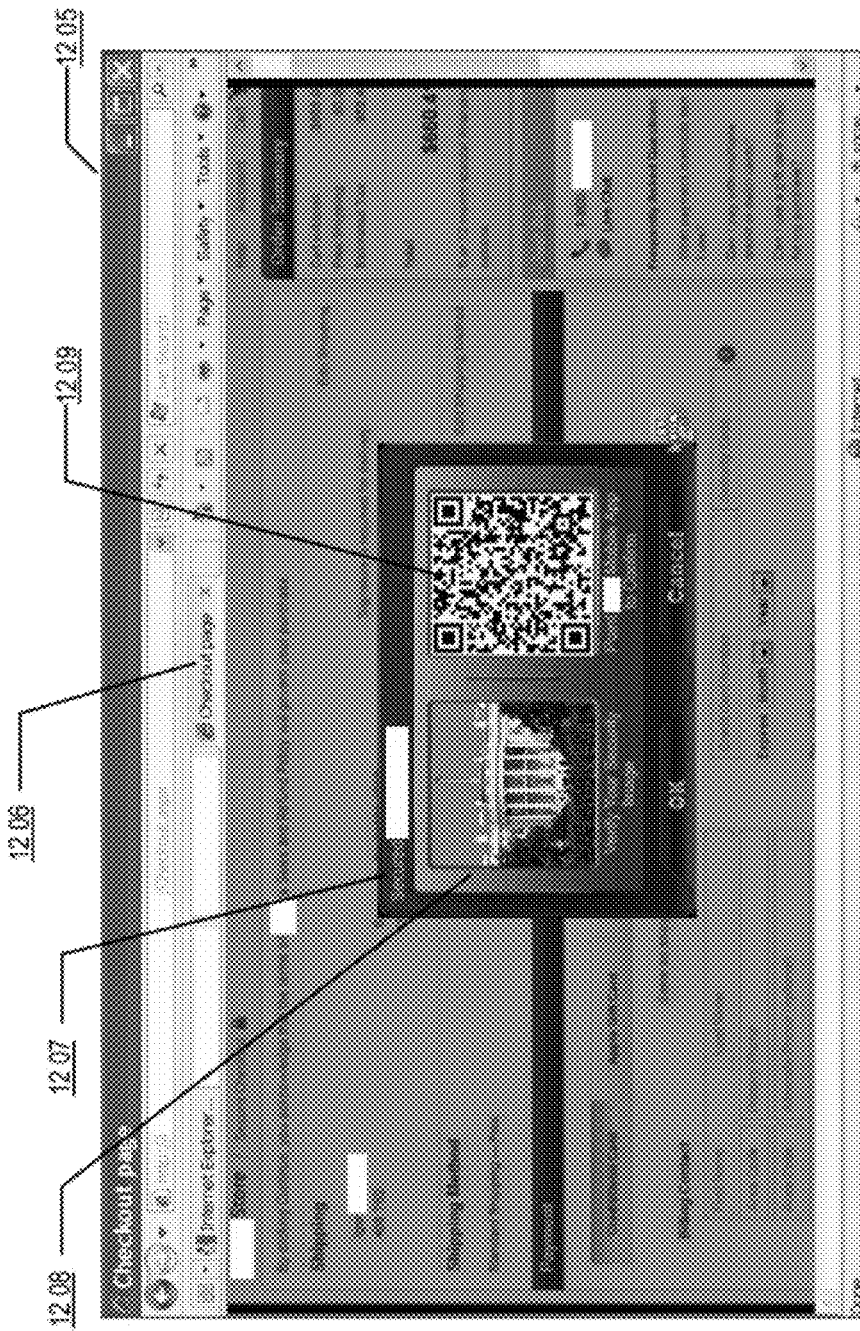

With reference to FIG. 12B, in some implementations, upon selecting the option to utilize the snap mobile payment procedure, the merchant checkout webpage, e.g., 1206, may provide via the browser application 1205, a QR code, e.g.,

1209, including information on the items in the virtual shopping cart as well as merchant information for the payment network to process the purchase transaction (e.g., a privacy token/alias linked to an acquirer financial account of the merchant). In some implementations, the webpage may be displayed via a secure display of a trusted computing device of the user. For example, as a security measure, the position of the QR code frame, e.g., 1207, within the display may be randomly varied to prevent a snapshot of the QR code from being obtained by fraudulent means (e.g., tampering with the trusted computing device). In some implementations, a security image, e.g., 1208, pre-selected by the user may be displayed on the screen so that the user may verify as being accurate. In some implementations, the image may be encrypted by the RUAP before providing it to the trusted computing device. In some implementations, the trusted computing device may be the only device to hold a decryption key required to decrypt and successfully display the image on the secure display to the user.

Figure 12C:
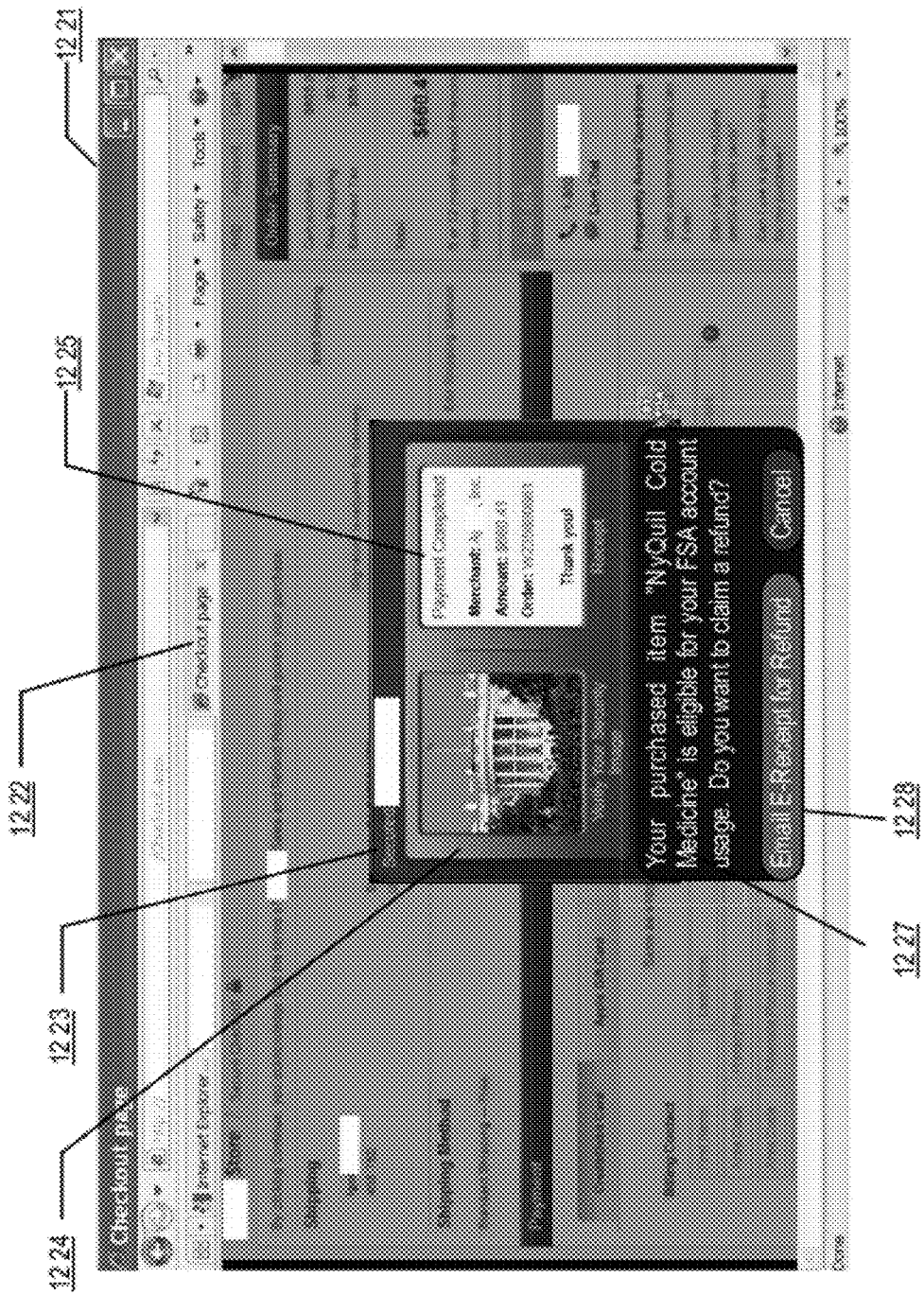

With reference to FIG. 12C, in some implementations, upon obtaining a snapshot of the merchant-product QR code, the user's smartphone may extract the product and merchant data stored within the QR code, and utilize an account for the user's virtual wallet linked to the user's smartphone to generate a purchase transaction request for processing by a payment network. Upon completion of processing of the payment transaction by the payment network using the information provided by the user's smartphone, the merchant website 1222 (via the browser application 1221) may provide a purchase receipt 1225 for the user. With reference to FIG. 12F, in implementations where the user utilizes the snap mobile payment procedure at a brick-and-mortar store, the POS terminal may display a purchase receipt for the user. In some implementations, the payment network may provide a purchaser receipt directly to the smartphone of the user. In further implementations, the user may enter a phone number, email address, instant messenger id, wallet id, social id, and/or the like, to the merchant PoS terminal, so that the terminal may send an electronic receipt to the user via email, SMS, instant messaging, wallet messaging, social messaging, and/or the like.

In one implementation, upon providing an electronic receipt, the RUAP may determine whether items in the receipt are eligible for a restricted-use account. For example, the RUAP may provide a RUAP alert 1227, notifying the user that one or more items are eligible for "FSA account usage," and inquire whether the user would like to claim a refund from the FSA account. In one implementation, the user may select to "email e-receipt for refund" 1228, and the RUAP may automatically forward the electronic receipt to the RUAP server for reimbursement processing (e.g., continuing on with 419 in FIG. 4A).

Figure 12D:
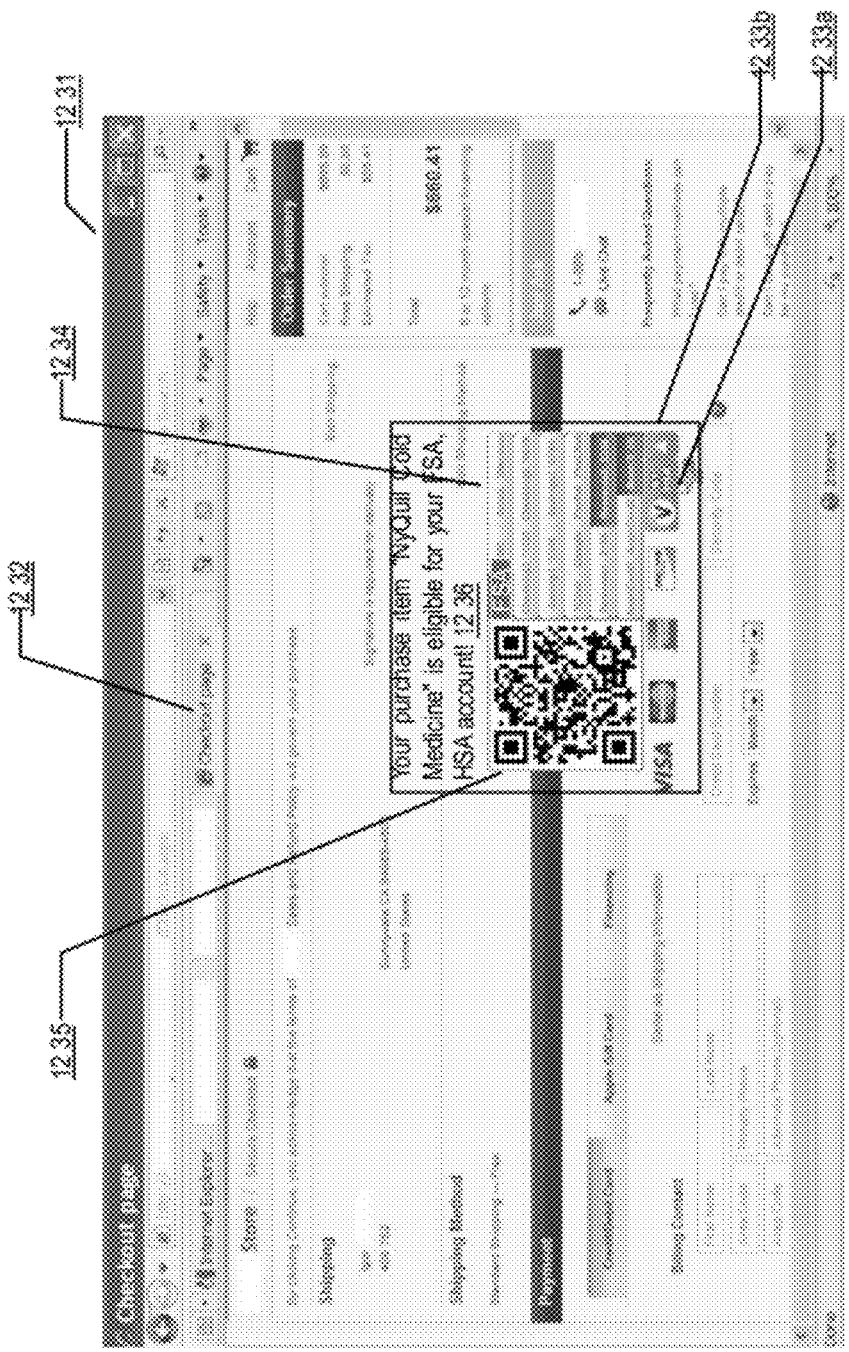

With reference to FIG. 12D, in some implementations, a user may be advantageously able to provide user settings into a device producing a QR code for a purchase transaction, and then capture the QR code using the user's mobile device. For example, a display device of a point-of-sale terminal may be displaying a checkout screen, such as a web browser executing on a client, e.g., 1231, displaying a checkout webpage of an online shopping website, e.g., 1232. In some implementations, the checkout screen may provide a user interface element, e.g., 1233*a-b*, whereby the user can indicate the desire to utilize snap mobile payment. For example, if the user activates element 1231*a*, the website may generate a QR code using default settings of the user, and display the QR code, e.g., 1235, on the screen of the client for the user to capture using the user's mobile device.

In some implementations, the user may be able to activate a user interface element, e.g., 1233*b*, whereby the client may display a pop-up menu, e.g., 1234, with additional options that the user may select from. For example, the website may provide user selection options similar to those discussed above in the description with reference to FIGS. 12B-C. In some implementations, the website may modify the QR code 1235 in real-time as the user modifies settings provided by activating the user interface element 1233*b*. Once the user has modified the settings using the pop-up menu, the user may capture a snapshot of the QR code to initiate purchase transaction processing.

In one implementation, the RUAP may generate a RUAP alert along with the pop-up window when one or more items are eligible for restricted-use accounts 1236. For another example, the RUAP may provide account recommendation by listing eligible restricted-use account (e.g., "FSA" as shown in FIG. 12D) on top of the account list.

Figure 12E:
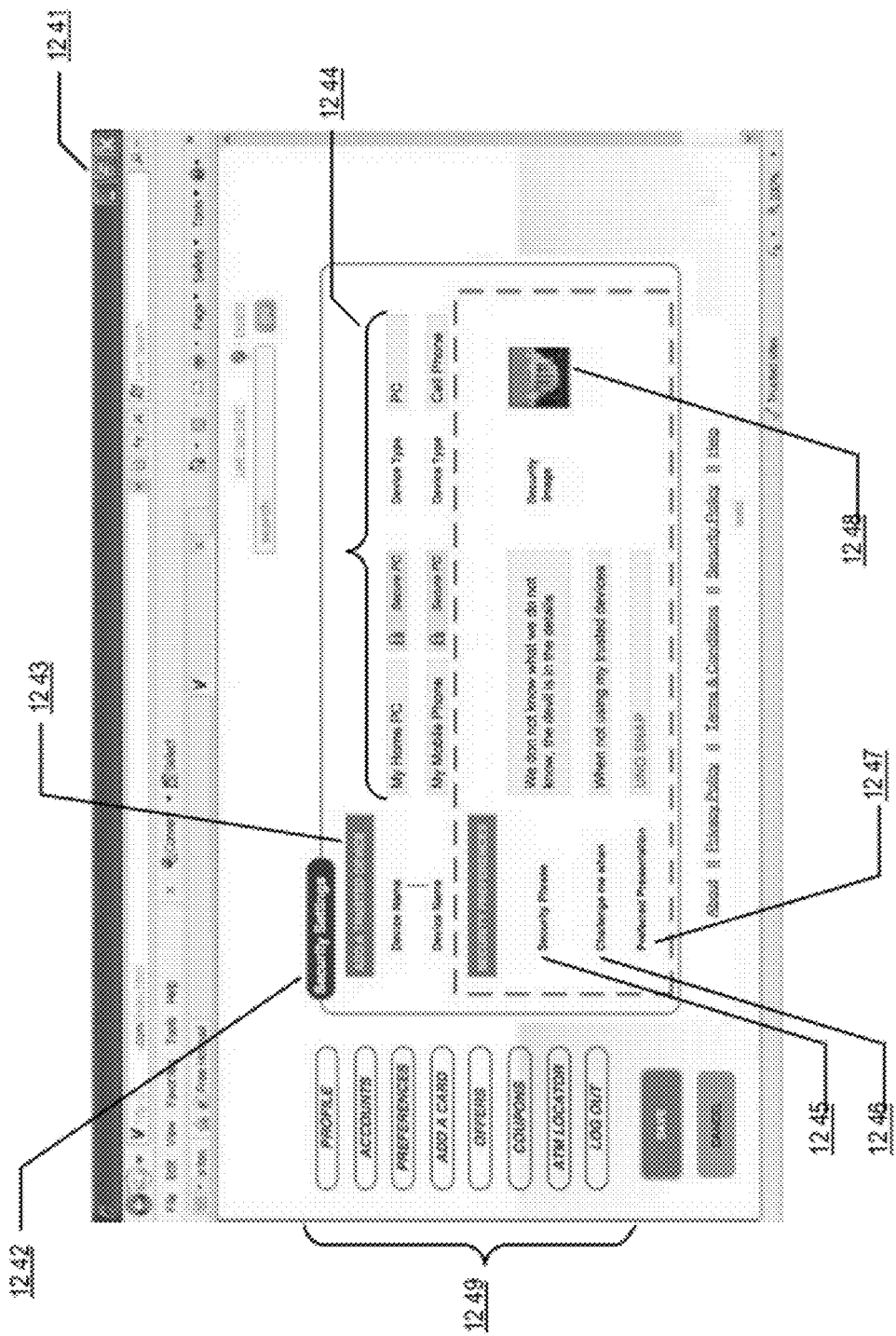

With reference to FIG. 12E, in some implementations, the RUAP may provide the user with a user interface to modify the user's snap mobile payment settings. For example, the RUAP may provide a web interface, e.g., 1241. For example, the user may be able to modify security settings of the user's virtual wallet, e.g., 1242, using the web interface. For example, the user may review a list of trusted device, e.g., 1244, via which the user may access the user's virtual wallet. In some implementations, the web interface may provide a user interface element to add a trusted device, e.g., 1243. The web interface may also provide the user with additional security options. For example, the user be able to set a security passphrase, e.g., 1245, modify settings for when the user should be challenged before authorizing a purchase transaction, e.g., 1246, the type/style of presentation of the security features, e.g., 1247, and a security image to be displayed on the terminal utilized in snap mobile payment, e.g., 1248. In various implementations, the user may be able to access other services including modifying user profiles, accounts, account preferences, adding cards, obtaining offers and coupons, locating ATM machines, etc.

Figure 13A:
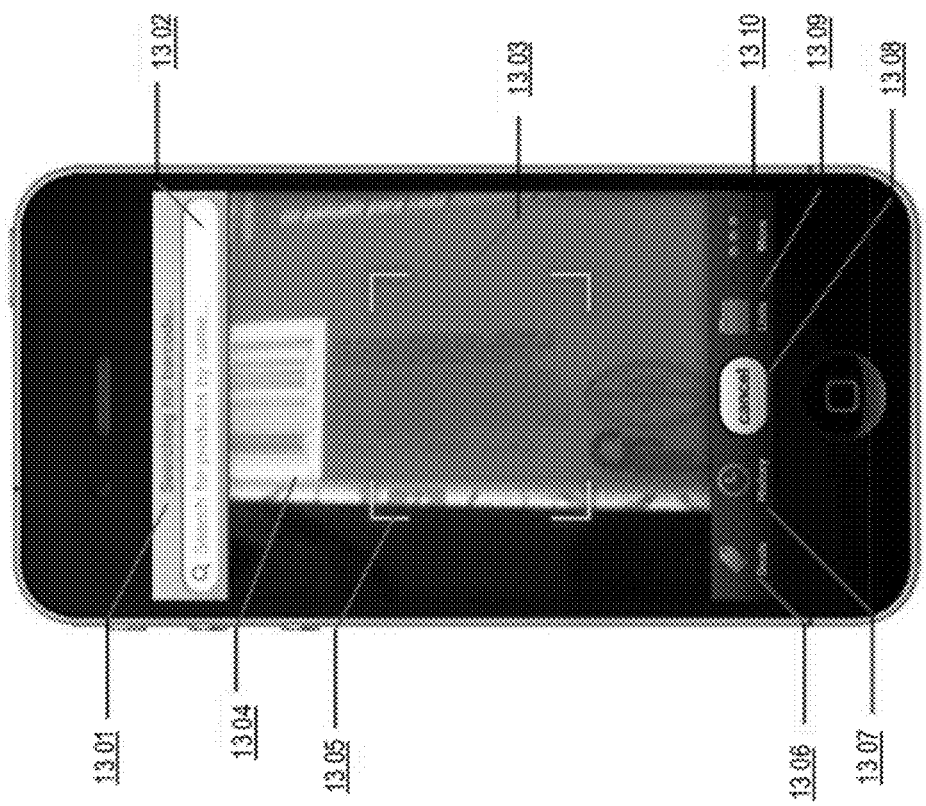
FIGS. 13A-13C provide exemplary mobile UIs illustrating user capturing a barcode/QR code for checkout/reimbursement within embodiments of the RUAP.
Figure 13B:
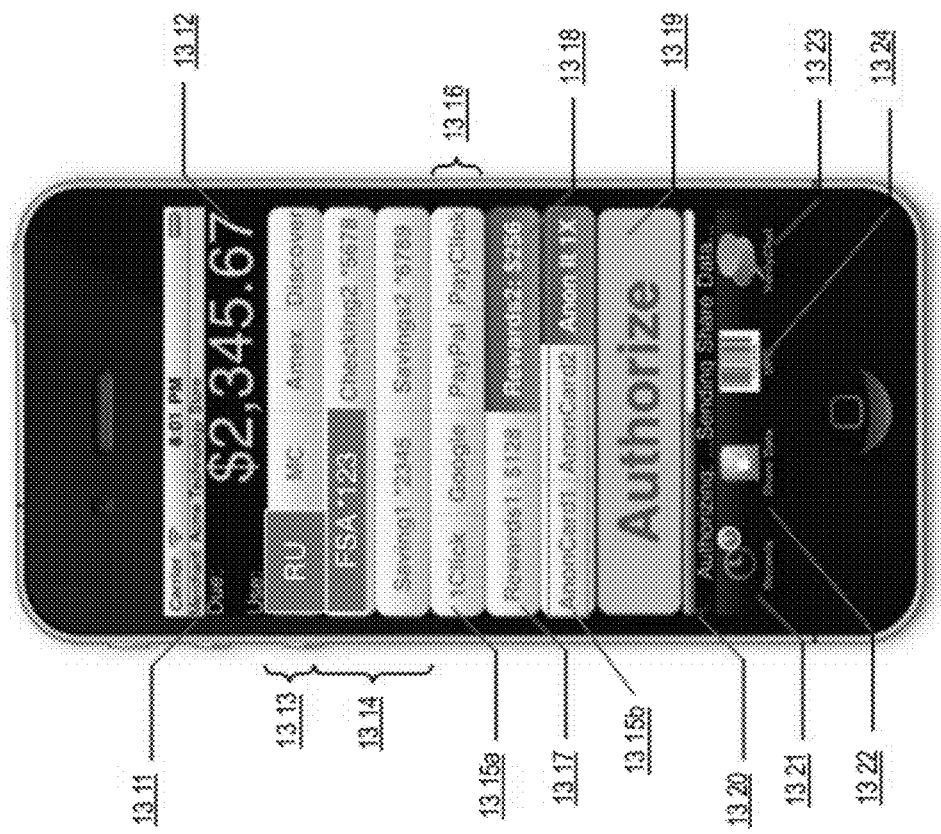
Figure 13C:
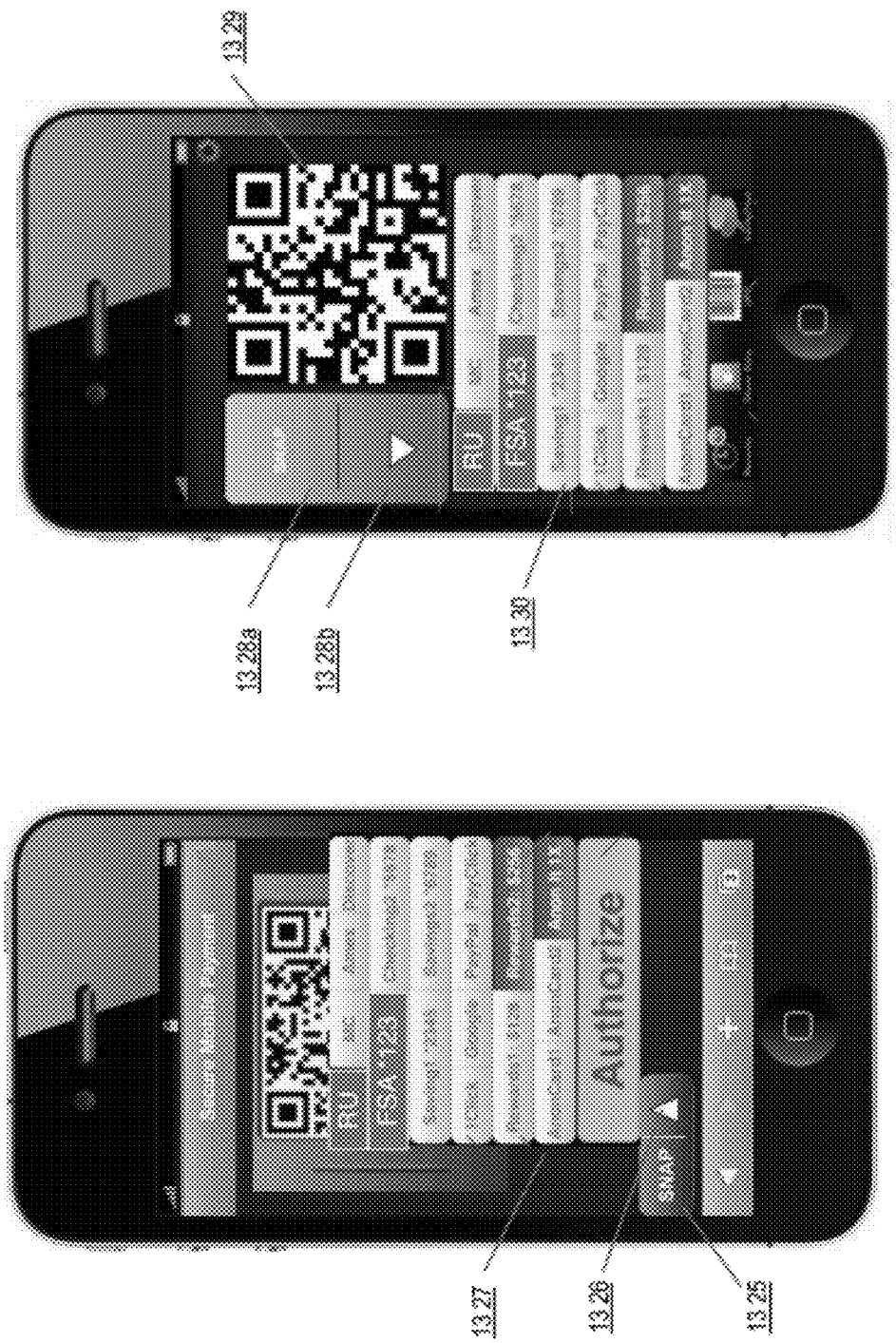

FIGS. 13A-13C provide exemplary mobile UIs illustrating user capturing a barcode/QR code for checkout/reimbursement within embodiments of the RUAP. It should be noted that although a mobile wallet platform is depicted, a digital/electronic wallet, a smart/prepaid card linked to a user's various payment accounts, and/or other payment platforms are contemplated embodiments as well; as such, subset and superset features and data sets of each or a combination of the aforementioned payment platforms may be accessed, modified, provided, stored, etc. via cloud/server services and a number of varying client devices throughout the instant specification. Similarly, although mobile wallet user interface elements are depicted, alternative and/or complementary user interfaces are also contemplated including: desktop applications, plug-ins to existing applications, stand alone mobile applications, web based applications (e.g., applications with web objects/frames, HTML applications/wrappers, web pages, etc.), and other interfaces are contemplated. It should be further noted that the RUAP payment processing component may be integrated with an digital/electronic wallet (e.g., a Visa V-Wallet, etc.), comprise a separate stand alone component instantiated on a user device, comprise a server/cloud accessed component, be loaded on a smart/prepaid card that can be substantiated at a PoS terminal (e.g., see 109 in FIG. 1B, 1715 in FIG. 17A), an ATM, a kiosk, etc., which may be accessed through a physical card proxy, and/or the like.

With reference to FIG. 13A, in some implementations, the app executing on the device of the user may include an app interface providing various features for the user. In some implementations, the app may be configured to recognize product identifiers (e.g., barcodes, QR codes, etc.), e.g., 1301. In some implementations, the user may be required to sign in to the app to enable its features. Once enabled, the camera may provide in-person one tap purchasing features for the user. For example, the client device may have a camera via which the app may acquire images, video data, streaming live video, and/or the like, e.g., 1303. The app may be configured to analyze the incoming data, and search, e.g., 1301, for a product identifier, e.g., 1304, such as QR codes 209, 211*a-b*, 216*a* and 227. In some implementations, the app may overlay cross-hairs, target box, and/or like alignment reference markers, e.g., 1305, so that a user may align the product identifier using the reference markers so facilitate product identifier recognition and interpretation. In some implementations, the app may include interface elements to allow the user to switch back and forth between the product identification mode and product offer interface display screens (see, e.g., 1306), so that a user may accurately study deals available to the user before capturing a product identifier. In some implementations, the app may provide the user with the ability to view prior product identifier captures (see, e.g., 1307) so that the user may be able to better decide which product identifier the user desires to capture. In some implementations, the user may desire to cancel product purchasing; the app may provide the user with a user interface element (e.g., 1308) to cancel the product identifier recognition procedure and return to the prior interface screen the user was utilizing. In some implementations, the user may be provided with information about products, user settings, merchants, offers, etc. in list form (see, e.g., 1309) so that the user may better understand the user's purchasing options. Various other features may be provided for in the app (see, e.g., 1310).

With reference to FIG. 13B, in some implementations, the app may include an indication of the location (e.g., name of the merchant store, geographical location, information about the aisle within the merchant store, etc.) of the user, e.g., 1311. The app may provide an indication of a pay amount due for the purchase of the product, e.g., 1312. In some implementations, the app may provide various options for the user to pay the amount for purchasing the product(s). For example, the app may utilize the GPS coordinates to determine the merchant store within the user is present, and direct the user to a website of the merchant. In some implementations, the RUAP may provide an API for participating merchants directly to facilitate transaction processing. In some implementations, a merchant-branded RUAP application may be developed with the RUAP functionality, which may directly connect the user into the merchant's transaction processing system. For example, the user may choose from a number of accounts (e.g., credit cards, debit cards, prepaid cards, etc.) from various issuers, e.g., under the account type "RU" (restricted-use) at 1313. In some implementations, the app may provide the user the option to pay the purchase amount using funds included in an account of the user, e.g., a checking, savings, money market, current account, etc., e.g., a "FSA" account 1314. In some implementations, the user may have set default options for which card, bank account, etc. to use for the purchase transactions via the app. In some implementations, such setting of default options may allow the user to initiate the purchase transaction via a single click, tap, swipe, and/or other remedial user input action, e.g., 1315*a*. In some implementations, when the user utilizes such an option, the app may utilize the default settings of the user to initiate the purchase transaction. In some implementations, the app may allow the user to utilize other accounts (e.g., Google™ Checkout, Paypal™ account, etc.) to pay for the purchase transaction, e.g., 1316. In some implementations, the app may allow the user to utilize rewards points, airline miles, hotel points, electronic coupons, printed coupons (e.g., by capturing the printed coupons similar to the product identifier) etc., to pay for the purchase transaction, e.g., 1317-318. In some implementations, the app may provide an option to provide express authorization before initiating the purchase transaction, e.g., 1319. In some implementations, the app may provide a progress indicator provide indication on the progress of the transaction after the user has selected an option to initiate the purchase transaction, e.g., 1320. In some implementations, the app may provide the user with historical information on the user's prior purchases via the app, e.g., 1321. In some implementations, the app may provide the user with an option to share information about the purchase (e.g., via email, SMS, wall posting on Facebook®, tweet on Twitter™, etc.) with other users and/or control information shared with the merchant, acquirer, payment network etc., to process the purchase transaction, e.g., 1322. In some implementations the app may provide the user an option to display the product identification information captured by the client device (e.g., in order to show a customer service representative at the exit of a store the product information), e.g., 1324. In some implementations, the user, app, device and or RUAP may encounter an error in the processing. In such scenarios, the user may be able to chat with a customer service representative (e.g., VerifyChat 1323) to resolve the difficulties in the purchase transaction procedure.

In some implementations, the user may select to conduct the transaction using a one-time anonymized credit card number, see e.g., 1315*b*. For example, the RUAP may utilize a pre-designated anonymized set of card details (see, e.g., "AnonCard1," "AnonCard2"). As another example, the RUAP may generate, e.g., in real-time, a one-time anonymous set of card details to securely complete the purchase transaction (e.g., "Anon It 1X"). In such implementations, the app may automatically set the user profile settings such that the any personal identifying information of the user will not be provided to the merchant and/or other entities. In some implementations, the user may be required to enter a user name and password to enable the anonymization features.

With reference to FIG. 13C, in some implementations, the user interface elements of the snap mobile payment app may be advantageously arranged to provide the user the ability to process a purchase with customized payment parameters with a minimum number of user gestures applied to the user's mobile device. For example, the user may be provided with an overloaded user interface element, e.g., 1325-326. For example, if the user has a QR pay code within the viewing angle of a camera included in the user's mobile device, the user may activate element 1325 to snap the QR code and utilize predetermined default settings to process the purchase based on the QR code. However, if the user wishes to customize the payment parameters, the user may activate user interface element 1326 (e.g., press and continue to hold). Upon doing so, the app may provide a pop-up menu, e.g., 1327, providing a variety of payment customization choices, such as those provided previously. The user may, e.g., drag the user's finger to the appropriate settings the user prefers, and release the user's finger from the touchscreen of the user's mobile device to select the setting for payment processing. In alternate implementations, the payment settings options, e.g., 1330, and QR capture activation buttons, e.g., 1328*a-b* (e.g., 1328*b*) may provide even more settings that those displayed in the initial screen), may be included in the user interface along with a window, e.g., 1329, for capturing the QR code via the mobile device's camera. In alternate implementations, the user's mobile device may generate a hybrid QR code-payment settings graphic, and the POS terminal (or user's trusted computing device) may capture the entire graphic for payment processing.

Figure 14A:
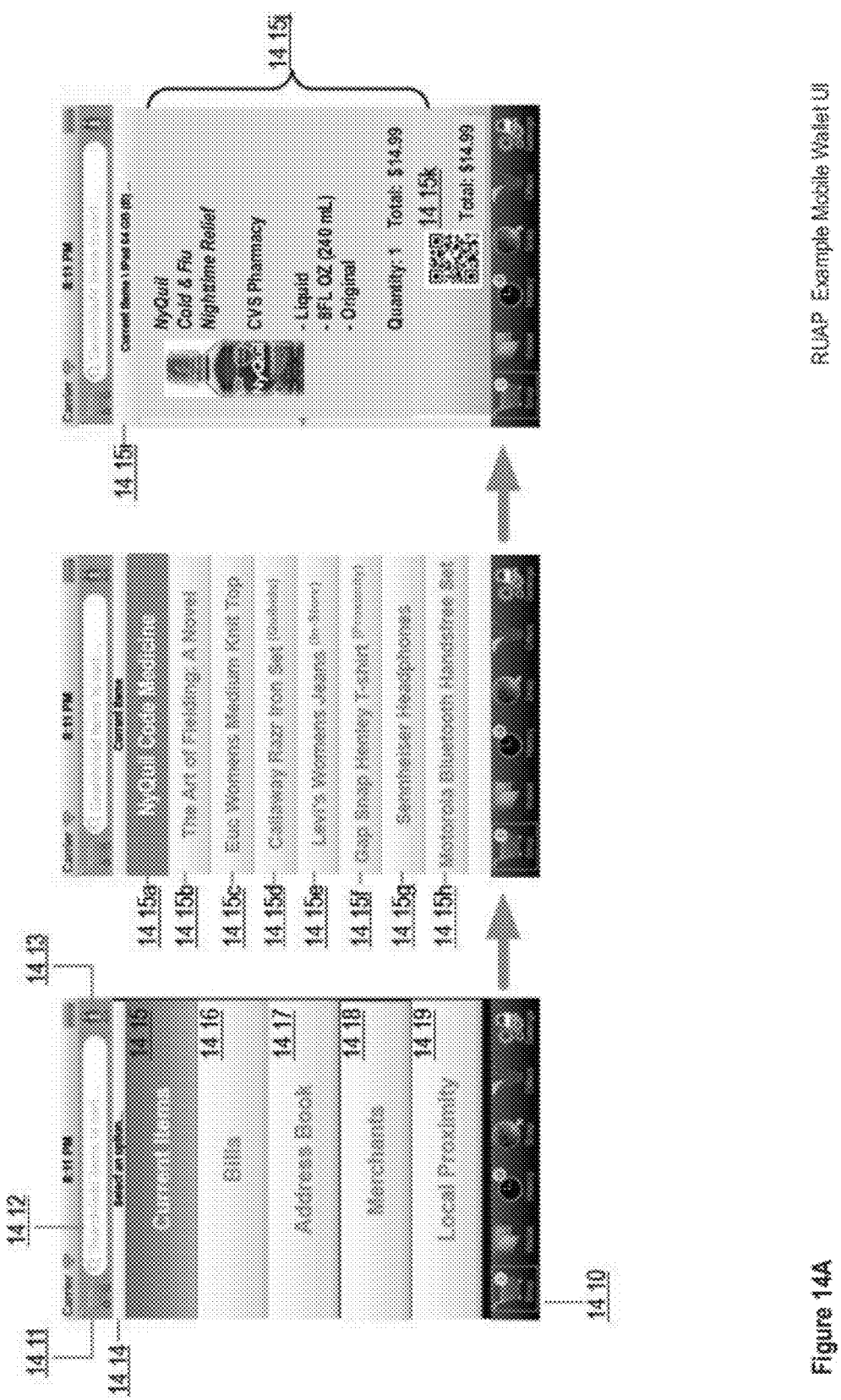
Figure 14B:
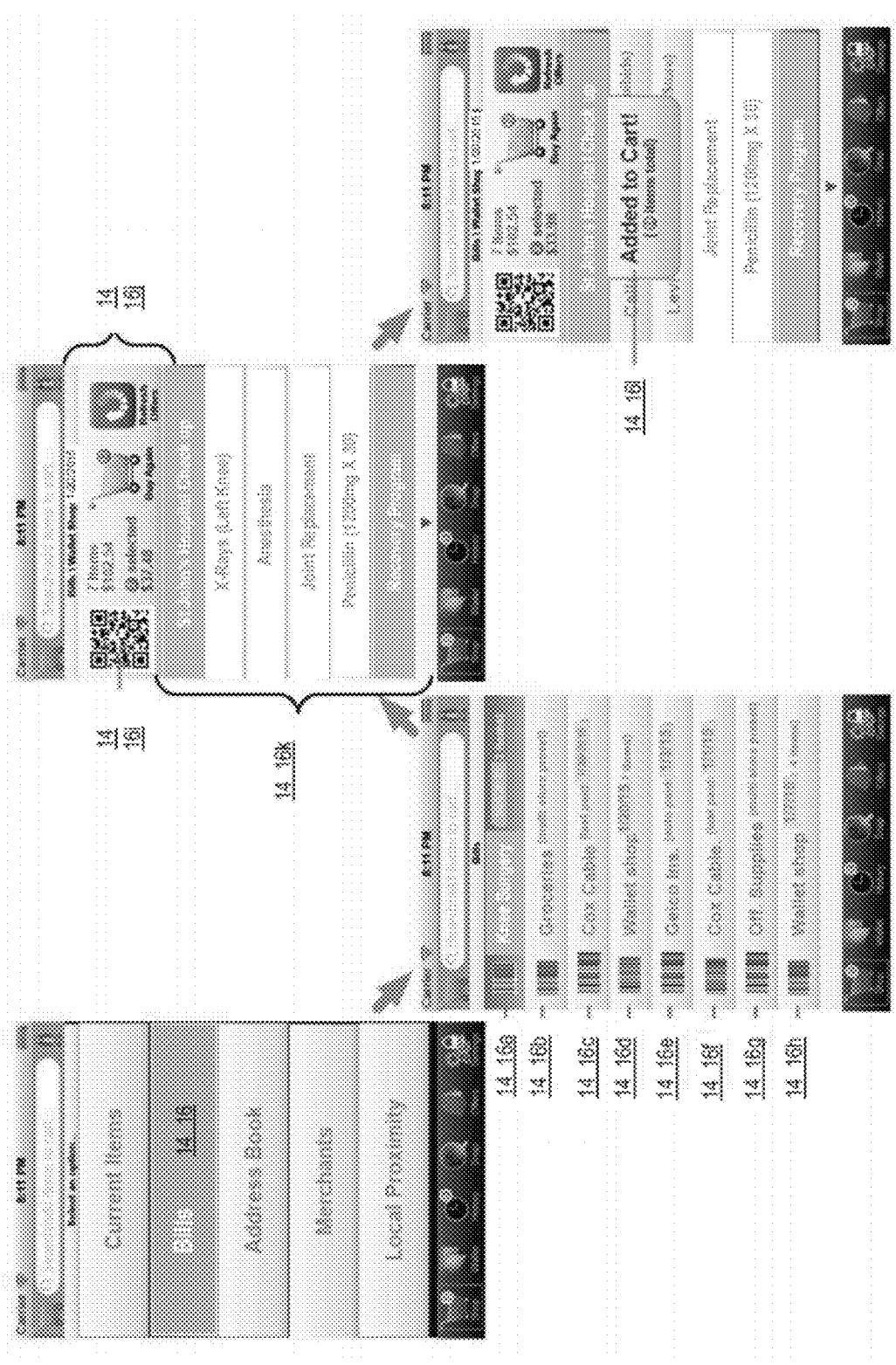
Figure 14C:
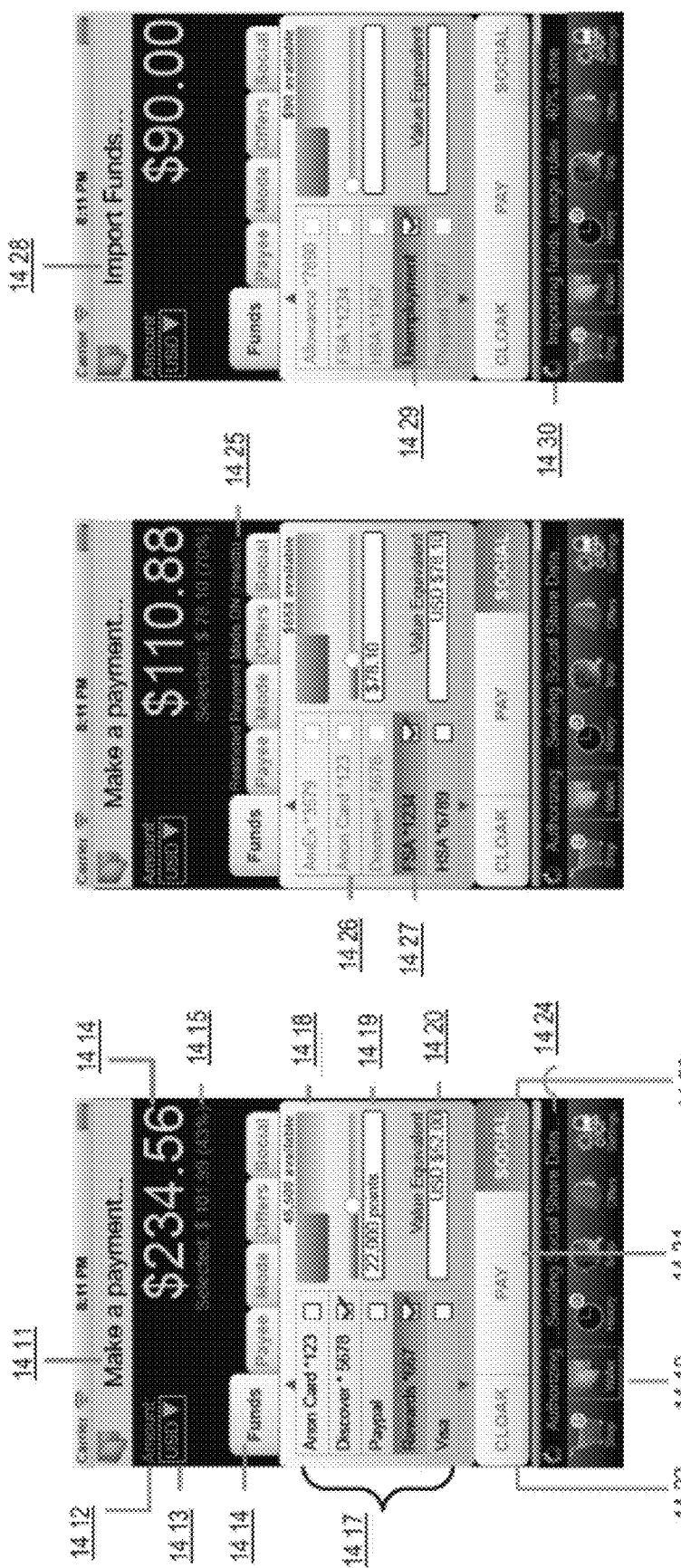

FIGS. 14A-14C provide exemplary mobile wallet UIs illustrating making a payment within embodiments of the RUAP. With reference to FIG. 14A, some embodiments of the virtual wallet mobile app facilitate and greatly enhance the shopping experience of consumers. A variety of shopping modes, as shown in FIG. 1914A, may be available for a consumer to peruse. In one implementation, for example, a user may launch the shopping mode by selecting the shop icon 1410 at the bottom of the user interface. A user may type in an item in the search field 1412 to search and/or add an item to a cart 1411. A user may also use a voice activated shopping mode by saying the name or description of an item to be searched and/or added to the cart into a microphone 1413. In a further implementation, a user may also select other shopping options 1414 such as current items 1415, bills 1416, address book 1417, merchants 1418 and local proximity 1419.

In one embodiment, for example, a user may select the option current items 1415, as shown in the left most user interface of FIG. 14A. When the current items 1415 option is selected, the middle user interface may be displayed. As shown, the middle user interface may provide a current list of items 1415*a-h* in a user's shopping cart 1411. A user may select an item, for example item 1415*a*, to view product description 1415*j* of the selected item and/or other items from the same merchant. The price and total payable information may also be displayed, along with a QR code 1415*k* that captures the information necessary to effect a snap mobile purchase transaction.

With reference to FIG. 14B, in another embodiment, a user may select the bills 1416 option. Upon selecting the bills 1416 option, the user interface may display a list of bills and/or receipts 1416*a-h* from one or more merchants. Next to each of the bills, additional information such as date of visit, whether items from multiple stores are present, last bill payment date, auto-payment, number of items, and/or the like may be displayed. In one example, the wallet shop bill 1416*a* dated Jan. 20, 2015 may be selected. The wallet shop bill selection may display a user interface that provides a variety of information regarding the selected bill. For example, the user interface may display a list of items 1416*k* purchased, <<916*i*>>, a total number of items and the corresponding value. For example, as shown at 1416*a*, the user may elect to pay for a bill for "Knee Surgery" 1416*a* performed at Jan. 20, 2015, which comprises details of the healthcare treatment performed for the user 1416*k*.

A user may now select any of the items and select buy again to add purchase the items. The user may also refresh offers 1416*j* to clear any invalid offers from last time and/or search for new offers that may be applicable for the current purchase. As shown in FIG. 14A, a user may select two items for repeat purchase. Upon addition, a message 1416*l* may be displayed to confirm the addition of the two items, which makes the total number of items in the cart 14.

In some implementations, the RUAP wallet may provide the RUAP with the GPS location of the user. Based on the GPS location of the user, the RUAP may determine the context of the user (e.g., whether the user is in a store, doctor's office, hospital, postal service office, etc.). Based on the context, the user app may present the appropriate fields to the user, from which the user may select fields and/or field values to send as part of the purchase order transmission. For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 14C, in one embodiment, the wallet mobile application may provide a user with a number of options for paying for a transaction via the wallet mode. In one implementation, an example user interface 1411 for making a payment is shown. The user interface may clearly identify the amount 1412 and the currency for the transaction. The amount may be the amount payable and the currency may include real currencies such as dollars and euros, as well as virtual currencies such as reward points. The amount of the transaction 1414 may also be prominently displayed on the user interface. The user may select the funds tab 1416 to select one or more forms of payment 1417, which may include various credit, debit, gift, rewards and/or prepaid cards. The user may also have the option of paying, wholly or in part, with reward points. For example, the graphical indicator 1418 on the user interface shows the number of points available, the graphical indicator 1419 shows the number of points to be used towards the amount due 234.56 and the equivalent 1420 of the number of points in a selected currency (USD, for example).

In one implementation, the user may combine funds from multiple sources to pay for the transaction. The amount 1419 displayed on the user interface may provide an indication of the amount of total funds covered so far by the selected forms of payment (e.g., Discover card and rewards points). The user may choose another form of payment or adjust the amount to be debited from one or more forms of payment until the amount 1419 matches the amount payable 1414. Once the amounts to be debited from one or more forms of payment are finalized by the user, payment authorization may begin.

In one implementation, the user may select a secure authorization of the transaction by selecting the cloak button 1422 to effectively cloak or anonymize some (e.g., preconfigured) or all identifying information such that when the user selects pay button 1421, the transaction authorization is conducted in a secure and anonymous manner. In another implementation, the user may select the pay button 1421 which may use standard authorization techniques for transaction processing. In yet another implementation, when the user selects the social button 1423, a message regarding the transaction may be communicated to one of more social networks (set up by the user) which may post or announce the purchase transaction in a social forum such as a wall post or a tweet. In one implementation, the user may select a social payment processing option 1423. The indicator 1424 may show the authorizing and sending social share data in progress.

In another implementation, a restricted payment mode 1429 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 1426 under the funds tab to select specialized accounts such as a flexible spending account (FSA) 1427, health savings account (HSA), and/or the like and amounts to be debited to the selected accounts. In one implementation, such restricted payment mode 1429 processing may disable social sharing of purchase information.

In one embodiment, the wallet mobile application may facilitate importing of funds via the import funds user interface 1428. For example, a user who is unemployed may obtain unemployment benefit fund 1429 via the wallet mobile application. In one implementation, the entity providing the funds may also configure rules for using the fund as shown by the processing indicator message 1430. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 14D:

With reference to FIG. 14D, in some other embodiments, a user may select merchants 1418 from the list of options in the shopping mode to view a select list of merchants 1418*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 1418*a* for example. The user may then navigate through the merchant's listings to find items of interest such as 1418*f-j*. Directly through the wallet and without visiting the merchant site from a separate page, the user may make a selection of an item 1418*j* from the catalog of Amazon 1418*a*. As shown in the right most user interface of FIG. 14D, the selected item may then be added to cart. The message 1418*k* indicates that the selected item has been added to the cart, and updated number of items in the cart is now 13.

Figure 14E:

With reference to FIG. 14E, in one embodiment, there may be a local proximity option 1419 which may be selected by a user to view a list of merchants that are geographically in close proximity to the user. For example, the list of merchants 1419*a-e* may be the merchants that are located close to the user. In one implementation, the mobile application may further identify when the user in a store based on the user's location. For example, position icon 1419*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 1419*f-j* available on aisle 5 of Walgreens. In one implementation, the user may select corn 1419*i* from his or her mobile application to add to cart 1419*k*. In one implementation, the wallet shopping cart may provide a RUAP alert 1420 notifying the purchased items (e.g., grocery items 1419*f-j*) are eligible for food voucher redemption.

Figure 14F:
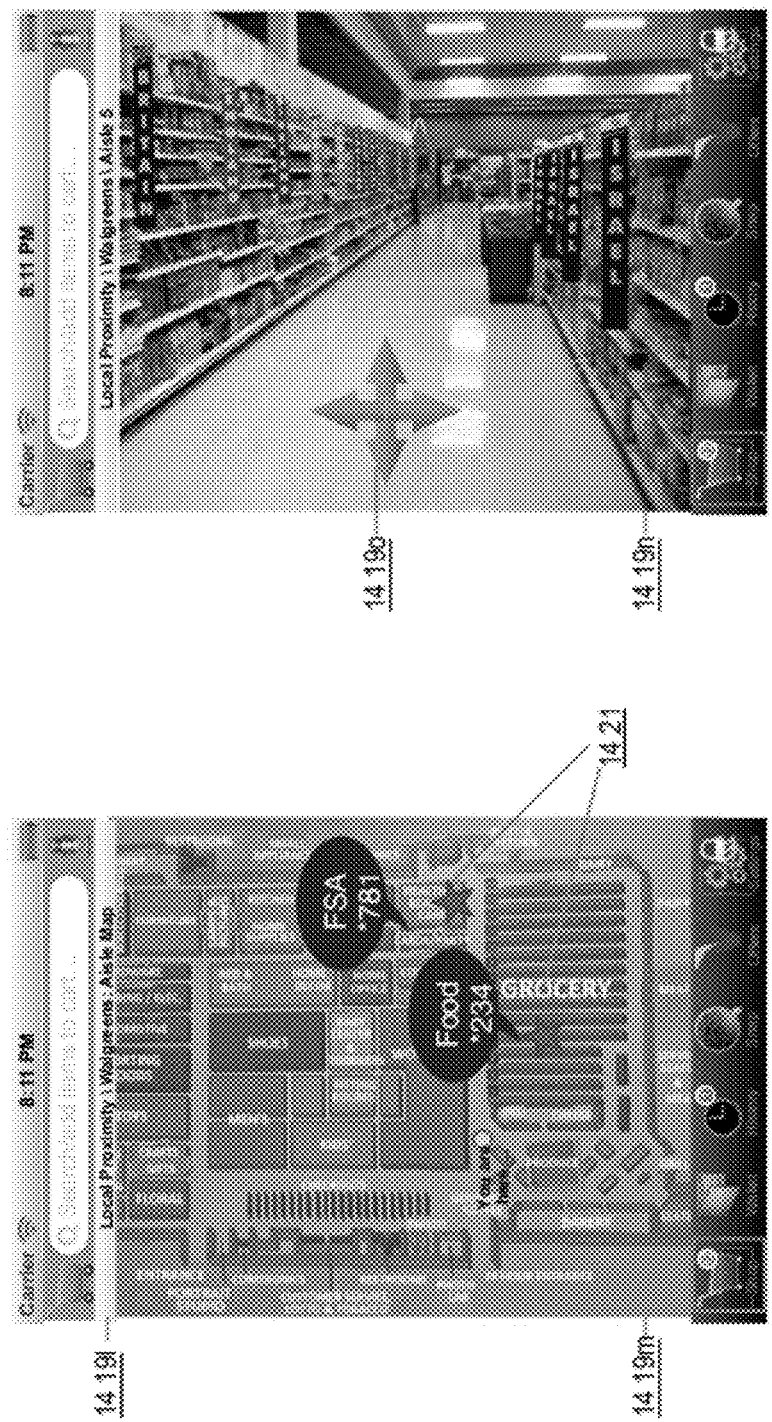

With reference to FIG. 14F, in another embodiment, the local proximity option 1419 may include a store map and a real time map features among others. For example, upon selecting the Walgreens store, the user may launch an aisle map 14191 which displays a map 1419*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 1419*n* may display images/video of the user's surrounding. For example, if the user is about to enter aisle 5, the store view map may show the view of aisle 5. Further the user may manipulate the orientation of the map using the navigation tool 14190 to move the store view forwards, backwards, right, left as well clockwise and counterclockwise rotation.

In further implementations, the RUAP may tag the store map view, e.g., 1421, to indicate purchase item categories that are potentially eligible for restricted-account usage. For example, products in the "grocery" area may be eligible for the user's food stamp/voucher usage; products in the "pharmacy" area may be eligible for various healthcare restricted-use accounts, e.g., FSA, HSA, etc.

FIG. 14G provides a mobile user interface diagram illustrating example features of augmented reality in-store scanning 1450 within embodiments of the RUAP. For example, the RUAP wallet component may allow a user to place a camera enabled device at a merchant store (e.g., scanning), and view a camera scene with augmented reality labels to indicate possible items eligible for a restricted-use account.

For example, in one implementation, when the user operate the camera enabled device to obtain a view inside the merchant store 1450, the user may also obtain augmented reality labels 1451 which identifies various products/items on the shelf, and show one or more possible eligible restricted-use accounts 1452. For example, over the counter drugs may be labeled as eligible for "FSA, HSA, HRA," etc., 1452; grocery products may be eligible for food stamp usage; and infant food may be eligible for a children nutrition benefit account, and/or the like.

Figure 15A:
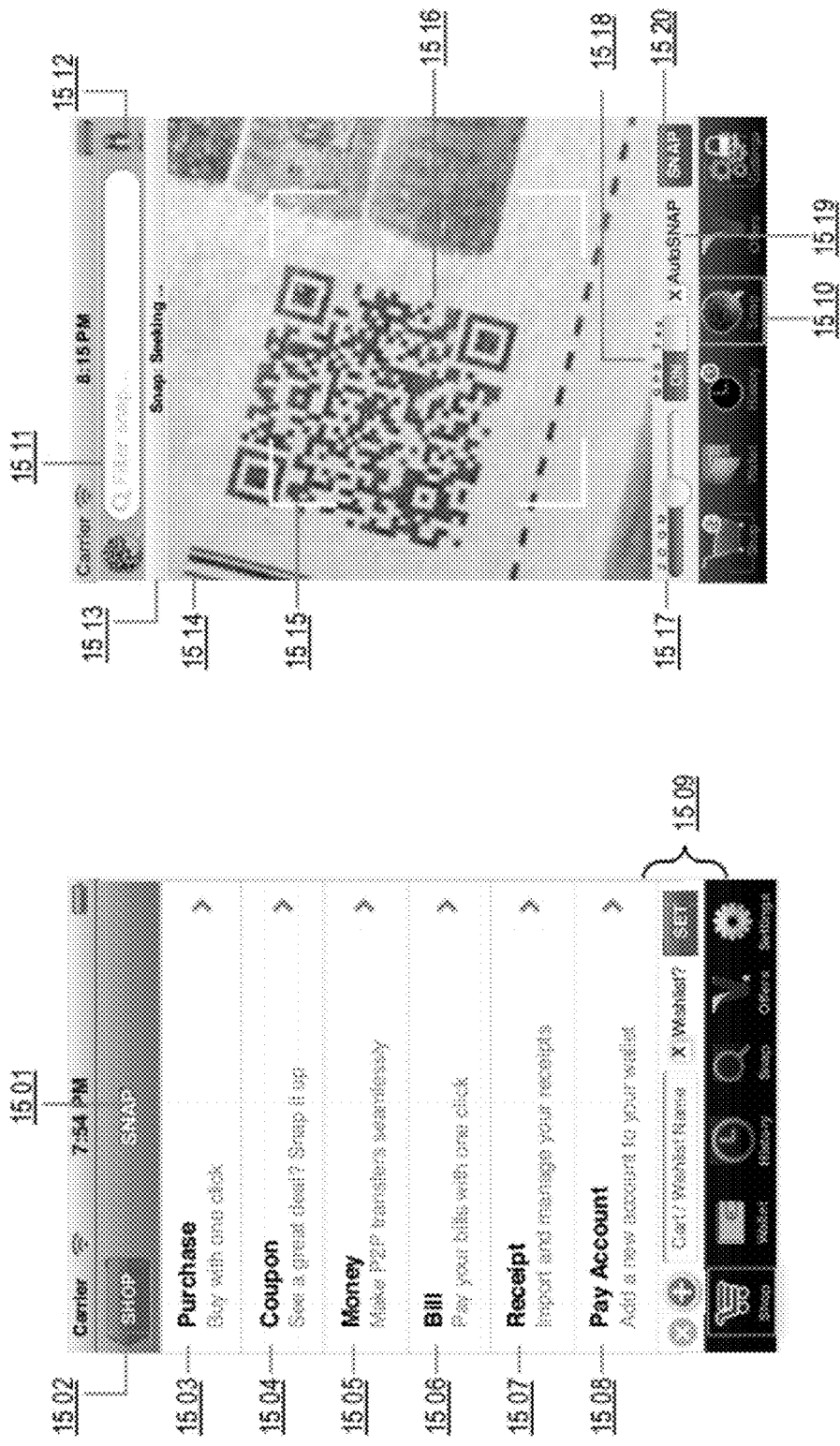

FIGS. 15A-15E show user interface diagrams illustrating example features of virtual wallet applications in a snap mode, in some embodiments of the RUAP. With reference to FIG. 15A, in some embodiments, a user may select a snap mode 1501 to access snap features. In various embodiments, the virtual wallet application may able to snap and identify a variety of items. For example, the virtual wallet application may be able to snap and identify a purchase invoice 1503, a coupon 104, money (e.g., sent in a person-to-person transfer) 1505, a bill (e.g., utilities, etc.) 1506, a receipt (e.g., for storing, expense reporting, etc.) 1507, a pay account (e.g., to add a new credit/debit/prepaid card to the virtual wallet application) 1508. The user may be able to return to a shopping screen at any time by activating a graphical user interface element 1502. In some embodiments, the user may be able to set a name of a cart or wishlist stored within the user's virtual wallet application to which the item snapped should be sent (see 1509). In some embodiments, the virtual wallet application may allow a user to create a new cart or wishlist to which the snapped items should be added.

In one embodiment, a user may select the snap mode 1510 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 15A. A user may use his or her mobile phone to take a picture of a QR code 1515 and/or a barcode 1514. In one implementation, the bar 1513 and snap frame 1515 may assist the user in snapping codes properly. For example, the snap frame 1515, as shown, does not capture the entirety of the code 1516. As such, the code captured in this view may not be resolvable as information in the code may be incomplete. This is indicated by the message on the bar 1513 that indicates that the snap mode is still seeking the code. The user may modify the zoom level 1517 of the camera to facilitate snapping the QR code. When the code 1516 is completely framed by the snap frame 1515, the bar message may be updated to, for example, "snap found." Upon finding the code, in one implementation, the user may initiate code capture using the mobile device camera (see 1520). In another implementation, the snap mode may automatically snap the code using the mobile device camera (see 1519). In some implementations, the virtual wallet application may optionally apply a Global Positioning System tag (see 1518) to the QR code before storing it, or utilizing it in a transaction.

Figure 15B:

With reference to FIG. 15B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1522 the receipt 1523 the user wants to reallocate. Alternatively, the user may directly snap a picture of a barcode on a receipt, and the snap mode may generate and display a receipt 1523 using information from the barcode. The user may now reallocate 1525. In some implementations, the user may also dispute the transaction 1524 or archive the receipt 1526.

In one implementation, when the reallocate button 1525 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1527 may be generated after the completion of the reallocation process. As discussed, the receipt shows that some charges have been moved from the Visa account to the FSA.

Figure 15C:
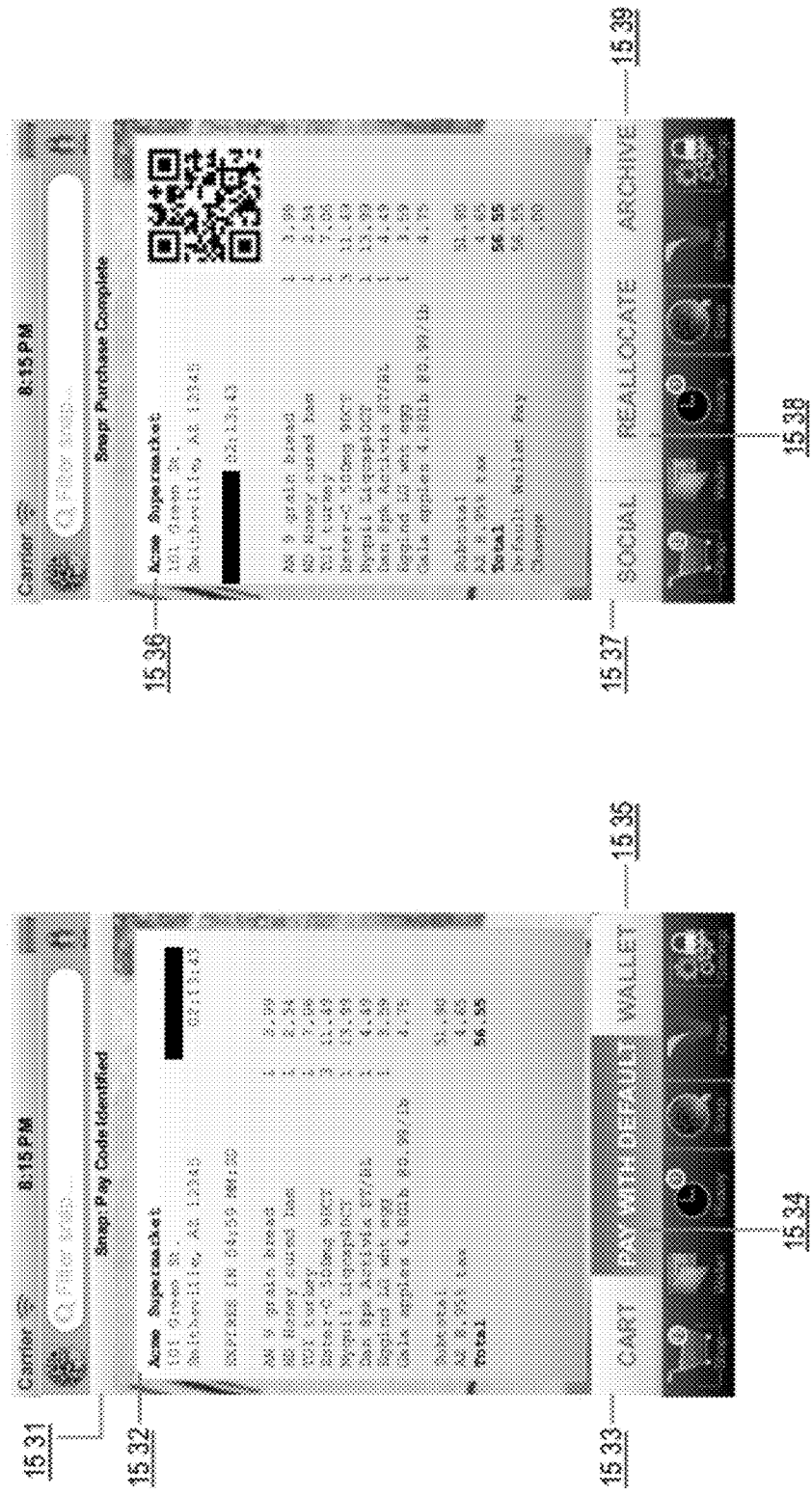

With reference to FIG. 15C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1532. Once the QR code is identified, the navigation bar 1531 may indicate that the pay code is identified. The user may now have an option to add to cart 1533, pay with a default payment account 1534 or pay with wallet 1535.

In one implementation, the user may decide to pay with default 1534. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1537 to share purchase information with others, reallocate 1538 as discussed with regard to FIG. 15B, and archive 1539 to store the receipt.

Figure 15D:

With reference to FIG. 15D, in one embodiment, the snap mode may also facilitate offer identification, application and storage for future use. For example, in one implementation, a user may snap an offer code 1541 (e.g., a bar code, a QR code, and/or the like). The wallet application may then generate an offer text 1542 from the information encoded in the offer code. The user may perform a number of actions on the offer code. For example, the user use the find button 1543 to find all merchants who accept the offer code, merchants in the proximity who accept the offer code, products from merchants that qualify for the offer code, and/or the like. The user may also apply the offer code to items that are currently in the cart using the add to cart button 1544. Furthermore, the user may also save the offer for future use by selecting the save button 1545.

In one implementation, after the offer or coupon 1546 is applied, the user may have the option to find qualifying merchants and/or products using find, the user may go to the wallet using 1548, and the user may also save the offer or coupon 1546 for later use.

Figure 15E:
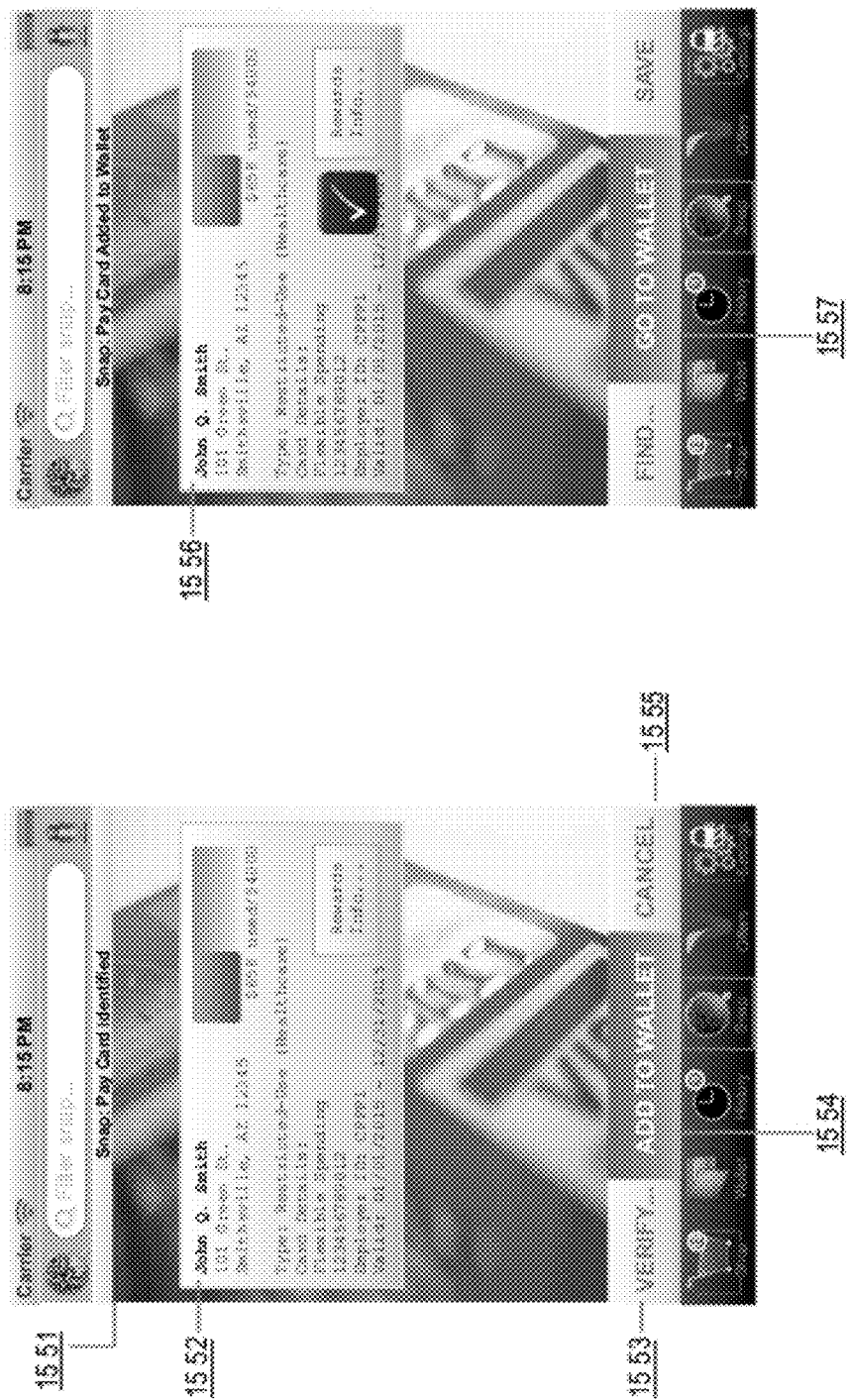

With reference to FIG. 15E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1551 and may display the textual information 1552 encoded in the pay card. The user may then perform verification of the information 1552 by selecting the verify button 1553. In one implementation, the verification may include contacting the issuer of the pay card for confirmation of the decoded information 1552 and any other relevant information. In one implementation, the user may add the pay card to the wallet by selecting the 'add to wallet' button 1554. The instruction to add the pay card to the wallet may cause the pay card to appear as one of the forms of payment under the funds tab discussed in FIG. 16C. The user may also cancel importing of the pay card as a funding source by selecting the cancel button 1555. When the pay card has been added to the wallet, the user interface may be updated to indicate that the importing is complete via the notification display 1556. The user may then access the wallet 1557 to begin using the added pay card as a funding source.

Figure 15F:
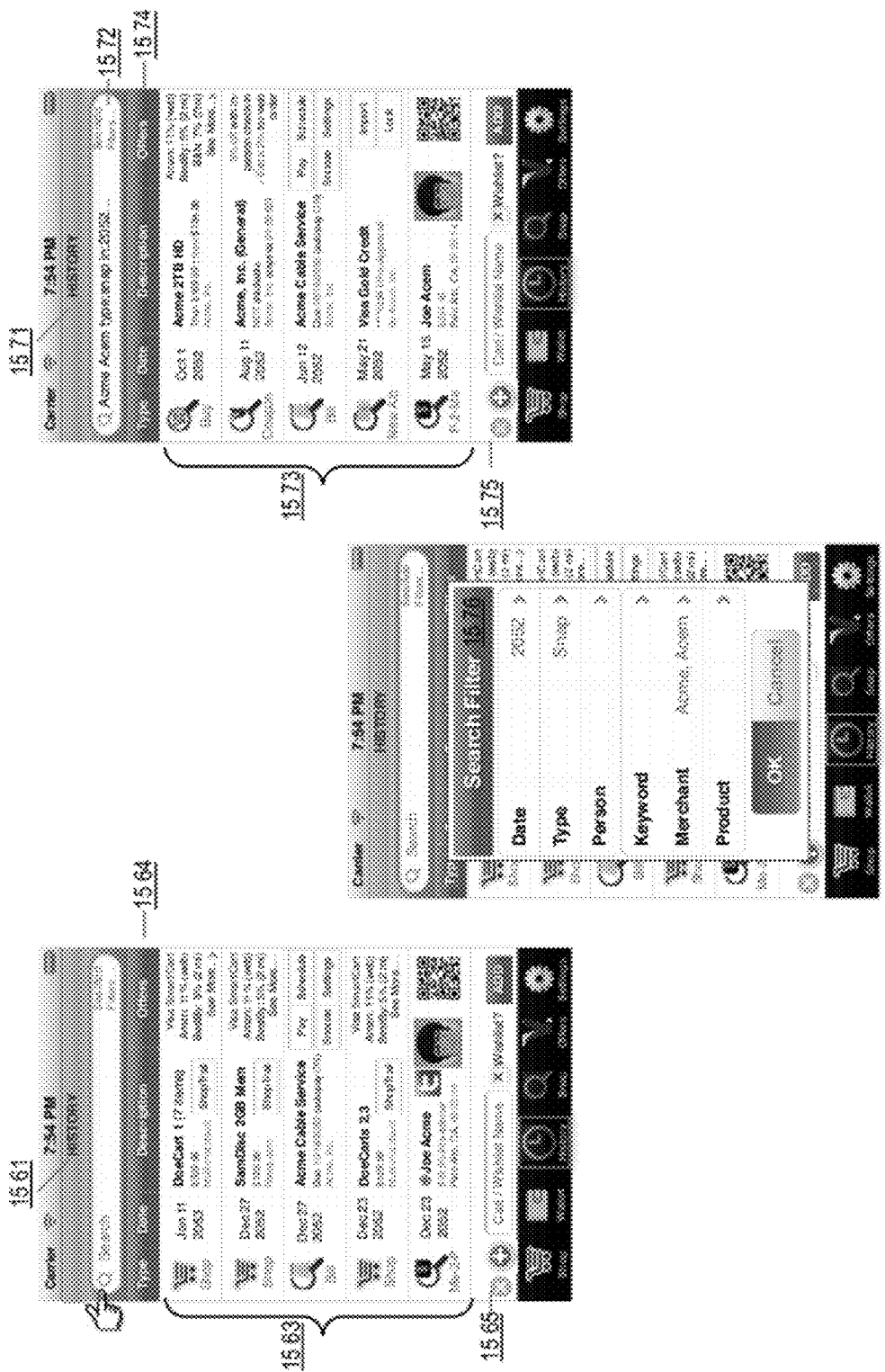
Figure 15G:
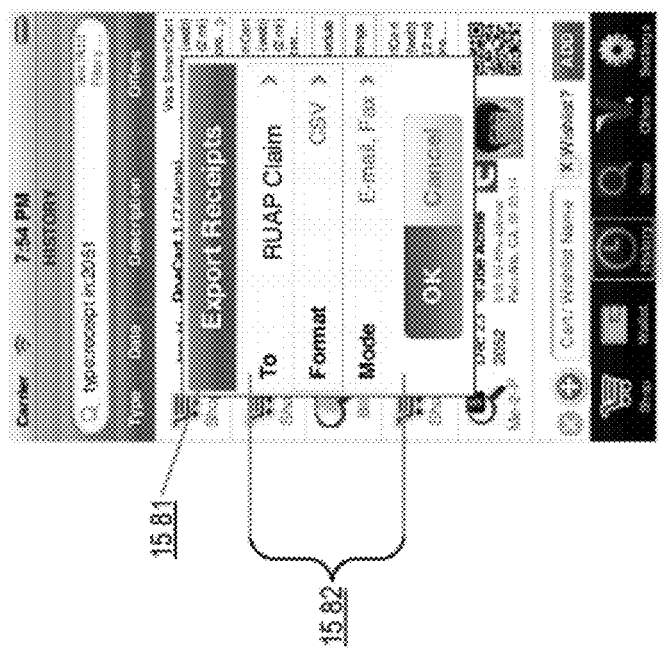

FIGS. 15F-15G provide user interface diagrams illustrating example aspects of a history mode of a virtual wallet application in some embodiments of the RUAP. With reference to FIG. 15F, in one embodiment, a user may select the history mode 1561 to view a history of prior purchases and perform various actions on those prior purchases. For example, a user may query on receipts of past transactions to claim a restricted-account reimbursement.

The wallet application may query the storage areas in the mobile device or elsewhere (e.g., one or more databases and/or tables remote from the mobile device) for prior transactions. The user interface may then display the results of the query such as transactions 1563. The user interface may identify 1564: a type of the transaction (e.g., previously shopped for items, bills that have been captured by camera in a snap mode, a person-to-person transfer; the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1565.

In one embodiment, a user may select the history mode 1571 to view a history of filtered prior purchases and perform various actions on those prior purchases. For example, a user may enter a merchant identifying information such as name, product, MCC, and/or the like in the search bar 1572. In another implementation, the user may use voice activated search feature to search the history. In another implementations, the wallet application may display a pop up screen 1576, in which the user may enter advanced search filters, keywords, and/or the like. The wallet application may query the storage areas in the mobile device or elsewhere (e.g., one or more databases and/or tables remote from the mobile device) for transactions matching the search keywords. The user interface may then display the results of the query such as transactions 1563. The user interface may identify 1574: a type of the transaction (e.g., previously shopped for items, bills that have been captured by camera in a snap mode, a person-to-person transfer; the date of the transaction; a description of the transaction, including but not limited to: a cart name, cart contents indicator, total cost, merchant(s) involved in the transaction; a link to obtain a shoptrail (explained further below in greater detail), offers relating to the transaction, and any other relevant information. In some implementation, any displayed transaction, coupon, bill, etc. may be added to a cart for (re)purchase, 1575.

With reference to FIG. 15G, in one embodiment, the history mode may also include facilities for exporting receipts. The export receipts pop up 1581 may provide a number of options for exporting the receipts of transactions in the history. For example, a user may use one or more of the options 1582, which include save (to local mobile memory, to server, to a cloud account, and/or the like), print to a printer, fax, email, and/or the like. The user may utilize his or her address book to look up email or fax number for exporting. The user may also specify format options for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button to initiate export of receipts.

Figure 15H:
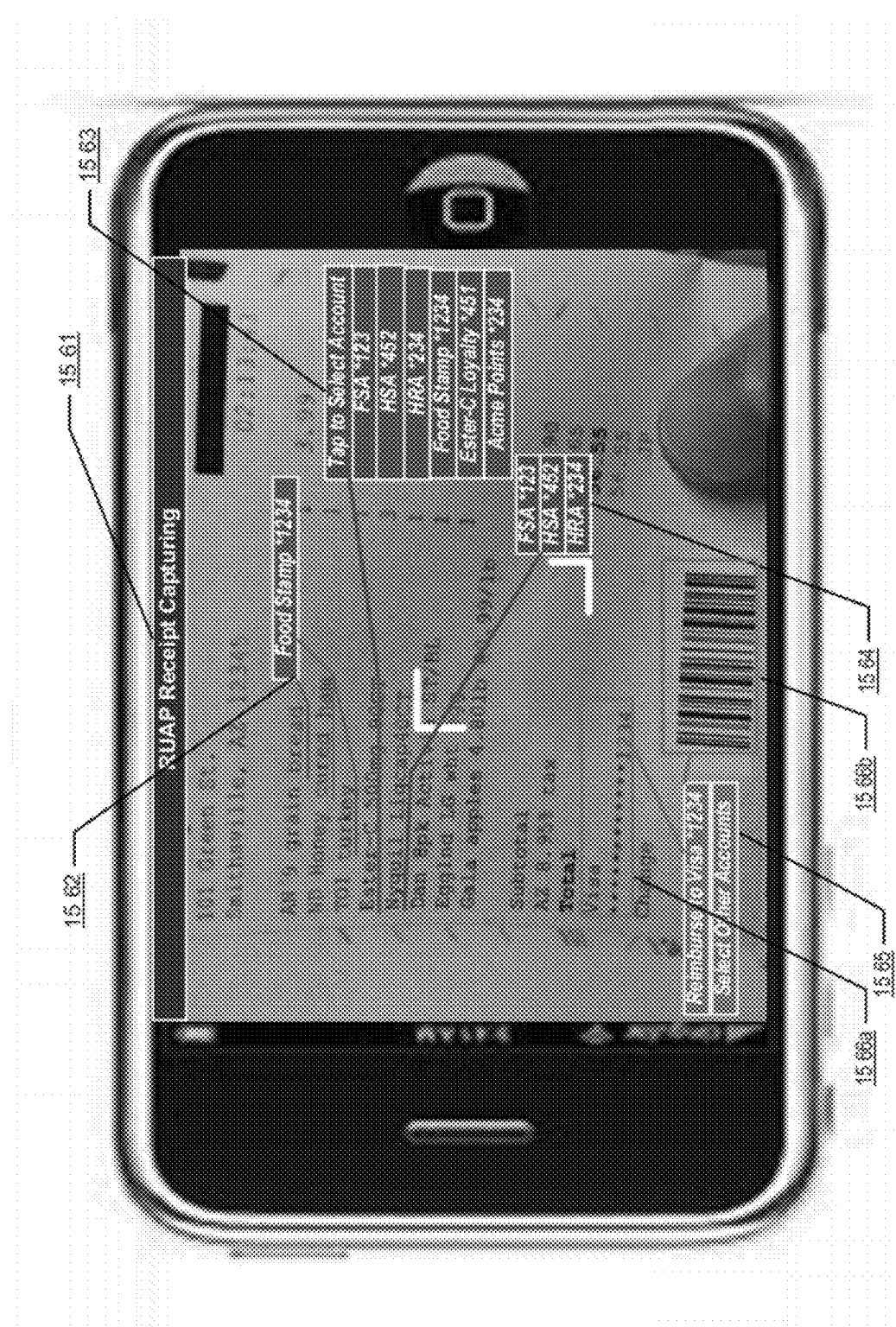

FIGS. 15H-I provide exemplary mobile UIs showing augmented reality receipt capturing within embodiments of the RUAP. In one implementation, a user may operate a camera enabled device to capture a view of a receipt 1561, and obtain augmented reality labels 1562 indicating items that are eligible for restricted-use accounts. For example, the RUAP wallet component may perform an instant OCR to extract item information and determine items such as "NyQuil" is eligible for FSA/HSA/HRA 1564 usage, and grocery/food items are eligible for food stamp 1562 usage. In one implementation, if the user tap on the displayed account, the RUAP may generate a virtual receipt (e.g., similar to that in FIG. 15C) and proceed to process reimbursement request with the selected restricted-use account.

In further implementation, if the RUAP does not automatically determine an item as eligible for any restricted-use accounts, e.g., an "Ester-C" supplement, a user may tap on the screen to select it, and may view a list of accounts 1563 to select a user desired reallocation account, e.g., any restricted-use account, loyalty account, and/or the like.

In further implementations, the RUAP may identify a payment account that has been used to fulfill the transaction associated with the receipt, e.g., a Visa account 1566a, and/or obtain account information from the barcode printed on the receipt 1566b. In one implementation, the RUAP may match the "*1234" Visa account with any of user's enrolled account in the wallet, and recommend the user to reimburse funds into an identified "Visa *1234" account if such account is identified from the wallet 1565. In another implementation, the RUAP may prompt the user to select other accounts for depositing reimbursement funds 1565.

Continuing on with FIG. 15I, if the user has tapped on an account, e.g., "FSA" at 1564 in FIG. 15H to reimburse an eligible item, the RUAP may generate a reimbursement request 1571, e.g., showing the user is going to reimburse "NyQuil Lipcap" 1572 from the selected "FSA *123" account 1573. In one implementation, the user may indicate an account for depositing the reimbursement funds, e.g., the "Visa *1234" 1574 account auto-identified from the receipt (e.g., at 1566a-b in FIG. 15H), and/or select other accounts.

In another implementation, if the user selects to tap on 1563 in FIG. 15H to reimburse "Ester-C" 1575 for "FSA *123" account 1576, as the RUAP does not identify "Ester-C" as an eligible FSA item, the RUAP may generate a reimbursement request but with a notification to the user that such reimbursement is subject to FSA review and may not be approved 1578.

Figure 16A:
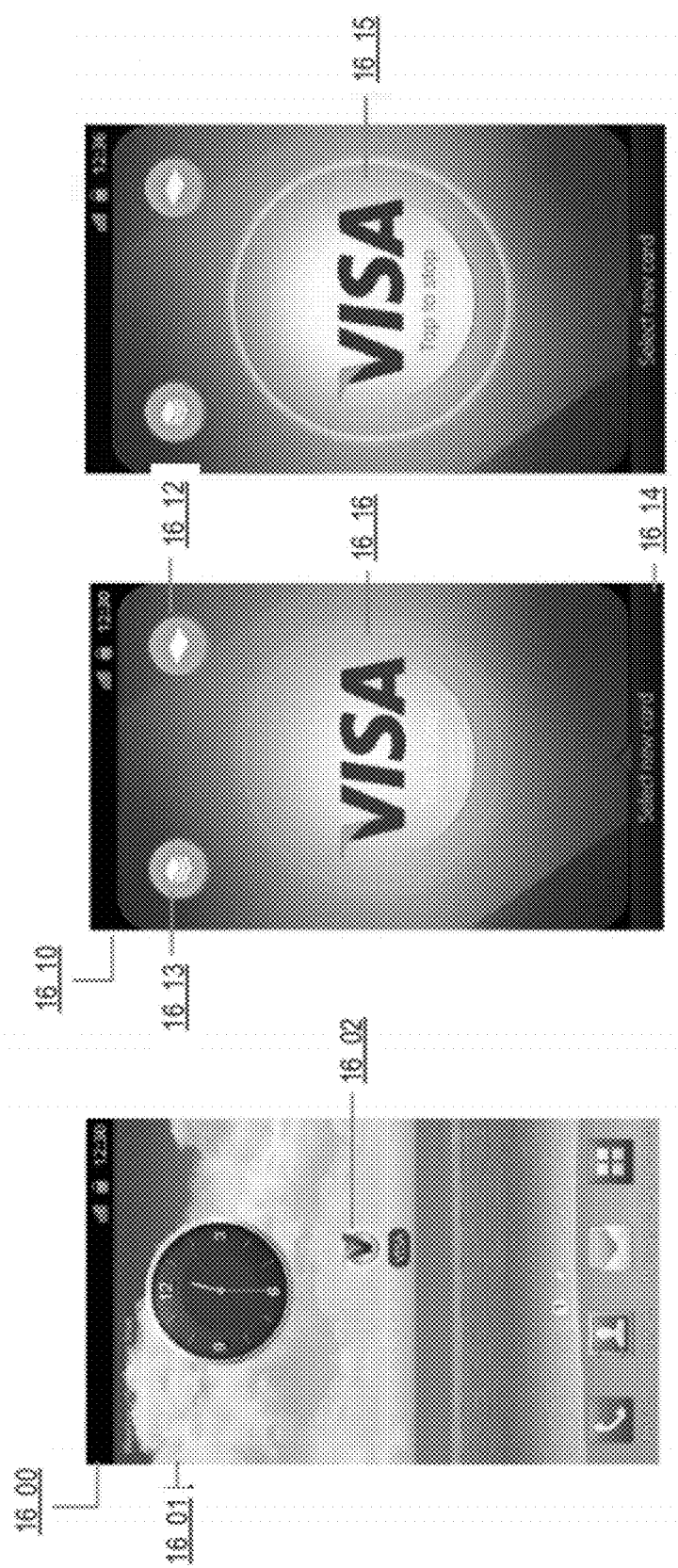
FIGS. 16A-16E provide exemplary mobile wallet UIs illustrating wallet account management within embodiments of the RUAP.

FIGS. 16A-16E provide exemplary mobile wallet UIs illustrating wallet account within embodiments of the RUAP. With reference to FIG. 16A, in some embodiments, a mobile device 1600 of the user may present a graphical user interface (GUI) 1601 (e.g., a home screen) including a GUI element 1602 to start up a virtual wallet application (e.g., an Apple® iPhone/iPad app, Google Android application, Windows® Mobile application, etc.). For example, the icon 1602 may indicate the wallet is enabled with RUAP service and the wallet has registered a RUAP prepaid account.

In some embodiments, when a user activates the GUI element 1601 of FIG. 16A, the mobile device may provide a virtual mobile wallet application interface 1610. In some embodiments, the application interface may include a GUI element 1611 to initiate a payment communication (e.g., transmitting a credit/debit/prepaid card number via NFC/Bluetooth/cellular communication). In some embodiments, the mobile device may utilize default values for the payment information (e.g., credit/debit/prepaid card information) and communication mode (e.g., NFC). In alternate embodiments, the user may be able to modify the payment information prior to communicating with a PoS terminal to initiate the payment transaction. For example, a GUI element 1614 may provide a mechanism to modify payment information without leaving the "tap to pay" screen provided by application interface 1610 (see, e.g., elements 1620-221 of FIG. 16B). As another example, a GUI element 1613 may, when activated by the user, present the user an application interface wherein the user may make more detailed adjustments to aspects of the payment mechanism (e.g., card utilized, anonymization/security preferences, etc.). In some embodiments, the user may be able to quickly revert to utilizing default payment settings by activating a GUI element 1612. In some embodiments, the user may be able to stop a communication of payment information that is in progress by activating a GUI element 1615 ("tap to stop") that the application interface presents during the communication of payment information.

Figure 16B:
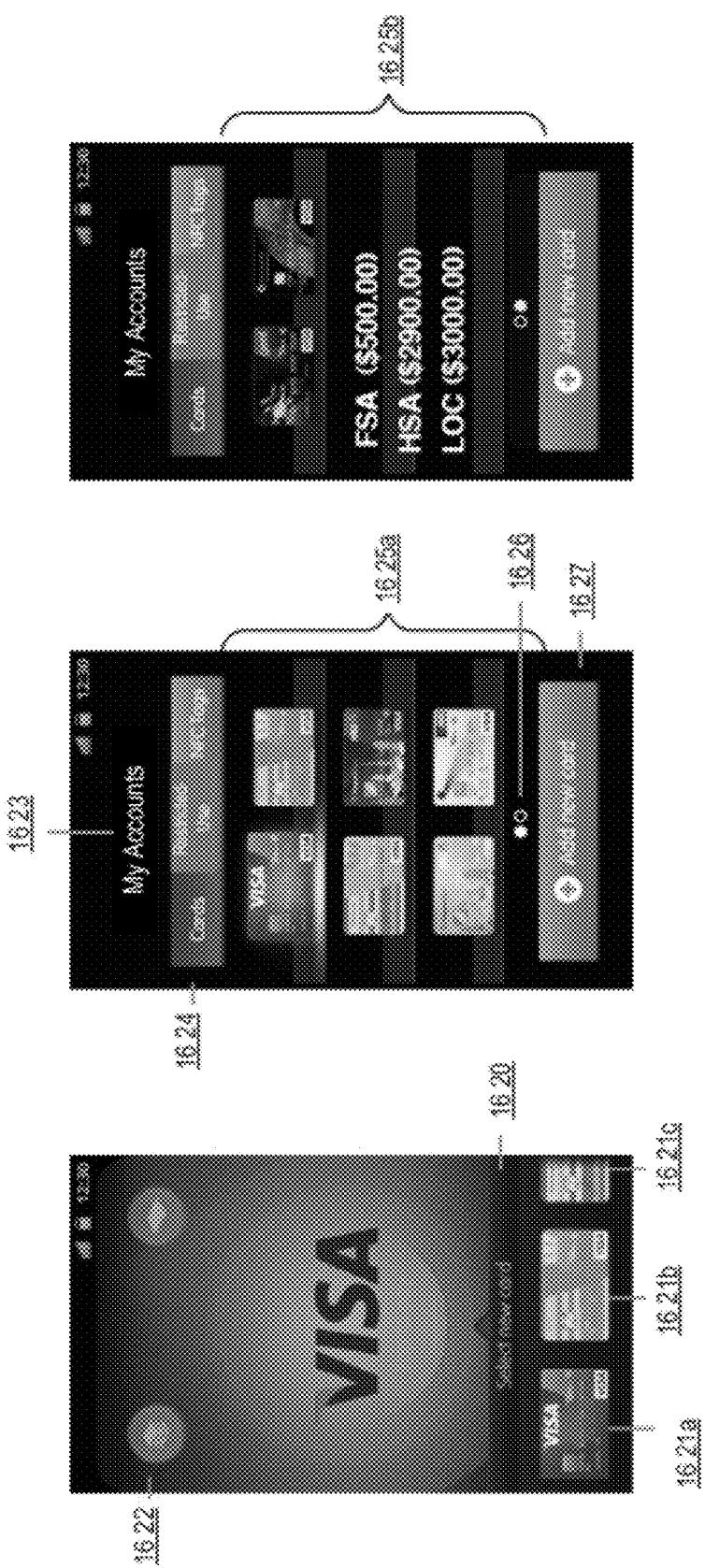

With reference to FIG. 16B, in some embodiments, the user may activate a GUI element 1620 when operating the virtual mobile wallet application in a payment activation application interface to obtain a menu of card selection options 1621a-c. For example, the user may add a RUAP prepaid account 1621a to the wallet upon obtaining a card number. The user may activate any of the card selection options to quickly modify the payment information utilized in the communication to trigger the payment transaction. In some embodiments, the user may activate GUI element 1622 to obtain an application interface 1623 ("my accounts") for a more detailed view, from which the user can make selections of payment options. For example, the wallet accounts 1623 may include a tab for the user's enrolled restricted use accounts. For example, a GUI element 1624 may describe types of payment options (e.g., payment cards, loyalty cards, NFC tags, etc.) available to the user. The specific payment options may be depicted in GUI elements 1625a-b. In some embodiments, the GUI elements 1625a-b may be arranged as a column browser, with multiple columns (see 1626). In some embodiments, the interface may provide a GUI element 1627 that the user can activate to add a new payment option to the existing payment options displayed in the GUI elements 1625a-b. For example, as shown at 1625b, the RUAP may list the user's FSA, HSA, LOC accounts enrolled in the wallet with its balance information.

Figure 16C:
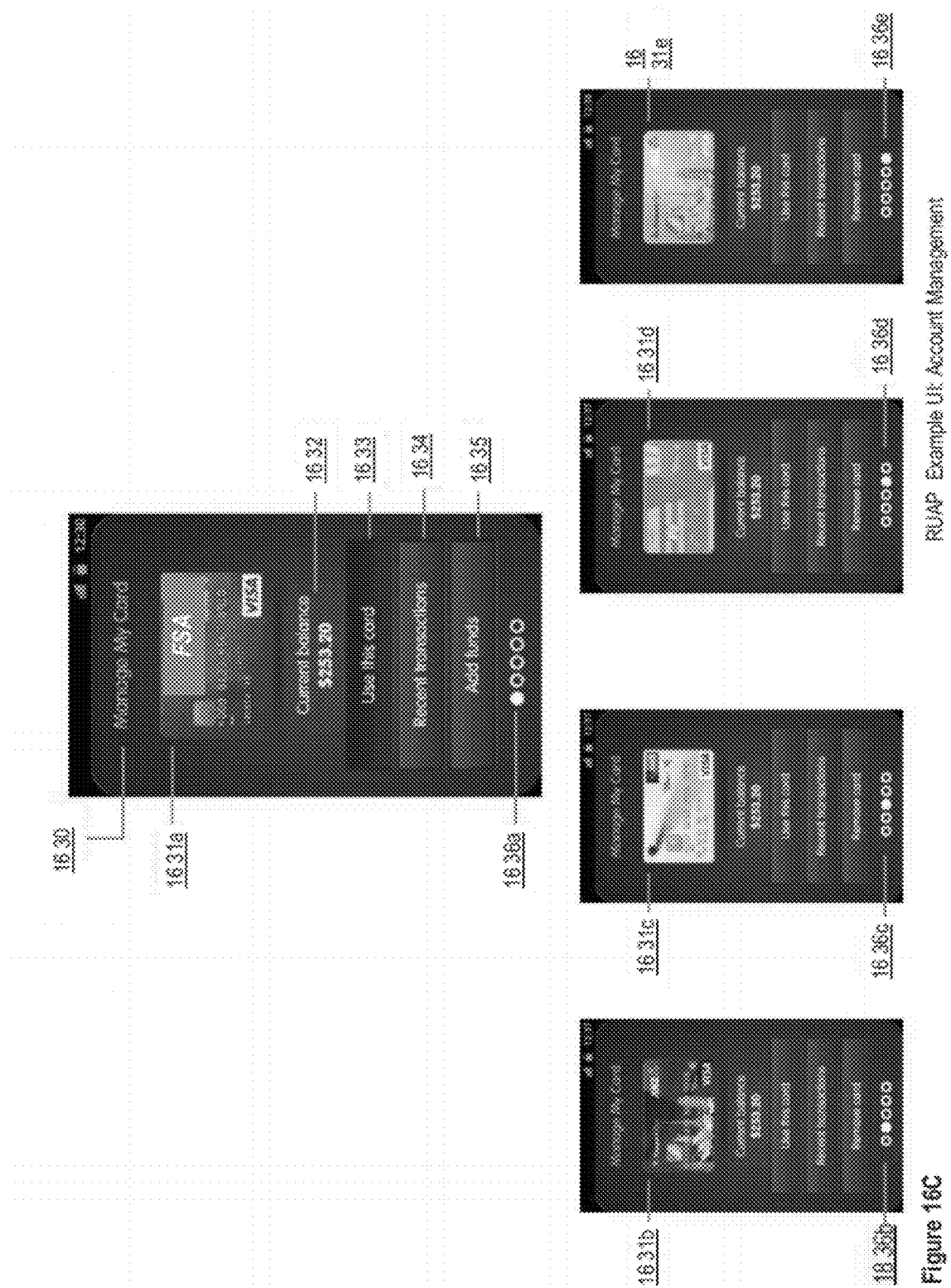

With reference to FIG. 16C, in some embodiments, activating a GUI element corresponding to a payment options may provide a detailed view of the payment option, e.g., 1630 ("manage my card"). The view may include a graphical view 1631a of the payment option, providing information including, without limitation: card payment processor (e.g., "Visa"), card number, payment mechanism (e.g., "Visa payWave"), cardholder name, expiration date, and/or the like. The view may also include indications of information such as, without limitation: a current balance 1632, a maximum payment amount currently permissible using the card, a date on which a balance payment is due, and/or the like. The view may include a GUI element 1633 that the user can activate to utilize the payment option in the purchase transaction initiation. In some embodiments, the view may include a GUI element 1634 that the user can activate to view recent purchase transactions initiated using the payment option currently being displayed in 1631a (e.g., a FSA account, etc.). The view may also include a GUI element 1635 that the user can activate to add funds to the payment option currently being displayed in 1631a. In some embodiments, the payment options may be arranged within a column browser interface, such that user can scan through the various payment options (e.g., 1631b-e) by swiping a touchscreen of the mobile device (see 1636a). As the user scans through the payment options, GUI element 1636b-e may modify to indicate the user's position within the column browser interface.

Figure 16D:
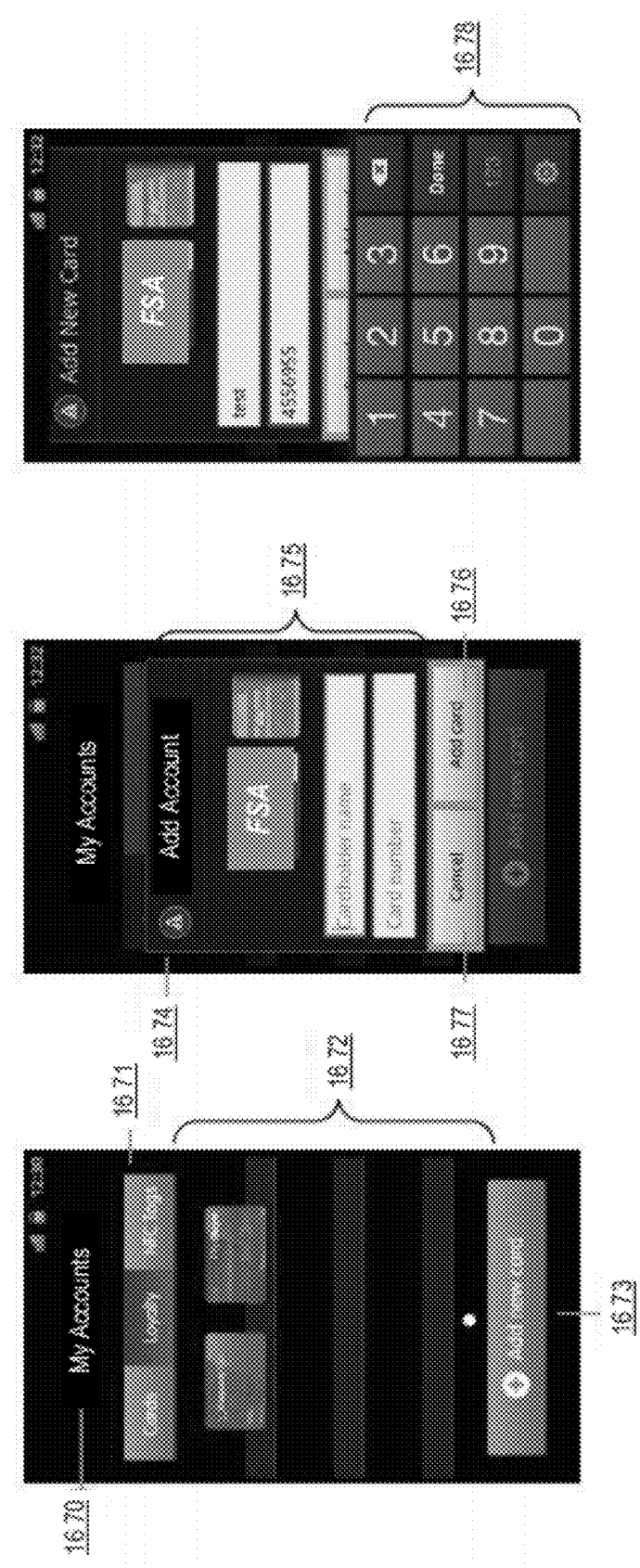

With reference to FIG. 16D, the user may be able to view a record of recent transactions 1640 initiated using a payment option (e.g., by activating GUI element 1634 of FIG. 16C). In the recent transactions view 1640, the user may be provided with a record listing 1645, including information on a time of a purchase transaction ("when" 1641), a description of the transaction ("what" 1642), an amount of the transaction ("amount" 1643), and a location of the transaction ("where" 1644). The user may be able to scroll through a long list of recent transactions by activating a GUI element 1646 ("view more"). In some embodiments, the user may activate a GUI element 1647 to obtain a view of transactions placed on a geographical map, so that the user may understand better where each of the user's transactions originate.

Figure 16E:
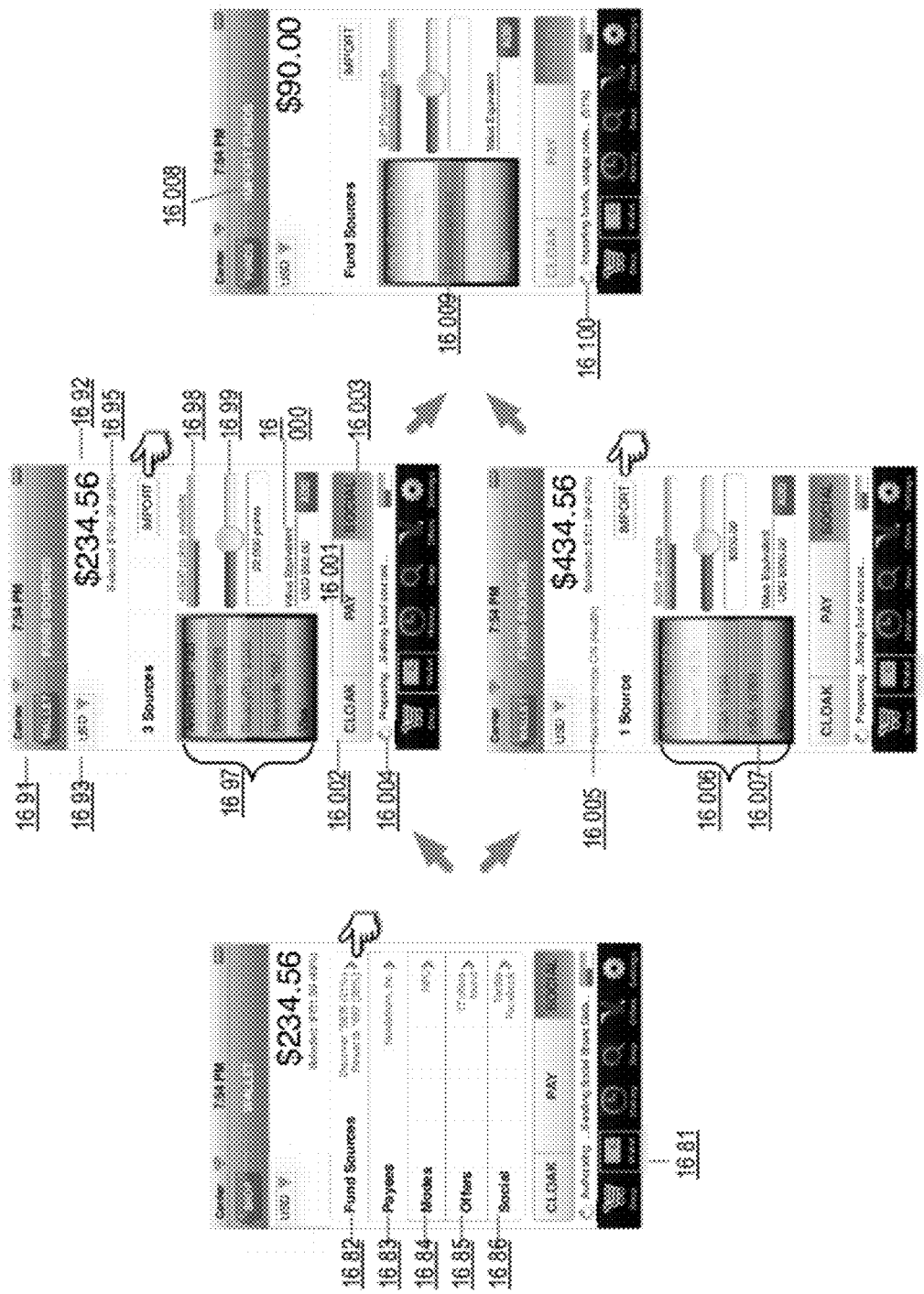

FIG. 16E shows user interface diagrams illustrating example aspects of allocating funds for a purchase payment within a virtual wallet application in some embodiments of the RUAP. In one embodiment, the wallet mobile application may provide a user with a number of options for paying for a transaction via the wallet mode 1681. The wallet mode may facilitate a user to set preferences for a payment transaction, including settings funds sources 1682, payee 1683, transaction modes 1684, applying real-time offers to the transaction 1685, and publishing the transaction details socially 1686, as described in further detail below.

In one implementation, an example user interface 1691 for making a payment is shown. The user interface may clearly identify the amount 1692 and the currency 1693 for the transaction. The amount may be the amount payable and the currency may include real currencies such as dollars and euros, as well as virtual currencies such as reward points. The user may select the funds tab 1682 to select one or more forms of payment 1697, which may include various credit, debit, gift, rewards and/or prepaid cards. The user may also have the option of paying, wholly or in part, with reward points. For example, the graphical indicator 1698 on the user interface shows the number of points available, the graphical indicator 1699 shows the number of points to be used towards the amount due 234.56 and the equivalent 16000 of the number of points in a selected currency (USD, for example).

In one implementation, the user may combine funds from multiple sources to pay for the transaction. The amount 1695 displayed on the user interface may provide an indication of the amount of total funds covered so far by the selected forms of payment (e.g., Discover card and rewards points). The user may choose another form of payment or adjust the amount to be debited from one or more forms of payment until the amount 1695 matches the amount payable 1694.

Once the amounts to be debited from one or more forms of payment are finalized by the user, payment authorization may begin.

In one implementation, the user may select a secure authorization of the transaction by selecting the cloak button 16002 to effectively cloak or anonymize some (e.g., pre-configured) or all identifying information such that when the user selects pay button 16001, the transaction authorization is conducted in a secure and anonymous manner. In another implementation, the user may select the pay button 16001 which may use standard authorization techniques for transaction processing. In yet another implementation, when the user selects the social button 16003, a message regarding the transaction may be communicated to one of more social networks (set up by the user), which may post or announce the purchase transaction in a social forum such as a wall post or a tweet. In one implementation, the user may select a social payment processing option 16003. The indicator 16004 may show the authorizing and sending social share data in progress.

In another implementation, a restricted payment mode 16005 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 16006 under the funds tab to select specialized accounts such as a FSA, HSA 16007, and/or the like and amounts to be debited to the selected accounts. In one implementation, such restricted payment mode 16005 processing may disable social sharing of purchase information.

In one embodiment, the wallet mobile application may facilitate importing of funds via the import funds user interface 16008. For example, a user who is unemployed may obtain unemployment benefit fund 16009 via the wallet mobile application. In one implementation, the entity providing the funds may also configure rules for using the fund as shown by the processing indicator message 16100. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 17A:
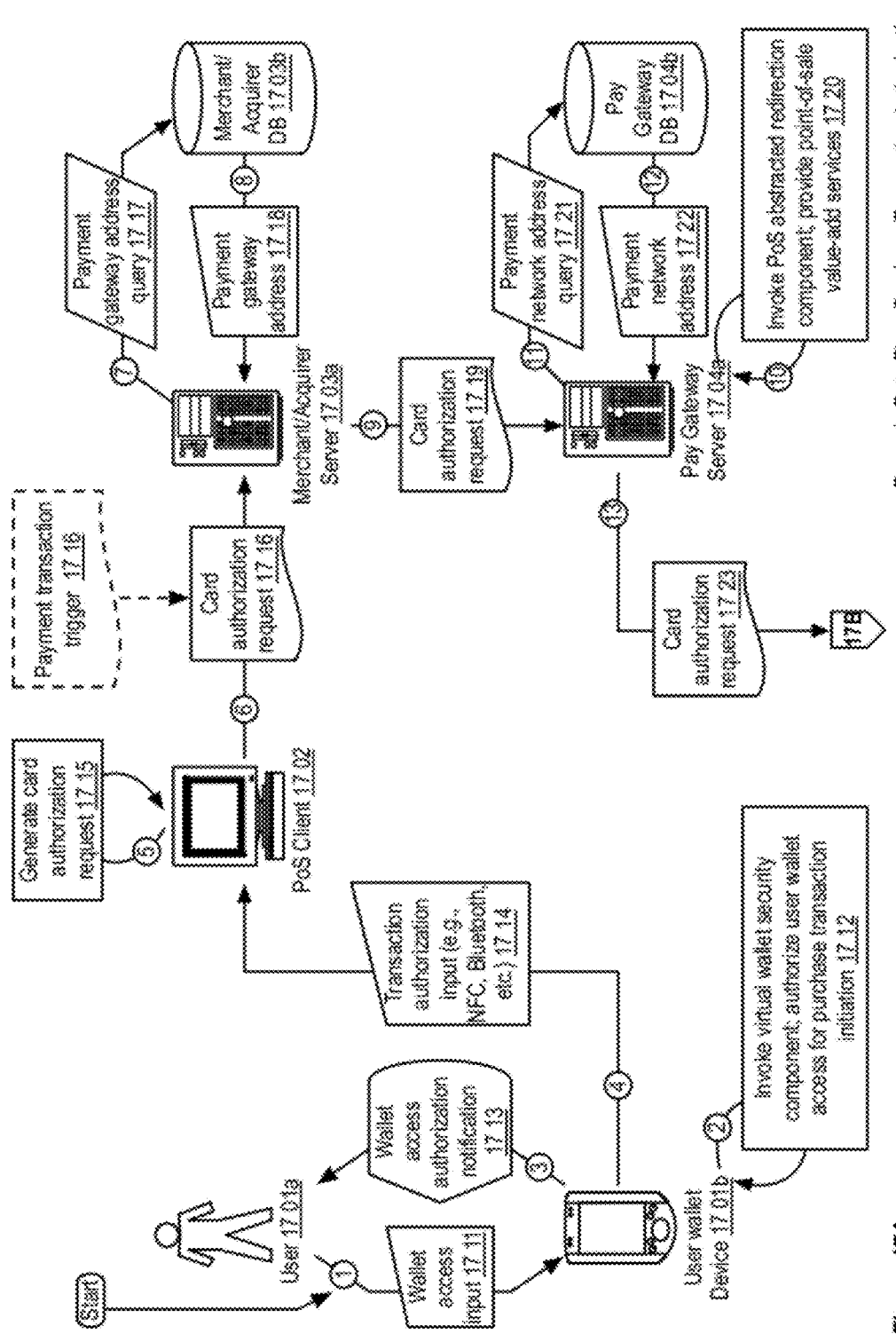
FIGS. 17A-B show data flow diagrams illustrating an example purchase transaction authorization procedure in some embodiments of the RUAP.
Figure 17B:
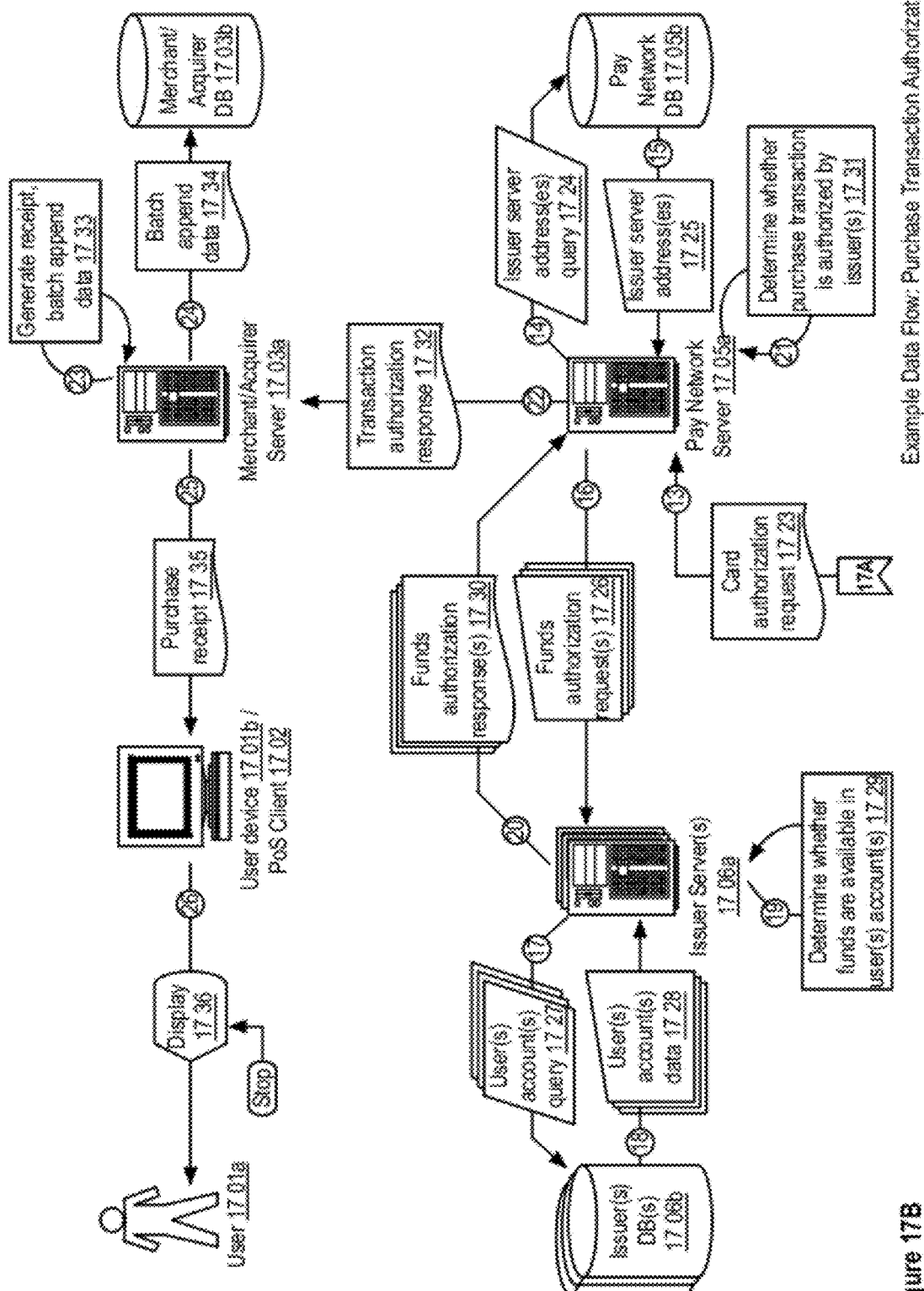

FIGS. 17A-B show data flow diagrams illustrating an example purchase transaction authorization procedure in some embodiments of the RUAP. With reference to FIG. 17A, in some embodiments, a user, e.g., 1701*a*, may wish to utilize a virtual wallet account to purchase a product, service, offering, and/or the like ("product"), from a merchant via a merchant online site or in the merchant's store. The user may utilize a physical card, or a user wallet device, e.g., 1701*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 1711 into the user wallet device. For example, if the user attempts to submit a healthcare payment, the user may tap on the restricted-use account list, and the wallet may return a list of restricted use accounts with updated balance information, e.g., see 585, 591-592 in FIGS. 5E-5F.

In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 1714, to a point-of-sale ("PoS") client, e.g., 1702. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 1714, track 1 data from the user's plastic card (e.g., credit card, debit card, prepaid card, charge card, etc.), such as the example track 1 data provided below:

```
%B1234567890123456^PUBLIC/J.Q.^990112000000000000000**901*******?*
```
(wherein '1234567890123456' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 1714, substantially in the form of XML-formatted data, is provided below:

```
<?XML version = "1.0" encoding = "UTF-8"?>
<transaction_authorization_input>
    <payment_data>
```

```
    <account>
        <charge_priority>1</charge_priority>
        <charge_ratio>40%</charge_ratio>
        <account_number>123456789012345</account_number>
        <account_name>John Smith</account_name>
        <bill_add>987 Green St #456, Chicago, IL 94652</bill_add>
        <ship_add>987 Green St #456, Chicago, IL 94652</ship_add>
        <CVV>123</CVV>
    </account>
    <account>
        <charge_priority>1</charge_priority>
        <charge_ratio>60%</charge_ratio>
        <account_number>234567890123456</account_number>
        <account_name>John Smith</account_name>
        <bill_add>987 Green St #456, Chicago, IL 94652</bill_add>
        <ship_add>987 Green St #456, Chicago, IL 94652</ship_add>
        <CVV>173</CVV>
    </account>
    <account>
        <charge_priority>2</charge_priority>
        <charge_ratio>100%</charge_ratio>
        <account_number>345678901234567</account_number>
        <account_name>John Smith</account_name>
        <bill_add>987 Green St #456, Chicago, IL 94652</bill_add>
        <ship_add>987 Green St #456, Chicago, IL 94652</ship_add>
        <CVV>695</CVV>
    </account>
</payment_data>
<!--optional data-->
<timestamp>2011-02-22 15:22:43</timestamp>
<expiry_lapse>00:00:30</expiry_lapse>
<secure_key>0445329070598623487956543322</secure_key>
<alerts_track_flag>TRUE</alerts_track_flag>
<wallet_device_details>
    <device_IP>192.168.23.126</client_IP>
    <device_type>smartphone</client_type>
    <device_model>HTC Hero</client_model>
    <OS>Android 2.2</OS>
    <wallet_app_installed_flag>true</wallet_app_installed_flag>
</wallet_device_details>
</transaction_authorization_input>
```

In some embodiments, the PoS client may generate a card authorization request, e.g., 1715, using the obtained transaction authorization input from the user wallet device, and/or product/checkout data. An example listing of a card authorization request 1715, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
    <session_ID>4NFU4RG94</order_ID>
    <timestamp>2011-02-22 15:22:43</timestamp>
    <expiry>00:00:30</expiry>
    <alerts_URL>www.merchant.com/shopcarts.php?sessionID=AEBB4356</alerts_URL>
    <!--optional data-->
    <user_ID>john.q.public@gmail.com</user_ID>
    <PoS_details>
        <PoS_IP>192.168.23.126</client_IP>
        <PoS_type>smartphone</client_type>
        <PoS_model>HTC Hero</client_model>
        <OS>Android 2.2</OS>
        <app_installed_flag>true</app_installed_flag>
    </PoS_details>
    <purchase_details>
    <Item1>
        <ItemCode> FOOD-9875 </ItemCode>
        <Category> FOOD </Category>
        <Sub-Category> Breakfast </Sub-Category>
        </ItemName> Cereal </ItemName>
```

```
        <Description> whole grain original 10 oz </Description>
        <Quantity> 1 </Quantity>
        <UnitPrice> 4.99 </UnitPrice>
        <TotalAmt> 4.99 </TotalAmt>
        ...
    </Item1>
    <Item2>
        <ItemCode> DRUG-23401 </ItemCode>
        <Category> DRUG </Category>
        <Sub-Category> Non-Prescription </Sub-Category>
        </ItemName> NyQuil Cold Medicine </ItemName>
        <Description> NyQuil Cold&Flu Liquid 80 mL </Description>
        <Quantity> 1 </Quantity>
        <UnitPrice> 12.99 </UnitPrice>
        <TotalAmt> 12.99 </TotalAmt>
        ...
    </Item2>
    <item_3>
        <ItemCode> SU-Shampoo-001 </ItemCode>
        <Category> WASH </Category>
        <Sub-Category> hair product </Sub-Category>
        </ItemName> SUAVE shampoo </ItemName>
        <Description> SUAVE shampoo heat treatment 120 mL </Description>
        <Quantity> 1 </Quantity>
        <UnitPrice> 8.99 </UnitPrice>
        <TotalAmt> 8.99 </TotalAmt>
        ...
    </item_3>
    ...
    </purchase_details>
    <merchant_params>
        <merchant_id>3FBCR4INC</merchant_id>
        <merchant_name>Acme Supermarket, Inc.</merchant_name>
        <merchant_auth_key>1NNF484MCP59CHB27365</merchant_auth_key>
    </merchant_params>
    <account_params>
        <account_name>John Smith</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
        <confirm_type>email</confirm_type>
        <contact_info>john.q.public@gmail.com</contact_info>
    </account_params>
    <shipping_info>
        <shipping_adress>same as billing</shipping_address>
        <ship_type>expedited</ship_type>
        <ship_carrier>FedEx</ship_carrier>
        <ship_account>123-45-678</ship_account>
        <tracking_flag>true</tracking_flag>
        <sign_flag>false</sign_flag>
    </shipping_info>
</card_authorization_request>
```

In some embodiments, the card authorization request generated by the user device may include a minimum of information to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 1716. The merchant server may forward the card authorization request to a pay gateway server, e.g., 1704a, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 1703b, for a network address of the payment gateway server, for example by using a portion of a user payment card number, or a user ID (such as an email address) as a keyword for the database query. For example, the merchant server may issue PHP/SQL commands to query a database table (such as FIG. 24, Pay Gateways 2419h) for a URL of the pay gateway server. An example payment gateway address query 1717, substantially in the form of PHP/SQL commands, is provided below:

```
<?PHP
header('Content-Type: text/plain');
mysql_connect("254.93.179.112",$DBserver,$password); // access
database server
mysql_select_db("RUAP_DB.SQL"); // select database table to
search
//create query
$query = "SELECT paygate_id paygate_address paygate_URL
paygate_name FROM
PayGatewayTable WHERE card_num LIKE '%' $cardnum";
$result = mysql_query($query); // perform the search query
mysql_close("RUAP_DB.SQL"); // close database access
?>
```

In response, the merchant/acquirer database may provide the requested payment gateway address, e.g., 1718. The merchant server may forward the card authorization request to the pay gateway server using the provided address, e.g., 1719. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a healthcare collection portal server, e.g., 1705*a*, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 1704*b*, for a network address of the payment network server, for example by using a portion of a user payment card number, or a user ID (such as an email address) as a keyword for the database query. For example, the pay gateway server may issue PHP/SQL commands to query a database table (such as FIG. 24, Pay Gateways 2419*h*) for a URL of the healthcare collection portal server. An example payment network address query 1721, substantially in the form of PHP/SQL commands, is provided below:

```
<?PHP
header('Content-Type: text/plain');
mysql_connect("254.93.179.112",$DBserver,$password); // access
database server
mysql_select_db("RUAP_DB.SQL"); // select database table to
search
//create query
$query = "SELECT payNET_id payNET_address payNET_URL
payNET_name FROM PayGatewayTable
WHERE card_num LIKE '%' $cardnum";
$result = mysql_query($query); // perform the search query
mysql_close("RUAP_DB.SQL"); // close database access
?>
```

In response, the payment gateway database may provide the requested payment network address, e.g., 1722. The pay gateway server may forward the card authorization request to the healthcare collection portal server using the provided address, e.g., 1723.

With reference to FIG. 17B, in some embodiments, the healthcare collection portal server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 24:
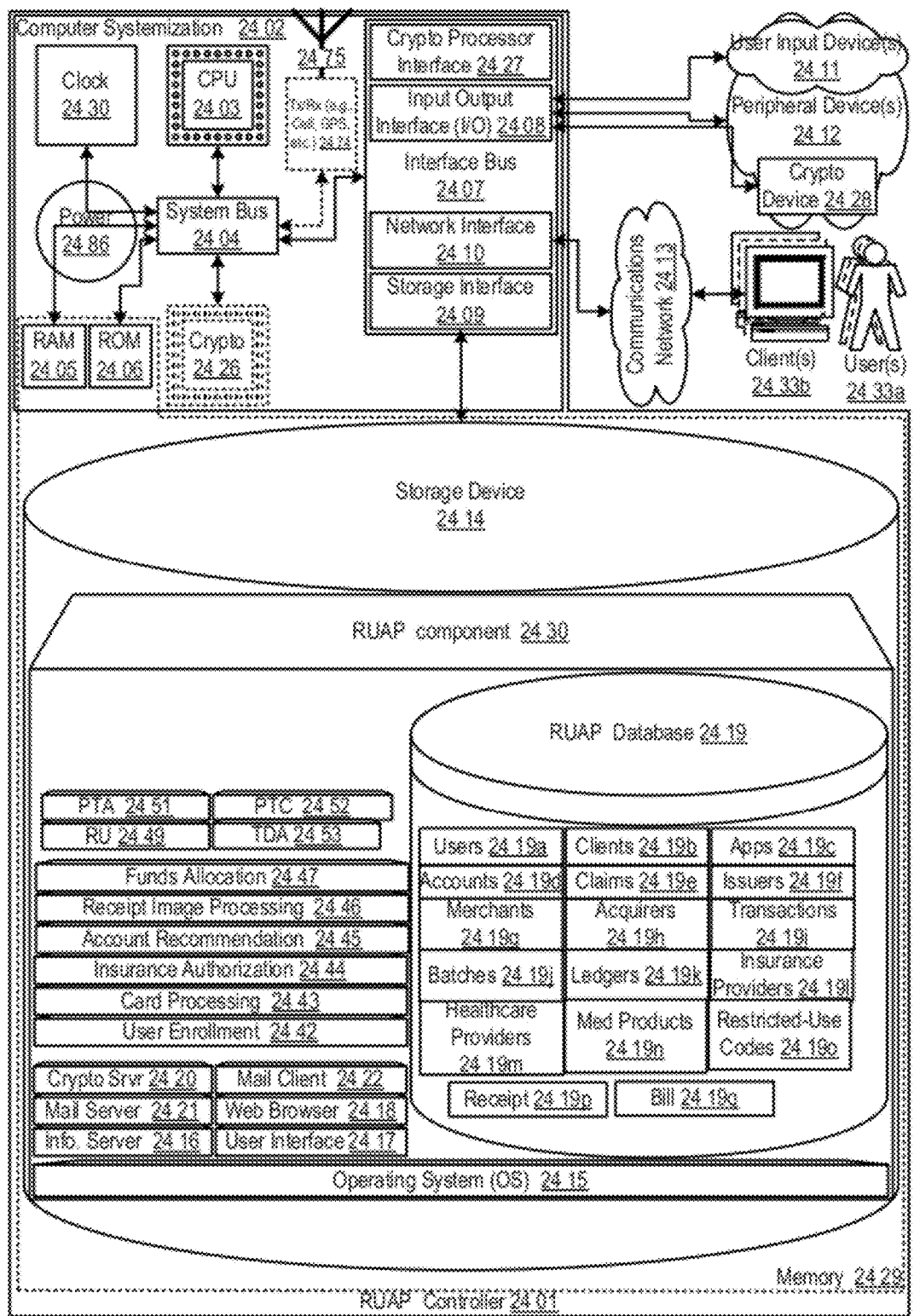
FIG. 24 shows a block diagram illustrating embodiments of a RUAP controller.

In some embodiments, the healthcare collection portal server may generate a query, e.g., 1724, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 1706*a*, of the issuer(s) may maintain details of the user's account(s). In some embodiments, a database, e.g., healthcare collection portal database 1705*b*, may store details of the issuer server(s) associated with the issuer(s). In some embodiments, the healthcare collection portal server may query a database, e.g., healthcare collection portal database 1705*b*, for a network address of the issuer(s) server(s), for example by using a portion of a user payment card number, or a user ID (such as an email address) as a keyword for the database query. For example, the merchant server may issue PHP/SQL commands to query a database table (such as FIG. 24, Issuers 2419*f*) for network address(es) of the issuer(s) server(s). An example issuer server address(es) query 1724, substantially in the form of PHP/SQL commands, is provided below:

```
<?PHP
header('Content-Type: text/plain');
mysql_connect("254.93.179.112",$DBserver,$password); // access
database server
mysql_select_db("RUAP_DB.SQL"); // select database table to
search
//create query
$query = "SELECT issuer_id issuer_address issuer_URL
issuer_name FROM IssuersTable
WHERE card_num LIKE '%' $cardnum";
$result = mysql_query($query); // perform the search query
mysql_close("RUAP_DB.SQL"); // close database access
?>
```

In response to obtaining the issuer server query, e.g., 1724, the healthcare collection portal database may provide, e.g., 1725, the requested issuer server data to the healthcare collection portal server. In some embodiments, the healthcare collection portal server may utilize the issuer server data to generate funds authorization request(s), e.g., 1726, for each of the issuer server(s) selected based on the predefined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 1726, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <query_ID>VNEI39FK</query_ID>
    <timestamp>2011-02-22 15:22:44</timestamp>
    <transaction_cost>$22.61</transaction_cost>
    <account_params>
        <account_type>checking</account_type>
        <account_num>1234567890123456</account_num>
    </account_params>
    <!--optional parameters-->
    <purchase_summary>
        <num_products>1</num_products>
    <Item1>
        <ItemCode> FOOD-9875 </ItemCode>
        <Category> FOOD </Category>
        <Sub-Category> Breakfast </Sub-Category>
        </ItemName> Cereal </ItemName>
        <Description> whole grain original 10 oz </Description>
        <Quantity> 1 </Quantity>
        <UnitPrice> 4.99 </UnitPrice>
        <TotalAmt> 4.99 </TotalAmt>
        ...
    </Item1>
    <Item2>
        <ItemCode> DRUG-23401 </ItemCode>
        <Category> DRUG </Category>
        <Sub-Category> Non-Prescription </Sub-Category>
        </ItemName> NyQuil Cold Medicine </ItemName>
        <Description> NyQuil Cold&Flu Liquid 80 mL </Description>
        <Quantity> 1 </Quantity>
        <UnitPrice> 12.99 </UnitPrice>
        <TotalAmt> 12.99 </TotalAmt>
        ...
    </Item2>
    <item_3>
        <ItemCode> SU-Shampoo-001 </ItemCode>
        <Category> WASH </Category>
        <Sub-Category> hair product </Sub-Category>
        </ItemName> SUAVE shampoo </ItemName>
        <Description> SUAVE shampoo heat treatment 120 mL </Description>
        <Quantity> 1 </Quantity>
        <UnitPrice> 8.99 </UnitPrice>
        <TotalAmt> 8.99 </TotalAmt>
        ...
    </item_3>
    </purchase_summary>
    <merchant_params>
        <merchant_id>3FBCR4INC</merchant_id>
        <merchant_name>Acme Supermarket, Inc.</merchant_name>
        <merchant_auth_key>1NNF484MCP59CHB27365</merchant_auth_key>
    </merchant_params>
</funds_authorization_request>
```

In some embodiments, an issuer server may parse the authorization request(s), and based on the request details may query a database, e.g., user profile database 1706b, for data associated with an account linked to the user. For example, the merchant server may issue PHP/SQL commands to query a database table (such as FIG. 24, Accounts 2419d) for user account(s) data. An example user account(s) query 1727, substantially in the form of PHP/SQL commands, is provided below:

```
<?PHP
header('Content-Type: text/plain');
mysql_connect("254.93.179.112",$DBserver,$password); // access
database server
mysql_select_db("RUAP_DB.SQL"); // select database table to
search
//create query
$query = "SELECT issuer user_id user_name user_balance
```

-continued

```
account_type FROM AccountsTable
WHERE account_num LIKE '%' $accountnum";
$result = mysql_query($query); // perform the search query
mysql_close("RUAP_DB.SQL"); // close database access
?>
```

In some embodiments, on obtaining the user account(s) data, e.g., 1728, the issuer server may determine whether the user can pay for the transaction using funds available in the account, 1729. For example, the issuer server may determine whether the user has a sufficient balance remaining in the account, sufficient credit associated with the account, and/or the like. Based on the determination, the issuer server(s) may provide a funds authorization response, e.g., 1730, to the healthcare collection portal server. For example, the issuer server(s) may provide a HTTP(S) POST message similar to the examples above. In some embodiments, if at least one issuer server determines that the user cannot pay for the transaction using the funds available in the account, the healthcare collection portal server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the healthcare collection portal server may abort the authorization process, and provide an "authorization fail" message to the merchant server, user device and/or client.

In some embodiments, the healthcare collection portal server may obtain the funds authorization response including a notification of successful authorization, and parse the message to extract authorization details. Upon determining that the user possesses sufficient funds for the transaction, e.g., 1731, the healthcare collection portal server may invoke a component to provide value-add services for the user.

In some embodiments, the healthcare collection portal server may generate a transaction data record from the authorization request and/or authorization response, and store the details of the transaction and authorization relating to the transaction in a transactions database. For example, the healthcare collection portal server may issue PHP/SQL commands to store the data to a database table (such as FIG. 24, Transactions 2419*i*). An example transaction store command, substantially in the form of PHP/SQL commands, is provided below:

```
<?PHP
header('Content-Type: text/plain');
mysql_connect("254.92.185.103",$DBserver,$password); // access database server
mysql_select("RUAP_DB.SQL"); // select database to append
mysql_query("INSERT INTO TransactionsTable (PurchasesTable (timestamp,
purchase_summary_list, num_products, product_summary, product_quantity,
transaction_cost, account_params_list, account_name, account_type, account_num,
billing_addres, zipcode, phone, sign, merchant_params_list, merchant_id, merchant_name,
merchant_auth_key)
VALUES (time( ), $purchase_summary_list, $num_products, $product_summary,
$product_quantity, $transaction_cost, $account_params_list, $account_name,
$account_type, $account_num, $billing_addres, $zipcode, $phone, $sign,
$merchant_params_list, $merchant_id, $merchant_name, $merchant_auth_key)"); // add
data to table in database
mysql_close("RUAP_DB.SQL"); // close connection to database
?>
```

In some embodiments, the healthcare collection portal server may forward a transaction authorization response, e.g., 1732, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1733, and store the XML data file, e.g., 1734, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Acme Supermarket, Inc.</merchant_name>
    <merchant_auth_key>1NNF484MCP59CHB27365</merchant_auth_key>
    <account_number>123456789</account_number>
</merchant_data>
<transaction_data>
    <transaction 1>
        ...
    </transaction 1>
    <transaction 2>
        ...
    </transaction 2>
    .
    .
    .
    <transaction n>
        ...
    </transaction n>
</transaction_data>
```

In some embodiments, the server may also generate a purchase receipt, e.g., 1733, and provide the purchase receipt to the client, e.g., 1735. The client may render and display, e.g., 1736, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 18B:
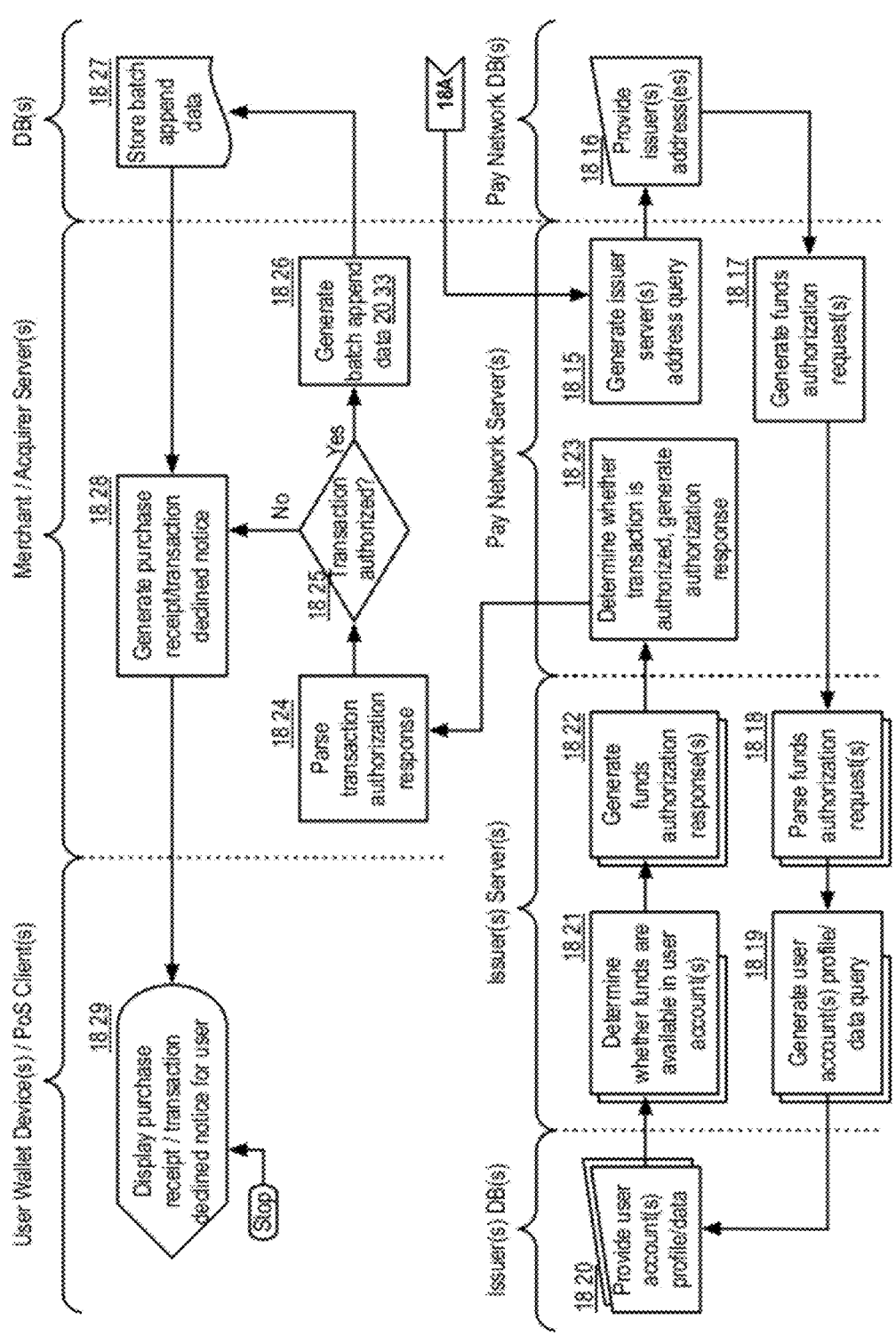

FIGS. 18A-B show logic flow diagrams illustrating example aspects of purchase transaction authorization in some embodiments of the RUAP, e.g., a Purchase Transaction Authorization ("PTA") component. With reference to FIG. 18A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 1801, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 1802-1803.

In some embodiments, upon authenticating the user for access to virtual wallet features, the user wallet device may provide a transaction authorization input, e.g., 1804, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 1805. For example, the PoS client may utilize a parser, such as the example parsers provided below in the discussion with reference to FIG. 24. The PoS client may generate a card authorization request, e.g., 1806, using the obtained transaction authorization input from the user wallet device, and/or product/checkout data.

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 1808, for a network address of the payment gateway server, for example by using a portion of a user payment card number, or a user ID (such as an email address) as a keyword for the database query. In response, the merchant/acquirer database may provide the requested payment gateway address, e.g., 1810. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 1811. For example, the pay gateway server may invoke components for fraud prevention (see e.g., VerifyChat, FIG. 3E), loyalty and/or rewards, and/or other services for which the user-merchant combination is authorized.

The pay gateway server may forward the card authorization request to a healthcare collection portal server for payment processing, e.g., 1814. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 1812, for a network address of the payment network server, for example by using a portion of a user payment card number, or a user ID (such as an email address) as a keyword for the database query. In response, the payment gateway database may provide the requested payment network address, e.g., 1813. The pay gateway server may forward the card authorization request to the healthcare collection portal server using the provided address, e.g., 1814.

With reference to FIG. 18B, in some embodiments, the healthcare collection portal server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the healthcare collection portal server may generate a query, e.g., 1815, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a healthcare collection portal database, may store details of the issuer server(s) associated with the issuer(s). In some embodiments, the healthcare collection portal server may query a database, e.g., 1815, for a network address of the issuer(s) server(s), for example by using a portion of a user payment card number, or a user ID (such as an email address) as a keyword for the database query.

In response to obtaining the issuer server query, the healthcare collection portal database may provide, e.g., 1816, the requested issuer server data to the healthcare collection portal server. In some embodiments, the healthcare collection portal server may utilize the issuer server data to generate funds authorization request(s), e.g., 1817, for each of the issuer server(s) selected based on the predefined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 1818, and based on the request details may query a database, e.g., 1819, for data associated with an account linked to the user.

In some embodiments, on obtaining the user account(s) data, e.g., 1820, the issuer server may determine whether the user can pay for the transaction using funds available in the account, e.g., 1821. For example, the issuer server may determine whether the user has a sufficient balance remaining in the account, sufficient credit associated with the account, and/or the like. Based on the determination, the issuer server(s) may provide a funds authorization response, e.g., 1822, to the healthcare collection portal server. In some embodiments, if at least one issuer server determines that the user cannot pay for the transaction using the funds available in the account, the healthcare collection portal server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the healthcare collection portal server may abort the authorization process, and provide an "authorization fail" message to the merchant server, user device and/or client.

In some embodiments, the healthcare collection portal server may obtain the funds authorization response including a notification of successful authorization, and parse the message to extract authorization details. Upon determining that the user possesses sufficient funds for the transaction, e.g., 1823, the healthcare collection portal server may invoke a component to provide value-add services for the user, e.g., 1823.

In some embodiments, the healthcare collection portal server may forward a transaction authorization response to the user wallet device, PoS client, and/or merchant server. The merchant may parse, e.g., 1824, the transaction authorization response, and determine from it that the user possesses sufficient funds in the card account to conduct the transaction, e.g., 1825, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 1826, and store the XML data file, e.g., 1827, in a database. In some embodiments, the server may also generate a purchase receipt, e.g., 1828, and provide the purchase receipt to the client. The client may render and display, e.g., 1829, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 19A:
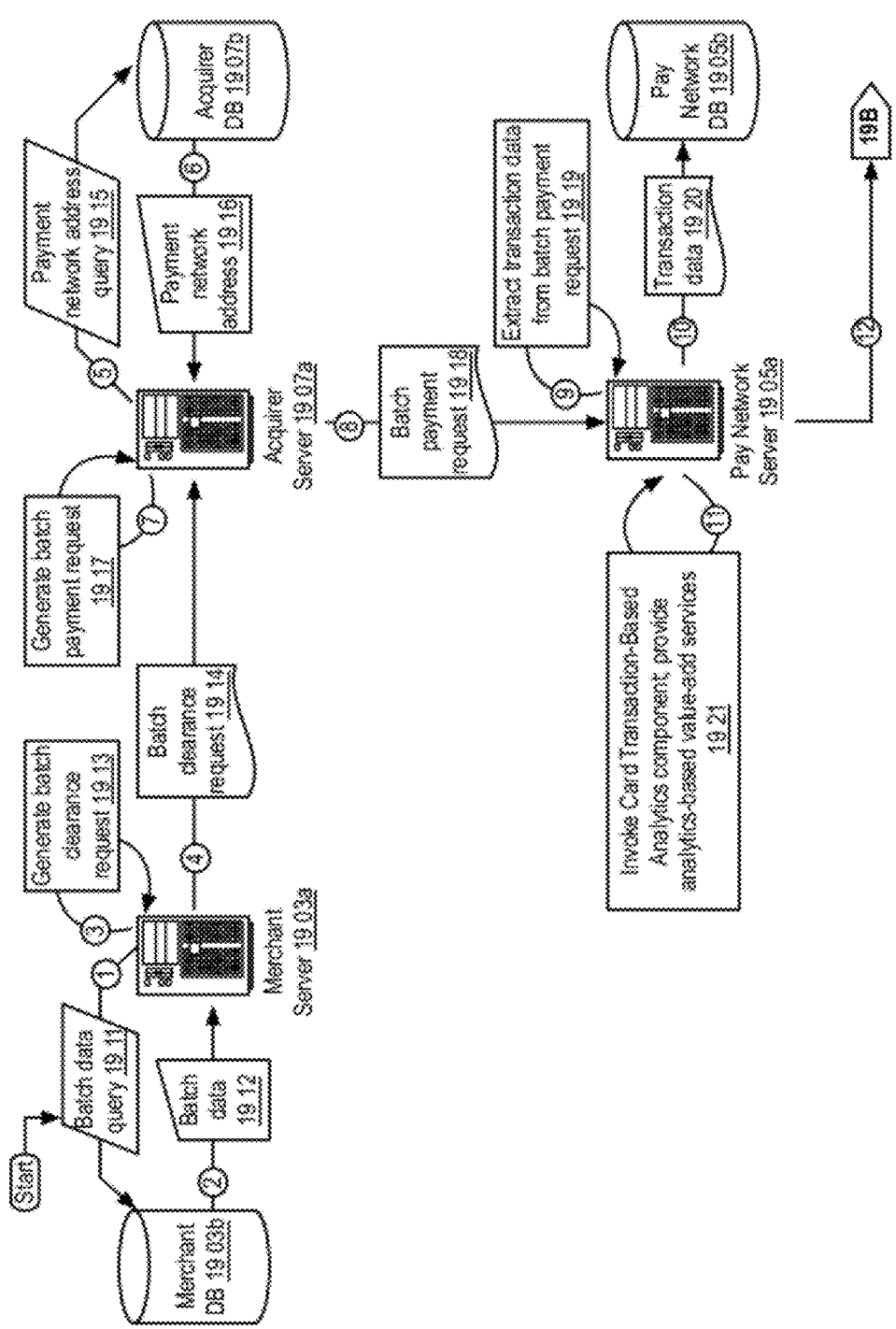
FIGS. 19A-B show data flow diagrams illustrating an example purchase transaction clearance procedure in some embodiments of the RUAP.
Figure 19B:
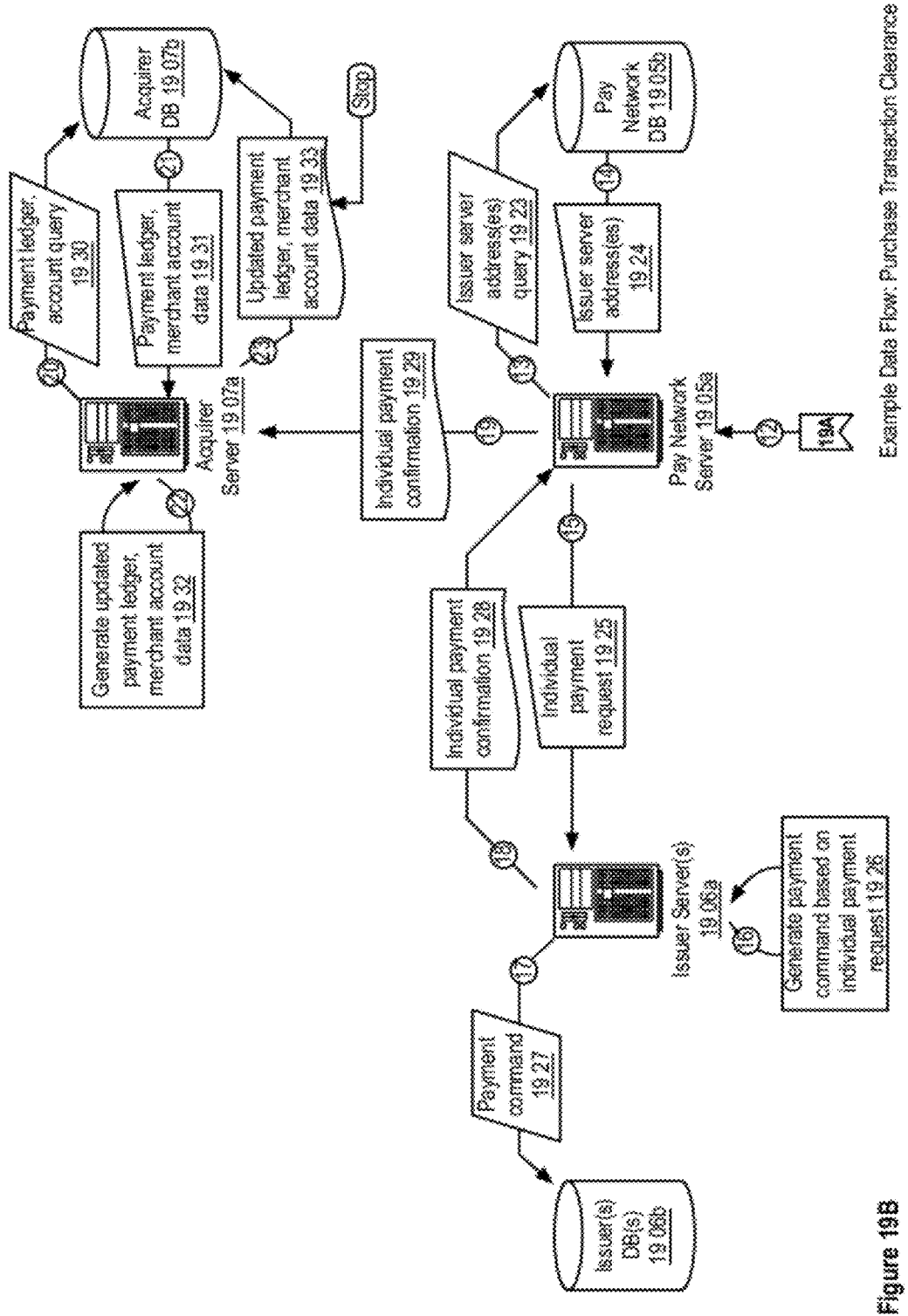

FIGS. 19A-B show data flow diagrams illustrating an example purchase transaction clearance procedure in some embodiments of the RUAP. With reference to FIG. 19A, in some embodiments, a merchant server, e.g., 1903a, may initiate clearance of a batch of authorized transactions. For example, the merchant server may generate a batch data request, e.g., 1911, and provide the request, to a merchant database, e.g., 1903b. For example, the merchant server may utilize PHP/SQL commands similar to the examples provided above to query a relational database. In response to the batch data request, the database may provide the requested batch data, e.g., 1912. The server may generate a batch clearance request, e.g., 1913, using the batch data obtained from the database, and provide, e.g., 1914, the batch clearance request to an acquirer server, e.g., 1907a. For example, the merchant server may provide a HTTP(S) POST message including XML-formatted batch data in the message body for the acquirer server. The acquirer server may generate, e.g., 1915, a batch payment request using the obtained batch clearance request, and provide, e.g., 1918, the batch payment request to the healthcare collection portal server, e.g., 1905a. The healthcare collection portal server may parse the batch payment request, and extract the transaction data for each transaction stored in the batch payment request, e.g., 1919. The healthcare collection portal server may store the transaction data, e.g., 1920, for each transaction in a database, e.g., healthcare collection portal database 1905b. In some embodiments, the healthcare collection portal server may invoke a component to provide value-add analytics services based on analysis of the transactions of the merchant for whom the RUAP is clearing purchase transactions. For example, the healthcare collection portal server may invoke a component such as the example card transaction-based analytics component discussed above with reference to FIG. 10. Thus, in some embodiments, the healthcare collection portal server may provide analytics-based value-added services for the merchant and/or the merchant's users.

With reference to FIG. 19B, in some embodiments, for each extracted transaction, the healthcare collection portal server may query, e.g., 1923, a database, e.g., healthcare collection portal database 1905b, for an address of an issuer server. For example, the healthcare collection portal server may utilize PHP/SQL commands similar to the examples provided above. The healthcare collection portal server may generate an individual payment request, e.g., 1925, for each transaction for which it has extracted transaction data, and provide the individual payment request, e.g., 1925, to the issuer server, e.g., 1906a. For example, the healthcare collection portal server may provide an individual payment request to the issuer server(s) as a HTTP(S) POST message including XML-formatted data. An example listing of an individual payment request 1925, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Smith</account_name>
        <account_type>credit</account_type>
        <account_num>123456789012345</account_num>
        <billing_address>123 Green St., Norman, OK 98765</billing_address>
        <phone>123-456-7809</phone>
        <sign>/jqp/</sign>
    </account_params>
    <merchant_params>
        <merchant_id>3FBCR4INC</merchant_id>
        <merchant_name>Acme Supermarket, Inc.</merchant_name>
        <merchant_auth_key>1NNF484MCP59CHB27365</merchant_auth_key>
    </merchant_params>
    <purchase_summary>
        <num_products>1</num_products>
        <product>
            <product_summary>Book - XML for dummies</product_summary>
            <product_quantity>1</product_quantity?
        </product>
    </purchase_summary>
</pay_request>
```

In some embodiments, the issuer server may generate a payment command, e.g., 1927. For example, the issuer server may issue a command to deduct funds from the user's account (or add a charge to the user's credit card account). The issuer server may issue a payment command, e.g., 1927, to a database storing the user's account information, e.g., user profile database 1906b. The issuer server may provide an individual payment confirmation, e.g., 1928, to the healthcare collection portal server, which may forward, e.g., 1929, the funds transfer message to the acquirer server. An example listing of an individual payment confirmation 1928, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 1930, an acquirer database 1907b for payment ledger and/or merchant account data, e.g., 1931. The acquirer server may utilize payment ledger and/or merchant account data from the acquirer database, along with the individual payment confirmation, to generate updated payment ledger and/or merchant account data, e.g., 1932. The acquirer server may then store, e.g., 1933, the updated payment ledger and/or merchant account data to the acquire database.

Figure 20A:
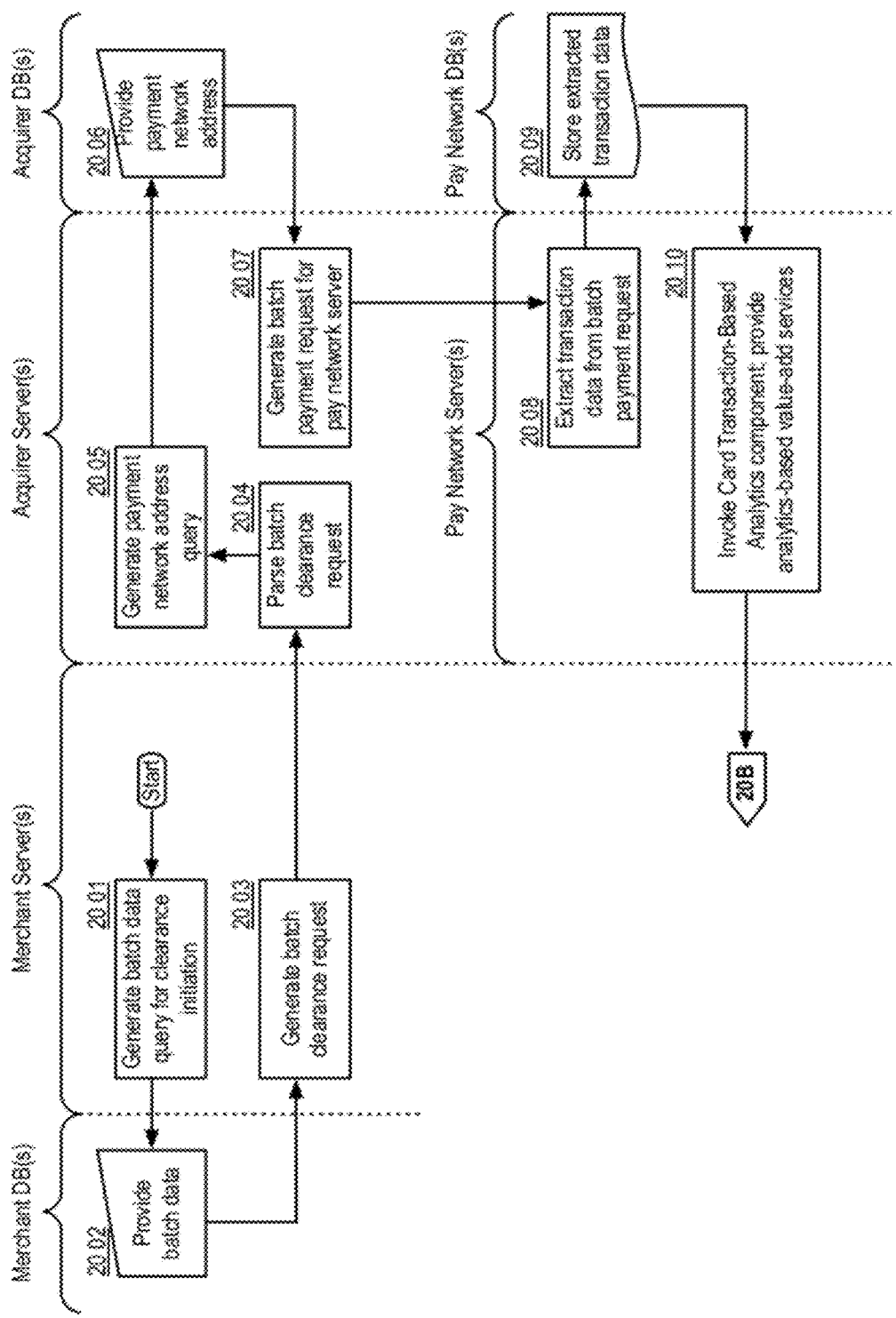
FIGS. 20A-B show logic flow diagrams illustrating example aspects of purchase transaction clearance in some embodiments of the RUAP, e.g., a Purchase Transaction Clearance ("PTC") component.
Figure 20B:
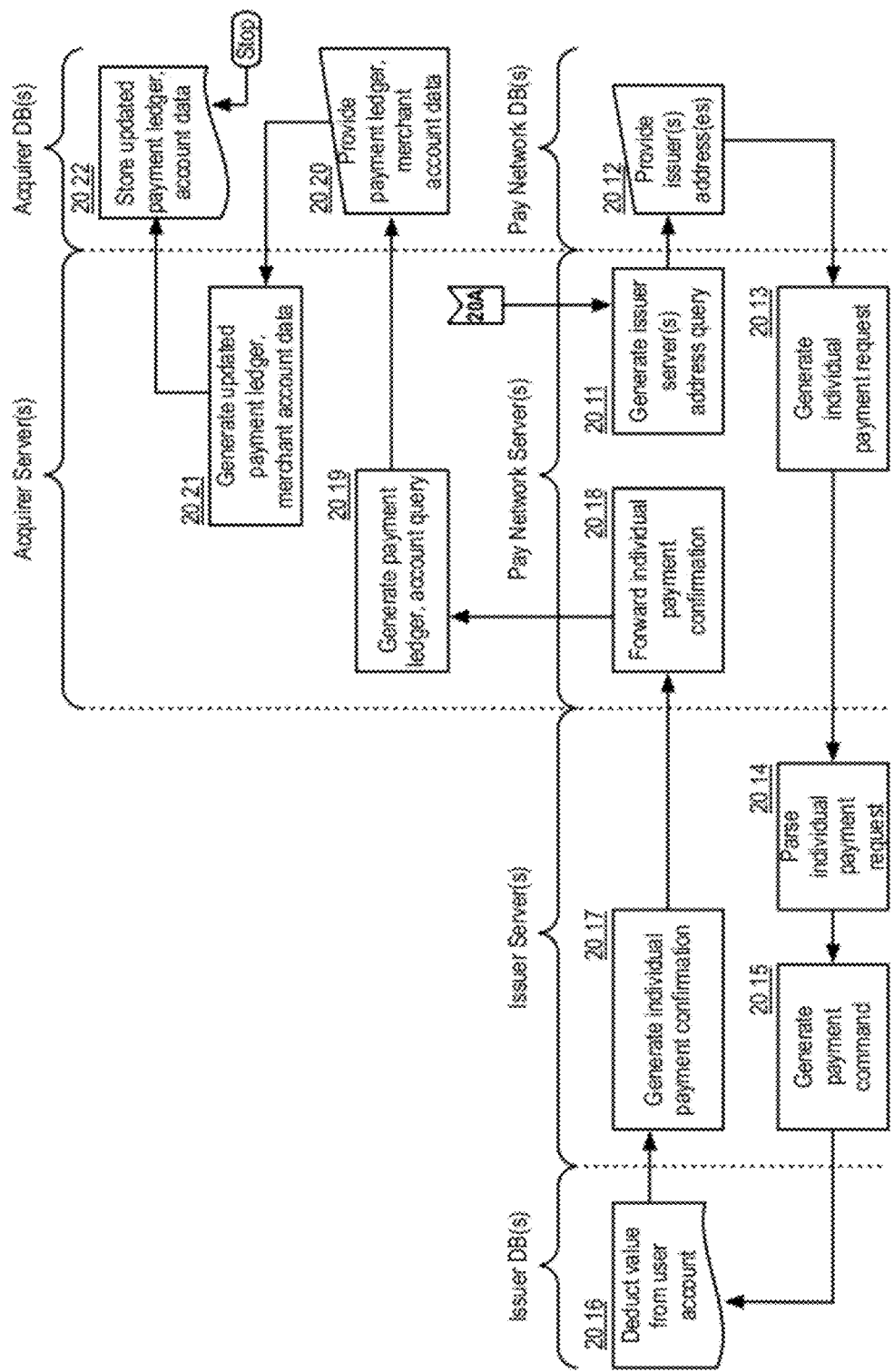

FIGS. 20A-B show logic flow diagrams illustrating example aspects of purchase transaction clearance in some embodiments of the RUAP, e.g., a Purchase Transaction Clearance ("PTC") component 2000. With reference to FIG. 20A, in some embodiments, a merchant server may initiate clearance of a batch of authorized transactions. For example, the merchant server may generate a batch data request, e.g., 2001, and provide the request to a merchant database. In response to the batch data request, the database may provide the requested batch data, e.g., 2002. The server may generate a batch clearance request, e.g., 2003, using the batch data obtained from the database, and provide the batch clearance request to an acquirer server. The acquirer server may parse, e.g., 2004, the obtained batch clearance request, and generate, e.g., 2007, a batch payment request using the obtained batch clearance request to provide, the batch payment request to a healthcare collection portal server. For example, the acquirer server may query, e.g., 2005, an acquirer database for an address of a payment network server, and utilize the obtained address, e.g., 2006, to forward the generated batch payment request to the healthcare collection portal server.

The healthcare collection portal server may parse the batch payment request obtained from the acquirer server, and extract the transaction data for each transaction stored in the batch payment request, e.g., 2008. The healthcare collection portal server may store the transaction data, e.g., 2009, for each transaction in a healthcare collection portal database. In some embodiments, the healthcare collection portal server may invoke a component, e.g., 2010, to provide analytics based on the transactions of the merchant for whom purchase transaction are being cleared. For example, the healthcare collection portal server may invoke a component such as the example card transaction-based analytics component discussed above with reference to FIG. 10.

With reference to FIG. 20B, in some embodiments, for each extracted transaction, the healthcare collection portal server may query, e.g., 2011, a healthcare collection portal database for an address of an issuer server. The healthcare collection portal server may generate an individual payment request, e.g., 2013, for each transaction for which it has extracted transaction data, and provide the individual payment request to the issuer server. In some embodiments, the issuer server may parse the individual payment request, e.g., 2014, and generate a payment command, e.g., 2015, based on the parsed individual payment request. For example, the issuer server may issue a command to deduct funds from the user's account (or add a charge to the user's credit card account). The issuer server may issue a payment command, e.g., 2015, to a database storing the user's account information, e.g., a user profile database. The issuer server may provide an individual payment confirmation, e.g., 2017, to the healthcare collection portal server, which may forward, e.g., 2018, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 2019, an acquirer database for payment ledger and/or merchant account data, e.g., 2020. The acquirer server may utilize payment ledger and/or merchant account data from the acquirer database, along with the individual payment confirmation, to generate updated payment ledger and/or merchant account data, e.g., 2021. The acquirer server may then store, e.g., 2022, the updated payment ledger and/or merchant account data to the acquire database.

Figure 21:
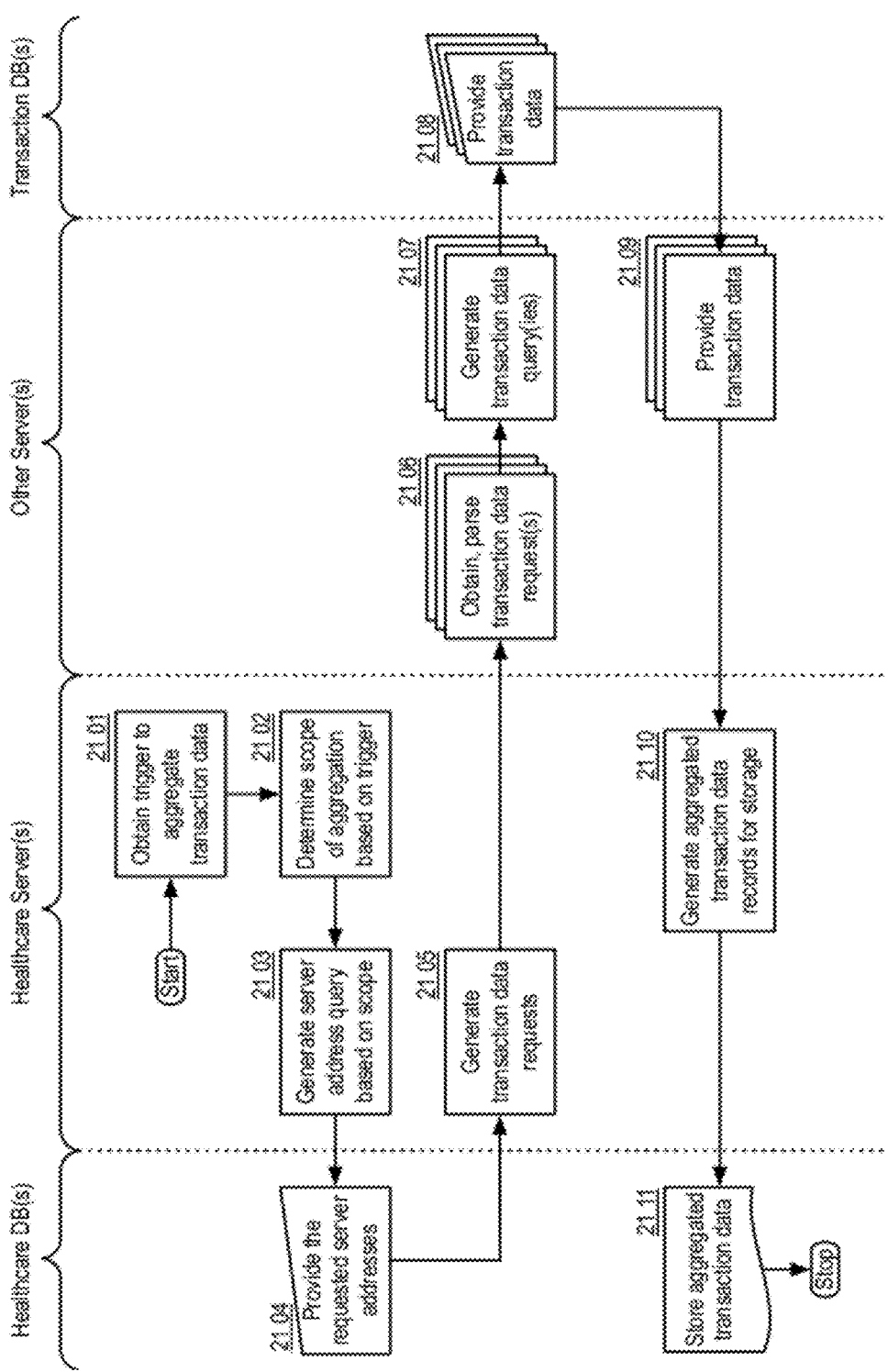
FIG. 21 shows a logic flow diagram illustrating example aspects of transaction data aggregation in some embodiments of the RUAP, e.g., a Transaction Data Aggregation ("TDA") component.

FIG. 21 shows a logic flow diagram illustrating example aspects of transaction data aggregation in some embodiments of the RUAP, e.g., a Transaction Data Aggregation ("TDA") component. In some embodiments, a RUAP server may obtain a trigger to aggregate transaction data, e.g., 2101. For example, the server may be configured to initiate transaction data aggregation on a regular, periodic, or continuous basis. As another example, the server may be configured to initiate transaction data aggregation in real-time on-demand. The RUAP server may determine a scope of data aggregation desired to perform the transaction analytics, e.g., 2102. For example, the scope of data aggregation may be pre-determined. As another example, the scope of data aggregation may be determined based on a received request for analytics, in real-time. The RUAP server may initiate data aggregation based on the determined scope. The RUAP server may generate a query for addresses of servers storing transaction data within the determined scope, e.g., 2103. The RUAP server may query a database for addresses of other servers that may have stored transaction data within the determined scope of the data aggregation. The database may provide, e.g., 2104, a list of server addresses in response to the RUAP server's query. Based on the list of server addresses, the RUAP server may generate transaction data requests, e.g., 2105. The RUAP server may issue the generated transaction data requests to the other servers. The other servers may obtain and parse the transaction data requests, e.g., 2106. Based on parsing the data requests, the other servers may generate transaction data queries, e.g., 2107, and provide the transaction data queries to their transaction databases. In response to the transaction data queries, the transaction databases may provide transaction data, e.g., 2108, to the other servers. The other servers may return, e.g., 2109, the transaction data obtained from the transactions databases to the RUAP server making the transaction data requests. The RUAP server may generate aggregated transaction data records from the transaction data received from the other servers, e.g., 2110, and store the aggregated transaction data in a database, e.g., 2111.

Figure 22:
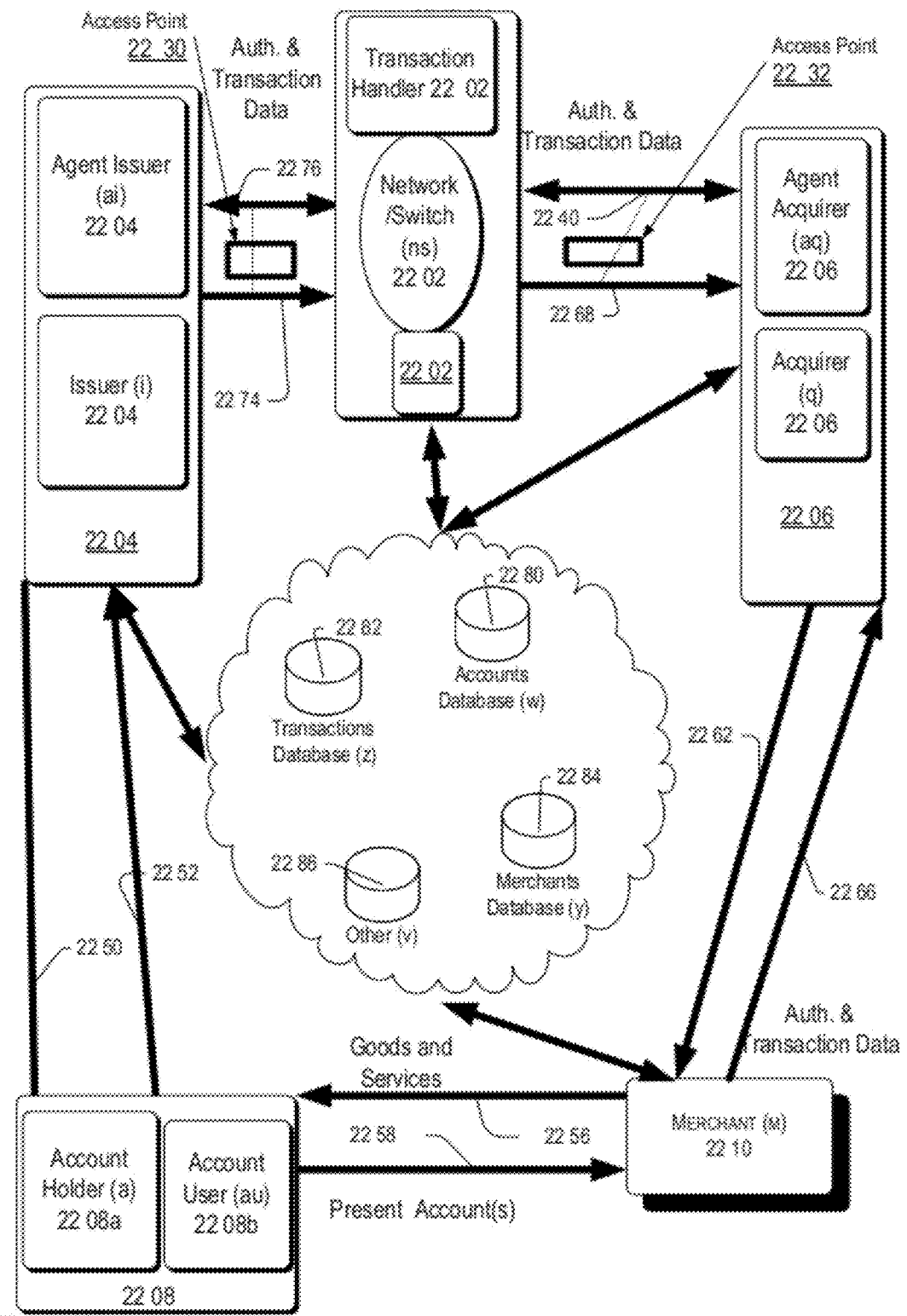
FIGS. 22-23 provide block diagrams illustrating infrastructure within embodiments of the RUAP.

FIG. 22 illustrates an exemplary open system payment processing network, depicting a general environment in which a merchant (m) 2210 can conduct a transaction for goods and/or services with an account user (au) or customer on an account (e.g., a prepaid account, credit account, points account, etc.) issued to an account holder (a) 2208 by an issuer (i) 2204, where the processes of paying and being paid for the transaction are coordinated by a transaction handler 2202. The transaction includes participation from different entities that are each a component of the payment processing system. As such, the open system payment processing network can be used by a patient (or agent thereof) to pay a healthcare service provider to who a balance due bill is owed as described above.

Payment processing system has a plurality of merchants 2210 that includes merchant (1) 2210 through merchant (M) 2210, where M can be up to and greater than an eight digit integer. Payment processing system has a plurality of accounts 2208 each of which is held by a corresponding account holder (1) 2208 through account holder (A) 2208, where A can be up to and greater than a ten eight digit integer.

Payment processing system includes account user (1) 2208 through account user (AU) 2208, where AU can be as large as a ten digit integer or larger. Each account user (au) may act as a customer and initiate a transaction for goods and/or services with merchant (m) 2210 using an account that has been issued by an issuer (i) 2204 to a corresponding account holder (a) 2208. Data from the transaction on the account is collected by merchant (m) and forwarded to a corresponding acquirer (a) 2206. Acquirer (a) 2206 forwards the data to transaction handler 2202 who facilitates payment for the transaction from the account issued by the issuer (i) 2204 to account holder (a) 2208.

Payment processing system has a plurality of issuers 2204. Each issuer (i) 2204 may be assisted in processing one or more transactions by a corresponding agent issuer (ai) 2204, where 'i' can be an integer from 1 to I, where 'ai' can be an integer from 1 to AI, and where I and AI can be as large as an eight digit integer or larger.

Payment processing system has a plurality of acquirers 2206. Each acquirer (q) 2206 may be assisted in processing one or more transactions by a corresponding agent acquirer (aq) 2204, where 'q' can be an integer from 1 to Q, where 'aq' can be an integer from 1 to AQ, and where Q and AQ can be as large as a eight digit integer or larger.

Payment processing system has a transaction handler 2202 to process a plurality of transactions. The transaction handler 2202 can include one or a plurality or networks and switches 2202. Each network/switch (ns) 2202 can be a mainframe computer in a geographic location different than each other network/switch (ns) 2202, where 'ns' is an integer from one to NS, and where NS can be as large as a four-digit integer or larger.

Dedicated communication systems 2268-2276 (e.g., private communication network(s)) facilitate communication between the transaction handler 2202 and each issuer (i) 2204 and each acquirer (a) 2206. The Internet 2212, via e-mail, the World Wide Web, cellular telephony, and/or other optional public and private communications systems, can facilitate communications using communication systems 2250-2266 among and between each issuer (i) 2204, each acquirer (a) 2206, each merchant (m) 2210, each account holder (a) 2208, and the transaction handler 2202. Alternatively and optionally, one or more dedicated communication systems 2250-2266 can facilitate respective communications between each acquirer (a) 2206 and each merchant (m) 2210, each merchant (m) and each account holder (a) 2208, and each account holder (a) 2208 and each issuer (i) 2204, respectively.

Each acquirer (q) 2206 may be assisted in processing one or more transactions by a corresponding agent acquirer (aq) 2204, where 'q' can be an integer from 1 to Q, where aq can be an integer from 1 to AQ, and where Q and AQ can be as large as a eight digit integer or larger.

Merchant (m) 2210 may be a person or entity that sells goods and/or services. Merchant (m) 2210 may also be, for instance, a healthcare service provider, a manufacturer, a distributor, a retailer, a load agent, a drugstore, a grocery store, a gas station, a hardware store, a supermarket, a boutique, a restaurant, or a doctor's office. In a business-to-business setting, the account holder (a) 2208 may be a second merchant making a purchase from another merchant (m) 2210. Merchant (m) 2210 may use at least one stationary and/or mobile point-of-sale terminal (POS) that can communicate with acquirer (a) 2206, transaction handler 2202, or issuer (i) 2204. Thus, the POS terminal is in operative communication with the payment processing system.

Typically, a transaction begins with account user (au) 2208 presenting a portable consumer device to merchant (m) 2210 to initiate an exchange for a good or service. The portable consumer device may be associated with an account (e.g., a monetary or reward points account) of account holder (a) 2208 that was issued to the account holder (a) 2208 by issuer (i) 2204.

The portable consumer device may be in a form factor that can be a payment card, a gift card, a smartcard, a smart media device, a payroll card, a healthcare card, a wrist band, a machine readable medium containing account information, a keychain device, such as a SPEEDPASS® device commercially available from ExxonMobil Corporation, or a supermarket discount card, a cellular phone, personal digital assistant, a pager, a security card, an access card, a wireless terminal, or a transponder. The portable consumer device may include a volatile or non-volatile memory to store information such as the account number or the name of an account holder (a) 2208.

Merchant (m) 2210 may use the POS terminal to obtain account information, such as a number of the account of the account holder (a) 2208, from the portable consumer device. The portable consumer device may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer (i) 2204 of the account corresponding to the portable consumer device. Alternatively, or in combination, the portable consumer device may communicate with issuer (i) 2204, transaction handler 2202, or acquirer (a) 2206.

Issuer (i) 2204 may authorize the transaction using transaction handler 2202. Transaction handler 2202 may also clear the transaction. Authorization includes issuer (i) 2204, or transaction handler 2202 on behalf of issuer (i) 2204, authorizing the transaction in connection with issuer (i) 2204's instructions such as through the use of business rules. The business rules could include instructions or guidelines from transaction handler 2202, account holder (a) 2208, merchant (m) 2210, acquirer (a) 2206, issuer (i) 2204, a related financial institution, or combinations thereof. Transaction handler 2202 may maintain a log or history of authorized transactions. Once approved, merchant (m) 2210 will record the authorization, allowing account user (au) 2208 to receive the good or service from merchant (m) or an agent thereof.

Merchant (m) 2210 may, at discrete periods, such as at the end of the day, submit a list of authorized transactions to acquirer (a) 2206 or other transaction related data for processing through the payment processing system. Transaction handler 2202 may compare the submitted authorized transaction list with its own log of authorized transactions. If a match is found, transaction handler 2202 may route authorization transaction amount requests from the corresponding acquirer (a) 2206 to the corresponding issuer (i) 2204 involved in each transaction. Once acquirer (a) 2206 receives the payment of the authorized transaction amount from issuer (i) 2204, acquirer (a) 2206 can forward the payment to merchant (m) 2210 less any transaction costs, such as fees for the processing of the transaction. If the transaction involves a debit or prepaid card, acquirer (a) 2206 may choose not to wait for the issuer (i) 2204 to forward the payment prior to paying merchant (m) 2210.

There may be intermittent steps in the foregoing process, some of which may occur simultaneously. For example, acquirer (a) 2206 can initiate the clearing and settling process, which can result in payment to acquirer (a) 2206 for the amount of the transaction. Acquirer (a) 2206 may request from transaction handler 2202 that the transaction be cleared and settled. Clearing includes the exchange of financial information between the issuer (i) 2204 and the acquirer (a) 2206 and settlement includes the exchange of funds. Transaction handler 2202 can provide services in connection with settlement of the transaction. The settlement of a transaction includes depositing an amount of the transaction settlement from a settlement house, such as a settlement bank, which transaction handler 2202 typically chooses, into a clearinghouse, such as a clearing bank, that acquirer (a) 2206 typically chooses. Issuer (i) 2204 deposits the same from a clearinghouse, such as a clearing bank, which issuer (i) 2204 typically chooses, into the settlement house. Thus, a typical transaction involves various entities to request, authorize, and fulfill processing the transaction.

Payment processing system will preferably have network components suitable for scaling the number and data payload size of transactions that can be authorized, cleared and settled in both real time and batch processing. These include hardware, software, data elements, and storage network devices for the same. Examples of payment processing system include those operated, at least in part, by American Express, Master Card, Discover Card, First Data Corporation, Diners Club, and Visa Inc., and agents of the foregoing.

Each network/switch (ns) 2202 can include one or more data centers for processing transactions, where each transaction can include up to 100 kilobytes of data or more. The data corresponding to the transaction can include information about the types and quantities of goods and services in the transaction, information about the account holder (a) 2208, the account user (au) 2208, the merchant (m) 2210, financial and incentive treatment(s) of the goods and services, coupons, rebates, rewards, loyalty, discounts, returns, exchanges, cash-back transactions, etc. Of course, in the case of the data corresponding to a healthcare-related transaction, the information would necessarily be limited with respect to the goods and services in the transaction as would be consistent with full regulatory compliance (e.g.; HIPAA compliance in the USA, the Personal Health Information Protection Act (PHIPA) in Canada, etc.)

By way of example, network/switch (ns) 2202 can include one or more mainframe computers (e.g., one or more IBM mainframe computers) for communications over systems 2268-2276, one or more server farms (e.g., one or more Sun UNIX Superservers), where the mainframe computers and server farms can be in diverse geographic locations.

Each issuer (i) 2204 (or agent issuer (ai) 2204 thereof) and each acquirer (a) 2206 (or agent acquirer (aq) 2206 thereof) can use one or more router/switch (e.g., Cisco routers/switches) to communicate with each network/switch (ns) 2202 via dedicated communication systems 2268-2276, respectively.

Transaction handler 2202 stores information about transactions processed through payment processing system in data warehouses such as may be incorporated as part of the plurality of networks/switches (ns) 2202. This information can be data mined. The data mining transaction research and modeling can be used for advertising, account holder and merchant loyalty incentives and rewards, fraud detection and prediction, and to develop tools to demonstrate savings and efficiencies made possible by use of the payment processing system over paying and being paid by cash, checks, or other traditional payment mechanisms.

The VisaNet® system is an example component of the transaction handler 2202 in the payment processing system. The open system payment processing network seen in FIG. 22 can be enabled via a telecommunications network that may make use of any suitable telecommunications network and may involve different hardware, different software and/or different protocols then those discussed below. FIG. 22 can be deemed to depict a global telecommunications network that supports purchase and cash transactions using any bankcard, travel and entertainment cards, and other private label and proprietary cards. The network also supports ATM transactions for other networks, transactions using paper checks, transactions using smart cards, virtual cards, and transactions using other financial instruments.

These transactions are processed through the network's authorization, clearing and settlement services. Authorization is when an issuer approves or declines a sales transaction before a purchase is finalized or cash is dispersed. Clearing is when a transaction is delivered from an acquirer to an issuer for posting to the customer's account. Settlement is the process of calculating and determining the net financial position of each member for all transactions that are cleared. The actual exchange of funds is a separate process.

Transactions can be authorized, cleared and settled as either a dual message or a single message transaction. A dual message transaction is sent twice—the first time with only information needed for an authorization decision, an again later with additional information for clearing and settlement. A single message transaction is sent once for authorization and contains clearing and settlement information as well. Typically, authorization, clearing and settlement all occur on-line.

FIG. 22 includes one or more transaction handlers 2202, access points 2230, 2232, acquirers 2206, and issuers 2204. Other entities such as payor banks and third party authorizing agents may also connect to the network through an access point. An interchange center is a data processing center that may be located anywhere in the world. In one embodiment, there are two in the United States and one each in the United Kingdom and in Japan. Each interchange center houses the computer system that performs the network transaction processing. The interchange center serves as the control point for the telecommunication facilities of the network, which comprise high speed leased lines or satellite connections based on IBM SNA protocol. Preferably, the communication lines that connect an interchange center (Transaction Handler 2202) to remote entities use dedicated high-bandwidth telephone circuits or satellite connections based on the IBM SNA-LUo communication protocol. Messages are sent over these lines using any suitable implementation of the ISO 8583 standard.

Access points 2230, 2232 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) 2206 and its access point 2232, and between the access point 2230 and issuer (i) 2204 are typically local links within a center and use a proprietary message format as preferred by the center.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 23:
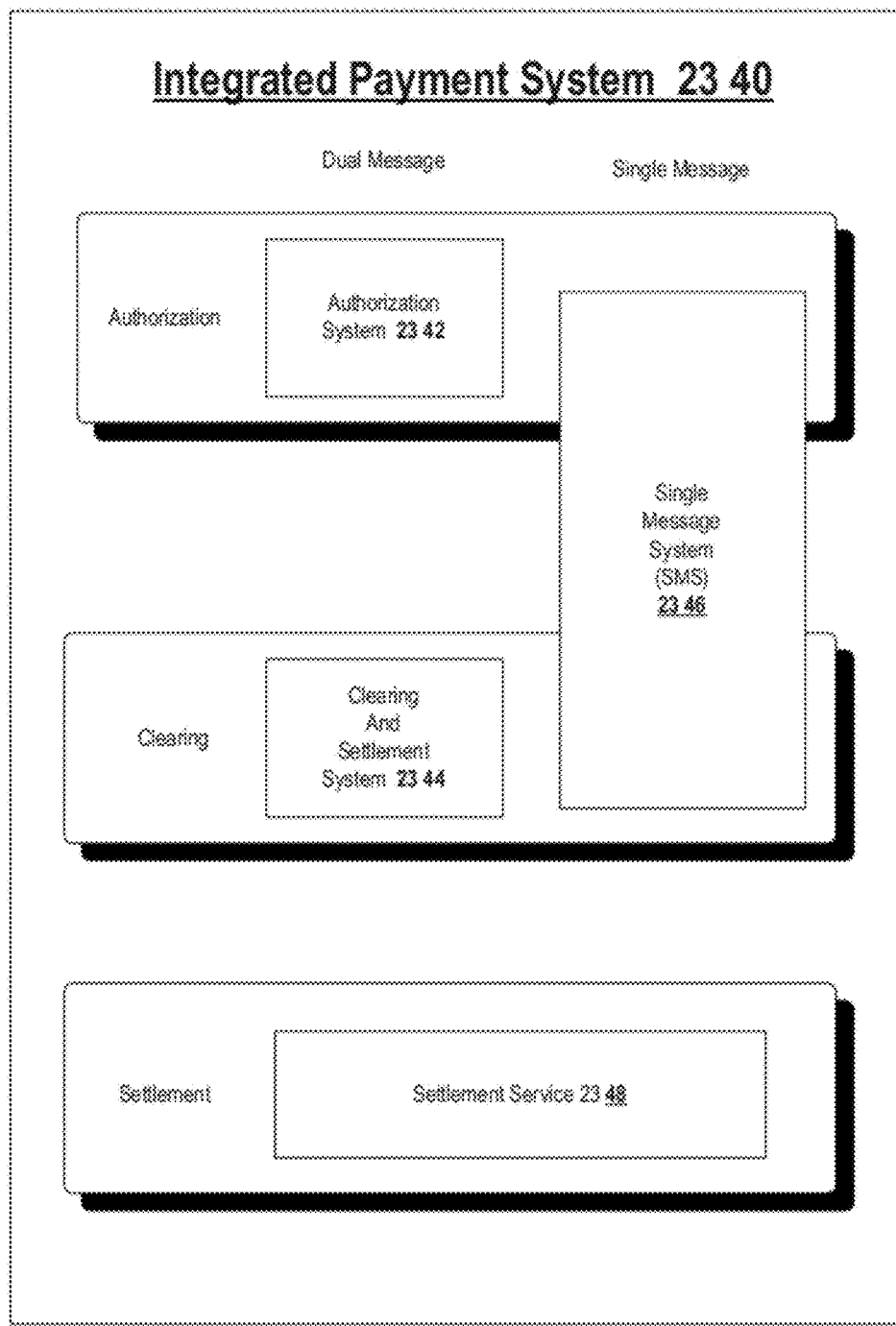

FIG. 23 illustrates an integrated payment system 2340 housed within an interchange center to provide on-line and off-line transaction processing within embodiments of the RUAP. For dual message transaction, authorization system 2342 provides authorization. Authorization system 2342 supports on-line and off-line functions, and its file includes internal systems tables, a customer database and a merchant central file. The on-line functions of system 2342 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 2342 to system 2346 makes it possible for members using system 542 to communicate with members using system 2346 and access the SMS gateways to outside networks.

Clearing and settlement system 2344 clears and settles previously authorized dual message transactions. Operating six days a week on a global basis, system 2344 collects financial and non-financial information and distributes reports between members It also calculates fees, charges and settlement totals and produces reports to help with reconciliation. A bridge forms an interchange between system 2344 processing centers and system 2346 processing centers.

Single message system 2346 processes full financial transactions. System 546 can also process dual message authorization and clearing transactions, and communicates with system 2342 using a bridge and accesses outside networks as required. System 2346 processes Visa, Plus Interlink and other card transactions. The SMS files comprise internal system tables that control system access and processing, and the cardholder database, which contains files of cardholder data used for PIN verification and stand-in processing authorization. System 2346 on-line functions perform real-time cardholder transaction processing and exception processing for authorization as well as full financial transactions. System 2346 also accumulates reconciliation and settlement totals. System 2346 off-line functions process settlement and funds transfer requests and provide settlement and activities reporting. Settlement service 548 consolidates the settlement functions of system 2344 and 2346, including Interlink, into a single service for all products and services. Clearing continues to be performed separately by system 2344 and system 2346.

RUAP Controller

FIG. 24 shows a block diagram illustrating example aspects of a RUAP controller 2401. In this embodiment, the RUAP controller 2401 may serve to aggregate, process, store, search, serve, identify, instruct, generate, match, and/or facilitate interactions with a computer through various technologies, and/or other related data.

Users, e.g., 2433a, which may be people and/or other systems, may engage information technology systems (e.g., computers) to facilitate information processing. In turn, computers employ processors to process information; such processors 2403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the RUAP controller 2401 may be connected to and/or communicate with entities such as, but not limited to: one or more users from user input devices 2411; peripheral devices 2412; an optional cryptographic processor device 2428; and/or a communications network 2413. For example, the RUAP controller 2401 may be connected to and/or communicate with users, e.g., 2433a, operating client device(s), e.g., 2433b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The RUAP controller 2401 may be based on computer systems that may comprise, but are not limited to, components such as: a computer systemization 2402 connected to memory 2429.

Computer Systemization

A computer systemization 2402 may comprise a clock 2430, central processing unit ("CPU(s)" and/or "processor(s)" (these terms are used interchangeably throughout the disclosure unless noted to the contrary)) 2403, a memory 2429 (e.g., a read only memory (ROM) 2406, a random access memory (RAM) 2405, etc.), and/or an interface bus 2407, and most frequently, although not necessarily, are all interconnected and/or communicating through a system bus 2404 on one or more (mother)board(s) 2402 having conductive and/or otherwise transportive circuit pathways through which instructions (e.g., binary encoded signals) may travel to effectuate communications, operations, storage, etc. The computer systemization may be connected to a power source 2486; e.g., optionally the power source may be internal. Optionally, a cryptographic processor 2426 and/or transceivers (e.g., ICs) 2474 may be connected to the system bus. In another embodiment, the cryptographic processor and/or transceivers may be connected as either internal and/or external peripheral devices 2412 via the interface bus I/O. In turn, the transceivers may be connected to antenna(s) 2475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing RUAP controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 2429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the RUAP controller and beyond through various interfaces. Should processing requirements dictate a greater amount speed and/or capacity, distributed processors (e.g., Distributed RUAP), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the RUAP may be achieved by implementing a microcontroller such as CAST's R8051XC2 microcontroller; Intel's MCS 51 (i.e., 8051 microcontroller); and/or the like. Also, to implement certain features of the RUAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the RUAP component collection (distributed or otherwise) and/or features may be implemented via the microprocessor and/or via embedded components; e.g., via ASIC, coprocessor, DSP, FPGA, and/or the like. Alternately, some implementations of the RUAP may be implemented with embedded components that are configured and used to achieve a variety of features or signal processing.

Depending on the particular implementation, the embedded components may include software solutions, hardware solutions, and/or some combination of both hardware/software solutions. For example, RUAP features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the RUAP features. A hierarchy of programmable interconnects allow logic blocks to be interconnected as needed by the RUAP system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the RUAP may be developed on regular FPGAs and then migrated into a fixed version that more resembles ASIC implementations. Alternate or coordinating implementations may migrate RUAP controller features to a final ASIC instead of or in addition to FPGAs. Depending on the implementation all of the aforementioned embedded components and microprocessors may be considered the "CPU" and/or "processor" for the RUAP.

Power Source

The power source 2486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2486 is connected to at least one of the interconnected subsequent components of the RUAP thereby providing an electric current to all the interconnected components. In one example, the power source 2486 is connected to the system bus component 2404. In an alternative embodiment, an outside power source 2486 is provided through a connection across the I/O 2408 interface. For example, a USB and/or IEEE 1394 connection carries both data and power across the connection and is therefore a suitable source of power.

Interface Adapters

Interface bus(ses) 2407 may accept, connect, and/or communicate to a number of interface adapters, frequently, although not necessarily in the form of adapter cards, such as but not limited to: input output interfaces (I/O) 2408, storage interfaces 2409, network interfaces 2410, and/or the like. Optionally, cryptographic processor interfaces 2427 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 2409 may accept, communicate, and/or connect to a number of storage devices such as, but not limited to: storage devices 2414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 2410 may accept, communicate, and/or connect to a communications network 2413. Through a communications network 2413, the RUAP controller is accessible through remote clients 2433*b* (e.g., computers with web browsers) by users 2433*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed RUAP), architectures may similarly be employed to pool, load balance, and/or otherwise increase the communicative bandwidth required by the RUAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2410 may be used to engage with various communications network types 2413. For example, multiple network interfaces may be employed to allow for the communication over broadcast, multicast, and/or unicast networks.

Input Output interfaces (I/O) 2408 may accept, communicate, and/or connect to user input devices 2411, peripheral devices 2412, cryptographic processor devices 2428, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 2411 often are a type of peripheral device 2412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2412 may be connected and/or communicate to I/O and/or other facilities of the like such as network interfaces, storage interfaces, directly to the interface bus, system bus, the CPU, and/or the like. Peripheral devices may be external, internal and/or part of the RUAP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 2428), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the RUAP controller may be embodied as an embedded, dedicated, and/or monitor-less (i.e., headless) device, wherein access would be provided over a network interface connection.

Cryptographic units such as, but not limited to, microcontrollers, processors 2426, interfaces 2427, and/or devices 2428 may be attached, and/or communicate with the RUAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2429. However, memory is a fungible technology and resource, thus, any number of memory embodiments may be employed in lieu of or in concert with one another. It is to be understood that the RUAP controller and/or a computer systemization may employ various forms of memory 2429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 2429 may include ROM 2406, RAM 2405, and a storage device 2414. A storage device 2414 may employ any number of computer storage devices/systems. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2429 may contain a collection of program and/or database components and/or data such as, but not limited to: operating system component(s) 2415 (operating system); information server component(s) 2416 (information server); user interface component(s) 2417 (user interface); Web browser component(s) 2418 (Web browser); database(s) 2419; mail server component(s) 2421; mail client component(s) 2422; cryptographic server component(s) 2420 (cryptographic server); the RUAP component(s) 2435; and/or the like (i.e., collectively a component collection). These components may be stored and accessed from the storage devices and/or from storage devices accessible through an interface bus. Although non-conventional program components such as those in the component collection may be stored in a local storage device 2414, they may also be loaded and/or stored in memory such as: peripheral devices, RAM, remote storage facilities through a communications network, ROM, various forms of memory, and/or the like.

Operating System

The operating system component 2415 is an executable program component facilitating the operation of the RUAP controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the RUAP controller to communicate with other entities through a communications network 2413. Various communication protocols may be used by the RUAP controller as a subcarrier transport mechanism for interaction, such as, but not limited to: multicast, TCP/IP, UDP, unicast, and/or the like.

Information Server

An information server component 2416 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the RUAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the RUAP database 2419, operating systems, other program components, user interfaces, Web browsers, and/or the like.

Access to the RUAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the RUAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the RUAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/9 Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2417 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2418 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the RUAP equipped nodes. The combined application may be nugatory on systems employing standard Web browsers.

Mail Server

A mail server component 2421 is a stored program component that is executed by a CPU 2403. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the RUAP.

Access to the RUAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2422 is a stored program component that is executed by a CPU 2403. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2420 is a stored program component that is executed by a CPU 2403, cryptographic processor 2426, cryptographic processor interface 2427, cryptographic processor device 2428, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the RUAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the RUAP component to engage in secure transactions if so desired. The cryptographic component facilitates the secure accessing of resources on the RUAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The RUAP Database

The RUAP database component 2419 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the RUAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the RUAP database is implemented as a data-structure, the use of the RUAP database 2419 may be integrated into another component such as the RUAP component 2435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2419 includes several tables 2419a-q. A Users table 2419a may include fields such as, but not limited to: user_id, applicant_id, firstname, lastname, address_line1, address_line2, dob, ssn, credit_check_flag, zipcode, city, state, account_params_list, account_mode, account_type, account_expiry, preferred_bank_name, preferred_ branch_name, credit_report, and/or the like. The User table may support and/or track multiple entity accounts on a RUAP. A Clients table 2419b may include fields such as, but not limited to: client_ID, client_type, client_MAC, client_IP, presentation_format, pixel_count, resolution, screen_size, audio_fidelity, hardware_settings_list, software_compatibilities_list, installed_apps_list, and/or the like. An Apps table 2419c may include fields such as, but not limited to: app_ID, app_name, app_type, OS_compatibilities_list, version, timestamp, developer_ID, and/or the like. An Accounts table 2419d may include fields such as, but not limited to: user_id, account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Claims table 2419e may include fields such as, but not limited to: user_id, claim_id, timestamp claim_type, snapshot_array, receipt_data, process_ sent_flag, process_clear_flag, and/or the like. An Issuers table 2419f may include fields such as, but not limited to: account_firstname, account_lastname, account_type, account_num, account_balance_list, billingaddress_$_{line}$1, billingaddress_line2, billing_zipcode, billing_state, shipping_preferences, shippingaddress_line1, shippingaddress_line2, shipping_zipcode, shipping_state, issuer_id, issuer_name, issuer_address, ip_address, mac_address, auth_key, port_num, security_settings_list, and/or the like. A Merchants table 2419g may include fields such as, but not limited to: merchant_id, merchant_name, provi merchant_address, ip_address, mac_address, auth_key, port_num, security_settings_list, and/or the like. An Acquirers table 2419h may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Transactions table 2419i may include fields such as, but not limited to: order_id, user_id, timestamp, transaction_cost, purchase_details_list, num_prod-ucts, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, rebate_ID, rebate_amount, rebate_user, rebate_sponsor, social_payment_id, and/or the like. A Batches table 2419j may include fields such as, but not limited to: applicant_firstname, applicant_lastname, applicant_ address_line1, applicant_address_line2, consumer_ bureau_data_list, consumer_bureau_data, applicant_ clear_flag, credit_limit, credit_score, account_balances, delinquency_flag, quality_flags, batch_id, transaction_id_list, timestamp_list, cleared_flag_list, clearance_trigger_settings, and/or the like. A Ledgers table 2419k may include fields such as, but not limited to: request_id, timestamp, deposit_amount, batch_id, transaction_id, clear_flag, deposit_account, transaction_summary, payor_name, payor_account, and/or the like. An Insurance Provider table 2419l may include fields such as, but not limited to InsuranceID, InsuranceName, InsuranceProgram, InsuranceBIN, InsuranceCoverageTable, InsuranceVeriCode, InsuranceAuthorization, and/or the like. A Healthcare Provider table 2419m may include fields such as, but not limited to HealthProviderID, HealthProviderName, HealthProviderZipcode, HealthProviderProcedureCode, HealthProviderClaimCode, HealthProviderPricingList, and/or the like. A medical products/services table 2419n may include fields such as, but not limited to authorizedMedProductID, authorizedMedServiceID, ProductCode, ServiceProcedureCode, HealthProviderID, InsuranceID, InsuranceCoverageRate, PricingRate, and/or the like. A Restricted-Use Codes table 2419o may include fields such as, but not limited to ru_type, ru_issuer, ru_category, ru_mcc, ru_sponsor, ru_rule, ru_deduction, ru_alert, ru_account, ru_whitelist, ru_blacklist, and/or the like. A Receipt table 2419p may include fields such as, but not limited to receipt_id, receipt_user_id, receipt_wallet_id, receipt_time, receipt_merchant_id, receipt_image, receipt_item, receipt_mcc, receipt_amount, receipt_transaction_id, receipt_transaction_amount, receipt_claim, receipt_ qr_code, receipt_item_ru, and/or the like. A Bill table 2419q may include fields such as, but not limited to bill_id, bill_user_id, bill_wallet_id, bill_time, bill_merchant_id, bill_image, bill_item, bill_mcc, bill_amount, bill_transaction_id, bill_transaction_amount, bill_claim, bill_qr_code, bill_item_ru, and/or the like.

In one embodiment, the RUAP database may interact with other database systems. For example, employing a distributed database system, queries and data access by search RUAP component may treat the combination of the RUAP database, an integrated data security layer database as a single database entity.

In one embodiment, user programs may contain various user interface primitives, which may serve to update the RUAP. Also, various accounts may require custom database tables depending upon the environments and the types of clients the RUAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices.

Similarly, configurations of the decentralized database controllers may be varied by consolidating and/or distributing the various database components 2419a-q. The RUAP may be configured to keep track of various settings, inputs, and parameters via database controllers.

The RUAP database may communicate to and/or with other components in a component collection, including itself, and/or facilities of the like. Most frequently, the RUAP database communicates with the RUAP component, other program components, and/or the like. The database may contain, retain, and provide information regarding other nodes and data.

The RUAPs

The RUAP component 2435 is a stored program component that is executed by a CPU. In one embodiment, the RUAP component incorporates any and/or all combinations of the aspects of the RUAP discussed in the previous figures. As such, the RUAP affects accessing, obtaining and the provision of information, services, transactions, and/or the like across various communications networks. The features and embodiments of the RUAP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the RUAP's features and facilities, and in many cases reduce the costs, energy consumption/requirements, and extend the life of RUAP's underlying infrastructure; this has the added benefit of making the RUAP more reliable. Similarly, many of the features and mechanisms are designed to be easier for users to use and access, thereby broadening the audience that may enjoy/employ and exploit the feature sets of the RUAP; such ease of use also helps to increase the reliability of the RUAP. In addition, the feature sets include heightened security as noted via the Cryptographic components 2420, 2426, 2428 and throughout, making access to the features and data more reliable and secure.

The RUAP transforms purchase item information inputs (e.g., see 203 in FIG. 2A) or purchase receipt inputs (e.g., see 411 in FIG. 4A) via RUAP components such as user enrollment component 2442 (e.g., FIGS. 8A-8B), card processing component 2443 (e.g., see FIGS. 17A-21), insurance authorization/adjudication component 2444 (e.g., see FIGS. 7A-7B), account recommendation component 2445 (e.g., see FIGS. 5D-5F), receipt/bill image processing component 2446 (e.g., see FIGS. 6A-6B), funds allocation (reimbursement processing) component 2447 (e.g., see FIGS. 4A-5C), restricted-use managing component 2449 (e.g., see FIG. 3C), PTA component 2451 (e.g., see FIGS. 18A-18B), PTC component 2452 (e.g., see FIGS. 19A-19B), TDA component 2453 (e.g., see FIG. 21) and/or the like into restricted-use account payment settlement outputs (e.g., see 226 in FIG. 2A; 766 in FIG. 7A, and/or the like).

The RUAP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the RUAP server employs a cryptographic server to encrypt and decrypt communications. The RUAP component may communicate to and/or with other components in a component collection, including itself, and/or facilities of the like. Most frequently, the RUAP component communicates with the RUAP database, operating systems, other program components, and/or the like. The RUAP may contain, communicate, generate, obtain, and/or provide program component, system, user, and/or data communications, requests, and/or responses.

Distributed RUAPs

The structure and/or operation of any of the RUAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the RUAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the RUAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

Non-limiting exemplary embodiments highlighting numerous further advantageous aspects include:

1. A processor-implemented restricted-use account reimbursement management method, comprising:

receiving a restricted-use account reimbursement request including receipt information related to a purchase transaction from a user;

obtaining purchase item information from the receipt information included in the restricted-use account reimbursement request;

identifying a restricted-use account of the user;

determining a purchase item is eligible for the restricted-account usage;

determining a reimbursement amount associated with the purchase item form the purchase item information;

generating a reimbursement authorization request message including the purchase item information and the reimbursement amount;

transmitting the reimbursement authorization request message to a restricted-account issuer for approval; and transacting the reimbursement amount from the restricted-use account to a user financial account upon the restricted-account issuer approval.
2. The method of embodiment 1, wherein the receipt information related to a purchase transaction comprises an image of a purchase receipt.
3. The method of embodiment 2, wherein the image of the purchase receipt is capture by a user mobile device.
4. The method of embodiment 1, wherein the restricted-use account reimbursement request is received via a user electronic wallet instantiated on a user mobile device.
5. The method of embodiment 4, wherein the user mobile device includes any of a smart phone, a laptop computer, and a personal digital assistant.
6. The method of embodiment 1, wherein the restricted-use account reimbursement request is received via a web-based application.
7. The method of embodiment 1, wherein the restricted-use account reimbursement request comprises user credentials including a user name and a password.
8. The method of embodiment 1, wherein the restricted-use account comprises any of: a Flexible Spending Account (FSA), and a Health Savings Accounts (HSA).
9. The method of embodiment 1, wherein the restricted use account comprises one or more government sponsored accounts, including any of Medicare and Medicaid.
10. The method of embodiment 1, wherein the restricted use account comprises an unemployment benefit account.
11. The method of embodiment 1, wherein the restricted-use account comprises any of a food stamp and a food voucher.
12. The method of embodiment 1, wherein the purchase item information includes a merchant category code.
13. The method of embodiment 1, wherein identifying a restricted-use account of the user comprises retrieving a user enrolled restricted-use account information from a user electronic wallet.
14. The method of embodiment 1, wherein obtaining purchase item information comprises performing an optical character recognition procedure on a receipt image.
15. The method of embodiment 1, wherein obtaining purchase item information comprises decoding a quick response code included in the receipt information.
16, The method of embodiment 1, wherein the purchase item information includes a payment amount associated with the purchase item.
17. The method of embodiment 1, wherein the reimbursement amount equals a payment amount obtained from the receipt information.
18. The method of embodiment 1, further comprising:
obtaining user insurance information;
determining the purchase item is a healthcare related product; and
generating an insurance embodiment request to an insurance provider.
19. The method of embodiment 1, further comprising:
receiving an insurance refund from the insurance provider.
20. The method of embodiment 19, further comprising:
calculating the reimbursement amount as a payment amount of the purchase item minus the insurance refund.
21. The method of embodiment 1, wherein the account issuer verifies the purchase item is eligible for usage with the restricted-use account.
22. The method of embodiment 1, wherein the account issuer determines there is sufficient remaining balance to reimburse for the reimbursement amount.
23. The method of embodiment 1, further comprising:
generating a restricted-use account recommendation list when the purchase item is eligible for more than one restricted-use accounts.
24. The method of embodiment 23, wherein the restricted-use account recommendation list is generated based on user configured restricted-use account usage rules.
25. The method of embodiment 23, wherein the wherein the restricted-use account recommendation list is generated based on available balance of each restricted-use account.
26. The method of embodiment 23, wherein the restricted-use account recommendation list ranks accounts in a prioritized order.
27. The method of embodiment 1, wherein the restricted-use account reimbursement account further comprises a user selected account for depositing reimbursed funds.
28. The method of embodiment 1, further comprising:
obtaining a payment account from the receipt information; and
depositing reimbursed funds into the payment account.
29. The method of embodiment 28, wherein the payment account comprises any of a credit card account, a debit account and a personal checking account.
30. The method of embodiment 1, wherein the purchase item information includes purchase items eligible for the restricted-use account and purchase items ineligible for the restricted-use account.
31. A restricted-use account reimbursement management system, comprising:
a memory;
a processor disposed in communication with said memory, and configured to issue a plurality of processing instructions stored in the memory, wherein the processor issues instructions to:
receive a restricted-use account reimbursement request including receipt information related to a purchase transaction from a user;
obtain purchase item information from the receipt information included in the restricted-use account reimbursement request;
identify a restricted-use account of the user;
determine a purchase item is eligible for the restricted-account usage;
determine a reimbursement amount associated with the purchase item form the purchase item information;
generate a reimbursement authorization request message including the purchase item information and the reimbursement amount;
transmit the reimbursement authorization request message to a restricted-account issuer for approval; and
transact the reimbursement amount from the restricted-use account to a user financial account upon the restricted-account issuer approval.
32. The system of embodiment 31, wherein the receipt information related to a purchase transaction comprises an image of a purchase receipt.
33. The system of embodiment 32, wherein the image of the purchase receipt is capture by a user mobile device.

34. The system of embodiment 31, wherein the restricted-use account reimbursement request is received via a user electronic wallet instantiated on a user mobile device.
35. The system of embodiment 34, wherein the user mobile device includes any of a smart phone, a laptop computer, and a personal digital assistant.
36. The system of embodiment 31, wherein the restricted-use account reimbursement request is received via a web-based application.
37. The system of embodiment 31, wherein the restricted-use account reimbursement request comprises user credentials including a user name and a password.
38. The system of embodiment 31, wherein the restricted-use account comprises any of: a Flexible Spending Account (FSA), and a Health Savings Accounts (HSA).
39. The system of embodiment 31, wherein the restricted use account comprises one or more government sponsored accounts, including any of Medicare and Medicaid.
40. The system of embodiment 31, wherein the restricted use account comprises an unemployment benefit account.
41. The system of embodiment 31, wherein the restricted-use account comprises any of a food stamp and a food voucher.
42. The system of embodiment 31, wherein the purchase item information includes a merchant category code.
43. The system of embodiment 31, wherein identifying a restricted-use account of the user comprises retrieving a user enrolled restricted-use account information from a user electronic wallet.
44. The system of embodiment 31, wherein obtaining purchase item information comprises performing an optical character recognition procedure on a receipt image.
45. The system of embodiment 31, wherein obtaining purchase item information comprises decoding a quick response code included in the receipt information.
46. The system of embodiment 31, wherein the purchase item information includes a payment amount associated with the purchase item.
47. The system of embodiment 31, wherein the reimbursement amount equals a payment amount obtained from the receipt information.
48. The system of embodiment 31, wherein the processor further issues instructions to:
obtain user insurance information;
determine the purchase item is a healthcare related product; and
generate an insurance embodiment request to an insurance provider.
49. The system of embodiment 31, wherein the processor further issues instructions to:
receive an insurance refund from the insurance provider.
50. The system of embodiment 49, wherein the processor further issues instructions to:
calculating the reimbursement amount as a payment amount of the purchase item minus the insurance refund.
51. The system of embodiment 31, wherein the account issuer verifies the purchase item is eligible for usage with the restricted-use account.
52. The system of embodiment 31, wherein the account issuer determines there is sufficient remaining balance to reimburse for the reimbursement amount.
53. The system of embodiment 31, wherein the processor further issues instructions to:
generate a restricted-use account recommendation list when the purchase item is eligible for more than one restricted-use accounts.
54. The system of embodiment 53, wherein the restricted-use account recommendation list is generated based on user configured restricted-use account usage rules.
55. The system of embodiment 53, wherein the wherein the restricted-use account recommendation list is generated based on available balance of each restricted-use account.
56. The system of embodiment 53, wherein the restricted-use account recommendation list ranks accounts in a prioritized order.
57. The system of embodiment 31, wherein the restricted-use account reimbursement account further comprises a user selected account for depositing reimbursed funds.
58. The system of embodiment 31, wherein the processor further issues instructions to:
obtain a payment account from the receipt information; and
deposit reimbursed funds into the payment account.
59. The system of embodiment 58, wherein the payment account comprises any of a credit card account, a debit account and a personal checking account.
60. The system of embodiment 31, wherein the purchase item information includes purchase items eligible for the restricted-use account and purchase items ineligible for the restricted-use account.
61. A restricted-use account reimbursement management processor-readable non-transitory medium storing processor-executable instructions executable by a processor to:
receive a restricted-use account reimbursement request including receipt information related to a purchase transaction from a user;
obtain purchase item information from the receipt information included in the restricted-use account reimbursement request;
identify a restricted-use account of the user;
determine a purchase item is eligible for the restricted-account usage;
determine a reimbursement amount associated with the purchase item form the purchase item information;
generate a reimbursement authorization request message including the purchase item information and the reimbursement amount;
transmit the reimbursement authorization request message to a restricted-account issuer for approval; and
transact the reimbursement amount from the restricted-use account to a user financial account upon the restricted-account issuer approval.
62. The medium of embodiment 61, wherein the receipt information related to a purchase transaction comprises an image of a purchase receipt.
63. The medium of embodiment 62, wherein the image of the purchase receipt is capture by a user mobile device.
64. The medium of embodiment 61, wherein the restricted-use account reimbursement request is received via a user electronic wallet instantiated on a user mobile device.
65. The medium of embodiment 64, wherein the user mobile device includes any of a smart phone, a laptop computer, and a personal digital assistant.

66. The medium of embodiment 61, wherein the restricted-use account reimbursement request is received via a web-based application.
67. The medium of embodiment 61, wherein the restricted-use account reimbursement request comprises user credentials including a user name and a password.
68. The medium of embodiment 61, wherein the restricted-use account comprises any of: a Flexible Spending Account (FSA), and a Health Savings Accounts (HSA).
69. The medium of embodiment 61, wherein the restricted use account comprises one or more government sponsored accounts, including any of Medicare and Medicaid.
70. The medium of embodiment 61, wherein the restricted use account comprises an unemployment benefit account.
71. The medium of embodiment 61, wherein the restricted-use account comprises any of a food stamp and a food voucher.
72. The medium of embodiment 61, wherein the purchase item information includes a merchant category code.
73. The medium of embodiment 61, wherein identifying a restricted-use account of the user comprises retrieving a user enrolled restricted-use account information from a user electronic wallet.
74. The medium of embodiment 61, wherein obtaining purchase item information comprises performing an optical character recognition procedure on a receipt image.
75. The medium of embodiment 61, wherein obtaining purchase item information comprises decoding a quick response code included in the receipt information.
76. The medium of embodiment 61, wherein the purchase item information includes a payment amount associated with the purchase item.
77. The medium of embodiment 61, wherein the reimbursement amount equals a payment amount obtained from the receipt information.
78. The medium of embodiment 61, further storing instructions executable by the processor to:
obtain user insurance information;
determine the purchase item is a healthcare related product; and
generate an insurance embodiment request to an insurance provider.
79. The medium of embodiment 61, further storing instructions executable by the processor to:
receive an insurance refund from the insurance provider.
80. The medium of embodiment 79, further storing instructions executable by the processor to:
calculating the reimbursement amount as a payment amount of the purchase item minus the insurance refund.
81. The medium of embodiment 61, wherein the account issuer verifies the purchase item is eligible for usage with the restricted-use account.
82. The medium of embodiment 61, wherein the account issuer determines there is sufficient remaining balance to reimburse for the reimbursement amount.
83. The medium of embodiment 61, further storing instructions executable by the processor to:
generate a restricted-use account recommendation list when the purchase item is eligible for more than one restricted-use accounts.
84. The medium of embodiment 83, wherein the restricted-use account recommendation list is generated based on user configured restricted-use account usage rules.
85. The medium of embodiment 83, wherein the wherein the restricted-use account recommendation list is generated based on available balance of each restricted-use account.
86. The medium of embodiment 83, wherein the restricted-use account recommendation list ranks accounts in a prioritized order.
87. The medium of embodiment 61, wherein the restricted-use account reimbursement account further comprises a user selected account for depositing reimbursed funds.
88. The medium of embodiment 61, further storing instructions executable by the processor to:
obtain a payment account from the receipt information; and
deposit reimbursed funds into the payment account.
89. The medium of embodiment 58, wherein the payment account comprises any of a credit card account, a debit account and a personal checking account.
90. The medium of embodiment 61, wherein the purchase item information includes purchase items eligible for the restricted-use account and purchase items ineligible for the restricted-use account.
91. A processor-implemented restricted-account payment method, comprising:
receiving a purchase checkout request including purchase item information;
obtaining purchase item category information from the purchase item information;
retrieving a restricted-account registered by a user;
determining at least one purchase item qualifies for the restricted-account usage based on the obtained purchase item category information;
generating an inquiry to the user notifying eligibility of the purchase item for the restricted-use account;
receiving a user account selection for the purchase checkout;
determining the user account selection indicates the restricted-use account; and
processing a financial transaction with the restricted-use account for the at least one purchase item.
92. A restricted-account payment system, comprising:
a memory;
a processor disposed in communication with said memory, and configured to issue a plurality of processing instructions stored in the memory, wherein the processor issues instructions to:
receive a purchase checkout request including purchase item information;
obtain purchase item category information from the purchase item information;
retrieve a restricted-account registered by a user;
determine at least one purchase item qualifies for the restricted-account usage based on the obtained purchase item category information;
generate an inquiry to the user notifying eligibility of the purchase item for the restricted-use account;
receive a user account selection for the purchase checkout;
determine the user account selection indicates the restricted-use account; and
process a financial transaction with the restricted-use account for the at least one purchase item.

93. A restricted-account payment processor-readable non-transitory medium storing instructions executable by a processor to:
receive a purchase checkout request including purchase item information;
obtain purchase item category information from the purchase item information;
retrieve a restricted-account registered by a user;
determine at least one purchase item qualifies for the restricted-account usage based on the obtained purchase item category information;
generate an inquiry to the user notifying eligibility of the purchase item for the restricted-use account;
receive a user account selection for the purchase checkout;
determine the user account selection indicates the restricted-use account; and
process a financial transaction with the restricted-use account for the at least one purchase item.

94. A processor-implemented restricted-account payment method, comprising:
obtaining, at a user device, a user input to initiate a purchase transaction;
acquiring an image frame via an image acquisition device operatively connected to the user device;
identifying a payment code depicted within the acquired image frame;
obtaining purchase item information based on the identified payment code;
determining a purchase item is qualified for a restricted-use account;
generating an account recommendation indication including the restricted-use account;
obtaining a user account selection including the restricted-use account in response to the account recommendation indication;
generating, via the user device, a purchase transaction request using the identified payment code;
providing the purchase transaction request for payment processing; and obtaining a purchase receipt for the purchase transaction.

95. A restricted-account payment system, comprising:
a memory;
a processor disposed in communication with said memory, and configured to issue a plurality of processing instructions stored in the memory, wherein the processor issues instructions to:
obtain, at a user device, a user input to initiate a purchase transaction;
acquire an image frame via an image acquisition device operatively connected to the user device;
identify a payment code depicted within the acquired image frame;
obtain purchase item information based on the identified payment code;
determine a purchase item is qualified for a restricted-use account;
generate an account recommendation indication including the restricted-use account;
obtain a user account selection including the restricted-use account in response to the account recommendation indication;
generate, via the user device, a purchase transaction request using the identified payment code;
provide the purchase transaction request for payment processing; and obtain a purchase receipt for the purchase transaction.

96. A restricted-account payment processor-readable non-transitory medium storing instructions executable by a processor to:
obtain, at a user device, a user input to initiate a purchase transaction;
acquire an image frame via an image acquisition device operatively connected to the user device;
identify a payment code depicted within the acquired image frame;
obtain purchase item information based on the identified payment code;
determine a purchase item is qualified for a restricted-use account;
generate an account recommendation indication including the restricted-use account;
obtain a user account selection including the restricted-use account in response to the account recommendation indication;
generate, via the user device, a purchase transaction request using the identified payment code;
provide the purchase transaction request for payment processing; and
obtain a purchase receipt for the purchase transaction.

In order to address various issues and advance the art, the entirety of this application for RESTRICTED-USE ACCOUNT PAYMENT ADMINISTRATION APPARATUSES, METHODS AND SYSTEMS APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a RUAP individual and/or enterprise user, database configuration and/or relational model, data type, data transmission and/or network framework, syntax structure, and/or the like, various embodiments of the RUAP may be implemented that allow a great deal of flexibility and customization. For example, aspects of the RUAP may be adapted for various card management and secured payment processing, offer/coupon distribution and redemption, social payment, and/or the like. While various embodiments and discussions of the RUAP have been directed to restricted-use account payment, however, it is to be understood that the embodiments described herein may be readily configured and/or customized for a wide variety of other applications and/or implementations.

What is claimed is:

1. A processor-implemented restricted-use account reimbursement management method, comprising:
    receiving electronically, by a payment processing computer network, a restricted-use account reimbursement request including receipt information related to a purchase transaction from a user mobile wallet component instantiated on a memory of a user mobile device, the receipt information having a purchase item that has already been paid for by a user, said purchase item being potentially eligible for a restricted-account usage;
    obtaining, by a transaction processor, purchase item information from the receipt information included in the restricted-use account reimbursement request;
    automatically generating, by the transaction processor, a computer-executable link to identify a recommended restricted-use account of the user in response to accessing information generated from the mobile device of the user, said information generated from the mobile device comprising GPS information from a GPS component;
    determining, by the transaction processor, based on the restricted-use account whether the purchase item is eligible for the restricted-account usage;
    in response to the determining eligibility of the purchase item, determining, by the transaction processor, a reimbursement amount associated with the purchase item from the purchase item information and the restricted-use account as a result of executing the computer-executable link;
    generating, by the transaction processor, a reimbursement authorization request message including the purchase item information and the reimbursement amount in response to the determining;
    transmitting, by the transaction processor, the reimbursement authorization request message to a restricted-account issuer for approval; and
    transacting electronically, by the transaction processor via the payment processing computer network, the reimbursement amount from the restricted-use account to a user financial account upon the restricted-account issuer approval.

2. The method of claim 1, wherein the receipt information related to a purchase transaction comprises an image of a purchase receipt.

3. The method of claim 2, wherein the image of the purchase receipt is capture by the user mobile device.

4. The method of claim 1, wherein the restricted-use account reimbursement request is received via a user electronic wallet instantiated on the user mobile device.

5. The method of claim 4, wherein the user mobile device includes any of a smart phone, a laptop computer, and a personal digital assistant.

6. The method of claim 1, wherein the restricted-use account reimbursement request is received via a web-based application.

7. The method of claim 1, wherein the restricted-use account reimbursement request comprises user credentials including a user name and a password.

8. The method of claim 1, wherein the restricted-use account comprises any of: a Flexible Spending Account (FSA), and a Health Savings Accounts (HSA).

9. The method of claim 1, wherein the restricted use account comprises one or more government sponsored accounts, said one or more government sponsored accounts including any of a Medicare account and a Medicaid account.

10. The method of claim 1, wherein the restricted use account comprises an unemployment benefit account.

11. The method of claim 1, wherein the restricted-use account comprises any of a food stamp and a food voucher.

12. The method of claim 1, wherein the purchase item information includes a merchant category code.

13. The method of claim 1, wherein identifying a restricted-use account of the user comprises retrieving a user enrolled restricted-use account information from a user electronic wallet.

14. The method of claim 1, wherein obtaining purchase item information comprises performing an optical character recognition procedure on a receipt image.

15. The method of claim 1, wherein obtaining purchase item information comprises decoding a quick response code included in the receipt information.

16. The method of claim 1, wherein the purchase item information includes a payment amount associated with the purchase item.

17. The method of claim 1, wherein the reimbursement amount equals a payment amount obtained from the receipt information.

18. The method of claim 1, further comprising:
    obtaining user insurance information;
    determining the purchase item is a healthcare related product; and
    generating an insurance claim request to an insurance provider.

19. The method of claim 1, wherein the identified restricted-use account of the user is highlighted among a list of user accounts via a user interface of the user mobile wallet component instantiated on the memory of the user mobile device, and accounts other than the identified restricted-use account are de-emphasized among the list of user account via the user interface of the user mobile wallet component instantiated on the user mobile device.

20. A restricted-use account reimbursement management system, comprising:
a memory;
a transaction processor disposed in communication with said memory, and configured to issue a plurality of processing instructions stored in the memory, wherein the transaction processor issues instructions to:
receive, at a payment processing network, a restricted-use account reimbursement request including receipt information related to a purchase transaction from a user mobile wallet component instantiated on a memory of a user mobile device, the receipt information having a purchase item that has already been paid for by a user, said purchase item being potentially eligible for a restricted-account usage;
obtain purchase item information from the receipt information included in the restricted-use account reimbursement request;
automatically generate a computer-executable link to identify a recommended restricted-use account of the user in response to accessing information generated from the user mobile device, said information from the user mobile device comprising GPS information from a GPS component;
determining based on the restricted-use account the purchase item is eligible for the restricted-account usage;
in response to the determining eligibility of the purchase item, determine a reimbursement amount associated with the purchase item from the purchase item information and the restricted-use account as a result of executing the computer-executable link;
generate a reimbursement authorization request message including the purchase item information and the reimbursement amount in response to the determining;
transmit the reimbursement authorization request message to a restricted-account issuer for approval; and
transact the reimbursement amount from the restricted-use account to a user financial account upon the restricted-account issuer approval.

21. A restricted-use account reimbursement management processor-readable non-transitory computer storage medium storing processor-executable instructions executable by a transaction processor to:
receive, by a payment processing network, a restricted-use account reimbursement request including receipt information related to a purchase transaction from a user mobile wallet component instantiated on a memory of a user mobile device, the receipt information having a purchase item that has already been paid for by a user, said purchase item being potentially eligible for a restricted-account usage;
obtain purchase item information from the receipt information included in the restricted-use account reimbursement request;
automatically generate a computer-executable link to identify a recommended restricted-use account of the user in response to accessing information generated from the user mobile device, said information from the user mobile device comprising GPS information from a GPS component;
determining based on the restricted-use account the purchase item is eligible for the restricted-account usage;
in response to the determining eligibility of the purchase item, determine a reimbursement amount associated with the purchase item from the purchase item information and the restricted-use account as a result of executing the computer-executable link;
generate a reimbursement authorization request message including the purchase item information and the reimbursement amount in response to the determining;
transmit the reimbursement authorization request message to a restricted-account issuer for approval; and
transact the reimbursement amount from the restricted-use account to a user financial account upon the restricted-account issuer approval.

* * * * *